US012599797B2

(12) United States Patent
Conboy

(10) Patent No.: US 12,599,797 B2
(45) Date of Patent: Apr. 14, 2026

(54) ENVIRONMENTALLY-CLEAN FIRE INHIBITING AND EXTINGUISHING COMPOSITIONS AND PRODUCTS FOR SORBING FLAMMABLE LIQUIDS WHILE INHIBITING IGNITION AND EXTINGUISHING FIRE

(71) Applicant: Mighty Fire Breaker LLC, Lima, OH (US)

(72) Inventor: Stephen Conboy, Carlsbad, CA (US)

(73) Assignee: MIGHTY FIRE BREAKER LLC, Lima, OH (US)

( * ) Notice: Subject to any disclaimer, the term of this patent is extended or adjusted under 35 U.S.C. 154(b) by 0 days.

(21) Appl. No.: 18/423,274

(22) Filed: Jan. 25, 2024

(65) Prior Publication Data

US 2024/0252865 A1 Aug. 1, 2024

Related U.S. Application Data

(63) Continuation of application No. 17/591,592, filed on Feb. 2, 2022, now Pat. No. 11,911,643, which is a (Continued)

(51) Int. Cl.
*A62D 1/00* (2006.01)
*A62C 25/00* (2006.01)

(52) U.S. Cl.
CPC ............ *A62D 1/0014* (2013.01); *A62C 25/00* (2013.01)

(58) Field of Classification Search
CPC ...... A62D 1/0014; A62C 25/00; A62C 15/00; A62C 27/00; A62C 3/0242
See application file for complete search history.

(56) References Cited

U.S. PATENT DOCUMENTS

| | | |
|---|---|---|
| 25,358 A | 9/1859 | Wilder |
| 625,871 A | 5/1899 | Busha |

(Continued)

FOREIGN PATENT DOCUMENTS

| | | |
|---|---|---|
| AU | 629404 B2 | 10/1992 |
| AU | 5986501 | 11/2001 |

(Continued)

OTHER PUBLICATIONS

US 8,460,513 B2, 06/2013, Sealey (withdrawn)

(Continued)

*Primary Examiner* — Andrew J. Oyer
(74) *Attorney, Agent, or Firm* — THOMAS J. PERKOWSKI, ESQ. PC

(57) ABSTRACT

Environmentally-clean fire inhibiting and extinguishing dry powder compositions and products for sorbing flammable liquids while inhibiting ignition and extinguishing fire involving flammable hydrocarbon liquids such as, oils, fuels and non-polar solvents such as ketones and alcohols. The dry powder chemical compositions are made by mixing, blending and milling to suitable powder particle sizes, the following components: a fire extinguishing agent in the form of at least one alkali metal salt of a nonpolymeric saturated carboxylic acid; a powder fluidizing agent to help provide the dry powder composition with excellent fluid flow characteristics; and an oleophilic/hydrophobic composition for absorbing liquid hydrocarbons, while repelling water.

14 Claims, 61 Drawing Sheets

DRY CHEMICAL POWDER COMPOSITIONS OF THE SECOND ILLUSTRATIVE EMBODIMENT OF THE PRESENT INVENTION ADAPTED FOR EXTINGUISHING FIRES INVOLVING FLAMMABLE HYDROCARBONS LIQUIDS SUCH AS, OILS, FUELS AND NON-POLAR SOLVENTS, WHILE ABSORBING THE FLAMMABLE HYDROCARBON LIQUIDS

Related U.S. Application Data continuation-in-part of application No. 17/233,461, filed on Apr. 17, 2021, now Pat. No. 11,865,394, and a continuation-in-part of application No. 17/176,670, filed on Feb. 16, 2021, now abandoned, and a continuation-in-part of application No. 17/167,084, filed on Feb. 4, 2021, now Pat. No. 11,865,390, and a continuation-in-part of application No. 16/914,067, filed on Jun. 26, 2020, now Pat. No. 11,395,931, and a continuation-in-part of application No. 16/805,811, filed on Mar. 1, 2020, now Pat. No. 11,400,324.

(56) References Cited

U.S. PATENT DOCUMENTS 867,560 A 10/1907 Currey
960,250 A 6/1910 Beenken
989,655 A 4/1911 Sicka
1,003,854 A 9/1911 Adams
1,009,620 A 11/1911 Adams
1,185,154 A 5/1916 Wilds
1,278,716 A 9/1918 Mork
1,278,718 A 9/1918 Morrison
1,293,377 A 2/1919 Donaldson
1,451,896 A 4/1923 Turner
1,468,163 A 9/1923 Matson
1,469,957 A 10/1923 Rich
1,504,454 A 8/1924 Tyson
1,532,443 A 4/1925 Sammis
1,561,193 A 11/1925 Spring
1,580,816 A 4/1926 Dunn
1,585,146 A 5/1926 Himberger
1,634,462 A 7/1927 Hallauer
1,665,995 A 4/1928 Wiley
1,708,867 A 4/1929 Bronander
1,786,963 A 12/1930 Schoenberger
1,817,342 A 8/1931 Beecher
1,819,722 A 8/1931 Sugimura
1,871,096 A 8/1932 Torseth
1,897,318 A 2/1933 Mcilvaine
1,907,153 A 5/1933 Greider
1,945,457 A 1/1934 Warr
1,948,880 A 2/1934 Hamm
1,953,331 A 4/1934 Armstrong
1,973,734 A 9/1934 Thomas
1,978,807 A 10/1934 Merritt
1,995,874 A 3/1935 Van De Mark
2,119,962 A 6/1938 Raleigh
2,150,188 A 3/1939 Rippey
2,246,616 A 6/1941 Cherry
2,247,608 A 7/1941 De Groff
2,336,648 A 12/1943 Sparks
2,349,980 A 5/1944 Moore
2,359,573 A 10/1944 Mackay
2,671,454 A 3/1954 Williams
2,886,425 A 5/1959 Seibert
2,931,083 A 4/1960 Sidenmark
3,040,816 A 6/1962 Slough
3,108,136 A 10/1963 De Pree
3,164,511 A 1/1965 Elmendorf
3,196,108 A 7/1965 Nelson
3,229,769 A 1/1966 Bashaw
3,238,129 A 3/1966 Veltman
3,274,105 A 9/1966 Mevel
3,304,675 A 2/1967 Graham-Wood
3,305,431 A 2/1967 Peterson
3,309,824 A 3/1967 Barrett
3,328,231 A 6/1967 Sergovic
3,334,045 A 8/1967 Nelson
3,350,822 A 11/1967 Nachazel
3,362,124 A 1/1968 Du Val Cravens
3,369,056 A 2/1968 Schwarzer
3,383,274 A 5/1968 Craig
3,400,766 A 9/1968 Foley
3,409,550 A 11/1968 Gould
3,427,216 A 2/1969 Quinn
3,442,334 A 5/1969 Spero
3,457,702 A 7/1969 Brown
3,468,092 A 9/1969 Chalmers
3,470,062 A 9/1969 Ollinger
3,478,861 A 11/1969 Elmendorf
3,484,372 A 12/1969 Birchall
3,501,419 A 3/1970 Bridgeford
3,506,479 A 4/1970 Breens
3,508,872 A 4/1970 Stuetz
3,509,083 A 4/1970 Winebrenner
3,511,748 A 5/1970 Heeb
3,539,423 A 11/1970 Simison
3,558,485 A 1/1971 Skvarla
3,584,412 A 6/1971 Palmer
3,607,811 A 9/1971 Hovd
3,609,074 A 9/1971 Rainaldi
3,621,917 A 11/1971 Rosen
3,635,290 A 1/1972 Schneider
3,639,326 A 2/1972 Kray
3,650,820 A 3/1972 DiPietro
3,661,809 A 5/1972 Pitts
3,663,267 A 5/1972 Moran
3,698,480 A 10/1972 Newton
3,703,394 A 11/1972 Hemming
3,730,890 A 5/1973 Nelson
3,734,191 A 5/1973 Johnson
3,738,072 A 6/1973 Adrian
3,752,234 A 8/1973 Degginger
3,755,163 A 8/1973 Broll
3,755,448 A 8/1973 Merianos
3,763,238 A 10/1973 Adams
3,795,637 A 3/1974 Kandler
3,809,223 A 5/1974 Kendall
3,827,869 A 8/1974 Von Bonin
3,899,855 A 8/1975 Gadsby
3,934,066 A 1/1976 Murch
3,935,343 A 1/1976 Nuttall
3,944,688 A 3/1976 Inman
3,984,334 A 10/1976 Hopper
3,994,110 A 11/1976 Ropella
4,013,599 A 3/1977 Strauss
4,037,665 A 7/1977 Hopper
4,049,556 A 9/1977 Tujimoto
4,049,849 A 9/1977 Brown
4,065,413 A 12/1977 Macinnis
4,076,862 A 2/1978 Kobeski
4,092,281 A 5/1978 Bertrand
4,104,073 A 8/1978 Koide
4,153,466 A 5/1979 Smith
4,168,175 A 9/1979 Shutt
4,172,858 A 10/1979 Clubley
4,176,071 A 11/1979 Crouch
4,176,115 A 11/1979 Hartman
4,184,449 A 1/1980 Louderback
4,184,802 A 1/1980 Cook
4,194,979 A 3/1980 Gottschall
4,197,913 A 4/1980 Korenowski
4,198,328 A 4/1980 Bertelli
4,209,561 A 6/1980 Sawko
4,226,727 A 10/1980 Tarpley, Jr.
4,228,202 A 10/1980 Tjaennberg
4,234,044 A 11/1980 Hollan
4,237,182 A 12/1980 Fulmer
4,248,976 A 2/1981 Clubley
4,251,579 A 2/1981 Lee
4,254,177 A 3/1981 Fulmer
4,265,963 A 5/1981 Matalon
4,266,384 A 5/1981 Orals
4,272,414 A 6/1981 Vandersall
4,285,842 A 8/1981 Herr
4,344,489 A 8/1982 Bonaparte
4,346,012 A 8/1982 Umaba
4,364,987 A 12/1982 Goodwin
4,382,884 A 5/1983 Rohringer
4,392,994 A 7/1983 Wagener
4,394,108 A 7/1983 Cook
4,419,256 A 12/1983 Loomis
4,419,401 A 12/1983 Pearson

(56) References Cited

U.S. PATENT DOCUMENTS

| | | | |
|---|---|---|---|
| 4,514,327 | A | 4/1985 | Rock |
| 4,530,877 | A | 7/1985 | Hadley |
| 4,560,485 | A | 12/1985 | Szekely |
| 4,563,287 | A | 1/1986 | Hisamoto |
| 4,572,862 | A | 2/1986 | Ellis |
| 4,578,913 | A | 4/1986 | Eich |
| 4,595,414 | A | 6/1986 | Shutt |
| 4,622,361 | A | 11/1986 | Gill |
| 4,652,383 | A | 3/1987 | Tarpley, Jr. |
| 4,659,381 | A | 4/1987 | Walters |
| 4,661,398 | A | 4/1987 | Ellis |
| 4,663,226 | A | 5/1987 | Vajs |
| 4,666,960 | A | 5/1987 | Spain |
| 4,688,643 | A | 8/1987 | Carter |
| 4,690,859 | A | 9/1987 | Porter |
| 4,714,652 | A | 12/1987 | Poletto |
| 4,720,414 | A | 1/1988 | Burga |
| 4,724,250 | A | 2/1988 | Schubert |
| 4,725,382 | A | 2/1988 | Lewchalermwong |
| 4,725,383 | A | 2/1988 | Hayashi |
| 4,737,406 | A | 4/1988 | Bumpus |
| 4,740,527 | A | 4/1988 | von Bonin |
| 4,743,625 | A | 5/1988 | Vajs |
| 4,755,397 | A | 7/1988 | Eden |
| 4,756,839 | A | 7/1988 | Curzon |
| 4,770,794 | A | 9/1988 | Cundasawmy |
| 4,776,403 | A | 10/1988 | Lejosne |
| 4,810,741 | A | 3/1989 | Kim |
| 4,822,524 | A | 4/1989 | Strickland |
| 4,824,483 | A | 4/1989 | Bumpus |
| 4,824,484 | A | 4/1989 | Metzner |
| 4,852,656 | A | 8/1989 | Banahan |
| 4,861,397 | A | 8/1989 | Hillstrom |
| 4,871,477 | A | 10/1989 | Dimanshteyn |
| 4,879,320 | A | 11/1989 | Hastings |
| 4,888,136 | A | 12/1989 | Chellapa |
| 4,895,878 | A | 1/1990 | Jourquin |
| 4,901,763 | A | 2/1990 | Scott |
| 4,909,328 | A | 3/1990 | DeChant |
| 4,913,835 | A | 4/1990 | Mandel |
| 4,965,296 | A | 10/1990 | Hastings |
| 4,986,363 | A | 1/1991 | Nahmiaj |
| 4,986,805 | A | 1/1991 | Laramore |
| 4,993,495 | A | 2/1991 | Burchert |
| 5,021,484 | A | 6/1991 | Schreiber |
| 5,023,019 | A | 6/1991 | Bumpus |
| 5,032,446 | A | 7/1991 | Sayles |
| 5,039,454 | A | 8/1991 | Policastro |
| 5,053,147 | A | 10/1991 | Kaylor |
| 5,055,208 | A | 10/1991 | Stewart |
| 5,062,996 | A | 11/1991 | Kaylor |
| 5,070,945 | A | 12/1991 | Nahmias |
| 5,091,097 | A | 2/1992 | Pennartz |
| 5,105,493 | A | 4/1992 | Lugtenaar |
| 5,130,184 | A | 7/1992 | Ellis |
| 5,156,775 | A | 10/1992 | Blount |
| 5,162,394 | A | 11/1992 | Trocino |
| 5,182,049 | A | 1/1993 | von Bonin |
| 5,185,214 | A | 2/1993 | Levan |
| 5,214,867 | A | 6/1993 | Weatherly |
| 5,214,894 | A | 6/1993 | Glesser-Lott |
| 5,239,007 | A | 8/1993 | Le-Khac |
| 5,250,200 | A | 10/1993 | Sallet |
| 5,283,998 | A | 2/1994 | Jong |
| 5,284,700 | A | 2/1994 | Strauss |
| 5,318,504 | A | 6/1994 | Edenbaum |
| 5,333,426 | A | 8/1994 | Varoglu |
| 5,356,568 | A | 10/1994 | Levine |
| 5,371,986 | A | 12/1994 | Guditis |
| 5,383,749 | A | 1/1995 | Reisdorff |
| 5,391,246 | A | 2/1995 | Stephens |
| 5,393,437 | A | 2/1995 | Bower |
| 5,405,661 | A | 4/1995 | Kim |
| 5,422,484 | A | 6/1995 | Brogi |
| 5,491,022 | A | 2/1996 | Smith |
| 5,507,350 | A | 4/1996 | Primlani |
| 5,509,485 | A | 4/1996 | Almagro |
| 5,518,638 | A | 5/1996 | Buil |
| 5,534,164 | A | 7/1996 | Guglielmi |
| 5,534,301 | A | 7/1996 | Shutt |
| 5,560,429 | A | 10/1996 | Needham |
| 5,582,759 | A | 12/1996 | Bursey, Jr. |
| 5,590,717 | A | 1/1997 | McBay |
| 5,605,767 | A | 2/1997 | Fuller |
| 5,609,915 | A | 3/1997 | Fuller |
| 5,626,787 | A | 5/1997 | Porter |
| 5,631,047 | A | 5/1997 | Friloux |
| 5,688,843 | A | 11/1997 | Inaoka |
| 5,709,821 | A | 1/1998 | von Bonin |
| 5,729,936 | A | 3/1998 | Maxwell |
| 5,734,335 | A | 3/1998 | Brogi |
| 5,738,924 | A | 4/1998 | Sing |
| 5,746,031 | A | 5/1998 | Burns |
| 5,765,333 | A | 6/1998 | Cunningham |
| 5,778,984 | A | 7/1998 | Suwa |
| 5,815,994 | A | 10/1998 | Knight |
| 5,817,369 | A | 10/1998 | Conradie |
| 5,833,874 | A | 11/1998 | Stewart |
| 5,834,535 | A | 11/1998 | Abu-Isa |
| 5,840,413 | A | 11/1998 | Kajander |
| 5,849,210 | A | 12/1998 | Pascente |
| 5,857,623 | A | 1/1999 | Miller |
| 5,894,891 | A | 4/1999 | Rosenstock |
| 5,918,680 | A | 7/1999 | Sheinson |
| 5,929,276 | A | 7/1999 | Kirkovits |
| 5,931,233 | A | 8/1999 | La Bonte |
| 5,934,347 | A | 8/1999 | Phelps |
| 5,945,025 | A | 8/1999 | Cunningham |
| 5,948,148 | A | 9/1999 | Cuevas |
| 5,968,669 | A | 10/1999 | Liu |
| 6,000,189 | A | 12/1999 | Breuer |
| 6,024,889 | A | 2/2000 | Holland |
| 6,029,751 | A | 2/2000 | Ford |
| 6,042,639 | A | 3/2000 | Valsoe |
| 6,073,410 | A | 6/2000 | Schimpf |
| 6,090,877 | A | 7/2000 | Bheda |
| 6,142,238 | A | 11/2000 | Holt |
| 6,146,544 | A | 11/2000 | Guglielmi |
| 6,146,557 | A | 11/2000 | Inata |
| 6,150,449 | A | 11/2000 | Valkanas |
| 6,153,682 | A | 11/2000 | Bannat |
| 6,164,382 | A | 12/2000 | Schutte |
| 6,167,971 | B1 | 1/2001 | Van Lingen |
| 6,173,791 | B1 | 1/2001 | Yen |
| 6,189,623 | B1 | 2/2001 | Zhegrov et al. |
| 6,202,755 | B1 | 3/2001 | Hardge |
| 6,209,655 | B1 | 4/2001 | Valkanas |
| 6,245,842 | B1 | 6/2001 | Buxton |
| 6,271,156 | B1 | 8/2001 | Gleason |
| 6,289,540 | B1 | 9/2001 | Emonds |
| 6,296,781 | B1 | 10/2001 | Amiran |
| 6,309,746 | B1 | 10/2001 | Broutier |
| 6,311,781 | B1 | 11/2001 | Jerke |
| 6,318,473 | B1 | 11/2001 | Bartley |
| 6,364,026 | B1 | 4/2002 | Doshay |
| 6,385,931 | B1 | 5/2002 | Risser |
| 6,387,300 | B1 | 5/2002 | Bosserman |
| 6,398,136 | B1 | 6/2002 | Smith |
| 6,401,487 | B1 | 6/2002 | Kotliar |
| 6,401,830 | B1 | 6/2002 | Romanoff |
| 6,406,755 | B1 | 6/2002 | Kindt |
| 6,415,571 | B2 | 7/2002 | Risser |
| 6,418,752 | B2 | 7/2002 | Kotliar |
| 6,423,129 | B1 | 7/2002 | Fitzgibbons, Jr. |
| 6,423,251 | B1 | 7/2002 | Blount |
| 6,427,779 | B1 | 8/2002 | Richman |
| 6,436,306 | B1 | 8/2002 | Jennings |
| 6,442,912 | B1 | 9/2002 | Phillips |
| 6,444,718 | B1 | 9/2002 | Blount |
| 6,453,636 | B1 | 9/2002 | Ritz |
| 6,461,542 | B1 | 10/2002 | Smith |
| 6,464,903 | B1 | 10/2002 | Blount |
| 6,470,805 | B1 | 10/2002 | Woodall |
| 6,491,254 | B1 | 12/2002 | Walkinshaw |

(56) References Cited

U.S. PATENT DOCUMENTS

| | | | |
|---|---|---|---|
| 6,502,421 | B2 | 1/2003 | Kotliar |
| 6,517,748 | B2 | 2/2003 | Richards |
| 6,524,653 | B1 | 2/2003 | Jones |
| 6,557,374 | B2 | 5/2003 | Kotliar |
| 6,558,684 | B1 | 5/2003 | Sutherland |
| 6,560,991 | B1 | 5/2003 | Kotliar |
| 6,565,923 | B1 | 5/2003 | Cheng |
| 6,581,878 | B1 | 6/2003 | Bennett |
| 6,608,123 | B2 | 8/2003 | Galli |
| 6,613,391 | B1 | 9/2003 | Gang |
| 6,620,348 | B1 | 9/2003 | Vandersall et al. |
| 6,622,966 | B1 | 9/2003 | Mcconnell, Sr. |
| 6,629,392 | B1 | 10/2003 | Harrel |
| 6,702,032 | B1 | 3/2004 | Torras, Sr. |
| 6,706,774 | B2 | 3/2004 | Muenzenberger |
| 6,713,411 | B2 | 3/2004 | Cox |
| 6,725,941 | B2 | 4/2004 | Edwards |
| 6,736,989 | B2 | 5/2004 | Stewart |
| 6,772,562 | B1 | 8/2004 | Dadamo |
| 6,777,469 | B2 | 8/2004 | Blount |
| 6,780,991 | B2 | 8/2004 | Vandersall et al. |
| 6,796,382 | B2 | 9/2004 | Kaimart |
| 6,800,352 | B1 | 10/2004 | Hejna |
| 6,802,994 | B1 | 10/2004 | Kegeler |
| 6,810,964 | B1 | 11/2004 | Arnot |
| 6,810,965 | B2 | 11/2004 | Matsukawa |
| 6,811,731 | B2 | 11/2004 | Archer |
| 6,828,437 | B2 | 12/2004 | Vandersall |
| 6,846,437 | B2 | 1/2005 | Vandersall |
| 6,852,853 | B2 | 2/2005 | Vandersall |
| 6,869,669 | B2 | 3/2005 | Jensen |
| 6,878,795 | B2 | 4/2005 | Marcinko |
| 6,881,247 | B2 | 4/2005 | Batdorf |
| 6,881,367 | B1 | 4/2005 | Baker |
| 6,889,776 | B2 | 5/2005 | Cheung |
| 6,897,173 | B2 | 5/2005 | Bernard |
| 6,905,639 | B2 | 6/2005 | Vandersall |
| 6,930,138 | B2 | 8/2005 | Schell |
| 6,982,049 | B1 | 1/2006 | Mabey |
| 7,018,571 | B1 | 3/2006 | Camarota |
| 7,028,783 | B2 | 4/2006 | Celorio-Villasenor |
| 7,029,612 | B2 | 4/2006 | Moriarty |
| 7,036,449 | B2 | 5/2006 | Sutter |
| 7,070,704 | B2 | 7/2006 | Kang |
| 7,082,999 | B2 | 8/2006 | Arnot |
| 7,083,000 | B2 | 8/2006 | Edwards |
| 7,089,862 | B1 | 8/2006 | Vasquez |
| 7,140,449 | B1 | 11/2006 | Ebner |
| 7,147,061 | B2 | 12/2006 | Tsutaoka |
| 7,164,468 | B2 | 1/2007 | Correia Da Silva Vilar |
| 7,210,537 | B1 | 5/2007 | Mcneil |
| 7,261,165 | B1 | 8/2007 | Black |
| 7,264,796 | B2 | 9/2007 | Hejna |
| 7,273,634 | B2 | 9/2007 | Fitzgibbons, Jr. |
| 7,323,248 | B2 | 1/2008 | Ramsey |
| 7,331,399 | B2 | 2/2008 | Multer |
| 7,337,156 | B2 | 2/2008 | Wippich |
| 7,341,113 | B2 | 3/2008 | Fallis |
| 7,407,993 | B2 | 8/2008 | Harrison |
| 7,413,145 | B2 | 8/2008 | Hale |
| 7,478,680 | B2 | 1/2009 | Sridharan |
| 7,479,513 | B2 | 1/2009 | Reinheimer |
| 7,482,395 | B2 | 1/2009 | Mabey |
| 7,487,841 | B1 | 2/2009 | Gonci |
| 7,504,449 | B2 | 3/2009 | Mazor |
| 7,560,041 | B2 | 7/2009 | Yoon |
| 7,585,566 | B2 | 9/2009 | Colvin |
| 7,587,875 | B2 | 9/2009 | Kish |
| 7,588,087 | B2 | 9/2009 | Cafferata |
| 7,614,456 | B2 | 11/2009 | Twum |
| 7,626,076 | B2 | 12/2009 | Shin |
| 7,670,513 | B2 | 3/2010 | Erdner |
| 7,673,696 | B1 | 3/2010 | Gunn |
| 7,686,093 | B2 | 3/2010 | Reilly |
| 7,744,687 | B2 | 6/2010 | Moreno |
| 7,748,662 | B2 | 7/2010 | Hale |
| 7,754,808 | B2 | 7/2010 | Goossens |
| 7,766,090 | B2 | 8/2010 | Mohr |
| 7,767,010 | B2 | 8/2010 | Curzon |
| 7,785,409 | B2 | 8/2010 | Atkinson |
| 7,785,712 | B2 | 8/2010 | Miller |
| 7,789,165 | B1 | 9/2010 | Yen |
| 7,810,724 | B2 | 10/2010 | Skaaksrud |
| 7,815,157 | B2 | 10/2010 | Knight |
| 7,820,736 | B2 | 10/2010 | Reinheimer |
| 7,824,583 | B2 | 11/2010 | Gang |
| 7,828,069 | B2 | 11/2010 | Lee |
| 7,832,492 | B1 | 11/2010 | Eldridge |
| 7,837,009 | B2 | 11/2010 | Gross |
| 7,849,542 | B2 | 12/2010 | Defranks |
| 7,863,355 | B2 | 1/2011 | Futterer |
| 7,886,836 | B2 | 2/2011 | Haaland |
| 7,886,837 | B1 | 2/2011 | Helfgott |
| 7,897,070 | B2 | 3/2011 | Knocke |
| 7,897,673 | B2 | 3/2011 | Flat |
| 7,900,709 | B2 | 3/2011 | Kotliar |
| 7,934,564 | B1 | 5/2011 | Stell |
| 7,955,711 | B2 | 6/2011 | Castillo |
| 7,975,774 | B2 | 7/2011 | Akcasu |
| 8,006,447 | B2 | 8/2011 | Beele |
| 8,080,186 | B1 | 12/2011 | Pennartz |
| 8,084,523 | B2 | 12/2011 | Lopez |
| 8,088,310 | B2 | 1/2012 | Orr |
| 8,141,649 | B2 | 3/2012 | Kotliar |
| 8,148,315 | B2 | 4/2012 | Baker |
| 8,168,304 | B2 | 5/2012 | Zhang |
| 8,171,677 | B2 | 5/2012 | Flint |
| 8,206,620 | B1 | 6/2012 | Bolton |
| 8,217,093 | B2 | 7/2012 | Reinheimer |
| 8,226,017 | B2 | 7/2012 | Cohen |
| 8,263,231 | B2 | 9/2012 | Mesa |
| 8,273,813 | B2 | 9/2012 | Beck |
| 8,276,679 | B2 | 10/2012 | Bui |
| 8,281,550 | B1 | 10/2012 | Bolton |
| 8,286,405 | B1 | 10/2012 | Bolton |
| 8,291,990 | B1 | 10/2012 | Mohr |
| 8,344,055 | B1 | 1/2013 | Mabey |
| 8,366,955 | B2 | 2/2013 | Thomas |
| 8,403,070 | B1 | 3/2013 | Lowe |
| 8,409,479 | B2 | 4/2013 | Alexander |
| 8,453,752 | B2 | 6/2013 | Katsuraku |
| 8,457,013 | B2 | 6/2013 | Essinger |
| 8,458,971 | B2 | 6/2013 | Winterowd |
| 8,465,833 | B2 | 6/2013 | Lee |
| 8,534,370 | B1 | 9/2013 | Al Azemi |
| 8,586,657 | B2 | 11/2013 | Lopez |
| 8,603,231 | B2 | 12/2013 | Wagh |
| 8,607,272 | B2 | 12/2013 | Walter |
| 8,646,540 | B2 | 2/2014 | Eckholm |
| 8,647,524 | B2 | 2/2014 | Rueda-Nunez |
| 8,662,192 | B2 | 3/2014 | Dunster |
| 8,663,427 | B2 | 3/2014 | Sealey |
| 8,663,774 | B2 | 3/2014 | Fernando |
| 8,663,788 | B2 | 3/2014 | Oh |
| 8,668,988 | B2 | 3/2014 | Schoots |
| 8,685,206 | B2 | 4/2014 | Sealey |
| 8,691,005 | B2 | 4/2014 | Moriarty |
| 8,698,634 | B2 | 4/2014 | Guedes Lopes Da Fonseca |
| 8,715,540 | B2 | 5/2014 | Curzon |
| 8,746,355 | B2 | 6/2014 | Demmitt |
| 8,746,357 | B2 | 6/2014 | Butz |
| 8,757,280 | B2 | 6/2014 | Cordani |
| 8,778,213 | B2 | 7/2014 | Guo |
| 8,789,769 | B2 | 7/2014 | Fenton |
| 8,801,536 | B2 | 8/2014 | O'Shea, III |
| 8,808,850 | B2 | 8/2014 | Dion |
| 8,820,421 | B2 | 9/2014 | Rahgozar |
| 8,871,053 | B2 | 10/2014 | Sealey |
| 8,871,058 | B2 | 10/2014 | Sealey |
| 8,871,110 | B2 | 10/2014 | Guo |
| 8,891,005 | B2 | 11/2014 | Sasaki |
| 8,893,814 | B2 | 11/2014 | Bui |
| 8,944,174 | B2 | 2/2015 | Thomas |
| 8,973,669 | B2 | 3/2015 | Connery |

(56) References Cited

U.S. PATENT DOCUMENTS

| | | | | |
|---|---|---|---|---|
| 8,980,145 | B2 | 3/2015 | Baroux | |
| 9,005,396 | B2 | 4/2015 | Baroux | |
| 9,005,642 | B2 | 4/2015 | Mabey | |
| 9,027,303 | B2 | 5/2015 | Lichtinger | |
| 9,072,228 | B1 | 7/2015 | Carelli | |
| 9,089,730 | B2 | 7/2015 | Shalev | |
| 9,109,390 | B1 | 8/2015 | Cavuoti | |
| 9,109,649 | B2 | 8/2015 | Bohle | |
| 9,120,570 | B2 | 9/2015 | Hoisington | |
| 9,174,074 | B2 | 11/2015 | Medina | |
| 9,187,674 | B2 | 11/2015 | Ulcar | |
| 9,199,108 | B2 | 12/2015 | Guo | |
| 9,248,325 | B2 | 2/2016 | Lewis | |
| 9,249,021 | B2 | 2/2016 | Mundheim | |
| 9,265,978 | B2 | 2/2016 | Klaffmo | |
| 9,302,749 | B1 | 4/2016 | D Offay | |
| 9,314,947 | B2 | 4/2016 | Moriarty | |
| 9,321,808 | B2 | 4/2016 | Seneci | |
| 9,323,116 | B2 | 4/2016 | You | |
| 9,328,317 | B2 | 5/2016 | Peng | |
| 9,339,671 | B1 | 5/2016 | Raj | |
| 9,382,153 | B2 | 7/2016 | Fisher | |
| 9,409,045 | B2 | 8/2016 | Berezovsky | |
| 9,420,169 | B2 | 8/2016 | Uemura | |
| 9,425,111 | B2 | 8/2016 | Park | |
| 9,426,984 | B2 | 8/2016 | Pascal | |
| 9,458,366 | B2 * | 10/2016 | Blomgreen | B32B 21/14 |
| 9,498,787 | B2 | 11/2016 | Fenton | |
| 9,499,677 | B2 | 11/2016 | Dukes | |
| 9,534,072 | B2 | 1/2017 | Gurke | |
| 9,597,538 | B2 | 3/2017 | Langselius | |
| 9,604,960 | B2 | 3/2017 | Liu | |
| 9,605,888 | B2 | 3/2017 | Shin | |
| 9,616,590 | B2 | 4/2017 | Birkeland | |
| 9,618,434 | B2 | 4/2017 | Mizuta | |
| 9,663,943 | B2 | 5/2017 | Dimakis | |
| 9,706,858 | B2 | 7/2017 | Johnson | |
| 9,715,352 | B2 | 7/2017 | Craddock | |
| 9,776,029 | B2 | 10/2017 | Izumida | |
| 9,777,500 | B1 | 10/2017 | Reisdorff | |
| 9,782,944 | B2 | 10/2017 | Martin | |
| 9,792,500 | B2 | 10/2017 | Pennypacker | |
| 9,803,228 | B2 | 10/2017 | Wu | |
| 9,809,685 | B2 | 11/2017 | Erbes | |
| 9,818,524 | B2 | 11/2017 | Vaesen | |
| 9,822,532 | B2 | 11/2017 | Sherry | |
| 9,851,718 | B2 | 12/2017 | Booher | |
| 9,852,993 | B2 | 12/2017 | Park | |
| 9,856,197 | B2 | 1/2018 | Zubrin | |
| 9,861,954 | B2 | 1/2018 | Chung | |
| 9,920,250 | B1 | 3/2018 | Vuozzo | |
| 9,931,648 | B2 | 4/2018 | Fenton | |
| 9,956,446 | B2 | 5/2018 | Connery | |
| 9,986,313 | B2 | 5/2018 | Schwarzkopf | |
| 9,988,563 | B2 | 6/2018 | Holvoet | |
| 10,016,643 | B2 | 7/2018 | Smith | |
| 10,041,251 | B2 | 8/2018 | King | |
| 10,131,119 | B2 | 11/2018 | Freres | |
| 10,166,419 | B2 | 1/2019 | Springell | |
| 10,260,232 | B1 | 4/2019 | Conboy | |
| 10,290,004 | B1 | 5/2019 | Conboy | |
| 10,332,222 | B1 | 6/2019 | Conboy | |
| 10,430,757 | B2 | 10/2019 | Conboy | |
| 10,464,294 | B2 | 11/2019 | Freres | |
| 10,472,169 | B1 | 11/2019 | Parker, Jr. | |
| 10,550,483 | B2 | 2/2020 | Khosla | |
| 10,653,904 | B2 | 5/2020 | Conboy | |
| 10,662,114 | B2 | 5/2020 | Lettkeman | |
| 10,695,597 | B2 | 6/2020 | Conboy | |
| 10,717,880 | B2 | 7/2020 | Dries | |
| 10,814,150 | B2 | 10/2020 | Conboy | |
| 10,844,223 | B2 | 11/2020 | Holvoet | |
| 10,899,038 | B2 | 1/2021 | Conboy | |
| 10,919,178 | B2 | 2/2021 | Conboy | |
| 10,960,249 | B2 | 3/2021 | Hulbert | |
| 10,960,251 | B1 | 3/2021 | Hulbert | |
| 10,995,221 | B2 | 5/2021 | Lu | |
| 11,025,560 | B2 | 6/2021 | Singleton, IV | |
| 11,142,698 | B2 | 10/2021 | Kim | |
| 11,247,087 | B2 | 2/2022 | Mcdonald | |
| 11,395,931 | B2 | 7/2022 | Conboy | |
| 11,395,934 | B2 | 7/2022 | Hulbert | |
| 11,400,324 | B2 | 8/2022 | Conboy | |
| 11,420,084 | B2 | 8/2022 | Hulbert | |
| 11,534,643 | B2 | 12/2022 | Hulbert | |
| 11,554,279 | B2 | 1/2023 | Hulbert | |
| 11,578,487 | B2 | 2/2023 | Johnson | |
| 11,602,658 | B2 | 3/2023 | Hulbert | |
| 11,607,570 | B2 | 3/2023 | Hulbert | |
| 11,628,324 | B2 | 4/2023 | Hulbert | |
| 11,633,636 | B2 | 4/2023 | Conboy | |
| 11,638,844 | B2 | 5/2023 | Conboy | |
| 11,642,555 | B2 | 5/2023 | Conboy | |
| 11,679,290 | B2 | 6/2023 | Robles | |
| 11,697,039 | B2 | 7/2023 | Conboy | |
| 11,697,040 | B2 | 7/2023 | Conboy | |
| 11,697,041 | B2 | 7/2023 | Conboy | |
| 11,794,044 | B2 | 10/2023 | Conboy | |
| 11,807,782 | B2 | 11/2023 | Lu | |
| 11,819,723 | B2 | 11/2023 | Hulbert | |
| 11,826,592 | B2 | 11/2023 | Conboy | |
| 11,836,807 | B2 | 12/2023 | Conboy | |
| 11,865,390 | B2 | 1/2024 | Conboy | |
| 11,865,391 | B2 | 1/2024 | Hulbert | |
| 11,865,392 | B2 | 1/2024 | Hulbert | |
| 11,865,394 | B2 | 1/2024 | Conboy | |
| 11,883,703 | B2 | 1/2024 | Hulbert | |
| 11,911,643 | B2 | 2/2024 | Conboy | |
| 11,975,231 | B2 | 5/2024 | Hulbert | |
| 12,053,658 | B2 | 8/2024 | Hulbert | |
| 12,109,446 | B2 | 10/2024 | Hulbert | |
| 12,168,152 | B2 | 12/2024 | Conboy | |
| 12,188,230 | B2 | 1/2025 | Johnson | |
| 12,208,296 | B2 | 1/2025 | Conboy | |
| 12,214,233 | B2 | 2/2025 | Conboy | |
| 12,214,236 | B2 | 2/2025 | Hulbert | |
| 12,214,237 | B2 | 2/2025 | Hulbert | |
| 12,221,576 | B2 | 2/2025 | Rodríguez et al. | |
| 12,226,661 | B2 | 2/2025 | Conboy | |
| 2001/0000911 | A1 | 5/2001 | Stewart | |
| 2001/0025712 | A1 | 10/2001 | Pagan | |
| 2001/0029706 | A1 | 10/2001 | Risser | |
| 2001/0029750 | A1 | 10/2001 | Kotliar | |
| 2002/0005288 | A1 | 1/2002 | Haase | |
| 2002/0011593 | A1 | 1/2002 | Richards | |
| 2002/0023762 | A1 | 2/2002 | Kotliar | |
| 2002/0045688 | A1 | 4/2002 | Galli | |
| 2002/0079379 | A1 | 6/2002 | Cheung | |
| 2002/0096668 | A1 | 7/2002 | Vandersall | |
| 2002/0110696 | A1 | 8/2002 | Slimak | |
| 2002/0111508 | A1 | 8/2002 | Bergrath | |
| 2002/0125016 | A1 | 9/2002 | Cofield | |
| 2002/0130294 | A1 | 9/2002 | Almagro | |
| 2002/0139056 | A1 | 10/2002 | Finnell | |
| 2002/0157558 | A1 | 10/2002 | Woodall | |
| 2002/0168476 | A1 | 11/2002 | Pasek | |
| 2003/0018695 | A1 | 1/2003 | Kagaya | |
| 2003/0022959 | A1 | 1/2003 | Blount | |
| 2003/0029622 | A1 | 2/2003 | Clauss | |
| 2003/0047723 | A1 | 3/2003 | Santoro | |
| 2003/0051886 | A1 | 3/2003 | Adiga | |
| 2003/0064779 | A1 | 4/2003 | Suda | |
| 2003/0066990 | A1 | 4/2003 | Vandersall | |
| 2003/0132425 | A1 | 7/2003 | Curzon | |
| 2003/0136879 | A1 | 7/2003 | Grabow | |
| 2003/0146843 | A1 | 8/2003 | Dittmer | |
| 2003/0155133 | A1 | 8/2003 | Matsukawa | |
| 2003/0159836 | A1 | 8/2003 | Kashiki | |
| 2003/0160111 | A1 | 8/2003 | Multer | |
| 2003/0168225 | A1 | 9/2003 | Denne | |
| 2003/0170317 | A1 | 9/2003 | Curzon | |
| 2003/0212177 | A1 | 11/2003 | Vandersall | |
| 2003/0213005 | A1 | 11/2003 | Alphey | |
| 2004/0003569 | A1 | 1/2004 | Frederickson | |

(56) References Cited

U.S. PATENT DOCUMENTS

2004/0038730 A1 2/2004 Suda
2004/0051086 A1 3/2004 Pasek
2004/0055765 A1 3/2004 Dillman
2004/0089458 A1 5/2004 Jones
2004/0099178 A1 5/2004 Jones
2004/0109853 A1 6/2004 McDaniel
2004/0134378 A1 7/2004 Batdorf
2004/0163825 A1 8/2004 Dunster
2004/0166246 A1 8/2004 Holcomb
2004/0173783 A1 9/2004 Curzon
2004/0175407 A1 9/2004 McDaniel
2004/0194657 A1 10/2004 Lally
2004/0209982 A1 10/2004 Horacek
2004/0231252 A1 11/2004 Benjamin
2004/0239912 A1 12/2004 Correia Da Silva Vilar
2004/0256117 A1 12/2004 Cheung
2005/0009965 A1 1/2005 Schell
2005/0009966 A1 1/2005 Rowen
2005/0011652 A1 1/2005 Hua
2005/0017131 A1 1/2005 Hale
2005/0022466 A1 2/2005 Kish
2005/0045739 A1 3/2005 Multer
2005/0058689 A1 3/2005 Mcdaniel
2005/0066619 A1 3/2005 McDonald
2005/0090201 A1 4/2005 Lengies
2005/0103506 A1 5/2005 Warrack
2005/0103507 A1 5/2005 Brown
2005/0126794 A1 6/2005 Palmer
2005/0139363 A1 6/2005 Thomas
2005/0161235 A1 7/2005 Chuprin
2005/0167920 A1 8/2005 Rose
2005/0182345 A1 8/2005 Termanini
2005/0229809 A1 10/2005 Lally
2005/0235598 A1 10/2005 Liggins
2005/0241731 A1 11/2005 Duchesne
2005/0263298 A1 12/2005 Kotliar
2005/0269109 A1 12/2005 Maguire
2005/0274312 A1 12/2005 Sutter
2005/0279972 A1 12/2005 Santoro
2006/0037277 A1 2/2006 Fitzgibbons, Jr.
2006/0039753 A1 2/2006 Leonberg
2006/0048466 A1 3/2006 Darnell
2006/0056379 A1 3/2006 Battin
2006/0060668 A1 3/2006 Gunter
2006/0083920 A1 4/2006 Schnabel
2006/0113513 A1 6/2006 Nilsson
2006/0124322 A1 6/2006 Goldburt
2006/0131035 A1 6/2006 French
2006/0134265 A1 6/2006 Beukes
2006/0157668 A1 7/2006 Erdner
2006/0162941 A1 7/2006 Sridharan
2006/0167131 A1 7/2006 Mabey
2006/0168906 A1 8/2006 Tonyan
2006/0174968 A1 8/2006 De Luna
2006/0175067 A1 8/2006 Cover
2006/0196681 A1 9/2006 Adiga
2006/0208236 A1 9/2006 Gang
2006/0213672 A1 9/2006 Mohr
2006/0260824 A1 11/2006 Dillman
2007/0007021 A1 1/2007 Regan
2007/0020476 A1 1/2007 Kintzley
2007/0026214 A1 2/2007 Bullock
2007/0034823 A1 2/2007 Hagquist
2007/0084554 A1 4/2007 Miller
2007/0085060 A1 4/2007 Santoro
2007/0089431 A1 4/2007 DuBrucq
2007/0090322 A1 4/2007 Yoon
2007/0119334 A1 5/2007 Atkinson
2007/0122616 A1 5/2007 Lawson
2007/0125880 A1 6/2007 Palle
2007/0176156 A1 8/2007 Mabey
2007/0193753 A1 8/2007 Adiga
2007/0194289 A1 8/2007 Anglin
2007/0197112 A1 8/2007 Mazor
2007/0227085 A1 10/2007 Mader
2007/0232731 A1 10/2007 Knocke
2007/0246609 A1 10/2007 Smetannikov
2007/0256842 A1 11/2007 Mohr
2007/0266649 A1 11/2007 Overmyer
2007/0278463 A1 12/2007 Ratzsch
2007/0289709 A1 12/2007 Chong
2007/0289752 A1 12/2007 Beck
2007/0295046 A1 12/2007 Cassan
2008/0000649 A1 1/2008 Guirguis
2008/0012229 A1 1/2008 Rose
2008/0030074 A1 2/2008 Duong
2008/0050565 A1 2/2008 Gross
2008/0050578 A1 2/2008 Sinclair, Sr.
2008/0054230 A1 3/2008 Mabey
2008/0099580 A1 5/2008 Gunter
2008/0099736 A1 5/2008 Clarke
2008/0115949 A1 5/2008 Li
2008/0128145 A1 6/2008 Butz
2008/0145548 A1 6/2008 Bracher
2008/0166484 A1 7/2008 Smith
2008/0168798 A1 7/2008 Kotliar
2008/0176141 A1 7/2008 Pan
2008/0179067 A1 7/2008 Ho
2008/0184642 A1 8/2008 Sebastian
2008/0201787 A1 8/2008 Shin
2008/0202772 A1 8/2008 Twum
2008/0202775 A1 8/2008 Bordallo Alvarez
2008/0217086 A1 9/2008 Ferreira Neves
2008/0236846 A1 10/2008 Gamble
2008/0265223 A1 10/2008 Sopheap
2008/0276556 A1 11/2008 Flint
2008/0289831 A1 11/2008 Kaimart
2008/0314601 A1 12/2008 Cafferata
2009/0014507 A1 1/2009 D Amato
2009/0039660 A1 2/2009 Gonzalez
2009/0044484 A1 2/2009 Berger
2009/0065646 A1 3/2009 Hale
2009/0075539 A1 3/2009 Dimanshteyn
2009/0090520 A1 4/2009 Lee
2009/0107064 A1 4/2009 Bowman
2009/0120653 A1 5/2009 Thomas
2009/0126948 A1 5/2009 DeSanto
2009/0126951 A1 5/2009 Baek
2009/0145075 A1 6/2009 Oakley
2009/0188567 A1 7/2009 Mchugh
2009/0194605 A1 8/2009 Lepeshinsky
2009/0212251 A1 8/2009 Taylor
2009/0215926 A1 8/2009 Kozlowski
2009/0216163 A1 8/2009 Evans
2009/0249556 A1 10/2009 Dermeik
2009/0255605 A1 10/2009 Filion
2009/0264560 A1 10/2009 Warnes
2009/0266025 A1 10/2009 Toas
2009/0280345 A1 11/2009 Maynard
2009/0301001 A1 12/2009 Kish
2009/0313748 A1 12/2009 Guedes Lopes Da Fonseca
2009/0313931 A1 12/2009 Porter
2009/0314500 A1 12/2009 Fenton
2009/0326117 A1 12/2009 Benussi
2010/0000743 A1 1/2010 Cohen
2010/0018725 A1 1/2010 Ramos Rodriguez
2010/0032175 A1 2/2010 Boyd
2010/0062153 A1 3/2010 Curzon
2010/0069488 A1 3/2010 Mabey
2010/0175897 A1 7/2010 Crump
2010/0176353 A1 7/2010 Hanna
2010/0181084 A1 7/2010 Carmo
2010/0200819 A1 8/2010 Mans Fibla
2010/0218959 A1 9/2010 Adiga
2010/0252648 A1 10/2010 Robinson
2010/0263886 A1 10/2010 Rahgozar
2010/0267853 A1 10/2010 Edry
2010/0269449 A1 10/2010 Bush
2010/0269735 A1 10/2010 Shichtel
2010/0281784 A1 11/2010 Leo
2010/0314138 A1 12/2010 Weatherspoon
2010/0326677 A1 12/2010 Jepsen
2011/0000142 A1 1/2011 Bui
2011/0005163 A1 1/2011 Timmerman

(56) References Cited

U.S. PATENT DOCUMENTS

2011/0005780 A1 1/2011 Rennie
2011/0015411 A1 1/2011 Goto
2011/0061336 A1 3/2011 Thomas
2011/0073331 A1 3/2011 Xu
2011/0089386 A1 4/2011 Berry
2011/0091713 A1 4/2011 Miller
2011/0123809 A1 5/2011 Riebel
2011/0146173 A1 6/2011 Visser
2011/0162295 A1 7/2011 Cottier
2011/0197530 A1 8/2011 Bahnmiller
2011/0203813 A1 8/2011 Fenton
2011/0224317 A1* 9/2011 O'Leary .................... C08J 9/08
521/70
2011/0266486 A1 11/2011 Orr
2011/0284250 A1 11/2011 Thomas
2011/0296769 A1 12/2011 Collins
2011/0315406 A1 12/2011 Connery
2012/0045584 A1 2/2012 Dettbarn
2012/0046419 A1 2/2012 Chung
2012/0067600 A1 3/2012 Bourakov
2012/0073228 A1 3/2012 Fork
2012/0121809 A1 5/2012 Vuozzo
2012/0138319 A1 6/2012 Demmitt
2012/0145418 A1 6/2012 Su
2012/0168185 A1 7/2012 Yount
2012/0199781 A1 8/2012 Rueda-Nunez
2012/0241535 A1 9/2012 Carriere
2012/0256143 A1 10/2012 Ulcar
2012/0258327 A1 10/2012 Mcarthur
2012/0279731 A1 11/2012 Howard, Sr.
2012/0295996 A1 11/2012 Wang
2012/0308631 A1 12/2012 Shirley
2012/0312562 A1 12/2012 Woehrle
2013/0000239 A1 1/2013 Winterowd
2013/0001331 A1 1/2013 Palle
2013/0101839 A1 4/2013 Dion
2013/0111839 A1 5/2013 Efros
2013/0149548 A1 6/2013 Williams
2013/0181158 A1 7/2013 Guo
2013/0239848 A1 9/2013 Fisher
2013/0264076 A1 10/2013 Medina
2013/0288031 A1 10/2013 Labock
2013/0312985 A1 11/2013 Collins
2013/0328322 A1 12/2013 Julian
2014/0027131 A1 1/2014 Kawiecki
2014/0041289 A1 2/2014 Mingolello
2014/0079942 A1 3/2014 Lally
2014/0090310 A1 4/2014 Greene
2014/0123572 A1 5/2014 Segall
2014/0130435 A1 5/2014 Paradis
2014/0193201 A1 7/2014 Stauffer
2014/0202716 A1 7/2014 Klaffmo
2014/0202717 A1 7/2014 Klaffmo
2014/0206767 A1 7/2014 Klaffmo
2014/0209330 A1 7/2014 Statter
2014/0215937 A1 8/2014 Zhou
2014/0216770 A1 8/2014 Gibson
2014/0231106 A1 8/2014 Lewis
2014/0239123 A1 8/2014 Hoisington
2014/0245693 A1 9/2014 Efros
2014/0245696 A1 9/2014 Anderson
2014/0246509 A1 9/2014 Fenton
2014/0284067 A1 9/2014 Klaffmo
2014/0284511 A1 9/2014 Klaffmo
2014/0284512 A1 9/2014 Klaffmo
2014/0290970 A1 10/2014 Izumida
2014/0295164 A1 10/2014 Parker
2014/0299339 A1 10/2014 Klaffmo
2014/0322548 A1 10/2014 Boldizsar
2014/0338930 A1 11/2014 Smith
2014/0366598 A1 12/2014 Carmo
2014/0371381 A1 12/2014 Holvoet
2015/0020476 A1 1/2015 Winterowd
2015/0021053 A1 1/2015 Klaffmo
2015/0021055 A1 1/2015 Klaffmo
2015/0052838 A1 2/2015 Ritchie
2015/0071978 A1 3/2015 Chang
2015/0076842 A1 3/2015 Bendel
2015/0129245 A1 5/2015 Weber
2015/0147478 A1 5/2015 Shutt
2015/0167291 A1 6/2015 Bundy
2015/0175841 A1 6/2015 Parker
2015/0224352 A1 8/2015 Klaffmo
2015/0314564 A1 11/2015 Mancini
2015/0321033 A1 11/2015 Statter
2015/0322668 A1 11/2015 Quinn
2015/0335926 A1 11/2015 Klaffmo
2015/0335928 A1 11/2015 Klaffmo
2015/0352385 A1 12/2015 Fenton
2015/0354199 A1 12/2015 Segall
2015/0368560 A1 12/2015 Pascal
2016/0024260 A1 1/2016 Moriarty
2016/0024779 A1 1/2016 Clus
2016/0030789 A1 2/2016 Cordani
2016/0051850 A1 2/2016 Menard
2016/0059960 A1 3/2016 Fearn
2016/0082298 A1 3/2016 Dagenhart
2016/0096053 A1 4/2016 Beechy
2016/0107014 A1 4/2016 Klaffmo
2016/0132714 A1 5/2016 Pennypacker
2016/0137853 A1 5/2016 Lopez
2016/0216091 A1 7/2016 Erickson
2016/0243789 A1 8/2016 Baroux
2016/0280827 A1 9/2016 Anderson
2016/0313120 A1 10/2016 Shishalov
2016/0329114 A1 11/2016 Lin-Hendel
2017/0007865 A1 1/2017 Dor-El
2017/0008764 A1 1/2017 Labuto
2017/0029632 A1 2/2017 Couturier
2017/0056698 A1 3/2017 Pai
2017/0059343 A1 3/2017 Spinelli
2017/0072236 A1 3/2017 Cordani
2017/0080404 A1 3/2017 Chung
2017/0081844 A1 3/2017 Dimakis
2017/0120089 A1 5/2017 Fisher
2017/0121965 A1 5/2017 Dettbarn
2017/0138049 A1 5/2017 King
2017/0157441 A1 6/2017 Smith
2017/0180829 A1 6/2017 Schwarzkopf
2017/0182341 A1 6/2017 Libal
2017/0210098 A1 7/2017 Moore
2017/0226424 A1 8/2017 Moon
2017/0294093 A1 10/2017 Smith
2017/0321418 A1 11/2017 Tremblay
2018/0023283 A1 1/2018 Dunster
2018/0086896 A1 3/2018 Appel
2018/0087270 A1 3/2018 Miller
2018/0089988 A1 3/2018 Schwarzkopf
2018/0119421 A1 5/2018 Pospisil
2018/0202051 A1 7/2018 Kinlen
2018/0331386 A1 11/2018 Koh
2019/0003943 A1 1/2019 King
2019/0023398 A1 1/2019 Albanna
2019/0083835 A1 3/2019 Mariampillai
2019/0091424 A1 3/2019 Haruta
2019/0168033 A1 6/2019 Conboy
2019/0168036 A1 6/2019 Conboy
2019/0169838 A1 6/2019 Conboy
2019/0262637 A1 8/2019 Statter
2019/0308044 A1 10/2019 Chattaway
2019/0330531 A1 10/2019 Wiehn
2019/0382661 A1 12/2019 Kim
2020/0109253 A1 4/2020 Appel
2020/0181328 A1 6/2020 Clark
2020/0206969 A1 7/2020 Pans
2020/0238116 A1 7/2020 Payton
2020/0254290 A1 8/2020 Robles
2020/0406075 A1 12/2020 Conboy
2021/0052928 A1 2/2021 Kim
2021/0154502 A1 5/2021 Conboy
2021/0189245 A1 6/2021 Rodriguez
2021/0213311 A1 7/2021 Austrheim
2021/0379429 A1 12/2021 Darnell
2021/0387376 A1 12/2021 Trefes

(56) References Cited

U.S. PATENT DOCUMENTS

| | | | |
|---|---|---|---|
| 2022/0008773 | A1 | 1/2022 | Conboy |
| 2022/0016461 | A1 | 1/2022 | Conboy |
| 2022/0017772 | A1 | 1/2022 | Tai |
| 2022/0054876 | A1 | 2/2022 | Conboy |
| 2022/0126144 | A1 | 4/2022 | Conboy |
| 2022/0134151 | A1 | 5/2022 | Conboy |
| 2022/0241629 | A1 | 8/2022 | Raymond |
| 2022/0362596 | A1 | 11/2022 | Wolf |
| 2022/0362600 | A1 | 11/2022 | Conboy |
| 2023/0129221 | A1 | 4/2023 | Wolf |
| 2023/0132525 | A1 | 5/2023 | Hulbert |
| 2023/0203811 | A1 | 6/2023 | Johnson |
| 2023/0398393 | A1 | 12/2023 | Hulbert |
| 2024/0252869 | A1 | 8/2024 | Conboy |
| 2024/0257265 | A1 | 8/2024 | Conboy |
| 2024/0264571 | A1 | 8/2024 | Shoshani |
| 2024/0286310 | A1 | 8/2024 | Ni |
| 2024/0366982 | A1 | 11/2024 | Conboy |
| 2025/0121235 | A1 | 4/2025 | Hulbert |
| 2025/0144460 | A1 | 5/2025 | Conboy |
| 2025/0262793 | A1 | 8/2025 | Ni |

FOREIGN PATENT DOCUMENTS

| | | | |
|---|---|---|---|
| AU | 2001259865 | | 2/2007 |
| AU | 2005220194 | | 4/2007 |
| AU | 2005220196 | | 4/2007 |
| AU | 2002240521 | | 12/2007 |
| AU | 2002241169 | | 7/2008 |
| AU | 2011244837 | | 5/2012 |
| AU | 2011280137 | | 1/2013 |
| AU | 2019240416 | | 10/2020 |
| CA | 2023624 | C | 3/1997 |
| CA | 2212076 | | 7/1997 |
| CA | 2294254 | | 1/1999 |
| CA | 2406118 | | 10/2001 |
| CA | 2408944 | | 11/2001 |
| CA | 2442148 | | 10/2002 |
| CA | 2409879 | | 4/2003 |
| CA | 2593435 | | 8/2006 |
| CA | 2653817 | | 12/2007 |
| CA | 2705140 | | 5/2009 |
| CA | 2974796 | | 7/2010 |
| CA | 2811358 | | 1/2013 |
| CA | 2792793 | | 4/2013 |
| CA | 2846076 | | 9/2014 |
| CA | 2862380 | | 4/2015 |
| CA | 2868719 | | 6/2015 |
| CA | 2933553 | | 6/2015 |
| CA | 3094694 | A1 | 9/2019 |
| CN | 1397613 | | 2/2003 |
| CN | 101293752 | | 10/2008 |
| CN | 101434760 | | 5/2009 |
| CN | 201815036 | | 5/2011 |
| CN | 202045944 | | 11/2011 |
| CN | 102300610 | | 12/2011 |
| CN | 102337770 | | 2/2012 |
| CN | 202892722 | | 4/2013 |
| CN | 103562079 | | 2/2014 |
| CN | 103813835 | | 5/2014 |
| CN | 104540556 | | 4/2015 |
| CN | 108060358 | | 5/2018 |
| DE | 1302520 | B | 10/1970 |
| DE | 3525684 | | 10/1986 |
| EP | 0059178 | A1 | 9/1982 |
| EP | 0059178 | B1 | 5/1985 |
| EP | 173446 | A1 | 3/1986 |
| EP | 173446 | B1 | 3/1986 |
| EP | 0199131 | A2 | 10/1986 |
| EP | 0140866 | B1 | 6/1987 |
| EP | 0263570 | A1 | 4/1988 |
| EP | 426178 | | 5/1991 |
| EP | 2505326 | | 10/2012 |
| EP | 2898925 | | 7/2015 |
| EP | 2902077 | | 8/2015 |
| EP | 2505326 | B1 | 3/2017 |
| EP | 19167771NWA1 | | 10/2019 |
| GB | 429207 | A | 5/1935 |
| GB | 831720 | A | 3/1960 |
| GB | 832691 | | 4/1960 |
| GB | 1112553 | | 5/1968 |
| GB | 2153193 | | 8/1985 |
| GB | 2301122 | | 11/1996 |
| GB | 2370766 | | 7/2002 |
| GB | 2370769 | A | 7/2002 |
| GB | 2375047 | | 11/2002 |
| GB | 2386835 | | 10/2003 |
| GB | 2486959 | A | 7/2012 |
| GB | 2533262 | | 6/2016 |
| GB | 2549980 | | 11/2017 |
| GB | 2555067 | | 4/2018 |
| JP | 2019058279 | A | 4/2019 |
| KR | 101675486 | | 5/2012 |
| KR | 102216096 | | 2/2021 |
| TW | 1471153 | | 2/2015 |
| TW | 201714639 | | 5/2017 |
| WO | 8607272 | A1 | 12/1986 |
| WO | 8704145 | | 7/1987 |
| WO | 1988000482 | A1 | 1/1988 |
| WO | 8801536 | A1 | 3/1988 |
| WO | 9010668 | | 9/1990 |
| WO | 9100327 | | 1/1991 |
| WO | 9105585 | | 5/1991 |
| WO | 9109390 | A1 | 6/1991 |
| WO | 9109649 | A1 | 7/1991 |
| WO | 9300963 | | 1/1993 |
| WO | 9302749 | A1 | 2/1993 |
| WO | 9321808 | A1 | 11/1993 |
| WO | 9323116 | A1 | 11/1993 |
| WO | 9420169 | A1 | 9/1994 |
| WO | 9425111 | A1 | 11/1994 |
| WO | 9604960 | A1 | 2/1996 |
| WO | 9605888 | A1 | 2/1996 |
| WO | 9618434 | A1 | 6/1996 |
| WO | 9706858 | A2 | 2/1997 |
| WO | 9706858 | A3 | 4/1997 |
| WO | 9715352 | A1 | 5/1997 |
| WO | 9803228 | A1 | 1/1998 |
| WO | 9809685 | A1 | 3/1998 |
| WO | 9818524 | A1 | 5/1998 |
| WO | 9852993 | A1 | 11/1998 |
| WO | 9856197 | A1 | 12/1998 |
| WO | 1999013022 | | 3/1999 |
| WO | 1999041012 | | 8/1999 |
| WO | 0006667 | A2 | 2/2000 |
| WO | 2000009326 | | 2/2000 |
| WO | 0022255 | | 4/2000 |
| WO | 0029067 | A1 | 5/2000 |
| WO | 0006667 | A3 | 8/2000 |
| WO | 0107116 | A1 | 2/2001 |
| WO | 0139599 | A2 | 6/2001 |
| WO | 0145932 | | 6/2001 |
| WO | 0166669 | | 9/2001 |
| WO | 0208015 | A1 | 1/2002 |
| WO | 0228484 | A1 | 4/2002 |
| WO | 0228708 | A2 | 4/2002 |
| WO | 0139599 | A3 | 5/2002 |
| WO | 0243812 | A2 | 6/2002 |
| WO | 0244305 | A2 | 6/2002 |
| WO | 0244305 | A3 | 8/2002 |
| WO | 2002072713 | | 9/2002 |
| WO | 2002078865 | | 10/2002 |
| WO | 0228708 | A3 | 1/2003 |
| WO | 03015873 | A2 | 2/2003 |
| WO | 0243812 | A3 | 3/2003 |
| WO | 03024618 | A1 | 3/2003 |
| WO | 2003018695 | A1 | 3/2003 |
| WO | 03015873 | A3 | 5/2003 |
| WO | 03057317 | A1 | 7/2003 |
| WO | 03072201 | A1 | 9/2003 |
| WO | 03073128 | A1 | 9/2003 |
| WO | 2003093395 | | 11/2003 |
| WO | 2004000422 | A1 | 12/2003 |
| WO | 2004000758 | | 12/2003 |

(56) References Cited

FOREIGN PATENT DOCUMENTS

| | | | |
|---|---|---|---|
| WO | 2004108528 | A2 | 12/2004 |
| WO | 2005014115 | A1 | 2/2005 |
| WO | 2005046800 | A1 | 5/2005 |
| WO | 2004108528 | A3 | 6/2005 |
| WO | 2005049144 | A2 | 6/2005 |
| WO | 2005054407 | A1 | 6/2005 |
| WO | 2005058423 | A1 | 6/2005 |
| WO | 2005119868 | | 12/2005 |
| WO | 2006006829 | | 1/2006 |
| WO | 2006010667 | | 2/2006 |
| WO | 2006013180 | | 2/2006 |
| WO | 2006017566 | A2 | 2/2006 |
| WO | 2006032130 | A1 | 3/2006 |
| WO | 2006036084 | A1 | 4/2006 |
| WO | 2006045167 | A1 | 5/2006 |
| WO | 2006053514 | A1 | 5/2006 |
| WO | 2006017566 | A3 | 6/2006 |
| WO | 2006056379 | A2 | 6/2006 |
| WO | 2006072672 | | 7/2006 |
| WO | 2006079899 | A2 | 8/2006 |
| WO | 2006081156 | | 8/2006 |
| WO | 2006081596 | | 8/2006 |
| WO | 2006097962 | | 9/2006 |
| WO | 2006056379 | A3 | 10/2006 |
| WO | 2006126181 | | 11/2006 |
| WO | 2007001403 | | 1/2007 |
| WO | 2007008098 | A1 | 1/2007 |
| WO | 2007027170 | A1 | 3/2007 |
| WO | 2007030982 | | 3/2007 |
| WO | 2007033450 | A1 | 3/2007 |
| WO | 2007048149 | | 5/2007 |
| WO | 2007065112 | | 6/2007 |
| WO | 2007092985 | A1 | 8/2007 |
| WO | 2007138132 | A1 | 12/2007 |
| WO | 2007140676 | | 12/2007 |
| WO | 2008031559 | | 3/2008 |
| WO | 2008045460 | A2 | 4/2008 |
| WO | 2008071825 | A2 | 6/2008 |
| WO | 2008071825 | A3 | 7/2008 |
| WO | 2008100348 | | 8/2008 |
| WO | 2008104617 | A1 | 9/2008 |
| WO | 2008111864 | A1 | 9/2008 |
| WO | 08118408 | | 10/2008 |
| WO | 2008150157 | | 12/2008 |
| WO | 2008150265 | | 12/2008 |
| WO | 2008155187 | | 12/2008 |
| WO | 2009004105 | A1 | 1/2009 |
| WO | 2009012546 | A1 | 1/2009 |
| WO | 2009020251 | | 2/2009 |
| WO | 2009022995 | A2 | 2/2009 |
| WO | 2005049144 | A3 | 3/2009 |
| WO | 2009022995 | A3 | 4/2009 |
| WO | 2009042847 | | 4/2009 |
| WO | 2009057104 | | 5/2009 |
| WO | 2009061471 | | 5/2009 |
| WO | 2009086826 | | 7/2009 |
| WO | 2009097112 | | 8/2009 |
| WO | 2009121682 | A1 | 10/2009 |
| WO | 2009139668 | A1 | 11/2009 |
| WO | 2009150478 | A1 | 12/2009 |
| WO | 2009150478 | A4 | 3/2010 |
| WO | 2010028416 | | 3/2010 |
| WO | 2010028538 | A1 | 3/2010 |
| WO | 2010041228 | | 4/2010 |
| WO | 2010046696 | | 4/2010 |
| WO | 2010061059 | | 6/2010 |
| WO | 2010066066 | | 6/2010 |
| WO | 2010078559 | | 7/2010 |
| WO | 2010082073 | | 7/2010 |
| WO | 2010083890 | A1 | 7/2010 |
| WO | 2010089604 | | 8/2010 |
| WO | 2010104286 | | 9/2010 |
| WO | 2010123401 | A1 | 10/2010 |
| WO | 2010139124 | | 12/2010 |
| WO | 2011015411 | A1 | 2/2011 |
| WO | 2011016773 | | 2/2011 |
| WO | 2011025310 | A2 | 3/2011 |
| WO | 2011034334 | A2 | 3/2011 |
| WO | 2011042609 | | 4/2011 |
| WO | 2011042761 | A1 | 4/2011 |
| WO | 2011049424 | A2 | 4/2011 |
| WO | 2011034334 | A9 | 5/2011 |
| WO | 2011054345 | | 5/2011 |
| WO | 2011078727 | A1 | 6/2011 |
| WO | 2011078728 | A1 | 6/2011 |
| WO | 2011025310 | A9 | 7/2011 |
| WO | 2011025310 | A3 | 9/2011 |
| WO | 2011116450 | | 9/2011 |
| WO | 2011049424 | A3 | 11/2011 |
| WO | 2011148206 | A1 | 12/2011 |
| WO | 2012002777 | A2 | 1/2012 |
| WO | 2012021146 | A1 | 2/2012 |
| WO | 2012028155 | A1 | 3/2012 |
| WO | 2012031762 | | 3/2012 |
| WO | 2012002777 | A3 | 5/2012 |
| WO | 2012060491 | | 5/2012 |
| WO | 2012071577 | A2 | 5/2012 |
| WO | 2012076905 | | 6/2012 |
| WO | 2012078916 | | 6/2012 |
| WO | 2012071577 | A3 | 8/2012 |
| WO | 2012147677 | | 11/2012 |
| WO | 2012149634 | A1 | 11/2012 |
| WO | 2012164478 | | 12/2012 |
| WO | 2013003097 | | 1/2013 |
| WO | 2013030497 | A1 | 3/2013 |
| WO | 2013060848 | A1 | 5/2013 |
| WO | 2013062295 | | 5/2013 |
| WO | 2013068260 | | 5/2013 |
| WO | 2013098859 | | 7/2013 |
| WO | 2013140671 | A1 | 9/2013 |
| WO | 2013145207 | | 10/2013 |
| WO | 2013179218 | | 12/2013 |
| WO | 2014001417 | | 1/2014 |
| WO | 2014025929 | | 2/2014 |
| WO | 2014084749 | A1 | 6/2014 |
| WO | 2014115036 | | 7/2014 |
| WO | 2014115038 | A2 | 7/2014 |
| WO | 2014127604 | A1 | 8/2014 |
| WO | 2014152528 | | 9/2014 |
| WO | 2014115038 | A3 | 10/2014 |
| WO | 2014155208 | A1 | 10/2014 |
| WO | 2014179482 | | 11/2014 |
| WO | 2014179904 | | 11/2014 |
| WO | 2015020388 | | 2/2015 |
| WO | 2015051917 | | 4/2015 |
| WO | 2015055862 | | 4/2015 |
| WO | 2015061905 | | 5/2015 |
| WO | 2015076842 | A1 | 5/2015 |
| WO | 2015089467 | | 6/2015 |
| WO | 2015094014 | | 6/2015 |
| WO | 2015104006 | | 7/2015 |
| WO | 2015126854 | | 8/2015 |
| WO | 2015131631 | | 9/2015 |
| WO | 2015134810 | A1 | 9/2015 |
| WO | 2015153843 | | 10/2015 |
| WO | 2015168456 | | 11/2015 |
| WO | 2015172619 | | 11/2015 |
| WO | 2016004801 | | 1/2016 |
| WO | 2016005650 | | 1/2016 |
| WO | 2016071715 | | 5/2016 |
| WO | 2016075480 | | 5/2016 |
| WO | 2016088026 | | 6/2016 |
| WO | 2016131060 | | 8/2016 |
| WO | 2016159897 | A1 | 10/2016 |
| WO | 2016175379 | A1 | 11/2016 |
| WO | 2016186450 | | 11/2016 |
| WO | 2017014782 | | 1/2017 |
| WO | 2017015585 | | 1/2017 |
| WO | 17019566 | | 2/2017 |
| WO | 2017016142 | A1 | 2/2017 |
| WO | 2017016143 | A1 | 2/2017 |
| WO | 2017031520 | A1 | 3/2017 |
| WO | 2017070375 | A1 | 4/2017 |
| WO | 2017070375 | A8 | 6/2017 |

(56) References Cited

FOREIGN PATENT DOCUMENTS

| | | |
|---|---|---|
| WO | 2017090040 A1 | 6/2017 |
| WO | 2017094918 | 6/2017 |
| WO | 2017103321 A1 | 6/2017 |
| WO | 2017116148 A1 | 7/2017 |
| WO | 2017157406 A1 | 9/2017 |
| WO | 2017179953 A1 | 10/2017 |
| WO | 2017208272 A1 | 12/2017 |
| WO | 2018006000 | 1/2018 |
| WO | 2018134704 | 7/2018 |
| WO | 2020163788 | 8/2020 |
| WO | 2024102391 | 5/2024 |
| WO | 2025160100 A1 | 7/2025 |
| WO | 2025250410 | 12/2025 |

OTHER PUBLICATIONS

Fike, "MicroMist: The Self Contained Fire Protection Alternative", Aug. 2012, (pp. 1-2).
Fike, "Mini Monitor Module", Apr. 2014, (pp. 1-2).
Fike, "ProInert: Inert Gas Fire Protection System", May 2012, (pp. 1-6).
Fike, "ProInert® 2 Agent Storage Cylinder IG-IG-55" Jan. 2016, (pp. 1-7).
Fike, "Single Hazard Panel Shp Pro", Dec. 2009, (pp. 1-2).
Fike, "Specification—Micromist Fire Suppression System with Cheetah Xi Control Panel", Dec. 2012, (pp. 1-10).
Fike, "Specification—Micromist Fire Suppression System with SHP-Pro Control Panel", Dec. 2009, (pp. 1-9).
Fire Engineeering, Len Garis, Karin Mark, "Tall Wood Buildings: Maximizing Their Safety Potential", Jan. 2018, (pp. 1-12).
Fire Engineering, "Charred Wood and Fire Resistance", Oct. 2016, (pp. 1-6).
Fire Engineering, Phillip Paff, "Mass Timber Construction in High-Rise Residential Structures: How Safe is it?", Jan. 2018, (pp. 1-9).
Fire Fighting Foam Coalition, "Best Practice Guidance for Use of Class B Firefighting Foams" May 2016 (8 Pages).
Fire Protection Research Foundation, Robert Gerard, David Barber, "Fire Safety Challenges of Tall Wood Buildings", Dec. 2013, (pp. 1-162).
Fire Retardant Coatings of Texas, "FlameStop Screenshots", Nov. 2017, (pp. 1-2).
Fire Retardant Coatings of Texas, "FX Flame Guard Screenshot", Nov. 2017, (pp. 1).
Fire Retardant Coatings of Texas, "FX Lumber Guard Screenshot", (pp. 1).
Fire Retardant Coatings of Texas, "FX Lumber Guard XT: Technical Data Submittal Sheet", Aug. 2018, (pp. 1).
Fire Retardant Coatings of Texas, "FX Lumber Guard", Nov. 2015, (pp. 1).
Fire Retardant Coatings of Texas, "FX Lumber Guard", Sep. 2016, (pp. 1).
Fire Retardant Coatings of Texas, "Product Certifications & Featured Products Screenshots", Nov. 2017, (pp. 1-4).
Fire Retardant Coatings of Texas, "Product Certifications Screenshot", Nov. 2017, (pp. 1).
Fire Retardant Coatings of Texas, "Safety Data Sheet (SDS)" Mar. 2016, (pp. 1-7).
Fire Retardant Coatings of Texas, "Safety Data Sheet Screenshot", Nov. 2017, (pp. 1).
Fire Retardant Coatings of Texas, M. Mueller, "Architects", Oct. 2016, (pp. 1-5).
Fire Retardant Coatings of Texas, M. Mueller, "Residential Home Builders", Oct. 2016, (pp. 1-5).
Fire Safe Council, "Get Ready For Fire Season—Fire Safe Your Home", Nov. 2017, (pp. 1).
Fire Terminology, Glossary Containing Fire Terms, by National Park Service, USDA Forest Service, captured at https://www.fs.fed.us/nwacfire/home/terminology.html on Mar. 28, 2021, (14 Pages).
Firefly AB, "Firefly EXIMO Brochure", Nov. 2017, (pp. 1-8).
Firefly AB, "Firefly Spark Detection: Higher Safety with Patented Technology", Jan. 2018, (pp. 1-12).
Firefly AB, "Firefly Training Brochure", Nov. 2017, (pp. 1-4).
Firefy AB, "Firefly Conveyer Guard: Fire Protection Solution for Conveyers", Nov. 2017, (pp. 1-4).
Firesafe, "History of Fire Extinguishers" Dec. 18, 2019 (12 Pages).
Firetect, "Safe-T-Guard Product Data Sheet", Apr. 2008, (pp. 1-6).
Flamestop, "Flamestop I-DS: Fire Retardant for Foam, Thatch, and Porous Materials", Jan. 2017, (pp. 1-3).
Flamestop, "Flamestop II: Fire Retardant Spray for Wood", Jan. 2017, (pp. 1-3).
Flamestop, "Learn About Flamestop Inc.", Jan. 2017, (pp. 1-3).
Flexterra Brochure "Profile Flexterra® HP-FGM High Performance Erosion Control Medium", HP-02-02/18, Feb. 2018, Profile Products, LLC, (4 Pages).
FLIR, "A65/A35/A15/A5 Brochure", Sep. 2014, (pp. 1-2).
FLIR, "Application Story: FLIR Arms Intelligent Power Inspection Robot with 'Hot Eye'", Nov. 2017, (pp. 1-2).
FLIR, "Application Story: Impact Thermal Imaging Camera From FLIR Continuously Monitors Packaging Quality", Nov. 2017, (pp. 1-2).
FLIR, "FC-Series R: Fixed Network thermal Cameras", Nov. 2017, (pp. 1-2).
FLIR, "FLIR A315/A615", Jan. 2018, (pp. 1-8).
FLIR, "FLIR A65", Jan. 2018, (pp. 1-7).
FLIR, "FLIR AA315 f", Jan. 2018, (pp. 1-4).
FLIR, "FLIR C3 Brochure", Dec. 2016, (pp. 1-2).
FLIR, "FLIR FC-Series R (Automation)", Jan. 2018, (pp. 1-5).
FLIR, "FLIR K2 Brochure", May 2015, (pp. 1-2).
FLIR, "FLIR KF6 Datasheet", Jan. 2016, (pp. 1-2).
FLIR, "FLIR One Pro Series Datasheet", Jun. 2018, (pp. 1-2).
FLIR, "FLIR One Pro Series: Professional-Level Thermal Imaging for Your Smartphone", Jun. 2018, (pp. 1-2).
FLIR, "FLIR Saros: Multi-Spectral Intrusion Solution", Jan. 2018, (pp. 1-3).
Global CSS Institute, "The Global Status of CSS: 2017", Oct. 2017, (pp. 1-43).
Globe Advisors, "Study of Insurance Costs for Mid-Rise Wood Frame and Conrete Residential Buildings", Jan. 2016, (pp. 1-61).
Globenewswire, "Shazamstocks.com Announces Profile Launch of MSE Enviro-Tech Corp.", Feb. 2008, (pp. 1-3).
Gokhan Balik, "The Use of Air Atomizing Nozzles to Produce Sprays with Fine Droplets", Apr. 2014, (pp. 1-7).
Green Building Advisor, Martin Holladay, "Is OSB Airtight?", Aug. 2015, (pp. 1-4).
Green Corrosion Inhibitors from Natural Sources and Biomass Wastes, by Stefania Marzorati , Luisella Verotta and Stefano P. Trasatti, Molecules 2019, vol. 24, Dec. 2018 (24 Pages).
Greentech Media, "Can Updated Tax Credits Bring Carbon Capture Into the Mainstream?", Feb. 2018, (pp. 1-8).
Group 1: Hydrogen and the Alkali Metals—Chemistry LibreTexts, captured on Oct. 6, 2024 at https://chem.libretexts.org/Bookshelves/Inorganic_Chemistry/Supplemental_Modules_and_Websites_(Inorganic_Chemistry)/Descriptive_Chemistry/Elements_Organized_by_Block/1_s-Block_Elements/Group_1%3A_The_Alkali_Metals (2 Pages).
GS Environment, "Stat-X Condensed Aerosol Fire Suppression Systems", Nov. 2017, (pp. 1-6).
Guomin Zhao, Guanghji Xu, Shuang Jin, Qingsong Zhang and Zhongxian Liu, Fire-Entinguishing Efficiency of Superfine Powders under Different Injection Pressures, Hindawi International Journal of Chemical Engineering, vol. 2019, Article ID 2474370, May 19, 2019, (8 Pages).
Guomin Zhao, Guangji Xu, Shuang Jin, Qinsong Zhang, Zhongxian Liu, International Journal of Mechanical Engineering, "Fire-Extinguishing Efficiency of Superfine Powders Under Different Injection Temperatures" May 2, 2019 (8 Pages).
H. A. Krebs, W. A. Johnson, "36 The role of citric acid in intermediate metabolism in animal tissues" Aug. 25, 1980 (9 Pages ).
H. Wang, L. A. Johnson, T. Wang, "Preparation of Soy Protein Concentrate amd Isolate from Extruded-Expelled Soybean Meals" Jul. 2004 (6 Pages).

(56) References Cited

OTHER PUBLICATIONS

Hansentek, Model 120 Spark Detector Brochure, Nov. 2017, (pp. 1-2).
Hardwood Plywood & Veneer Association, "Report on Surface Burning Characteristics Determined by Astm E 84 Twenty-Five Foot Tunnel Furnace Test Method", Jan. 2008, (pp. 1-7).
Hartindo, "AF31 Air Bombing Screenshots", Nov. 2017, (pp. 1-4).
Hartindo; Clean Anti Fire Chemicals—Dectan; as published Nov. 9, 2016 retrieved from https://web.archive.org/web/ 20161109011047/ http://hartindo.co.id/products/dectan/ (2 pages).
History of Dr. Paul Lohmann, published by Dr. Paul Lohmann GmbH & Co. KGaA Hauptstrasse 2 • 31860 Emmerthal Germany, captured on Oct. 6, 2024 at https://www.lohmann-minerals.com/ company/history/ (17 Pages).
Holzforschung Austria, "Construction with Cross-Laminated Timber in Multi-Storey Buildings: Focus on Building Physics", Apr. 2013, (pp. 1-160).
Holzforshung Austria, "Short Report: Renewal of the abridged report on the fire resistance REI 60 according to EN 13501-2 of Stora Enso CLTas load-carying cross-laminated timber wall elements 80 mm unplanked and planked with plaster boards", Dec. 2012, (pp. 1-5).
Honeywell, "Viewguard PIR", Jan. 2007, (pp. 1-2).
Hoover Inc., "Code References: Fire-Retardant-Treated Wood", Mar. 2014, (pp. 1-2).
Hoover Inc., "Exterior Fire-X Treated Wood: Material Safety Data Sheet", Oct. 2005, (pp. 1-9).
Hoover Inc., "Exterior-Fire X", Nov. 2017, (pp. 1).
Hoover Inc., "Fasteners for Pyro-Guard: Interior Fire Retardant Treated Wood Products", Oct. 2013, (pp. 1).
Hoover Inc., "Guidelines For Finishing and Use of Adhesives with Pyro-Guard Fire Retardant Treated Wood", Jan. 2014, (pp. 1).
Hoover Inc., "Leed and FSC Chain of Custody Information", Feb. 2016, (pp. 1).
Hoover Inc., "Pyro-Guard Storage, Handling, and Installation Recommendations", Jan. 2014, (pp. 1).
Hoover Inc., "Pyro-Guard, Exterior Fire-X", Dec. 2017, (pp. 1-12).
Hoover Inc., "Pyro-Guard", Nov. 2017, (pp. 1).
Hoover Inc., "Specification for Pyro-Guard: Interior Fire Retardant Treated Wood", Apr. 2014, (pp. 1).
Hoover Wood Products, "Exterior Fire-X Material Safety Data Sheet", Oct. 2005, (pp. 1-5).
Hoover, "2hr Fire Resistant Load Bearing Wall", Nov. 2017, (pp. 1).
https://www.youtube.com/watch?v=YMgd5sAxG1o—wood finger joint production line, published Jun. 27, 2016.
Huang Yingsheng, Zhang Wencheng, Dai Xiaojing, Zhao Yu, "2012 International Symposium on Safety Science and Technology: Study on water-based fire extinguishing agent formulations and properties", Elsevier Procedia Engineeering, vol. 45 (6 Pages).
Huang Yinsheng, Zhang Wencheng, Dai Xiaojing, and Zhao Yu, "2012 International Symposium on Safety Science and Technology Study on water-based fire extinguishing agent formulations and properties", Published by Elsevier Ltd. Selection and/or peer-review under responsibility of the Beijing Institute ofTechnology, 2012, (6 Pages).
Hughes Associates Europe, "The Water Mist Technology Future; How the Test and Approval Process May Affect the next Developments", Jan. 2015, (pp. 1-23).
Hui Zhang, Rice University, "Effect of Oils, Soap and Hardness on the Stability of Foams" Sep. 2003, (221 Pages).
Hy-Tech, "Insulating Ceramic Microspheres", Nov. 2017, (pp. 1-3).
Hy-Tech, "ThermaCels: Insulating Ceramic Additive for Paint", Nov. 2017, (pp. 1-2).
Hyeon Kim, Young Seok Ji, Shaheed Ur Rehman, Min Sun Choi, Myung Chan Gye, Hye Hyun Yoo, "Pharmacokinetics and Metabolism of Acetyl Triethyl Citrate, a Water-Soluble Plasticizer for Pharmaceutical Polymers in Rats" Apr. 3, 2019 (13 Pages).
Hyun-Min Yang, The role of Organic and Eco-Friendly Inhibitors on the Corrosion Mitigation of Steel in Acidic Environments—A State-of-Art Review, Molecules 2021, 26, 3473 (20 Pages).
ICC Evaluation Service Inc., "FirePro", Nov. 2005, (pp. 1-4).
ICC Evaluation Service Inc., "ICC-ES Listing Report: FX Lumber Guard/FX Lumber Guard XT Fire-Retardant Coatings", Oct. 2016, (pp. 1-3).
ICC Evaluation Service Inc., "ICC-ES Report: Pyro-Guard Fire Retardant-Treated Wood", Dec. 2016, (pp. 1-8).
ICL Performance Products LP, "Material Safety Data Sheet", Jul. 2014, (pp. 1-6).
Industrial Fire Journal, "Rising to the Challenge", Sep. 2017, (pp. 1-2).
Inland Marine Underwriters Association, "CLT and Builder's Risk", May 2017, (pp. 1-26).
Installation & Quick Start Guide for SoprayLogger E3B, Sheridan, Wyoming, Mar. 21, 2019, AgTerra Technologies, Inc., (17 Pages).
Installation and Quick Start Guide for the SprayLogger BackPack Lite, by AgTerra Technologies, Inc., Sheridan, Wyoming, Mar. 2019 (11 Pages).
ASTM International, "Standard Practice for Calculating Bending Strength Design Adjustment Factors For Fire-Retardant-Treated Plywood Roof Sheathing", Oct. 2015, (pp. 1-6).
ASTM International, "Standard Test Method for Evaluating the Effects of Fire-Retardant Treatments and Elevated Temperatures on Strength Properies of Fire-Retardant treated Lumber", Jul. 2010, (pp. 1-6).
ASTM International, "Standard Test Method for Evaluating the Flexural Properties of Fire-retardant Treated Softwood Plywood Exposed to Elevated Temperatures", May 2001, (pp. 1-7).
ASTM International, "Standard Test Method for Extended Duration Surface Burning Characteristics of Building Materials (30 min Tunnel Test)," Aug. 2011, (pp. 1-4).
ASTM International, "Standard Test Method for Hygroscopic Properties of Fire-Retardant Wood and Wood-Based Products", Jul. 2013, (pp. 1-3).
ASTM International, "Standard Test Methods for Fire Tests of Building Construction and Materials", Oct. 2000, (pp. 1-24).
Australian Building Codes Board, "NCC 2019, Fire Safety Verification Method", Jan. 2018, (pp. 1-95).
Autodesk, Inc., "Autodesk® BIM 360 Docs: A Cloud-Based Document Management Service for Construction Project and Project Teams," 2016 (1 Pages).
Autodesk, Inc., "Autodesk® BIM 360 Docs: A Cloud-Based Document Management Service for Construction Project and Project Teams," 2017 (2 Pages).
Autodesk, Inc., "Autodesk® BIM 360 Docs: A Cloud-Based Document Management Service for Construction Project and Project Teams," 2017 (3 Pages).
Autodesk, Inc., Sander Lijbers, AEC Industry Manager, Presentation at Cadac BIM Congres 2015 on Autodesk® BIM 360®, 2015 (33 Pages).
Bank Insurance, Michael D. White, "How Benjamin Franklin Became the 'Father of Insurance'", Dec. 1998, (pp. 1-3).
Benzinga, "Megola Inc. Files Application to Underwriter Laboratories for Certification", May 2010, (pp. 1-3).
Bergman et al. The Carbon Impacts of Wood Products. Forest Products Journal vol. 64, No. 7/8. 2014.
Bete, "PJ: Fine Atomization", Nov. 2017, (pp. 1).
Bete, "Bete Announces High-Performance Nozzles for Fire Protection Systems", Nov. 2017, (pp. 1-2).
Bete, "Low Flow", Nov. 2017, (pp. 1).
Bete, "MicroWhirl: Fine Atomization", Nov. 2017, (pp. 1).
Bete, "P: Fine Atomization", Nov. 2017, (pp. 1).
Bete, "UltiMist", Nov. 2017, (pp. 1).
Binu Kundukad , Gayathri Udayakumar, Erin Grela, Dhamanpreet Kaur, Scott A. Rice, Staffan Kjelleberg, Patrick S. Doyle, Weak acids as an alternative anti-microbial therapy, Elsevier B. V., Biofilm 2, 2020 100019 (8 Pages).
Binu Kundukad, Gayathri Udayakumar, Erin Grela, Dhamanpreet Kaur, Scott A. Rice, Staffan Kjelleberg, Patrick S. Doyle, Elsevier, "Biofilm: Weak acids as an alternative anti-microbial therapy" Jan. 15, 2020 (8 Pages).

(56) References Cited

OTHER PUBLICATIONS

Blog Article titled, "Cleaning and Killing Black Mold with Common, Non-Toxic, Household Products" captured on Feb. 1, 2021 at https://www.lifemaideasy.com/cleaning-and-killing-black-mold-w (pp. 1-9).
Blog on LifeMaidEasy.com, Cleaning and Killing Black Mold With Common, Nontoxic, Household Product, posted Mar. 17, 2020, https://www.lifemaideasy.com/post/cleaning-and-killing-black-mold-with-common-non-toxic-household-products, Mar. 17, 2020 (9 Pages).
Bo Madsen and E. Kristofer Gamstedt, Review Article "Wood versus Plant Fibers: Similarities and Differences in Composite Applications", Hindawi Publishing Corporation Advances in Materials Science and Engineering vol. 2013, Article ID 564346, (14 pages).
Boss Products, "EcoMAXX Brochure", Apr. 2016, (pp. 1-2).
Brian R. Donner, "Dry Chemical Suppression for Lithium Compounds" Jan. 2012 (32 Pages).
Brief Profile on Tripotassium Citrate, by European Chemicals Agency (ECHA), Official Journal of the European Union, Jun. 13, 2022 (18 Pages).
Briefing "Assessing Aerial Suppresion Drop Effectiveness", Issue 38, Sep. 2009, Fire Note Background Briefs, published jointly by theBushfire Cooperative Research Centre (Bushfire CRC ) and the Australasian Fire and Emergency Service Authorities Council (AFAC) (4 Pages).
Brochure for Clore Wildfire Defense, Clore Corp., Aug. 2024 (2 Pages).
Brochure for AkroFoam Master Stream Nozzle with Pickup Tube Style 4475, Akron Brass Company, Apr. 2021 (2 Pages).
Brochure for Chemguard NFF 3×3 UL201 Non-Fluorinated Alcohol Resistant Firefighting Foam Concentrate, Johnson Controls, Jan. 14, 2021 (4 Pages).
Brochure for GreenFire Pro Defense Wetting Agent, by Fire Suppression Innovations, Placentia CA, Jul. 2022 (2 Pages).
Brochure for Jungbunzlauer Range of Products, Jungbunzlauer Suisse AG, May 7, 2020 (20 Pages).
Brochure for SKUM Firefighting Foam Concentrates and Hardware, Johnson Controls, Oct. 2019 (8 Pages).
Bruker, "S1 Titan Brochure", Nov. 2017, (pp. 1-8).
C. I. Onwulata, R. P. Konstance, P. M. Tomasula, American Dairy Science Association, "Minimizing Variation in Functionality of Whey Protien Concentrates from Different Sources" Sep. 25, 2003 (8 Pages).
Calcium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/calcium-salts/ (6 Pages).
Calgary Herald, Andrea Cox, "Homebuilder Wants Buyers to be in the Pink", Oct. 2011, (pp. 1-6).
Callisonrtkl, "Seattle Mass Timber Tower, Feasibility Study: Design and Construction Analysis" Aug. 2016, (pp. 1-34).
Canada Department of Forest and Rural Development, Ottawa, Canada, "The Sprayer-Duster As A Tool For Forest Fire Control", D. G. Fraser, Forestry Branch Departmental Publication No. 1167, 1967 (19 Pages).
Canadian Interagency Forest Fire Centre (CIFFC) Products Meeting the Canadian Specification for Longh-Term Retardants (Meeting Qualifying Performance Requiremens for Long-Term Fire Retardants and Pretreatment Produts, US Forest Service 5100-304d, Canadian Interagency Forest Fire Centre (CIFFC) , Fire & Aviation MAnagement, May 5, 2024 (2 Pages).
Carol Walker, Executive Director of RMIIA, "Wildfire & Insurance: Insurance Communications Challenges a& Opportunities", https://www.iii.org/sites/default/files/docs/pdf/cc_presentation_carole_walker_111416.pdf , Oct. 2016, (8 Pages).
Carole Walker, Director RMIIA, Presentation—"Wildfire & Insurance: Insurance Communications Challenges & Opportunities", Sep. 2018 (8 Pages).
Cease Fire, "CFCA 900 Clean Agent Fire Supression System Unit Specifications", Nov. 2017, (pp. 1).
Cease Fire, "Why Choose Waterless Fire Suppression", Sep. 2018, (pp. 1-2).
CFR—Code of Federal Regulations, Title 21 Food and Drugs, vol. 1, Salts iof Fatty Acids, As Food Additive, US FDA, Oct. 17, 2023 (1 Page).
Chapter 9.2: Solubility and Structure—Chemistry LibreTexts, captured on Oct. 6, 2024, at https://chem.libretexts.org/Courses/Prince_Georges_Community_College/CHEM_2000%3A_Chemistry_for_Engineers_(Sinex)/Unit_3%3A_States_of_Matter/Chapter_9%3A_Solutions/Chapter_9.2%3A_Solubility_and_Structure, (12 Pages).
Charlotte Pipe and Foundry Company, "Technincal Bulletin: Understanding Flame Spread Index (FSI) and Smoke Developed Index (SDI) Ratings", Jan. 2016, (pp. 1-2).
Chemical Online, "Mse Enviro-Tech Corp. Introduces Dectan", May 2007, (pp. 1).
Web Pages Showing a Buckeye™ Wet Chemical Fire Extinguisher containing Potassium Citrate, Buckeye Fire Equipment Company, Kings Mountain, North Carolina, published at http://buckeyefire.com/products/liquid-agent-fire-systems/ captured on Jun. 16, 2021, (3 Pages).
Web Pages Showing Invatech Italia 868 Backpack Duster Mister Fogger Unit, Invatech Italia, Sumas, Washington, published at https://invatechitalia.com/?gclid=EAIaIQobChMIxKuVyu6c8QIVGYblCh12ggwOEAAYASAAEgIkefD_BWE captured onJun. 16, 2016, (11 Pages).
Webpage for TriFone BRAVO 600 Line of Sprayers, hhspray.com, H&H Farm Machine Company, Jan. 2020 (4 Pages).
Website Decription of Clore Wildfire Defense, Clore Corp., captured at https://clorefr.com/clore-wildfire-defense on Aug. 6, 2024 (4 Pages).
Website Pages from Fire Break Protection Systems Inc., captured from https://www.dnb.com/business-directory/company-profiles.fire_break_protection_systems.04a9c4cc966d5ffce0e52d19515a79a7.html on Mar. 8, 2021, Fire Break Protection Systems, Simi Valley, California, (6 Pages).
Website Pages from Frontline Wildfire Defense Systems, System Brochure, captured from https://www.frontlinewildfire.com/ on Mar. 8, 2021, Frontline Wildfire Defense Systems, Wildomar, California, (5 Pages).
Website Pages from Perimeter Solutions Inc. regarding Phoschek® Fortify® Fire Retardant, Perimeter Solutions Inc., captured at https://www.perimeter-solutions.com/fire-safety-fire-retardants/phos-chek-fortify/ on Jun. 15, 2021, (5 Pages).
Wei-Tao Luo, Shun-Bing Zhu, Jun-Hui Gong, Zheng Zhao, "Research and Development of Fire Extinguishing Technology for Power Lithium Batteries", 2017 8th International Conference on Fire Science and Fire Protection Engineering (on the Development of Performance-based Fire Code), Elsevier, Procedia Engineering, Dec. 2017 (7 Pages).
Western Wood Preservers Institute, "Fire Retardant Wood and the 2015 International Building Code", Jan. 2015, (pp. 1-2).
Western Wood Products Association, "Flame-spread Ratings & Smoke-Developed Indices; Conformance with Model Building codes", Nov. 2017, (pp. 1-2).
Weyerhauser, Renee Strand, "Mid-Rise, Wood-Framed, Type III Construction—How to Frame the Floor to Wall Intersection at Exterior Walls", Apr. 2016, (pp. 1-8).
White Paper for Johnson Controls, "Types of firefighting foam agents: Properties and applications", Jan. 2020 (4 Pages).
Whitepaper Brochure by Perimter Solutions—"Long-Term Fire Retardants: History, Innovation and Preparing for the Future of Wildfires", Perimeter Solutions LP, Jan. 2022 (20 Pages).
Wikipedia Article on Fluorocarbon, Wikipedia.org, captured Apr. 11, 2021 at https://en.wikipedia.org/wiki/Fluorocarbon (11 Pages).
Wikipedia Article on Greek Fire, Wikipedia.org, captured Jan. 28, 2021 at https://en.wikipedia.org/wiki/Greek_fire (14 Pages).
Wikipedia article on Potassium Citrate, Wikipedia .org captured May, 6, 2020 at https://en.wikipedia.org/wiki/Potassium_citrate (2 Pages).

(56) References Cited

OTHER PUBLICATIONS

Wikipedia Entry for Diammoniun Phosphate, published at https://en.wikipedia.org/wiki/Diammonium_phosphate , Retrieved May 7, 2022 (3 Pages).
Wikipedia Entry for Potassium Citrate, published at https://en.wikipedia.org/wiki/Potassium_citrate, Last Edited Jul. 19, 201, Retrieved May 6, 2022 (3 Pages).
Wikipedia Entry for Sodium Benzoate Aug. 14, 2024, Wikipedia.org, (8 Pages).
Wikipedia for Potassium Citrate, published on https://en.wikipedia.org/wiki/Potassium_citrate, Jun. 17, 2021, Wikipedia.org, (3 Pages).
Wikipedia, "Phos-Chek Screenshots", Nov. 2017, (pp. 1-3).
Wikpedia Article on Per- and Polyfluoroalkyl Substances, Wikipedia.org, captured Apr. 11, 2021 at https://en.wikipedia.org/wiki/Per-_and_polyfluoroalkyl_substances, (26 Pages).
Wildfire Defense Systems, Inc., Web Brochure on WDSFire Wildfire Reporting Dashboard Service For Wildfire Risk During an Active Wildfire, 2017, (2 Pages).
Wildfire Defense Systems, Inc., Web Brochure on WDSPRo Mobile Application For Wildfire Hazard Property Assessment, 2017, (3 Pages).
William R. Smythe, "The Spectrum of Fluorine", Apr. 1921 (7 Pages).
Wood Environment & Infrastructure Solutions UK Ltd., "The use of P15 FAS and fluorine-free alternatives in fire-fighting foams" Jun. 2020 (534 Pages).
Wood Works, "The Case for Cross Laminated Timber", Jan. 2016, (pp. 1-212).
Woodworking Network, "Megola to Buy Wood-Protecting Hartindo AF21 Fire Inhibitor", Aug. 2011, (pp. 1-2).
Woodworks, "Carbon Calculator and Estimator App", Jul. 2018 , (pp. 1-12).
Woodworks, "Carbon Calculator: Reference & Notes", Jan. 2016, (pp. 1-8).
Woodworks, "Carbon Estimator", Jul. 2018, (pp. 1).
Woodworks, "Case Study: UW West Campus Student Housing", Jan. 2013, (pp. 1-8).
Woodworks, "Design Example: Five-Story Wood-Frame structure Over Podium Slab", Sep. 2016, (pp. 1-79).
Woodworks, "Options for Brick Veneer on Mid-Rise Wood-Frame Buildings", Oct. 2015, (pp. 1-8).
Woodworks, "Wood Brings the Savings Home", Jan. 2013, (pp. 1-8).
XLam, "Technical: XLam Panel Specifications", Jan. 2018, (pp. 11).
Yang Xuebing, "Change in the Chinese Timber Structure Building Code", Jan. 2006, (pp. 1-11).
Yavuz HK, Ozcan MM, Lemiasheuski VK, "The Effect of Some Chemical Additives on the Foaming Performance of the Pasteurized Liquid Egg White" Jan. 31, 2018 (4 Pages).
Yi-Yuan Shao, Kuan-Hung Lin, Yu-Ju Kao, Journal of Food Quality, "Modification of Foaming Properties of Commercial Soy Protein Isolates and Concentrates by Heat Treatments" Aug. 10, 2016 (12 Pages).
Yong-Liang Xu, Lan-Yun Wang, Don-Lin Liang, Ming-Gao Yu, Ting-Xiang Chu, "Experimental and Mechanism Study of Electrically Charged Water Mist for Controlling Kerosene Fire in a Controlled Space", Apr. 2014, (pp. 1-7).
Yuri B. Vysotsky, Elena Kartashynska, Dieter Vollhardt, Valentin B. Fainerman, "Surface pKa of Saturated Carboxylic Acids at the Air/Water Interface" A Quantum Chemical Approach Jun. 5, 2020 (10 Pages).
Zhen Wang, "Optimization of Water Mist Droplet size in Fire Supression by Using CFD Modeling", Dec. 2015, (pp. 1-68).
Zhen Wang, "Optimization of Water Mist Droplet Size in Fire Suppression by Using CFD Modeling", Masters of Science Degree Thesis, Graduate College of the Oklahoma State University, Oklahome, Dec. 2015, (68 Pages).
Zinc Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/zinc-salts/ (6 Pages).
LA Times, Sam Byker, "Fire Retardants That Protect the Home", Nov. 25, 2007, (pp. 1-4).
Labat Environmental, "Ecological Risk Assessment of Wildland Fire-Fighting Chemicals: Long-Term Fire Retardants", Fire and Aviation Management US Forest Service, Boise, ID, Dec. 2013, (110 Pages).
Iacovidou et al. The use of smart technologies in enabling construction components reuse: A viable method or a problem creating solution? Journal of Environmental Management 216 (2018) 214-223. Online May 5, 2017.
Leader Group S.A.S, "Foam Proportioning: Multi-Flow Inductors" Oct. 2020 (15 Pages).
Ledinek, "X-Press", Nov. 2017, (pp. 1-5).
Legal Information about Jungbunzlauer brand Tripotassium Citrate, captured at https://www.jungbunzlauer.com/en/products/special-salts/tripotass, Jungbunzlauer Suisse AG, Basel, Switzerland, (2 Pages), 2020.
Lendlease, Jeff Morrow, "More with Less: An Overview of the 1st CLT Hotel in the U.S.", Apr. 2016, (pp. 1-45).
Leyla-Cann Sogutoglu, Michael Steiger, Jelle Houben, Daan Biemans, Hartmut R. Fischer, Pim Dinkers, Henk Huinink, Olaf C. G. Adan, Crystal Growth & Design, "Understanding the Hydration Process of Salts: The Impact of a Nucleation Barrier" Feb. 14, 2019 (10 Pages).
List of Corrosion Inhibitors a Surface Protection from Polygon Chemie AG, Olten 4600, Switzerland, 2023 (5 Pages).
Lon H. Ferguson and Christopher A. Janicak, "Fundamentals of Fire Protection for the Safety Professional", Governmenta Institutes, The Rowman & Littlefield Publishing Group, Inc., 2005 (341 Pages).
Louisiana-Pacific, "FlameBlock: Assemblies and Applications", Aug. 2017, (pp. 1-8).
Lousiana-Pacific, "LP Solutions Software", Mar. 2012, (pp. 1-8).
LP Building Products, "Material Safety Data Sheet", May 2014, (pp. 1-4).
LSU Agcenter Wood Durability Laboratory, Eco Building Products, "Eco Red Shield: Technical Specifications—Strength Testing", Aug. 2011, (pp. 1-21).
M. F. M. Ibrahim, H. G. Abd El-Gawad and A. M. Bondok, "Physiological Impacts of Potassium Citrate and Folic Acid on Growth, Yield, and Some Viral Diseases of Potato Plants", Middle East Journal of Agriculture, col. 4, Issue 3, Jul.-Sep. 2015 (13 Pages).
M.L Vitosh, J.W. Johnson, D.B. Mengel, Michigan State University, Ohio State University, Purdue University, "Tri-state Fertilizer Recommendation for Corn, Soybeans, Wheat, and Alfalfa" Jul. 1995 (24 Pages ).
Magnesium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/magnesium-salts/ (8 Pages).
MagTech, "MagTech OSB", Nov. 2017, (pp. 1-2).
Mamoru Kohno, "Outline of the Fire Resistance Verification Method in the Building Standard Law of Japan", May 2000, (pp. 1-7).
Marioff, "Fire Fighting Excellence: HI-FOG Water Mist Fire Protection", Jan. 2017, (pp. 1-8).
Marioff, "Hi-Fog for Buildings", Jan. 2014, (pp. 1-16).
Marioff, "Hi-Fog System Components", Nov. 2017, (pp. 1-2).
Marioff, "Hi-Fog Water Mist Fire Protection: Fire Protection for Buildings", Jan. 2017, (pp. 1-12).
Marioff, Hi-Fog Electric Pump Unit, Jan. 2016, (pp. 1-2).
Marisa Alviar-Agnew, 9.7: Carboxylic Acids and Esters—Chemistry LibreTexts, captured on Oct. 6, 2024 at https://chem.libretexts.org/Bookshelves/Introductory_Chemistry/Chemistry_for_Changing_Times_(Hill_and_McCreary)/09%3A_Organic_Chemistry/9.08%3A_Carboxylic_Acids_and_Esters, (7 Pages).
Mark L. Robin, FS World, "Fire Detection & Suppression", Apr. 2011, (pp. 1-10).
Marketwire, "Megola Inc. Signs 'Hartindo AF21' Licensing Agreement with Eco Blu Products, Inc.", Nov. 2009, (pp. 1-2).
Marketwired, "Megola Announces AF21 Test Results", Aug. 2007, (pp. 1-2).

(56) References Cited

OTHER PUBLICATIONS

Marketwired, "Megola Continues Sales of Hartindo AF21 to EcoBlu Products, Inc.", Dec. 2010, (pp. 1-2).
Marketwired, "Megola Obtains Class A Rating for Hartindo AF31", Nov. 2007, (pp. 1-2).
Marketwired, Megola Updates on Hartindo AF21, a Total Fire Inhibitor, Aug. 2010, (pp. 1-3).
Marketwired, "MSE Enviro-Tech Corp.'s AF31 Fire Extinguishing Agent Addresses Need for More Effective Forest Fire Fighting Technology", Jul. 2007, (pp. 1-2).
Marketwired, "WoodSmart Solutions, Inc. Tests Hartindo AF21 in BluWood Solution", Nov. 2007, (pp. 1-2).
Marleyeternit, "JB FireSafe Scaffold Boards", Jan. 2016, (pp. 1-2).
Material Safety Data Sheet for Fire Terminator Sachet (Class F / K Fires) by Fire Terminator International Pte Ltd, Singapore 408 704, dated May 25, 2022 (4 Pages).
Material Safety Data Sheet for FT JN1010-Green Firefighting Solution for Class A/B/C/D Fires, by Fire Terminator International Pte Ltd, Singapore 408 704, dated May 21, 2022 (4 Pages).
Material Safety Data Sheet for FT JN669-Green Firefighting Solution for Forest/Peat Fires, by Fire Terminator International Pte Ltd, Singapore 408 704, dated May 25, 2022 (4 Pages).
Material Safety Data Sheet for FT Slam (Class A/B/C Fires) by Fire Terminator International Pte Ltd, Singapore 408 704, dated May 25, 2022 (4 Pages).
Material Safety Data Sheet (MSDS) for FIRE-TROL® 936 Fire Retardant Used in Wildfire Control, by ICL France-ICL Biogemea S.A.S, Revision 09, updated Mar. 29, 2013 , (4 Pages).
Material Safety Data Sheet (MSDS) for Purple K Dry Chemical Fire Extinguishant, Amerex Corporation, Trussville, AL, Sep. 2003 (7 Pages).
Material Safety Data Sheet for Ansul 3% Fluorprotein Foam Concentrate, Tyco Fire Protection Products, Oct. 7, 2011 (4 Pages).
Material Safety Data Sheet for D96026 Chromtint Green 2726 Concentrated Colorant, Chromatech Inc., Canton Michigan CAS No. Blend, Jan. 4, 2011 (6 Pages).
Material Safety Data Sheet for Hartindo AF31 Eco Fire Break, Eco Building Products, Inc., Feb. 4, 2013, (4 Pages).
Material Safety Data Sheet for Knockdown Class A Foam, National Foam Inc., Oct. 1, 2007 (8 Pages).
Material Safety Data Sheet for Purple K Dry Chemical Fire Extinguishant, Amerex Corporation, Sep. 2003 (7 Pages).
Matthew E. Benfer, Joseph L. Ffey, "valuation of Water Additives for Fire Control and Vapor Mitigation—Two and Three Dimensional Class B Fire Tests" Mar. 15, 2015 (34 Pages).
Maureen Puettmann, Woodlife Environmental Consultants, LLC, Dominik Kaestner, Adam Taylor, University of Tennessee, "Corrim Report—Module E Life Cycle assessment of Oriented Strandboard (OSB) Production", Oct. 2016, (pp. 1-71).
Megola, "RE: File No. 0-49815—Response to Comments—Form 10K for Fiscal Year Ended Jul. 31, 2009", Sep. 2010, (pp. 1-4).
Metroscape, "Building the Future: New Technology and the Changing Workforce", Jan. 2017, (pp. 1-32).
Metsawood, "Kerto LVL Screenshot", Nov. 2017, (pp. 1).
FLIR, "Integration AX8 & A-B Overview", Oct. 2017, (pp. 1-9).
FLIR, "IR Automation Guidebook: Temperature Monitoring and Control with IR Cameras", Jan. 2018, (pp. 1-68).
FLIR, "M100/M200 Series: Installation & Operation Instructions", Oct. 2017, (pp. 1-112).
FLIR, "M100/M200 Series: Quick Start Guide", Oct. 2017, (pp. 1-5).
FLIR, "Thermal Imaging for Machine Vision and Industrial Safety Applications", Aug. 2014, (pp. 1-12).
FLIR, "User's Manual: FLIR A3xx Series", May 2016, (pp. 1-126).
FLIR, "VUE Pro: Thermal Camera for SUAS", Jul. 2009, (pp. 1-2).
FLIR, FLIR "AX8 Brochure", Nov. 2017, (pp. 1-2).
FM Appovals, "Approval Standard for Heavy Duty Mobile Equipment Protection Systems", Aug. 2015, (pp. 1-79).
FM Approvals, "American National Standard for Water Mist Systems", Nov. 2017, (pp. 1-191).
FM Approvals, "Approval Standard for Automatic Sprinklers for Fire Protection", Feb. 2018, (pp. 1-119).
FM Approvals, "Approval Standard for Clean Agent Extinguishing Systems", Apr. 2013, (pp. 1-74).
FM Approvals, "Approval Standard for Combustible Gas Detectors", Jan. 2018, (pp. 1-21).
FM Approvals, "Approval Standard for Explosion Suppression Systems", Feb. 2018, (pp. 1-57).
FM Approvals, "Approval Standard for Heat Detectors for Automatic Fire Alarm Signaling", Jan. 2018, (pp. 1-29).
FM Approvals, "Approval Standard for Hybrid (Water and Inert Gas) Fire Extinguishing Systems", Nov. 2011, (pp. 1-196).
FM Approvals, "Approval Standard for Hydrocarbon Leak Detectors", Oct. 2012, (pp. 1-18).
FM Approvals, "Approval Standard for Pressure Actuated Waterflow Switches", Aug. 1970, (pp. 1-6).
FM Approvals, "Approval Standard for Quick Response Storage Sprinklers for Fire Protection", Feb. 2018, (pp. 1-87).
FM Approvals, "Approval Standard for Radiant Energy-Sensing Fire Detectors for Automatic Fire Alarm Signaling", Jan. 2018, (pp. 1-17).
FM Approvals, "Approval Standard for Residential Automatic Sprinklers for Fire Protection", Aug. 2009, (pp. 1-68).
FM Approvals, "Approval Standard for Smoke Actuated Detectors for Automatic Alarm Signaling", Jan. 2012, (pp. 1-25).
FM Approvals, "Approval Standard for Spark Detection and Extinguishing Systems", Nov. 2015, (pp. 1-32).
FM Approvals, "Approval Standard for Sprinkler Valve Supervisory Devices—Standard Security and Enhanced Security", Dec. 2017, (pp. 1-17).
FM Approvals, "Approval Standard for Video Image Fire Detectors for Automatic Fire Alarm Signaling", Dec. 2011, (pp. 1-22).
FM Approvals, "Approval Standard for Water Mist Systems", Apr. 2016, (pp. 1-314).
FM Approvals, "FM Approvals: History", Jan. 2018, (pp. 1-7).
FM Approvals, Ansi, "American National Standard for Radiant Energy-Sensing Fire Detectors for Automatic Fire Alarm Signaling", Feb. 2014, (pp. 1-16).
FM Approvals, Approval Standard for Automatic and Open Water-Spray Nozzles for Installation in Permanently Piped Systems, Feb. 2010, (pp. 1-23).
FM Approvals, Approval Standard for Public Mode Visible Signaling Appliances for Automatic Fire Alarm Signaling, Nov. 2016, (pp. 1-18).
FM Approvals"Approval Standard for Audible Notification Appliances for Automatic Fire Alarm Signaling", Nov. 2003, (pp. 1-16).
Forest and Wood Products Australia, Andrea Jane Leys Phd, "How is Carbon Stored in Trees and Wood Products?", Jan. 2012, (pp. 1-10).
Forest Products Laboratory, Robert H. White, Mark A. Dietenberger, "Chapter 17: Fire Safety", Feb. 1999, (pp. 1-17).
FP Innovations, M. Mohammad, "Connections in CLT Assemblies", Sep. 2011, (pp. 1-59).
Fpinnovations, "A Synthesis of Research on Wood Products & Greenhouse Gas Impacts 2nd Edition", Octoer 2010, (pp. 123).
Fpinnovations, "CLT Handbook: Cross-Laminated Timber", Jan. 2013, (pp. 1-572).
Frank Rustincovitch, US Environmental Protection AuaryENCY, "Environmental Impact Guidelines: For New Source Phosphate Fertilizer Manufacturing Facilities" Oct. 1981 (227 Pages).
Frank Wigglesworth Clarke, The Constitution of Natural Silicates, Department of the Interior, United States Geological Survey, Bullentin 588, Washington, Government Printing Office (128 Pages).
G. S. Grigoryan, Z. G. Grigorya, A. Ts. Malkhasyan, Yerevan State University, "Obtaining Esters of Citric Acid with High Aliphatic Alcohols" Jan. 2017 (4 Pages).
Gabrielle Kassel, What is Soy Protein Isolate and Is It Bad For You? Jan. 24, 2020 (4 Pages).
General Information Sheet for Chemguard Class "A" Foam, Chemguard, Sep. 2005 (2 Pages).
General Information Sheet for Chemguard Foam Products, Chemguard, Sep. 2005 (6 Pages).

(56) References Cited

OTHER PUBLICATIONS

General Information Sheet for Chemguard Foam System Solutions, Johnson Controls, Jan. 2020 (12 Pages).
General Information Sheet for WD881 Class A Foam Concentrate, Perimeter Solutions Jan. 2019 (5 Pages).
General Information Sheet for Wildland Fire Chemical Products: Toxicity and Environmental Concerns, Wildland Fire Chemical Systems, USDA WFS, Jan. 17, 2007 (2 Pages).
Gerhard Schickhofer, Andreas Ringhofer, "The Seismic Behaviour of Buildings Erected in Solid Timber", Aug. 2012, (pp. 1-124).
Gerry Parlevliet and Steven McCoy, "Organic Grapes and Wine: A Guide to Production", Department of Primary Industries and Regional Development, Govt. of Australia, Bullentins 4000—Research Publications, Jul. 2001, (41 Pages).
Ghafoor, A.; Khan, F.A.;Khorsandi, F.; Khan, M.A.; Nauman, H.M.; Farid, M.U., Development and Evaluation of a Prototype Self-Propelled Crop Sprayer for Agricultural Sustainability in Small Farms, Sustainability 2022, 14, 9204 (22 Pages).
Gizmodo, Esther Inglis-Arkell, "The Deadliest Ways to Try to Put Out a Fire", May 2015, (pp. 1-3).
Glenalmond Timber Company, "IWS FR Fire Retardant Treated Wood: Corrosion Information", Nov. 2017, (pp. 1).
Data Sheet for Chemguard S-764P-12A High Performance Anionic Fluorosurfactant, Tyco Fire Protection Products, Jan. 2018 (2 Pages ).
Data Sheet for FLOWmix, Leader Group, Jun. 2018 (2 Pages).
Data Sheet for Leader Mix, Leader Group, Jun. 2018 (2 Pages).
Data Sheet for Purple K Dry Suppressing Agent, Tyco Fire Protection Products, Jan. 2018 (1 Page ).
Data Sheet for SNS-D2 C Alltural Disease and Fungal Control Application & Use Guide, Sierra Natural Science, Jan. 2020 (pp. 1-7).
Data Sheet for Towalex FFFP ARC 3×6, Incendium Fire Solutions, Nov. 2014 (2 Pages ).
Data Sheet for Williams Fire & Hazard Control Inline Foam Eductors, Williams Fire & Hazard Control, Jan. 2019 (1 Page).
Datasheet for Tearra-Blend® withg Tacking Agent 3® Hydraulic Mulch, Oct. 2017, Profile Products, LLC, Buffalo Grove, Illinois, (1 Pages).
DCI Engineers, "Cross-Laminate Timber", May 2016, (pp. 1-5).
Dealer News, "SiteOne Introduces New LESCO Smart Guided Precision Spray System", Nov. 5, 2018, https://www.rurallifestyledealer.com/articles/7715-siteone-introduc , (4 Pages).
Defence Research and Development Canada, John A. Hiltz, "Additives for Water Mist Fire Suppression Systems—A Review", Nov. 2012, (pp. 1-40).
Department of Financial Services, "Certification of Insurance Fire Protection System Contractor, State of Florida," Aug. 2007, (pp. 1).
Department of Homeland Security, "Class A Foam for Structural Firefighting", Dec. 1996, (pp. 1-62).
Department of the Navy, "Military Specification: Lumber and Plywood", Jun. 1984, (pp. 1-16).
Diversified Protection Systems Inc., "Fire Protection Protection Presentation", Jan. 2004, (pp. 1-35).
Dr. Anthony E. Finnerty, U.S. Army Research Laboratory, "Water-Based Fire-Extinguishing Agents", Jan. 1995, (pp. 1-12).
Dr. Inge Krämer, BASF, "Acronal PRO & Joncryl: Water based Resins for Metal Protection" Oct. 3, 2011, (21 Pages).
DRJ, "AAF21 Fire Treated Wood Protection Coating Applied to Lumber", Sep. 2017, (pp. 1-8).
DRJ, "Technical Evaluation Report: Eco Red Shield Fire Treated Wood Protection Coating", Apr. 2016, (pp. 1-8).
Drjohnson Lumber Company, "Cross Laminated Timbers: Mass Timber Construction", Jan. 2016, (pp. 1).
Dupont, "Some facts you should know about NOVEC 1230 and ECARO-25 . . . ", Oct. 2004, (pp. 1-2).
Dupont, Mark L. Robin, "DuPont Fire Extinguishants: Comparison Testing of FE-25 and Automatic Sprinklers in a Simulated Data Processing/Telecommunications Facility", Jul. 2008, (pp. 1-20).
Eco Building Products Inc, "Eco Red Shield Material Safety Data Sheet : Wood Dust", Jun. 2005, (pp. 1-2).
Eco Building Products, "Affiliate Program Screenshots", Apr. 2013, (pp. 1-3).
Eco Building Products, "ECO Disaster Break: Class A Fire Rated, UV Resistant, High Performance, Non-Toxic, Acrylic Coating", Feb. 2013, (pp. 1).
Eco Building Products, "Safety Data Sheet: Eco Red Shield", May 2016, (pp. 1-6).
Eco Building Products, "Technical Bulletin: Corrosive Effects From Eco Red Shield Coatings", Jan. 2011, (pp. 1).
Elsevier, Chao Man, Zhu Shunbing, Jia Litao, Wu Xiaoli, "Surfactant-containing Water Mist Suppression Pool Fire Experiemental Analysis", Oct. 2010, (pp. 1-7).
Elsevier, Qiang Chen, Jun-Cheng Jiang, Fan Wu, Meng-Ya Zou, "Performance Evaluation of Water Mist with Mixed Surfactant Additives Based on Absorption Property", Dec. 2017, (pp. 1-9).
Elsevier, Zhang Tianwei, Liu Hao, Han Zhiyue, Du Zhiming, Wang Yong, "Research Paper: Active Substances Study in Fire Extinguishing by Water Mist with Potassium Salt Additives Based on Thermoanalysis and Thermodynamics", May 2017, (pp. 1-10).
EPA's Safer Choice Criteria for Processing Aids and Additives, US Environmental Protection Agency (EPA) Safer Choice Program, published at https://www.epa.gov/saferchoice/safer-choice-criteria-processing-aids-and-additives , US EPA, Aug. 7, 2024 (5 Pages).
Erdal Ozkan, Ohio State University Professor and Extension Agriculture Engineer, "One-of-a-kind Intelligent Sprayer Being Developed in Ohio", Jun. 20, 2018, https://www.michfb.com/MI/Farm-News/One-of-a-kind-Intelligent-sprayer-being-developed-in-Ohio/, (6 Pages).
Ester Inglis-Arkell, "The Deadliest Ways to Try To Put Out A Fire," GIZMODO published at https://gizmodo.com/the-deadliest-ways-to-try-to-put-out-a-fire , Aug. 20, 2018, (3 Pages).
Eva Snejdrova and Milan Dittrich, Pharmaceutical Application of Plasticized Polymers, https://www.researchgate.net/publication/221929431_Pharmaceutical_Applications_of_Plasticized_Polymers, Mar. 2012, (23 Pages).
Exova Warringtonfire, "Ad-hoc tests on watermist systems utilising the principles of the procedure defined in Draft BS 8458: 2014: Annex B", Sep. 2015, (pp. 1-19).
Exova Warringtonfire, "BS 8458:2015: Annex C" Jan. 2016, (pp. 1-22).
Exova Warringtonfire, Test on a watermist system utilising the principles of the procedure defined in BS 9252: 2011: Annex S (21 pages).
Fact Sheet for PFOA & PFOS, EPA, Nov. 2016 (5 Pages).
Fike, "Cheetah Xi: Intelligent Suppression Control System", Sep. 2012, (pp. 1-6).
Fike, "DuraQuench: A New Era in Water-Based Fire Protection", Sep. 2015, (pp. 1-2).
Fike, "DuraQuench: Pumped Water Mist System", Sep. 2015, (pp. 1-8).
Fike, "Even in the Age of Cloud Computing, Data Center Downtime Can Spell Disaster", Aug. 2016. (pp. 1-2).
Fike, "Fire Alarm Solutions: Ready for the Future Fike Fire Panels", May 2007, (pp. 1-2).
Fike, "Intelligent Graphic Annunciators", Mar. 2009, (pp. 1-2).
Fike, "Intelligent Ionization Detector", Mar. 2014, (pp. 1-2).
Fike, "Intelligent Manual Pull Station", Jun. 2014, (pp. 1-2).
Fike, "Intelligent Non-Relay Photoelectric Duct Housing", Jun. 2014, (pp. 1-2).
Fike, "Intelligent Photoelectric Detector", Mar. 2014, (pp. 1-2).
Fike, "Micromist Suppression System Data Sheet", Sep. 2005, (pp. 1-2).
Fike, "Micromist System Package Data Sheet", Sep. 2005, (p. 1-2).
Plumis, "Automist vs. Alternatives", Jan. 2016, (pp. 1-4).
Plumis, Plumis Declaration of Testing and Conformity with Applicable Standards (Automist SmartScan), Jan. 2017, (pp. 1-3).
Plumis, "Registered Details Fact Sheet: Automist Fixed Wall Head", Jan. 2017, (pp. 1).
Pongsathron Issarayungyuen, Wiwat Pichayakorn, Thawatchai Phaechamud, "Cast Natural Rubber Films Comprising Triethyl Citrate" Nov. 15, 2013 (5 Pages).

(56) References Cited

OTHER PUBLICATIONS

Potassium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/potassium-salts/ (6 Pages).
Preeti Singh, R. Kumar, S. N. Sabapathy, A. S. Bawa, Comprehensive Reviews in Food Science and Food Safety, Functional and Edible Uses of Soy Protein Products Aug. 2, 2007 (15 Pages).
Preliminary Investigation (PI-0284) by Caltrans Division of Research , Innovation and System Information, DRSI, Surface Applications of Fire Retardants Requested by Kenneth Murray, Division of Maintenance, Nov. 11, 2020, California Department of Transportation, 2020 (25 Pqges).
Press Release "Perimeter Solutions Acquires LaderaTech and FORTIFY-Brand Fire Retardant Technology", Perimeter Solutions, St. Louis Missouri, May 7, 2020 (2 Pages).
Press Release by Perimeter Solutions, Inc,. published Oct. 8, 2020, "Perimeter Solutions and CCSAA Group Partner to Provide Wildfire Defense", Perimeter Solutions, LP, (2 Sheets).
Press Release captioned "Perimeter Solutions's Phos-Chek® Fortify® Now Qualified by USDA Forest Service for Application as a Proactive Wildfire Solution", Oct. 5, 2021, Perimeter Solutions LP, (3 Pages).
Procore Technologies, Inc, Brochure for Procore® Cloud-Based Construction Management Software, Nov. 2018, (11 Pages).
Procore Technologies, Inc, Brochure for Procore® Construction Operating System and Cloud-Based Construction Management System , 2018, (15 Pages).
Produce Brochure for PCC-2020064 Phos-Chek® Preventive Wildfire Solutions Using Phos-Chek® Long-Term Retardants—Phos-Chek® Fortify Fire Retardant and Phos-Chek® LC95/259-FX Fire Retardant Technology, Perimeter Solutions, LP, 2020, (2 Sheets).
Product Application Bulletin for F-500 Encapsulator Multi-Purpose Fire Suppression Agent for Class A, Class B and Class D Type Fires, Hazard Control Technologies, Inc. (HCT), Fayetteville, Georgia 2015 (2 Pages).
Product Brochure "Facts—Formulating Better Tasting Infant Formula—Jungbunzlauer—from Nature to Ingredients®", Jungbunzlauer Suisse AG, Basel, Switzerland, (8 Pages), 2015.
Product Brochure "Product Range Bio-Based Ingredients—Jungbunzlauer—from Nature to Ingredients®", Jungbunzlauer Suisse AG, Basel, Switzerland, (16 Pages), 2017.
Product Brochure "Special Salts—Functional Minerals—Jungbunzlauer—from Nature to Ingredients®", Jungbunzlauer Suisse AG, Basel, Switzerland, (8 10 Pages), 2017.
Product Brochure PCC-2019057-0 for PHOS-CHECK® Airbase and Mobile Services Guide, by Perimeter Solutions, LP, 2020, (12 Sheets).
Product Brochure "Hi-Fog Water Mist Fire Protection—Fire Protection for Buildings—HI-FOG® High-Presure Water Mist", Marioff Corporation Oy, 2017, (12 Pages).
Product Brochure (V5B) for F-500 Encapsulator Agent Technology—Multi-Purpose Fire Suppression Agent for Class A, Class B and Class D Type Fires, Hazard Control Technologies, Inc. (HCT), Fayetteville, Georgia 2015 (6 Pages).
Product Brochure for "259-Fx Long-Term Fire Retardant Low Viscosity (LV) Powder Concentrate by Phos-Chek" (PCC-2019036-2), Perimeter Solutions LP, 2023 (3 Pages).
Product Brochure for "Ground Applied Phos-Chek Long-Term Fire Retardant" (PCC-2019019-0), Perimeter Solutions LP, 2020 (6 Pages).
Product Brochure for "Phos-Chek 259-Fx Long-Term Fire Retardant Low Viscosity (LV) Powder Concentrate" (PCC-2019036-v4), Perimeter Solutions LP, 2023 (3 Pages).
Product Brochure for "Phos-Chek Preventive Wildfire Solutions" (PCC-2020064), Perimeter Solutions LP, 2020 (2 Pages).
Product Brochure for Citrofol, Jungbunzlauer Suisse AG, Jan. 9, 2020 (6 Pages).
Product Brochure for FIRE-TROL® 934 and FIRE-TROL 936 Long-Term Fire Retardants Used in Wildfire Control Ground Applications, by ICL France—ICL Biogemea S.A.S, Revision 12, updated Mar. 29, 2013 , (1 Page).
Product Brochure for First Alert® Tundra™ AF400 Fire Extinguishing Spray, BRK Brands, Inc. Aurora, Illinois, 2007 (2 Pages).
Product Brochure for First Alert® Tundra™ AF400 Fire Extinguishing Spray, BRK Brands, Inc. Aurora, Illinois, 2020 (3 Pages).
Product Brochure for Komodo®-Pro 0-0-16 Plus Micronutrients, by Solutions 4Earth, LLC, Anderson NV, Apr. 2017 (1 Page).
Product Brochure for Komodo®-Pro Premium Potassium Chloride-Free Fertilizer, by Solutions 4Earth, LLC, Anderson NV, Apr. 2017 (2 Pages).
Product Brochure for Longray Model: TS-18 Truck-Mounted ULV Cold Fogger, Shenzhen Longray Technology Co., Ltd., Shenzhen, China, 2013, (1 Page Total).
Product Brochure for Longray Model: TS-50 Truck-Mounted/Wheeled Battery-Powered ULV Cold Fogger, Shenzhen Longray Technology Co., Ltd., Shenzhen, China, 2013, (1 Page Total).
Product Brochure for Longray Model: TS-95 Truck-Mounted Thermal Fogging Machine, Shenzhen Longray Technology Co., Ltd., Shenzhen, China, 2013, (1 Page Total).
Product Brochure for Longray Model:TS 35A[E} Hand-Held Thermal Foggier Machine, Shenzhen Longray Technology Co., Ltd., Shenzhen, China, 2013, p. 1 of Fogger Brochure, (16 Pages Total).
Product Brochure for Micro-Blaze Out® Class A/B Fire Fighting Agent (i.e. Microbial Wettinig Agent) Concentrated Water Additive (1-3%), Containing Foaming Agents and Emulsifiers, Verde Environmental, Inc. Houston Texas, 2021, (2 Pages).
Product Brochure for PHOS-CHEK® Wildfire Home Defense Authorizd Service Provider Program, Perimeter Solutions, LP, 2020, (1 Sheet).
Product Brochure for Surfactant-Loaded-Citrate, Jungbunzlauer Suisse AG, Jan. 2018 (8 Pages).
Product Brochure PCC-2019014-0 for Phos-Chek® Code—Combined On Demand Equipment (Code)—Mobile Multi-Chemical System, by Perimeter Solutions, LP, 2020, (4 Sheets).
Product Brochure PCC-2019019-0 for PHOS-CHEK® Ground Applied Long-Term Fire Retardant Groun Application, by Perimeter Solutions, LP, 2020, (6 Sheets).
Product Brochure PCE-2019052-0 for Phos-Chek® PC Avenger All-Terrain Mobile Unit, Published by Perimeter Solutions, LP, 2019, (12 Sheets).
Product Brochure PCE-2019058-0 for PHOS-CHECK® Fabricated Equipment Solutions, by Perimeter Solutions, LP., 2019, (4 Sheets).
Product Catalogue for Foam Tech Brand of Anti-Fire Chemicals, FoamTech Antifire Company, Kundli, India, Aug. 2021 (9 Pages).
Product Information about Jungbunzlauer brand Tripotassium Citrate, captured at https://www.jungbunzlauer.com/en/products/special-salts/tripotass, Jungbunzlauer Suisse AG, Basel, Switzerland, (3 Pages), 2020.
Product Information for Bio For, Bioex SAS, Mar. 12, 2019, (2 Pages).
Product Information for Phos-Chek 1% Fluorine Free Class A/B Foam Concentrate, Perimeter Solutions, Jan. 2019 (2 Pages).
Product Information for Phos-Chek MVP-F (0.95 lb/Gal) Dry Concentrate Gum-Thickened, Medium Viscocity, Fugitive Color, USDA Forest Service, May 2016 (1 Page).
Product Label for Phos-Chek® Wildfire Home Defense Long-Term Fire Retardant Concentrated Formula (0.75 Makes 5 Gallons) and Easy Mixing and Spraying Instructions, Perimeter Solutions, LP, 2020, (2 Sheets).
Product Overview (V3) for F-500 Encapsulator Agent (EA) Technology—Multi-Purpose Fire Suppression Agent for Class A, Class B and Class D Type Fires, Hazard Control Technologies, Inc. (HCT), Fayetteville, Georgia 2017 (2 Pages).
Product Overview of Phos-Chek Wildfire Home Defense, Mfg. No. LC-95W, ICL Performance Products, St Louis Missouri, 2020, (1 Page).
Product Properties Information about Jungbunzlauer brand Tripotassium Citrate, captured at https://www.jungbunzlauer.com/en/products/special-salts/tripotass, Jungbunzlauer Suisse AG, Basel, Switzerland, (2 Pages), 2020.

(56) References Cited

OTHER PUBLICATIONS

Insurance Institute for Business & Home Safety (IBHS), Oct. 22, 2018, "Colorado Property & Insurance WildfirePreparedness Guide", 2018 (2 Pages).
Insurance Institute for Business & Home Safety, "Protect Your Property from Wildfire", Jan. 2011, (pp. 1-40).
Intelligent Wood Systems, "IWS FR Fire Retardant Treated Wood Corrosion Information", Jan. 2016, (pp. 1).
Intelligent Wood Systems, "Treated Timber—Consumer Information", Nov. 2016, (pp. 1-15).
Intelligent Wood Systems, "Treated Timber—Customer Information", Nov. 2016, (pp. 1-8).
International Fire Chiefs Association, "Guidelines for Managing Private Resources on Wildland Fire Incidents", Jan. 2016, (pp. 1-2).
International Preliminary Report on Patentability (IPRP) and Applicant's ART34 Amendment Claims 1-98, issued in PCT/US22/15004 dated Aug. 31, 2023 (30 Pages).
International Search Report (ISR) and Written Opinion of The International Searching Authority (WO) dated Jun. 8, 2022 issued in PCT International Patent Application No. PCT/US22/15004 filed Feb. 2, 2022 by Applicant, M-Fire Holdings LLC, Assigned to Mighty Fire Breaker LLC, (37 Pages).
International Search Report (ISR) issued in PCT/US22/15055 dated Jul. 18, 2022 (6 Pages).
Intertek, "Building & Construction Information Bulletin: Introduction to ASTM E84 & Frequently Asked Questions", Jun. 2017, (pp. 1-2).
Intertek, "Report of Testing 7'×7' Floor/Ceiling Assembly", Aug. 2013, (pp. 1-6).
Intertek, "Report of Testing FX Lumber Guard (Dimensional Lumber)", Apr. 2015, (pp. 1-10).
Intertek, "Report of Testing FX Lumber guard Fire Retardant Coating Applied to I-Joists in a Floor Celing Assembly", Aug. 2014, (pp. 1-6).
Intertek, "Report of Testing FX Lumber Guard Fire Retardant for I-Joist, Truss Joist (TJI), FLoor Joist, Ceiling Joist, amd OSB", Mar. 2013, (pp. 1-9).
Intertek, "Report of Testing FX Lumber Guard on SPF Lumber", Jun. 2012, (pp. 1-6).
Intertek, "Report of Testing FX Lumber Guard", Aug. 2015, (pp. 1-6).
Intertek, "Report of Testing FX Lumber Guard", Nov. 2014, (pp. 1-9).
Iron Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/ products/mineral-salts/iron-salts/ (7 Pages).
J. Craig Voelkert, "Fire and Fire Extinguishment: A Brief Guide to Fire Chemistry and Extinguishment Theory for Fire Equipment Service Technicians", Jan. 2015, (28 Pages).
J. G. Quintiere, Qdot LLC, "Literature Review: Packaging Technique to to Defeat Fires and Explosions due to Lithium-ion and Related High-Energy-Density Batteries" Mar. 2020 (64 Pages).
J. W. Hastie, "Molecular Basis of Flame Inhibition" Jul. 19, 1973 (22 Pages).
J28 . W. Hastie, "Molecular Basis of Flame Inhibitition", Journal of Research of the National Bureau of Standards—A Physics and Chemistry, vol. 77A, No. 6, Nov.-Dec. 1973, (22 Pages).
James Hardie Technology, "HardieBacker: With Moldblock Technology", Jan. 2012, (pp. 1-10).
James Hardie Technology, "30-Year Limited Warranty", Oct. 2011, (pp. 1-8).
James R. Butz, Technologies Inc, Richard Carey, David Taylor Research Center, "Application of Fine Water Mists to Fire Suppression", Nov. 2017, (pp. 1-11).
Jerrold E. Winandy, Qingwen Wang, Robert E. White, "Fire-Retardant-Treated Strandboard: Properties and Fire Performance", May 2007, (pp. 1-10).
Jesse Roman, "Build. Burn. Repeat?", NFPA Journal, NFPA.org, Jan./Feb. 2018 , (9 Pages).
Jim Clark, Group 1_ Properties of Alkali Metals—Chemistry LibreTexts, captured on OC (tober 6, 2024 T https://chem.libretexts.org/Bookshelves/Inorganic_Chemistry/Supplemental_Modules_and_Websites_(Inorganic_Chemistry)/Descriptive_Chemistry/Elements_Organized_by_Block/1_s-Block_Elements/Group_1%3A_The_Alkali_Metals/1Group_1%3A_Physical_Properties_of_Alkali_Metals (3 Pages).
John Packer, NZ Institute of Chemistry, "Chemistry in Fire Fighting", Oct. 2017, (6 Pages).
Johnson Controls , "Aqueous Film-Forming Foam (AFFF) Concentrates: Aspirated Versus Nonaspirated AFFF" Jan. 2020 (4 Pages)6.
Johnson Controls, "SaboFoam: Firefighting Foam Suppression Technology" Jan. 2019 (6 Pages).
Josef Hainzl, "High Pressure Water Mist for Protection of High Rise Buildings", Nov. 2016, (pp. 1-3).
Joseph W. Mitchell and Oren Patashnik, "Firebrand Protection as the Key Design Element for Structure Survival during Catastrophic Wildland Fires", M-bar Technologies & Consulting, published at https://www.slideserve.com/mari/firebrand-protection-as-the-key-design-element-for-structure-survival-during-catastrophic-wildland-fires , uploaded on Aug. 22, 2013, (15 Pages).
Joseph W. Mitchell, M-Bar Technologies and Consulting, "Wind-Enabled Ember Dousing: A Comparison of Wildland Fire Protection Strategies", Aug. 2008, (pp. 1-53).
Joseph W. Mitchell, Oren Patashnik, "Firebrand Protection as the Key Design Element for Structure Survival During Catastrophic Wildland Fires", Aug. 2006, (pp. 1-15).
Joseph W. Mitchell, PhD, "Wind-Enabled Ember Dousing: A Comparison of Wildland Fire Protection Strategeies" Prepared for Ramona Fire Recovery Center, M-bar Technologies and Consulting, LLC, Aug. 12, 2008, (53 Pages).
Josephine Christina, Youngsoo Lee, Jounral of Food Science, "Modification of Sodium Release Using Porous Corn Starch and Lipoproteic Matrix" Jan. 22, 2016 (9 Pages).
Journal of Civil & Environmental Engineering, Mohamed Fayek Abdrabbo et al., "The Effect of Water Mist Droplet Size and Nozzle Flow Rate on Fire Extinction in Hanger by Using FDS", Oct. 2010, (pp. 1-12).
Jungbunzlauer Products That Comply with California Proposition 65, by Jungbunzlauer Suisse AG, Basel Switzerland, Jan. 3, 2020 (1 Page).
Jungbunzlauer Suisse AG, "Trisodium Citrate Anhydrous" Feb. 2021 (4 Pages ).
Jungbunzlauer White Paper "Jungbunzlauer Tripotassium Citrate: Environmental and health friendly flame retardant in wood application", Product Group Special Salts, Tripotassium Citrate, Protection TPC Fire Retardant Wood, published on Jungbunzlauer Website 2019 (2 Pages).
Jungbunzlauer, "Facts: Citrofol as coalescent agent" Jan. 2019 (12 Pages).
Jungbunzlauer, "Wood treatment—TPC as fire retardant" Jan. 2019 (11 Pages ).
Kallesoe Machinery A/S, "System Solutions for Laminated Wood Products", Nov. 2017, (pp. 1-3).
Kallesoe Machinery, "CLT Production Line", Nov. 2017, (pp. 1-5).
Keith Klassen, "Aspirating Foam Nozzles", Oct. 20, 2011 (6 Pages).
Khrystyna Regata, Christoph Bannwarth, Stehan Grimme and Michael Allan, "Free electrons and ionic liquids: study of excited states by means of electron-energy loss spectroscopy and the density functional theory multireference configuration interaction method", Phys. Chem. Chem Phys. 2015, 17 15771, (10 Pages).
Khrystyna Regeta, Christoph Bannwarth, Stefan Grimme, Michael Allan, Royal Society of Chemistry, "Free Electrons and Ionic Liquids: study of excited states by means of electron-energy loss spectroscopy and the density functional theory multireference configuration interaction method", May 2015, (pp. 1-10).
Nayyani C. Adiga, Researchgate, "Ultra-fine Water Mist as a Total Flooding Agent: A Feasibility Study", Jan. 2014, (pp. 1-13).
Kostas D. Kalabokidis, "Effects of Wildfire Suppression Chemicals on People and the Environment—A Review", Sep. 2000, (pp. 1-9).

(56) References Cited

OTHER PUBLICATIONS

MGB Achitecture & Design, "The Case for Tall Wood Buildings: How Mass Timber Offers A Safe, Economical, and Environmentally Friendly Altermative for Tall Building Structures", Feb. 2012, (pp. 1-240).
Michelle D. King, Jiann C. Yang, Wnedy S. Chien and William L. Grosshandler, "Evaporation of A Small Water Droplet Containing An Additive" Proceedings of the ASME National Heat Transfer Conference, Baltimore, Aug. 1997 (6 Pages).
Mike H. Freeman, Paul Kovacs, "Metal and Fastener Corrosion in Treated Wood from an Electrochemical—Thermodynamic Standpoint", Jan. 2011, (pp. 1-22).
Mike Kirby, Fire Rescue, "Nozzles Types, Pros and Cons", Jun. 2012, (pp. 1-7).
Mineral Salt Product from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/ (4 Pages).
Minimax Fire Products White Paper The Cost-benefit Advantages of Replacing Halon with 725 PSI MX 1230 Clean Agent Fire Suppression Systems, MiniMax Fire Products, 2014, (7 Pages).
Minimax, "The Cost-Benefit Advantages of Replacing Halon with 725 PSI MX 1230 Clean Agent Fire Suppression Systems", Mar. 2014, (pp. 1-7).
Mitsui Home America, "Mitsui Homes Inc. Website and Screenshots", Dec. 2012, (pp. 1-38).
Mohamed Fayek Abdrabbo, Ayoub Mostafa Ayoub,Mohamed Aly Ibrahim and Abdelsalam M. Shara Feldin, "The Effect of Water Mist Droplet Size and Nozzle Flow Rate on Fire Extinction in Hanger by Using FDS", Journal of Civil & Environmental Eng. 2016, vol. 6, Issue 2, (12 Pages).
Mohammadmahdi Ghiji, Vasily Novozhilov, Khalid Moinuddin, Paul Joseph, Ian Burch, Brigitta Suendermann, Grant Gamble, MDPI, "A Review of Lithium-Ion Battery Fire Suppression" Oct. 1, 2020 (30 Pages).
Moince M. Fiume et al., "Safety Assesment of Citric Acid, Inorganic Citrate Salts, and Alkyl Citrate Esters as Used in Cosmetics" Jan. 2014 (31 Pages).
Morflex Inc., "Pharmaceutical Coatings Bulletin 102-4: Influence Of Triethyl Citrate On The Properties Of Tablets Containing Coated Pellets" Jan. 1996 (10 Pages ).
MSDS for Potassium Citrate published at https://hazard.com//msds/mf/baker/baker/files/p5675.htm , Nov. 6, 1997, (4 Pages).
MSDS for Potassium Citrate, MSDS No. P5675 prepared on Nov. 6, 1997 by J. T. Baker of Strategic Services Division of Mallinckrodt Baker, Inc. (4 Pages).
Mylene Merlo, "San Diego Wildfires, Parts 1, 2, 3 and 4: Myths and Reality", Jun. 2, 2014,http://www.mylenemerlo.com/blog/san-diego-wildfires-myths-reality/ , (42 Pages).
N. M. Kovalchuk, A. Tybala, V. Starov, O. Matar, N. Ivanova, "Fluoro- vs hydrocarbon surfactants: Why do they differ in wetting performance?" Advances in Colloid and Interface Science, vol. 210, Aug. 2014, (7 Pages ).
National Academy Press, "Fire Suppression Substitutes and Alternatives to Halon for U.S. Navy Applications", Jan. 1997, (pp. 1-111).
National Enhanced Oil Recovery Initiative (NEORI), "Recommended Modifications To The 45Q Tax Credit For Carbon Dioxide Sequestration", Feb. 2012, (12 Pages).
National Fire Protection Association, "Standard for Fire Retardant-Treated Wood and Fire-Retardant Coatings for Building Materials", Jan. 2015, (pp. 1-16).
National Fire Protection Inc., "FM-200 / HFC-227ea: Clean Agent Fire Suppression", Jan. 2016, (pp. 1-5).
National Instruments, "IMAQ Vision Concepts Manual", Oct. 2000, (pp. 1-313).
National Refrigerants Inc., "R123 Safety Data Sheet", May 2015, (pp. 1-8).
National Research Council of Canada, Zhigang Liu, Andrew K. Kim, Don Carpenter, Fountain Fire Protection Inc., Ping-Li Yen, "Portable Water Mist Fire Extinguishers as an Alternative for Halon 1211", Apr. 2001, (pp. 1-5).
National Wildfire Coordinating Group, "Foam Vs Fire: Class A Foam for Wildland Fires" Oct. 1993 (36 Pages)6.
Natural Fire Solutions, "Website Screenshots", Nov. 2017, (pp. 1-4).
Navair, "Natops U.S. Navy Aircraft Emergency Rescue Information Manual", Jan. 2009, (pp. 1-288).
Navair, "Natops U.S. Navy Aircraft Firefighting Manual", Oct. 2003, (pp. 1-200).
Ncasi, Brad Upton, Reid Miner, Kirsten Vice, "The Greenhouse Gas and Carbon Profile of the Canadian Forest Products Industry", Oct. 2007, (pp. 1-41).
Nelson Pine, "How LVL is Made", Nov. 2017, (pp. 1).
Newstar Chemicals, Hartindo Anti Fire Products, Nov. 2017, (pp. 1).
Newszak, "Hfc-227Ea Fire Extinguishers Market Outlook 2023: Top Companies, Trends and Future Prospects Details for Business Development", Sep. 2018, 5 pages.
NFPA Journal, Jesse Roman, "Build. Burn. Repeat?", Feb. 2018, (pp. 1-9).
NFPA, "Certified Fire Protection Specialist: Candidate Handbook", Apr. 2018, (pp. 1-34).
NFPA, "Standard on Water Mist Fire Protection Systems", Feb. 2006, (pp. 1-135).
Nordson Corporation, "Airless Spray Systems: The Efficient Choice for Many Liquid Painting Applications", Jan. 2004 (pp. 1-8).
North American Green, Inc., Installation Guide for HydroMax™ Hydraulic Erosion Control Products, Dec. 2017, http://www.nagreen.com, (2 Pages).
Notice of Allowance dated Jun. 5, 2023 for U.S. Appl. No. 17/497,948 )pp. 1-8).
Notice of Allowance dated Apr. 10, 2019 for U.S. Appl. No. 15/866,454 (pp. 1-5).
Notice of Allowance dated Dec. 1, 2020 for U.S. Appl. No. 15/829,943 (pp. 1-7).
Notice of Allowance dated Dec. 8, 2020 for U.S. Appl. No. 15/829,944 (pp. 1-9).
Notice of Allowance dated Feb. 11, 2021 for U.S. Appl. No. 16/449,389 (pp. 1-7).
Notice of Allowance dated Jan. 18, 2019 for U.S. Appl. No. 15/921,617 (pp. 1-7).
Notice of Allowance dated May 13, 2019 for U.S. Appl. No. 15/874,874 (pp. 1-5).
Notice of Allowance dated Oct. 29, 2020 for U.S. Appl. No. 16/449,389 (pp. 1-5).
NRC CNRC, "Fire Performance of Houses. Phase I. Study of Unprotected Floor Assemblies in Basement Fire Scenarios. Summary Report", Dec. 2008, (pp. 1-55).
NRCC, Zhigang Liu, Andrew K. Kim, "A Review of Water Mist Fire Suppression Technology: Part II—Application Studies", Feb. 2001, (pp. 1-29).
Nutrient Source Specifics Sheet for Monoammonium Phoshate (MAP), International Plant Nutrition Institute (IPNI), Norcross, Georgia, Ref#10069, 2019, (1 Page).
NY Times, "Building with Engineered Timber", Jun. 2012, (pp. 1-3).
OCV Control Valves, " Engineering / Technical Section", Jun. 2013, (pp. 1-12).
OCV Control Valves, "Solenoid Control Valve Series 115", May 2017, (pp. 1-6).
Product Selection Guide for BASF Resins, BASF, Feb. 2019 (77 Pages).
Profile Products LLC, "GHS Safety Data Sheet: ConTack", Jan. 2017, (pp. 1-6).
Profile Products LLC, "Certificate of Compliance, Terra-Blend with Tacking Agent 3", Jan. 2016, (pp. 1).
Profile Products LLC, "Earth-Friendly Solutions for Sustainable Results", Feb. 2014, (pp. 1-2).
Profile Products LLC, "Flexterra HP-FGM", Feb. 2018, (pp. 1-4).
Profile Products LLC, "Hydraulically-Applied Erosion Control Bonded Fiber Matrix" Mar. 2017 (5 Pages).

(56) References Cited

OTHER PUBLICATIONS

Profile Products LLC, "Profile Products Base Hydrualic Mulch Loading Chart and Application Guide", Oct. 2011, (pp. 1).
Profile Products LLC, "Profile Soil Solutions Software: Getting Started", Nov. 2017, (pp. 1-21).
Profile Products LLC, "Terra-Blend with Tacking Agent 3", Oct. 2017, (pp. 1).
Profile, "Product Screenshots", Nov. 2017, (pp. 1-5).
Profile® Products Base Hydraulic Mulch Loading Chart and Application Guide (ESP-02), Oct. 2011, Profile Products, LLC, Buffalo Grove, Illinois, (1 Page).
Qai Laboratories, "Test Report #T1003-1: FX Lumber Guard", Apr. 2015, (pp. 1-10).
Quick Start Guide for the SnapMapper, by AgTerra Technologies, Inc, Sheridan, Wyoming, Mar. 29, 2019 (8 Pages).
R. W.. Walker, "Free Radicals in Combustion Chemistry", Science Progress Oxford, 1990, vol. 74, No. 2, pp. 163-188, (22 Pages).
Ramage et al.; The Wood from the Trees: The Use of Timber in Construction; Renewable and Sustainable Energy Reviews 68 ( 2017) 333-359; published Oct. 2016.
Raute, "LVL Technology Screenshot on Web", (pp. 1).
RDR Technologies, "BanFire Screenshot", Nov. 2017, (pp. 1).
RDR Technologies, "Fire Retardant Spray for Artificial Tree and Decorations", Nov. 2017, (pp. 1).
RDR Technologies, Fire Retardant Coatings of Texas, "FX Lumber Guard Screenshots", Nov. 2017, (pp. 1-2).
Realfire® Realtors Promoting Community Wildfire Awareness, Eagle County, Colorado, "Wildfire Reference Guide: A Guide For Realtors® To Assist Home Sellers & Buyers With Understanding Wildfire", http: www.REALFire.net , Mar. 2017 (8 Pages).
Reed Construction Data, "Osmose Inc., FirePro Fire Retardant", Jan. 2004, (pp. 1-3).
Replacement Claims filed by Mighty Fire Breaker LLC in PCT Application No. PCT/US2022/015004 on May 27, 2023 (24 Pages).
Researchgate, Kayyani C. Adiga, "Ultra-fine Water Mist as a Total Flooding Agent: A Feasibility Study", Jan. 2014, (pp. 1-13).
Rethink Wood, "Designing for Fire Protection: Expanding the Possibilities of Wood Design", Aug. 2015, (pp. 1-8).
Rethink Wood, "Evaluating the Carbon Footprint of Wood Buildings: Reducing Greenhouse Gases with High-Perfromance Structures", Apr. 2015, (pp. 1-8).
Rethink Wood, "Mid-Rise Wood Construction", Apr. 2015, (pp. 1-12).
RFID Journal, Ask The Experts Forum, "How Is RFID Being Used in the Construction Industry?", Jun. 27, 2013, (2 Pages).
Robert H. White, Erik V. Nordheim, "Charring Rate of Wood for ASTM E 119 Exposure", Feb. 1992, (pp. 1-2).
Robert L. Darwin, Hughes Associates Inc., "Aircraft Carrier Flight and Hangar Deck Fire Protection: History and Current Status", Jan. 2001, (pp. 1-102).
Robert L. Darwin, Hughes Associates Inc., Frederick W. Williams, Navy Technology Center for Safety and Survivability, "Overview of the Development of Water-Mist Systems for U.S. Navy Ships", Apr. 1999, (pp. 1-8).
Robert Zalosh, Gregory Gallagher, "Water Mist Sprinkler Requirements for Shipboard Fire Protection", May 1996, (pp. 1-97).
Role of Organic and Eco-Friendly Inhibitors on the Corrosion Mitigation of Steel in Acidic Environments—A State-of-Art Review, by Hyun-Min Yang, Molecules 2021, vol. 26, Jun. 2021 (20 Pages).
Roseburg Forest Products, "Roseburg EWP Commerical Design and Installation Guide", Mar. 2017, http://www.roseburg.com., (pp. 1-48).
Roseburg Forest Products, "Wood I-Joists", Jan. 2016, (pp. 1-6).
Rossi Jean-Louis, Marcelli Thierry, Chatelon François Joseph, Université de Corse, Systèmes Physiques pour l'Environnement UMR-CNRS 6134, Corte, France Morvan Dominique, Simeoni Albert, Rossi Jean-Louis, Marcelli Thierry, and Chatelon François Joseph, "Fuelbreaks: a Part of Wildfire Prevention", published in Global Assessment Report on Disaster Risk Reduction 2019, as a Contributing Paper, United Nations Office for Disaster Risk Reduction, Jul. 2019, (25 Pages).
Rossroof Group, "Tilcor: High Performance Roofing Systems", Nov. 2017, (pp. 1-2)).
Rubner Holzbau, "Timber Engineering in the 21st Century", Jan. 2017, (pp. 1-21).
Rubner Holzbau, "Wood Culture 21: Construction Expertise for Architects, Designers and Building Owners", Jul. 2017, (pp. 1-23).
Ryan S. Mcmullen, "Research of Alkali Metal-Ammonia Microjets Published in Journal Science" Jun. 4, 2020 (9 Pages).
S. Chen, A. Nussinovitch, The Role of Xanthan Gum in Traditional Coatings of Easy Peelers, Food Hydrocolloids, vol. 14, Issue 4, Jul. 2000, pp. 319-326, (7 Pages).
S. Foghmoes, T. Klemensøl, K. Brodersen, J. J. Bentzen and M. Della Negra, "Citrate- and glycerol triesters as novel dual-functional dispersants and plasticisers for ceramic processing", Department of Energy Conversion and Storage, Technical University of Denmark, Frederiksborgvej 399, DK-4000 Roskilde, Denmark, 2018 Elsevier (24 Pages).
S.T Lebow, J. E. Winandy, "Effect of fire-retardant treatment on plywood pH and the relationship of pH to strength properties" Jan. 8, 1997 (14 Pages ).
Safety Data Sheet for Chemguard DirectAttack Foam Concentrate, Tyco Fire Protection Products, Jan. 2018 (2 Pages).
Safety Data Sheet for First Alert® Tundra™ EZ Fire Spray™ Mixture, BRK Brands, Inc. Aurora, Illinois, Jun. 18, 2020 (6 Pages).
Safety Data Sheet for Purple K Dry Chemical (Fire Extinguishing Agent—Pressurized and Nonb-Pressurized) containing Potassium Bicarbonate and Calcium Ca, Badger Fire Protection, Ruckersville, VA, Nov. 23, 2015 (10 Pages).
Safety Data Sheet by NEXREG Compliance Inc. for Phos-Chek® Fortify Solution, Perimeter Solutions LP, Apr. 21, 2021 (5 Pages).
Safety Data Sheet fo KV-Lite Forming Fluoro Pr10 otein (FFFP) Foam Concentrate 3 & 6%, M/S K.V. Fire Chemicals Pvt. Ltd, Dec. 2009 (3 Pages).
Safety Data Sheet for Angus Fire FP 70 Foam, Angus Fire Ltd, Dec. 3, 2014 (9 Pages).
Safety Data Sheet for Bio Fluopro 3E, BIOEX SAS, Nov. 11, 2005 (2 Pages).
Safety Data Sheet for Chemguard: Direct Attack Class A Foam, Tyco Fire Protection Products, Feb. 22, 2016 (8 Pages).
Safety Data Sheet for Citroflex 4 , Vertellus Performance Materials Inc., Jul. 12, 2012 (9 Pages).
Safety Data Sheet for Citroflex A-2, Vertellus LLC, Nov. 30, 2010 (9 Pages).
Safety Data Sheet for Citroflex A-4, Vertellus LLC, Jun. 29, 2018 (8 Pages).
Safety Data Sheet for Dayglo® ECO-21 Corona Magneta Pigment™, Day Glo Color Corp., Cleveland, Ohio, Aug. 9, 2022 (7 Page).
Safety Data Sheet for Dayglo® ECO-2100FR Corona Magneta Pigment™, Day Glo Color Corp., Cleveland, Ohio, Aug. 9, 2022 (7 Page).
Safety Data Sheet for Fortress™ FR-100 Fire Retardant, Fortress North America, LLC, Rocklin, California , Jul. 10, 2020 (3 Pages).
Safety Data Sheet for Fortress™ FR-200 Fire Retardant, Fortress North America, LLC, Rocklin, California , Jul. 19, 2020 (3 Pages).
Safety Data Sheet for Fortress™ FR-600 Fire Retardant, Fortress North America, LLC, Rocklin, California , Feb. 8, 2022 (3 Pages).
Safety Data Sheet for Fortress™ FR-700 Fire Retardant, Fortress North America, LLC, Rocklin, California , Apr. 19, 2022 (3 Pages).
Safety Data Sheet for Iron Oxide Pigment Red (E172), CAS 1309-37-1 Diion Trioxide-32-1, Manufacturer: LGC Limited, Teddington, United Kingdom, Printing Date Jul. 6, 2016, Revision Aug. 26, 2014 (7 Pages).
Safety Data Sheet for Komodo Pro Fertilizer (No. R30528) Prepared on Feb. 9, 2017 by Solutions 4 Earth LLC, Henderson NV, Feb. 2017 (4 Pages).
Safety Data Sheet for Lankem BioLoop 68L, Lankem Ltd, May 3, 2020 (7 Pages).
Safety Data Sheet for Lankem BioLoop 84L, Lankem Ltd, Feb. 18, 2018 (7 Pages).

(56) References Cited

OTHER PUBLICATIONS

Safety Data Sheet for M-Fire AAF31 Job Site Spray, M-Fire Holdings LLC., Jan. 2018 (7 Pages).
Safety Data Sheet for Phos-Chek 1% AFF—[Aquafilm AF-1U], Auxquimia, Jul. 7, 2014 (13 Pages ).
Safety Data Sheet for Phos-Chek 1% Fluorine Free, Perimeter Solutions, Sep. 13, 2019 (6 Pages).
Safety Data Sheet for PHOS-CHEK WD-881's Fish Toxicity Values, Perimeter Solutions, May 2019 (2 Pages).
Safety Data Sheet for Phos-Chek® LC95W Solution (AST10150. 173), Perimeter Solutions, St. Louis, Missouri, Jun. 10, 2015 (5 Pages).
Safety Data Sheet for Polyphase PW40, Troy Corporation, Aug. 23, 2018 (14 Pages ).
Safety Data Sheet for Potassium Oxalate Monohydrate (CAS RN 6487-48-5), by Fisher Scientific Company, Revised Dec. 24, 2024 (7 Pages).
Safety Data Sheet for Sodium Benzoate, Lab Grade, CAS 532-32-1, Manufacturer: AquaPhoenix Scientific, Hanover, PA, SDS Created by Global Safety Management, Inc. Effective Date Dec. 28, 2014, Last Updated Mar. 19, 2015 (6 Pages).
Safety Data Sheet for The Amazing Docter Zymes Eliminator, The Amazing Doctor Zymes, Laytonville, CA, Revision Jul. 10, 2017 (2 Pages).
Safety Data Sheet for The Amazing Doctor Zymes Eliminator, The Amazing Doctor Zymes, Jul. 10, 2017 (2 Pages).
Safety Data Sheet for TROY PolyPhase PW40, Troy Corporation, Revised Aug. 23, 2018 (2018).
Safety Report titled "Safety Risks to Emergency Responders from Lithium-ion Battery Fires in Electric Vehicles", National Transportation Safety Board, Nov. 13, 2020 (80 Pages).
Sam Baker, "Fire Retardants That Protect The Home", LA Times, Nov. 25, 2007, https://www.latimes.com/business/realestate/la-re-fire25nov25-story.html, (4 Pages).
Scientific Opinion by EFSA Panel on Food Additives and Nutrient Sources added to Food (ANS), comprising Maged Yo"unes, Peter Aggett, et al., "Evaluation of di-magnesium malate, used as a novel food ingredient and as a source of magnesium in foods for the general population, food supplements, total diet replacement for weight control and food for special medical purposes", published in EJ EFSA Journal, EFSAEFSA Journal 2018;16(6):5292 (24 Pages).
Scott T. Handy, "Applications of Ionic Liquids in Science and Technology" , Published by InTech, Rijeka, Croatia, 2011, (528 Pages).
Scott T. Hardy, "Applications of lonic Liquids in Science and Technology", Sep. 2011, (pp. 1-528).
Screenshot of webpage for Lankem Bioloop Surfactants, Lankem Ltd, captured on Feb. 7, 2021 at https://www.lankem.com/bioloop-surfactants (1 Pag 1).
Screenshot of webpage for Lankem Products, Lankem Ltd, captured on Feb. 7, 2021 at https://www.lankem.com/products (1 Page ).
SDS for GreenFire Pro Defense Wetting Agent, by Fire Suppression Innovations, Placentia CA, Aug. 16, 2022 (4 Pages).
Sellsheet for Green Design Engineering (GDE)—Earth-Friendly Solutions for Sustainable Results™—by Profile Products LLC, Mar. 2014, Profile Products, LLC, Buffalo Grove, Illinois, (2 Pages).
SFPE, Peter Johnson, "Fire Safety Engineering Education—Part of a Certification Framework", Jan. 2012, (pp. 1-11).
Siemens, "Transforming Timbers into Houses", Jan. 2013, (pp. 1-3).
Simplex Aerospace, "Spray Systems Overview", Jan. 2016, (pp. 1-3).
SNS-DC™ All Natural Disease and Fungal Control Application & Use Guide, Sierra Natural Science, Inc. Salinas, CA, , 2020 (7 Pages).
Sodium Salts from the manufacturer—Dr. Paul Lohmann, published by Dr. Paul Lohmann GmbH & Co. KGaA Hauptstrasse 2 • 31860 Emmerthal Germany, captured on Oct. 6, 2024, at https://www.lohmann-minerals.com/products/mineral-salts/sodium-salts/ (7 Pages).
Specification Data Sheet for Instant & Non Instant Whey Protein Concentrate 80%, The Milky Whey Inc., Jan. 2021 (1 Page).
Specification Document for Fire Suppressant Foam for Wildland Firefighting (Class A Foam), U. S. Department of Agriculture Forest Service, Jun. 1, 2007 (31 Pages).
Specification Document for Water Enhancers for Wildland Firefighting, U.S. Department of Agriculture Forest Service, Jun. 1, 2007 (24 Pages).
Specification for Fire Suppressant Foam for Wildland Firefighting (Class A Foam), 5100-307b, Jun. 1, 2007, (Amendments Inserted into the Text, May 17, 2010) U.S. Department of Agriculture Forest Service (31 Pages).
Specification for Water Enhancers for Wildland Firefighting, 5100-306b, Sep. 2018 Superseding Specification 5100-306a, Jun. 1, 2007, U.S. Department of Agriculture Forest Service (24 Pages).
Spiritos Properties, "Mass Timber—101 and Beyond", Apr. 2017, (pp. 1-17).
Spraying Systems Co., "Industrial Hydraulic Spray Products", Jan. 2015, (pp. 1-220).
State of California Environmental Protection Agency, "Chemicals Known to the State to Cause Cancer or Reproductive Toxicity", Jan. 2017, (pp. 1-22).
Status of REACH Registration for Jungbunzlauer Products before the European Chemicals Agency (ECHA), No. 12.19, by Jungbunzlauer Suisse AG, Basel Switzerland, Aug. 10, 2020 (2 Pages).
Stefania Marzorati *, Luisella Verotta and Stefano P. Trasatti, Green Corrosion Inhibitors from Natural Sources and Biomass Wastes, Molecules 2019, 24, 48 (24 Pages).
Stephen Preece, Paul Mackay, Adam Chattaway, "The Cup Burner Method—Parametric Analysis of the Factors Influencing the Reported Extinguishing Concentrations of Inert Gases", Jan. 2001, (pp. 1-13).
Stephen Quarles and Ed Smith, "The Combustibility of Landscape Mulches" (SP-11-04), University of Nevada Cooperative Extension, 2011 (8 Pages).
Office Action dated Apr. 2, 2020 for U.S. Appl. No. 15/829,940 (pp. 1-8).
Office Action dated Apr. 2, 2020 for U.S. Appl. No. 15/829,941 (pp. 1-8).
Office Action dated Dec. 9, 2020 for U.S. Appl. No. 16/805,811 (pp. 1-9).
Office Action dated Feb. 6, 2020, for U.S. Appl. No. 15/866,451 (pp. 1-9).
Office Action dated Feb. 26, 2019 for U.S. Appl. No. 15/952,183 (pp. 1-12).
Office Action dated Janary 25, 2019 for U.S. Appl. No. 15/829,945 (pp. 1-7).
Office Action dated Jun. 1, 2018 for U.S. Appl. No. 15/829,914 (pp. 1-7).
Office Action dated Jun. 1, 2018 for U.S. Appl. No. 15/829,948 (pp. 1-13).
Office Action dated Mar. 18, 2020 for U.S. Appl. No. 16/449,389 (pp. 1-5).
Office Action dated Mar. 26, 2020 for U.S. Appl. No. 15/829,943 (pp. 1-8).
Office Action dated Mar. 27, 2020 for U.S. Appl. No. 15/829,944 (pp. 1-8).
Office Action dated May 31, 2019 for U.S. Appl. No. 15/866,451 (pp. 1-6).
Office Action dated Nov. 24, 2021 for U.S. Appl. No. 16/914,067 (10 Pages).
Office Action dated Nov. 9, 2018 for U.S. Appl. No. 15/866,456 (pp. 1-11).
Office Action dated Oct. 10, 2019 for U.S. Appl. No. 16/055,001 (pp. 1-9).
Office Action dated Oct. 11, 2018 for U.S. Appl. No. 15/866,454 (pp. 1-12).
Office Action dated Oct. 12, 2018 for U.S. Appl. No. 15/874,874 (pp. 1-15).
Office Action dated Oct. 5, 2021 for U.S. Appl. No. 16/805,811 (10 Pages ).
Office Action mailed Sep. 19, 2019 for U.S. Appl. No. 15/911,172 (pp. 1-8).

(56) References Cited

OTHER PUBLICATIONS

Online Britannica Entry for CHROMPHORE, https://www.britannica.com/science/chromophore , captured Sep. 26, 2024 (4 Pages).
Online Britannica Entry for Carboxylic Acid, https://www.britannica.com/science/carboxylic-acid, captured Mar. 16, 2024 (15 Pages).
Online Product Advertisement titled "What is K-Rich™? A High analysis pH-buffered liquid potassium complexed with citric acid", Agricultural Solutions Inc., https://www.agsolcanada.com/individual-product-info/nts-k-rich, Aug. 5, 2020, (7 Pages).
Online Wikipedia Entry for Alkali , https://en.wikipedia.org/wiki/Alkali , captured Apr. 12, 2023 (3 Pages).
Online Wikipedia Entry for Alkali Metals, https://en.wikipedia.org/wiki/Alkali_metal, captured Apr. 12, 2023 (48 Pages).
Online Wikipedia Entry for Carboxylic Acid, https://en.wikipedia.org/wiki/Carboxylic_acid , captured Apr. 2, 2023 (10 Pages).
Online Wikipedia Entry for Chromophore , https://en.wikipedia.org/wiki/Chromophore, captured Sep. 26, 2024 (5 Pages).
Online Wikipedia Entry for Ester, https://en.wikipedia.org/wiki/Ester, captured Feb. 15, 2024 (15 Pages).
Online Wikipedia Entry for List of Carboxylic Acids, https://en.wikipedia.org/wiki/List_of_carboxylic_acids , captured Feb. 13, 2023 (10 Pages).
Online Wikipedia Entry for Saturated and Unsaturated Compounds , https://en.wikipedia.org/wiki/Saturated_and_unsaturated_compounds, captured Mar. 16, 2023 (3 Pages).
OSB, "Trust Joist 2JI 210 Screenshot", Jan. 2012, (pp. 1).
Paint & Coatings Industry, "Making the Transition: Coalescing for Latex Paint" Feb. 29, 2000 (8 Pages).
Panasonic Corporation, "Pir Motion Sensor 'PaPIRs'", Jul. 2017, (pp. 1-9).
Patol, "500 Series: Model 5410 Infra-Red Transit Heat Sensor Infosheet", Nov. 2017, (pp. 1-2).
Patrick Mackary, UK Journal of Pharmaceutal and Biosciences, "Principles of Salt Formation", Aug. 2, 2014, (4 Pages).
Pau Loke Show, Kehinde Opeyemi Oladele, Qi Yan Siew, Fitri Abdul Aziz Zakry, John Chi-Wei Lan, Tau Chuan Ling, Frontiers in Life Science, "Overiview of citric acid production from aspergillus niger" Apr. 20, 2015 (14 Pages).
PCT Third Party Observation submitted in PCT/US2022/015004 (Applicant: Mighty Fire Breaker LLC) on May 24, 2023 under PCT Administrative Instructions Part 8 by Anonymous Third Party (2 Pages).
PCT Third Party Observation submitted in PCT/US2022/015005 (Applicant: Mighty Fire Breaker LLC) on May 24, 2023 under PCT Administrative Instructions Part 8 by Anonymous Third Party (2 Pages).
Pendu Manufacturing, Inc., North Holland, PA, Slide Show of Youtube Video of a Pendu Automated Wood Board Dip Tank System in Operation, Feb. 8, 2012, (30 Pages).
Pentair, "Hypro—SHURflo: Agriculture Products Catalog", Mar. 2013, (pp. 1-28).
Philip D. Evans, Hiroshi Matsunaga, Alan F. Preston, Cameron M. Kewish, "Wood Protection for Carbon Sequestration—a Review of Existing Approaches and Future Directions", Current Forestry Reports (2022) vol. 8, pp. 181-198 (18 Pages).
Phos-Chek, "Protect Your Home From Wildfire", Nov. 2017, (pp. 1-4).
Phos-Chek® LC95W Safety Data Sheet, Version 1.1, Issue Date Mar. 18, 2019, Published by Perimeter Solutions, LP, (5 Sheets).
Pillar Technologies Inc., "Pillar Technologies Presentation", Jul. 2018, (pp. 1-16).
PLabat-Anderson Incorporated, "Human Health Risk Assessment: Wildland Fire-Fighting Chemical" Prepared for Missoula Technology and Development Center USDA Forest Service, Missoula, MT, Mar. 17, 2003 (37 Pages).
Plumis, "Austomist Tap Mount: The discreet watermist sprinkler alternative ideal for kitchen fire protection", Jan. 2017, (pp. 1-2).
Plumis, "Autmist Smartscan: The smarter, modern alternative to a fire sprinkler system", Jan. 2017, (pp. 1-2).
Plumis, "Automist Fixed Wall Head Handbook", Jan. 2017, (pp. 1-30).
Plumis, "Automist Personal Protection System Handbook", Jan. 2016, (pp. 1-18).
Plumis, "Automist Personal Protection System: The plug & play mobile watermist fire sprinkler", Jan. 2016, (pp. 1-2).
Plumis, "Automist Smartscan Handbook" Jan. 2017, (pp. 1-66).
"Colorless Long Term Fire Retardant—Successful Applications", Phos-Chek® Home Defese Long Term Fire Retardant, ICL Performance Products LP, 2014, (1Page).
"Mulch—Fire in California", University of California Cooperative Extension (UCCE)—Fire in California, published at https://ucanr.edu/sites/fire/Prepare/Landscaping/Mulch/, captured on Jun. 20, 2021, (3 Pages).
"What is Foliar Spray: Learn About Different Types of Foliar Spraying", http://www.gardeningknowhow.com, Aug. 6, 2020 (2 Pages).
11.3 Alcohols, Acids, and Esters—Chemistry LibreTexts, captured on Oct. 6, 2024 at https://chem.libretexts.org/Courses/Grand_Rapids_Community_College/CHM_110%3A_Chemistry_of_the_Modern_World_(Neils)/11%3A_Organic_Chemistry/11.3_Alcohols%2C_Acids%2C_and_Esters (9 Pages).
2 Technical Data Sheet for Lankem BioLoop 84L, Lankem Ltd, Feb. 2018 (12 Pages).
2012 CLT Handbook, Christian Dagenais, Robert H. White, Kuma Sumathipala, "Chapter 8—Fire", Nov. 2012, (pp. 1-55).
2012 International Symposium on Safety Science and Technology Study on Water-based Fire Extinguishing Agent Formulations and Properties by Yinsheng Huang, Wencheng Zhang , Xiaojing Dai , and Yu Zhao , Procedia Engineering, vol. 45, pp. 649-654, 2012 (6 Pages).
2017 Model 3 Emergency Response Guide for Tesla 400 Volt Lithium-ion Battery, Tesla Inc., Aug. 2018 (37 Pages).
2017 Product Brochure of Agricultural Solutions from Sierra Natural Science, Inc., Sierra Natural Science, Inc., Salina CA, 2017, (9 Pages).
2021 Model S Emergency Response Guide for Tesla Model S Electric Vehicles with Lithium Ion Battery, Version 001, Tesla Inc., 2021 (32 Pages).
21.7: Chemistry of Esters—Chemistry LibreTexts, captured on Oct. 6, 2024 at https://chem.libretexts.org/Workbench/LCDS_Organic_Chemistry_OER_Textbook_-_Todd_Trout/21%3A_Carboxylic_Acid_Derivatives-_Nucleophilic_Acyl_Substitution_Reactions/21.07%3A_Chemistry_of_Esters (6 Pages).
3M, "From Our Labs to Your Life", Jan. 2016, (pp. 1-12).
3M, "Novec 1230 : Specification", Jan. 2018, (pp. 1-10).
3M, "Novec 1230 Fire Protection Fluid," Jan. 2018, (pp. 1-11).
3M, "Novec 1230 Fire Protection Fluid: Helping Protect Critical Military Assets Through Sustainable Fire Protection Technology", Aug. 2014, (pp. 1-2).
3M, "Novec 1230 Fire Protection Fluid", Jan. 2017, (pp. 1-4).
3M, Building and Commerical Services Division, "Brochure for 3M FireDam™ Spray 200 Sealing Agent", 2009,(2 Pages).
60 Data Sheet for Hydro Blanket BFM, Profile Products, Feb. 2017 (1 Pages).
9.8: Esters: Structures and Names—Chemistry LibreTexts, captured on Oct. 6, 2024 at https://chem.libretexts.org/Courses/Sacramento_City_College/SCC%3A_Chem_309_-_General_Organic_and_Biochemistry_(Bennett)/Text/09. _Organic_Functional_Groups%3A_Structure_and_Nomenclature/9.08%3A_Esters%3A_Structures_and_Names (3 Pages).
A. A. Shindia, G. A. El-Sherbeny, A. E. El-Esawy and Y. M. M. M. Sheriff, Production of Gluconic Acid by Some Local Fungi, Mycobiology 34(1): 22-29 (2006) (8 Pages).
A. A. Shindia, G. A. El-Sherbeny, A. E. El-Esawy and Y. M. M. M. Sheriff, Production of Gluconic Acid by Some Local FungiProduction of Gluconic Acid by Some Local Fungi, The Korean Society of Mycology, Mycobiology 34(1): 22-29 (2006), (8 Pages).
A. Poshadri, Aparna Kuna, "Microencapsulation Technology: A Review" Jan. 2010 (17 Pages).
A.M. Kaja, K. Schollbach, S. Melzer, S.R. Van Der Laan, H.J.H. Brouwers, Qingliang Yu, Hydration of potassium citrate-activated BOF slag, Nov. 13, 2020 (11 Pages).

(56) References Cited

OTHER PUBLICATIONS

Adewale Giwa ete al , Green dispersants for oil spill response: A comprehensive review of recent advances, Marine Pollution Bulletin, vol. 193, Aug. 2023, 115118 (6 Pages).
Agacad, "Wood Framing", Jan. 2016 (pp. 1-4).
Aida Adlimoghaddam, Mohammad G. Sabbir, Bendeict C. Albensi, Frontiers in Molecular Neuroscience, "Ammonia as a Potential Neurotoxic Factor in Alzheimer's Disease" Aug. 2016 (11 Pages).
AIG, "AIG Global Property Construction Risk Engineering", Nov. 2017, (pp. 1-6).
Alagappa Rammohan, James A. Kaduk, Crystallographic Communications, "Crystal structure of anhydrous tripotassium citrate from laboratory X-ray powder diffraction data and DFT comparison" Jul. 14, 2016 (9 Pages).
Alexander Kremsmair, Johannes H. Harenberg, Kuno Schwarzer, Andreas Hess and Paul Knochel ,Preparation and reactions of polyfunctional magnesium and zinc organometallics in organic synthesis, Published by the Royal Society of Chemistry Chem. Sci., 2021, 12, 6011-6019 |(9 Pages).
Allison Soult, Ph.D. (Department of Chemistry, University of Kentucky), 3.3: The Dissolving Process—Chemistry LibreTexts, captured on Oct. 6, 2024 at https://chem.libretexts.org/Courses/Brevard_College/CHE_104%3A_Principles_of_Chemistry_11/03%3A_Solutions_and_Colloids/3.03%3A_The_Dissolving_Process, (4 Pages).
Amendment under Article 34 (2)(b) filed by Mighty Fire Breaker LLC in PCT Application No. PCT/US2022/015004 on May 27, 2023 (37 Pages).
Amerex, "Safety Data Sheet: Deionized Water, Pressurized Water Extinguisher", Mar. 2018, (pp. 1-8).
American Chemical Society, "Seeing Red: Controversy smolders over federal use of aerially applied fire retardants", Aug. 2011, (p. 1-6).
American Wood Council, "2015 NDS Changes", Jul. 2015, (pp. 1-66).
American Wood Council, "Design for Code Acceptance: Flame Spread Performance of Wood Products Used for Interior Finish", Apr. 2014, (pp. 1-5).
American Wood Preservers' Association, "Standard Method of Determining Corrosion of Metal in Contact With Treated Wood", Jan. 2015, (pp. 1-4).
Andrew Buchanan, Birgit Ostman, Andrea Frangi, "Fire Resistance of Timber Structures", Mar. 2014, (pp. 1-20).
Andrew Crampton, "Cross Laminated Timber: The Future of Mid-Rise Construction," Jun. 2016, (pp. 1-5).
Andrzej Jankowski, Radosław Balwiariz, Dominik Marciniak, Dariusz Łukowiec, Janusz Pluta, "Influence of Spray Drying Manufacturing Parameters on Quality of Losartan Potassium Microspheres", Acta Poloniae Pharmaceutica and Drug Research, vol. 71, No. 5, 2014 , (9 Pages).
Angus Fire Ltd., "TankMaster: Which Foam to Use for Hydrocarbon Tank Fires" Jan. 2004 (23 Pages )17.
Anna Wiegand, Gioia Fischer, Harald Seeger, Daniel Fuster, Nasser Dhayat, Oliver Bonny, Thomas Ernandez, Min-Jeong Kim, Carsten A. Wagner, Nilufar Mohebbi, Clinical Kidney Journal, "Impact of potassium citrate on urinary risk profile, glucose and lipid metabolism of kidney stone formers in Switzerland" Aug. 19, 2019 (12 Pages).
Anthony C. Yu, Hector Lopez Hernandez, Andrew H. Kim, Lyndsay M. Stapleton, Reuben J. Brand, Eric T. Mellor, Cameron P. Bauer, Gregory D. McCurdy, Albert J. Wolff III, Doreen Chan, Craig S. Criddle, Jesse D. Acosta, and Eric A. Appel, "Wildfire prevention through prophylactic treatment of high-risk landscapes using viscoelastic retardant fluids," Proceedings of The National Academy of Science (PNAS), published Sep. 30, 2019, https://www.pnas.org/content/117/2/1233, (10 Pages).
Anthony E. Finnerty, "Water-Based Fire Extinguishing Agents", US Army Research Laboratory, Aberdeen Proving Ground, Maryland, 1995 (12 Pages).
Applicant's Reply to Written Opinion filed in Application No. PCT/US2022/015004 on May 27, 2023 (24 Pages).
Arch Wood Protection Inc., "Dricon: Application Guide", Jan. 2016, (pp. 1-28).
Archpaper Antonio Pacheco, "Katerra's Approach Could Make Factory Construction a Model for the Future", Apr. 2018, (pp. 1-4).
Article 34 Amendment and Reply to Written Opinion (RWO) filed in PCT/US22/15004 filed on May 27, 2023 (112 Pages).
Article on Carboxylic Acid, Britannica Online Encyclopedia, captured Jan. 24, 2021 at https://www.britannica.com/print/article/95261 (41 Pages)9.
Asia Pacific Fire, "Approaching the Flame Fire Fighting", Jun. 2017, (pp. 1-2).
ASTM International, "Standard Practice for Calculating Design Value Treatment Adjustment Factors for Fire-Retardant-Treated Lumber", Apr. 2016, (pp. 1-7).
Tyco Fire Products, "AquaMist: Watermist Fire Protection", Jan. 2013, (pp. 1-7).
Tyco Fire Products, "AquaMist", Jan. 2016, (pp. 1-5).
Tyco Fire Products, "Ultra Low Flow AQUAMIST Solution for Protecting Office Spaces, False Ceilings and False Floors—VdS Approval Criteria", May 2016, (pp. 1-6).
Tyco Fire Protection Products, "Alcohol Resistant—Aqueous Film-Forming Foam (AR-AFFF) Concentrates" Jan. 19, 2016 (2 Pages).
Tyco Fire Protection Products, "Chemguard: Foam Concentrates and Hardware" Jan. 2019 (7 Pages).
Tyco Fire Protection Products, "Foam Systems—Acceptable Materials of Construction" Jan. 2018 (2 Pages).
Tyco Fire Protection Products, "Storage of Foam Concentrates: Recommended4 Storage, Handling and Inspection of Foam Concentrates" Jan. 2018 (3 Pages).
Tyco, "AquaMist Introduction" by Steve Burton, Certfied Fire Engineer, Tyco Fire Protection Products, Nov. 2015, (pp. 1-108).
Tyco, "Gaseous Fire Suppression Systems", Sep. 2013, (pp. 1-16).
Tyco, "NOVEC 1230: Gaseous Fire Suppression Solution", Feb. 2013, (pp. 1).
Tzoulis et al. Emerging Traceability Technologies as a Tool for Quality Wood Trade. Procedia Technology 8 ( 2013 ) 606-611.
U.S. Department of Agriculture, "Aerial Application of Fire Retardant", May 2011, (pp. 1-370).
U.S. Department of Agriculture, "Carbon Storage and Accumulation in United States Forest Ecosystems", Aug. 1992, (pp. 1-55).
U.S. Department of Energy, "Method for Calculating Carbon Sequestration by Trees in Urban and Suburban Settings", Apr. 1998, (pp. 1-16).
UL Greenguard Certification Test Report for AF21 Clean Fire Inhibitor, M-Fire Suppression Inc., May 29, 2018 (23 Pages).
Underwriters Laboratories Inc., "BPVV R7002 Lumber, Treated", Jan. 2011, (pp. 1-5).
Underwriters Laboratories Inc., BUGV R7003 Treated Plywood, Oct. 2011, (pp. 1-4).
Underwriters Laboratories Inc., "Greenguard Certification Test for Eco Building Products, Inc.: Eco Red Shield—01", Mar. 2015, (pp. 1-21).
Underwriters Laboratories, "Project 90419—Greenguard and Greenguard Gold Annual Certification Test Results", Mar. 2015, (pp. 1-21).
Underwriters Laboratories, "Report on Structural Stability of Engineered Lumber in Fire Conditions", Sep. 2008, (pp. 1-178).
United Nations, "Globally Harmonized System of Classification and Labelling of Chemicals (GHS)", Oct. 2011, (pp. 1-568).
US Department of Agriculture Forest Service Specification 5100-304d, Long-Term Retardant, Wildland Firefighting, USDA Forest Service, Jan. 7, 2020, (32 Pages).
US International Trademark Commission, "Citric Acid and Certain Citrate Salts from Canada and China (Investigation Nos. 701-TA-456 and 731-TA-1152 (Final)", ITC Publication No. 4076, Washington, DC, May 2009 (184 Pages).
USDA Forest Service "Guidelines for Aerial Delivery of Retardant or Foam Near Waterways", USDA Forest Service, Apr. 2000 (2 Pages).
USDA Forest Service List of Long-Term Retardant for Wildland Fire Management—Aerial Applications—Qualified by US Forest

(56) References Cited

OTHER PUBLICATIONS

Service in Accordance with Forest Service Specification 5100-301d, US Forest Service, Washington Office, Fire & Aviation Management, May 5, 2024 (2 Pages).
USDA Forest Service List of Long-Term Retardant for Wildland Fire Management—Pretreatment—Product Qualified by US Forest Service in Accordance with Forest Service Specification 5100-301d, US Forest Service, Washington Office, Fire & Aviation Management, Aug. 5, 2023 (1 Page).
USDA Forest Service Product Information on Fortress FR-700 Pretreatment Retardant Usingf Magnesium Cloride, Gum Thickened, Medium Viscosity, Uncolored, USDA Forest Service, May 2023 (1 Page).
USDA Forest Service Product Information on Phos-Chek 259-F (1.14 lb/gal) Retardant for Aerial or Ground Application, Gum Thickened, Low Viscosity, Fugitive Colored, USDA Forest Service, Sep. 2024 (1 Page).
USDA Forest Service Product Information on Phos-Chek 259-F (1.60 lb/gal) Retardant for Aerial or Ground Application, Gum Thickened, Low Viscosity, Fugitive Colored, USDA Forest Service, Sep. 2024 (1 Page).
USDA Forest Service Product Information on Phos-Chek 259-R (1.14 lb/gal) Retardant for Aerial or Ground Application, Gum Thickened, Low Viscosity, Iron Oxide Colored, USDA Forest Service, Sep. 2024 (1 Page).
USDA Forest Service Product Information on Phos-Chek 259-R (1.60 lb/gal) Retardant for Aerial or Ground Application, Gum Thickened, Low Viscosity, Iron Oxide Colored, USDA Forest Service, Sep. 2024 (1 Page).
USDA Forest Service Product Information on Phos-Chek D75-R and D75-F Retardant for Aerial or Ground Application, Gum Thickened, High Viscosity, Iron Oxide and Fugitive Colored, USDA Forest Service, Sep. 2024 (1 Page).
USDA Forest Service Product Information on Phos-Chek Fortify Pretreatment Retardant, Gum Thickened, Low Viscosity, Colorless, USDA Forest Service, Nov. 2021 (1 Page).
USDA Forest Service Product Information on Phos-Chek G75-F and G75-W Retardant for Aerial or Ground Application, Gum Thickened, Low Viscosity, Fugitive Colored and Uncolored, USDA Forest Service, Sep. 2024 (1 Page).
USDA Forest Service Product Information on Phos-Chek LC-95A-R (5.5:1) Retardant for Aerial or Ground Application, Gum Thickened, Low Viscosity, Iron Oxide Colored, USDA Forest Service, Sep. 2024 (1 Page).
USDA Forest Service Product Information on Phos-Chek LCE20W Pretreatment Retardant, Gum Thickened, Low Viscosity, Colorless, USDA Forest Service, Nov. 2021 (1 Page).
USDA Forest Service Product Information on Phos-Chek LV-R and MV-R (3.5:1) Retardant for Aerial or Ground Application, Fluid Concentrate, Gum Thickened, Iron Oxide Colored, USDA Forest Service, Sep. 2024 (1 Page).
USDA Forest Service Product Information on Phos-Chek® Fortify—Pre-Mixed Pretreatment Retardant, Gum Thickened, Low Viscosity, Colorless, USDA Forest Service, Nov. 2021 (1 Page).
USDA Forest Service Product Information on Phos-Chek® LCE20W—Pre-Mixed Pretreatment Retardant, Gum Thickened, Low Viscosity, Colorless, USDA Forest Service, Nov. 2021 (1 Page).
USDA Forest Service, "Mass Laminated Timber in the United States: Past, Present, and Future", Nov. 2017, (pp. 1-13).
USDA, "Hygrothermal Performance of Mass Timber Construction", Nov. 2015, (pp. 1-21).
USDA, Natural Resources Conservation Service, Denver Colorado, "2012 Fact Sheet on HydroMulching", 2012, (2 Pages).
Vesper, S.; Sienkiewicz, N.; Struewing, I.; Linz, D.; Lu, J., Prophylactic Addition of Glucose Suppresses Cyanobacterial Abundance in LakeWater. Life 2022, 12, 385. (13 Pages).
Mctaulic, "Victaulic Vortex 1000 Fire Supression System", Feb. 2011, (pp. 1-2).
Victaulic, "Victaulic Vortex 1500 Fire Suppression System", Jun. 2016, (pp. 1-3).
Victoria J. Nikiforova, Pieter Giesbertz, JanWiemer, Bianca Bethan, Ralf Looser, Volker Liebenberg, Patricia Ruiz Noppinger, Hannelore Daniel, and Dietrich Rein, Research Article "Glyoxylate, a New Marker Metabolite of Type 2 Diabetes", Hindawi Publishing Corporation, Journal of Diabetes Research, vol. 2014, Article ID 685204, (9 Pages).
Victualic, William, Reilly, "Dual Agent Extinguishing System: Victaulic Vortex", Apr. 2008, (pp. 1-6).
Vivian Merk, Munish Chanana, Tobias Keplinger, Sabyasachi Gaand and Ingo Burgert, "Hybrid wood materials with improved fire retardance by bio-inspired mineralisation on the nano- and submicron level", Green Chemistry, 2015, vol. 17 , pp. 1423-1428 (6 Pages).
Vivian Merk, Munish Chanana*, Sabyasachi Gaan and Ingo Burgert, "Mineralization of wood by calcium carbonate insertion for improved flame retardancy", Holzforschung, vol. 70, No. 9, pp. 867-876 (10 Pages).
W. Gill Giese, Slide Show on "Potassium in the Vineyard and Winery", New Mexico State University, Viticulture Extension , Nov. 2016, (25 Pages).
Chemical Specialties Inc., "D-Blaze Fire Retardant Treated Wood, The New Generation Building Material", Mar. 2004, (pp. 1-2).
Chemistry LibreTexts Entry for Properties of Esters , https://chem.libretexts.org/Bookshelves/Organic_Chemistry/Supplemental_Modules_(Organic_Chemistry)/Esters/Properties_of_Esters , captured Sep. 26, 2024 (4 Pages).
Cheryl Hogue, "Seeing Red: Controversy Smolders over Federal Use of Aerially Applied Fire Retardants", Aug. 29, 2021, ACS vol. 89, No. 35, pp. 11-15, published at http://pubsapp.acs.org/cen/coverstory/89/8935cover.html, (6 PAges).
Chip Tuson, Ohio State News, "World's First "Intelligent" Sprayer", Aug. 2, 2018, https://news.osu.edu/the-worlds-first-intelligent-sprayer/, (4 Pages).
Christopher E. Chwedyk, Burnham, "Re-examining Residential high-Rise Sprinklers: Where Does Chicago Stand?", Aug. 2017, (pp. 1-4).
Clean Production Action, "GreenScreen Certified: Standard for Firefighting Foam" Apr. 1, 2021 (28 Pages).
Clean Production Action, "GreenScreen Certified: Standard for Firefighting Foam" Feb. 25, 2020 (48 Pages).
Clive Buckley and David Rush, Ministry of Defence, "Water Mist Developments for the Royal Navy", Apr. 1996, (pp. 1-14).
CMA Robotics, "GR 650", Nov. 2017, (pp. 1-2).
CMA Robotics, "GR 6100-HW-S", Nov. 2017, (pp. 1-2).
CMA Robotics, "GR 6100-HW", Nov. 2017, (pp. 1-2).
CMA Robotics, "GR 630", Nov. 2017, (pp. 2).
Coastal Forest Products, "CP-LAM 2.0E Design Properties & Floor Beams", Nov. 2017, (pp. 1-5).
Coastal Forest Products, "Multi-Ply CP-LAM Beam Assembly", Nov. 2017, (pp. 1-5).
Col Michael Receniello, "Fire Suppression Systems (FSS) Enhance Tactical Wheeled Vehicle (TWV) Survivability", Jul. 2010, (pp. 1-3).
Conception R.P. Inc., "The Cutting Edge of Finger Jointing", Feb. 2005, (pp. 1-16).
Conrad Forest Products, "Bluwood: The Color of Protection", http://www.conradfp.com/building-products-bluwood.php, Nov. 2017, (pp. 1-8).
Cornell Law School, "26 U.S. Code § 45Q—Credit for Carbon Dioxide Sequestration", Dec. 2014, (pp. 1-3).
Corrected Notice of Allowability dated Dec. 21, 2020 for U.S. Appl. No. 15/829,943 (pp. 1-2).
Corrected Notice of Allowability dated Dec. 23, 2020 for U.S. Appl. No. 16/449,389 (pp. 1-4).
Corrected Notice of Allowability dated Jan. 7, 2021 for U.S. Appl. No. 15/829,944 (pp. 1-2).
Cosmetics Info, "Citric Acid and its Salts and Esters" Jan. 15, 2021 (3 Pages).
Costas Emmanuel Synolakis and Georgios Marios Karagiannis, Wildfire risk management in the era of climate change, PNAS Nexus, May 2024, 3, (12 Pages).
CSE Inc, "AC479: Proposed AC for Wood Structural Panels with Factory-Applied Fire-Retardant Coating", Feb. 2017, (pp. 1-101).

(56) References Cited

OTHER PUBLICATIONS

Csiro, "Certificate for Conformity: Fike Micromist, Pre-engineered Water Mist Fire Suppression System", Jan. 2012, (pp. 1-5).
Custom Product Technical Data Sheet for Dayglo® ECO-2100ER Corona Magneta Pigment™—Rev. 1.00_2023 10.12, Day Glo Color Corp., Cleveland, Ohio, 2023 (1 Page).
CutSheet for GreenFire Pro Defense Wetting Agent, by Fire Suppression Innovations, Placentia CA, Jul. 1, 2022 (2 Pages).
Cyril N. Hinshelwood, "Chemical Kinetics in the Past Few Decades", Nobel Lecture, Dec. 1956, (pp. 1-11).
D. Roosendams, K. Van Wingerden, M.N. Holme and P. Hoorelbeke, "Experimental Investigation of Explosion Mitigating Properties of Aqueous Potassium Carbonate Solutions", Journal of Loss Prevention in the Process Industries, vol. 46, Feb. 20, 2017 (19 Pages).
D. Roosendans, K. Van Wingerden, M. H. Holme, and P. Hoorelbeke, "Experimental Investigation of Explosion Mitigating Properties of Aqueous Potassium Carbonate Solutions," Journal of Loss Prevention in the Process Industries, vol. 46, 2017 (19 Pages).
D. Roosendans, K. Van Wingerden, M. N. Holme, P. Hoorelbeke, Elsevier, "Experimental investigation of explosion mitigating properties of aqueous potassium carbonate solutions" Feb. 14, 2017 (19 Pages).
D. Roosendans, K. Van Wingerden, M.N. Holme, P. Hoorelbeke, "Experimental investigation of explosion mitigating properties of aqueous potassium carbonate solutions" Feb. 20, 2017 (19 Pages).
D.G. Fraser, "Break the Flame Chain Reaction", Jun. 1962, (pp. 1-3).
D.J. Spring, D.N. Ball, "Alkali Metal Salt Aerosols As Fire Extinguishants", Jan. 1998 (7 Pages).
D.Jones Joseph Jebaraja, N. Rajesh Jesudoss Hynesb* , Basanth Navin Kc, Corrosion Inhibition in Magnesium by using Green Inhibitor, IOP Conf. Series: Materials Science and Engineering 1258 (2022) 012035, (9 Pages).
Danfoss Semco Fire Protection, "Deck Foam Fire Fighting System", Aug. 2016, (pp. 1-4).
Danfoss Semco Fire Protection, "Dry Powder Fire Fighting System", Aug. 2016, (pp. 1-4).
Danfoss Semco Fire Protection, "High Pressure CO2 Fire Fighting System", Aug. 2016, (pp. 1-4).
Danfoss Semco Fire Protection, "Sem-Safe: High-Pressure Water Mist System", Feb. 2014, (pp. 1-8).
Daniel Madrzykowski, National Institute of Standards and Technology, "Water Additives for Increased Efficiency of Fire Protection and Suppression", Jan. 1998, (pp. 1-6).
Data Sheet for 36 Chemguard 36 Gallon 2 Foam Station, Tyco Fire Protection Products, Jan. 2018 (4 Pages).
Data Sheet for Ansul AFP6B 6% Fluoroprotein Foam Concentrate, Johnson Controls, Jan. 2019 (2 Pages).
Data Sheet for Ansul AFP6B 6% Fluoroprotein Foam Concentrate, Tyco Fire Protection Products, Jan. 2019 (2 Pages).
Data Sheet for ANSUL Foam Testing/ Foam Test Kit, Johnson Controls, Jan. 2020 (1 Page).
Data Sheet for Chemguard 3% Fluoroprotein Foam Concetrate, Chemguard, Sep. 2005 (2 Pages).
Data Sheet for Chemguard CFP3B 3% Fluoroprotein Foam Concentrate, Tyco Fire Protection Products, Jan. 2019 (2 Pages).
Data Sheet for Chemguard S-550 High Performance Nonionic Fluorosurfactant, Tyco Fire Protection Products, (1 Page), 2018.
Data Sheet for Chemguard S-760P High Performance Anionic Fluorosurfactant, Tyco Fire Protection Products, Jan. 2018 (1 Page).
Data Sheet for Chemguard S-761P High Performance Anionic Fluorosurfactant, Tyco Fire Protection Products, Jan. 2018 (1 Page).
Data Sheet for Chemguard S-764P High Performance Anionic Fluorosurfactant, Tyco Fire Protection Products Jan. 2018 (2 Pages)2.
Stephen Vesper, Nathan Sienkiewicz, Ian Struewing, David Linz and Jingrang Lu, Prophylactic Addition of Glucose Suppresses Cyanobacterial Abundance in Lake Water, Life 2022, 12, p. 38. (13 Pages).
Stora Enso, "CLT—Cross Laminated Timber: Fire Protection", Jan. 2016, (pp. 1-51).
Stora Enso, "CLT Engineer: The Stora Enso CLT Design Software User Manual," Jan. 2016, (pp. 1-118).
Stora Enso, "Stora Enso CLT Technical Brochure", Feb. 2017, (pp. 1-32).
Structural Building Components Association, "Fire Retardants and Truss Design", Jan. 2015, (pp. 1-48).
Structural Building Components Association, "Research Report: Lumber Use in Type III-A Buildings", Jul. 2016, (pp. 1-8).
Studiengemeinschaft Holzleimbau, "Building with Cross Laminated Timber", Jan. 2011, (pp. 1-36).
Surfire Services Limited, "UltraGuard: The personal protection system from Surefire", Nov. 2017, (pp. 1-3).
Swiss Krono, "Swiss Krono 0SB: Prefabricated Construction" Nov. 2017, (pp. 1-6).
Tarek Alshaal and Hassan Ragab El-Ramady, "Foliar Application: From Plant to Biofortification", The Environment, Biodiversity and Soil Security, vol. 1, pp. 71-83, Jul. 2017 (14 Pages).
Taylor et al. EPD-Environmental Product Declarations for Wood Products—An Application of Life Cycle Information About Forest Products. Forest Products Journal, vol. 61, No. 3, pp. 192-201; 2011.
Technical Brief "Jungbunzlauer Tripotassium Citrate: Environmental and Health Friendlky Flame Retardant in Wood Application", Jungbunzlauer Suisse AG, Basel, Switzerland, (2 Pages).
Technical Brochure titled "FACTS: Formulating Better Tasting Infant Formula", No. 150, by Jungbunzlauer Suisse AG, Basel Switzerland, 2015 (8 Pages).
Technical Brochure titled "Lactics", No. 130, by Jungbunzlauer Suisse AG, Basel Switzerland, 2016 (8 Pages).
Technical Brochure titled "Product Range: Bio-Based Ingredients", No. 217, by Jungbunzlauer Suisse AG, Basel Switzerland, 2017 (16 Pages).
Technical Brochure titled "Specialty Salts: Functional Minerals", No. 038, by Jungbunzlauer Suisse AG, Basel Switzerland, 2017 (16 Pages).
Technical Bulletin for Phos-Chek® Retardants for Wildfire Control IC/SCS-312 by Monsanto, Monsanto Company, 1964 (7 Pages).
Technical Data Sheet for Dayglo® Eco Pigments™—Rev. 1.00_2023 08.11, Day Glo Color Corp., Cleveland, Ohio, 2023 (2 Page).
Technical Data Sheet for Lankem BioLoop 68L, Lankem Ltd, May 2020 (2 Pages).
Technical Evaluation Report for Citric Acid, OMRI for the USDA, Feb. 17, 2015 (31 Pages).
Technical Evaluation Report for Citroflex 2 (Triethyl Citrate), OMRI for the USDA, Nov. 5, 2014 (15 Pages).
Technical Paper titled "Jungbunzlauer Tripotassium Citrate: Environmental and Health Friendly Flame Retardant in Wood Application", Product Group Special Salts, by Jungbunzlauer Suisse AG, Basel Switzerland, Aug. 10, 2020 (2 Pages).
Technical Product Information Sheet for Tripotassium Citrate Monohydyrate, Cargill Acidulants, Eddyville, IA, USA, Nov. 30, 2010 (1 Page).
Technical Specification Sheet for Mono-Ammonium Phosphate (12-61-0) Fertilizer, by Haifa Chemicals Ltd., Haifa Bay, Isreal, May 7, 2020 (2 Pages).
Technical Specifications for Diammonium Phosphate (DAP), Nutrient Source Specifics No. 17, International Plant Nutrition Institute (IPNI), Norcross, Georgia, Ref# 11040, May 2020 (1 Page).
Technical Specifications for Monoammonium Phosphate (MAP,) Nutrient Source Specifics No. 9, International Plant Nutrition Institute (IPNI), Norcross, Georgia, Ref# 10069, May 2020 (1 Page).
Technical Specifications of MonoAmmonium Phosphate (MAP), published at Mosaic Crop Nutrition Resource Library, https://www.cropnutrition.com/resource-library/monoammonium- . . . May 5, 2020 (2 Pages).
Teco, "Wood-Based Structural-Use Panels and Formaldehyde Emissions", May 2009, (pp. 1-3).
Ted A. Moore, Joseph L. Lifke, Robert E. Tapscott, "In Search of an Agent for the Portable Fire Extinguisher", Jan. 1996, (pp. 1-12).
Ten Questions to Ask Before Testing a Dye or Pigment Disperson in Your Product, Chromtech Inc., Canton, Michigan, Sep. 2024 (3 Pages).

(56) References Cited

OTHER PUBLICATIONS

Teresa Dobbins, "Electrostatic Spray Heads Convert Knapsack Mistblowers to Electrostatic Operation", International Pest Control, Sep./Oct. 1995, vol. 37, No. 5, (4 Pages ).
Tersa Berninger, Natalie Dietz, and Oscar Gonzalez Lopez of Jungbunzlauer Ladenburg GmbH , "Water-Soluble Polymers in Agriculture: Xanthan Gum as Eco-Friendly Aternative to Synthetics", Microbial Biotechnology, published by Society for Applied Microbiology and John Wiley & Sons Ltd., Jun. 2021 (16 Pages).
Tesla Battery Emergency Response Guide for Lithium Ion, TS-00040027 Revision 1.8, Tesla Inc., 2020 (14 Pages).
The University of Chicago, Salen Churi, Harrison Hawkes, Noah Driggs, "Internet of Things: Risk Manager Checklist, U.S.", Dec. 2016, (pp. 1-23).
Thierry Carriere, Jim Butz, Sayangdev Naha and Angel Abbud-Madrid, "Fire Suppression Tests Using A Hand-Held Water Mist Extinguisher Designed For Space-Craft Applications", SUPDET 2012 Conference Proceedings, Mar. 5-8, 2012, Phoenix, AZ, (3 Pages).
Thierry Carriere, Jim Butz, Sayangdev Naha, Angel Abbud-Madrid, "Fire Supression Tests Using a Handheld Water Mist Extinguisher Designed for Spacecraft Application", Mar. 2012, (pp. 1-3).
Thomas Schroeder, Klaus Kruger, Felix Kuemmerlen, "Fast Detection of Deflagrations Using Image Processing", Jan. 2012, (pp. 1-113).
Tom Toulouse, Lucile Rossi, Turgay Celik, Moulay Akhloufi, "Automatic Fire Pixel Detection Using Image Processing: A Comparative Analysis of Rule-Based and Machine Learning-Based Methods", Jun. 2016, (pp. 1-8).
Toxicological and Environmental Safety Brochure on PHOS-CHeK® Fire Retardants For the Use in Preventing and Controll Fires in Willand Fuels, ICL Performance Products LP, 2008 (8 Pages).
Trackabout, "Asset Tracking Industry Selection Guide", Nov. 2017, (pp. 1-8).
Trackabout, "Follow-On Tracking", Jan. 2013, (pp. 1-2).
Training Manual for Thermo-Gel® POK Nozzle Backpack System, Thermo Technologies, LLC, Bismarck, North Dekota, 2020, (55 Pages).
Treated Wood "D-Blaze Fire Retardant Treated Wood: The New Generation Building Material", Mar. 2004, (pp. 1-2).
Treated Wood, "D-Blaze: Fire Retardant Treated Wood", Jan. 2015, (pp. 1-13).
Treated Wood, "Fire Retardant Treated Wood For Commercial and Residential Structures", Jan. 2012, (pp. 1-73).
Treated Wood, "TimberSaver", Nov. 2017, (pp. 1-6).
Treehugger, Lloyd Alter, "Katerra to Build Giant New CLT Factory in Spokane, Washington", Sep. 2017, (pp. 1-16).
Treehugger, Lloyd Alter, "Wood Frame Construction is Safe, Really", Dec. 2014, (pp. 1-5).
Trusjoist, Weyerhauser, "Fire-Rated Assemblies and Sprinkler Systems", May 2017, (pp. 1-24).
Turbo Technologies, Inc. "Specifications for Turbo Turf's HY-750-HE Hybrid Hydroseeder", https://turboturf.com/hy-750-he/, Jan. 2018, (4 Pages).
Office Action (Final Rejection) dated Jun. 21, 2023 for U.S. Appl. No. 17/167,084 (pp. 1-5).
Office Action (Final Rejection) dated Jun. 21, 2023 for U.S. Appl. No. 17/233,461 (pp. 1-5).
Office Action (Non-Final Rejection) dated Feb. 1, 2023 for U.S. Appl. No. 17/167,084 (pp. 1-8).
Office Action (Non-Final Rejection) dated Feb. 1, 2023 for U.S. Appl. No. 17/233,461 (pp. 1-7).
Office Action (Non-Final Rejection) dated Feb. 16, 2023 for U.S. Appl. No. 17/176,670 (pp. 1-99).
Office Action (Non-Final Rejection) dated Feb. 16, 2023 for U.S. Appl. No. 17/176,670 (pp. 1-12).
Office Action (Non-Final Rejection) dated Jun. 5, 2024 for U.S. Appl. No. 18/492,649 (pp. 1-10).
Office Action (Non-Final Rejection) dated Jun. 5, 2024 for U.S. Appl. No. 18/492,642 (pp. 1-9).
Office Action (Non-Final Rejection) dated Jun. 28, 2022 for U.S. Appl. No. 16/029,861 (pp. 1-11).
Office Action (Non-Final Rejection) dated Aug. 28, 2024 for U.S. Appl. No. 18/432,017 (pp. 1-10).
Office Action (Non-Final Rejection) dated Sep. 9, 2024 for U.S. Appl. No. 18/432,018 (pp. 1-12).
Office Action (Non-Final Rejection) dated Sep. 20, 2024 for U.S. Appl. No. 18/432,014 (pp. 1-9).
Office Action (Non-Final Rejection) dated Sep. 23, 2024 for U.S. Appl. No. 18/432,020 (pp. 1-11).
Office Action (Non-Final Rejection) dated Oct. 6, 2022 for U.S. Appl. No. 17/497,945 (pp. 1-6).
Office Action (Non-Final Rejection) dated Oct. 6, 2022 for U.S. Appl. No. 17/497,946 (pp. 1-6).
Office Action (Non-Final Rejection) dated Oct. 6, 2022 for U.S. Appl. No. 17/497,962 (pp. 1-5).
Office Action (Non-Final Rejection) dated Oct. 11, 2022 for U.S. Appl. No. 17/497,948 (pp. 1-5).
Office Action (Non-Final Rejection) dated Oct. 27, 2022 for U.S. Appl. No. 17/497,943 (pp. 1-9).
Office Action (Non-Final Rejection) dated Oct. 27, 2022 for U.S. Appl. No. 17/497,952 (pp. 1-8).
Office Action (Non-Final Rejection) dated Oct. 27, 2022 for U.S. Appl. No. 17/497,953 (pp. 1-9).
Office Action (Non-Final Rejection) dated Nov. 10, 2022 for U.S. Appl. No. 17/497,942 (pp. 1-8).
Office Action (Non-Final Rejection) dated Nov. 10, 2022 for U.S. Appl. No. 17/497,949 (pp. 1-7).
Office Action (Notice of Allowance and Fees Due (PTOL-85)) dated Feb. 13, 2023 for U.S. Appl. No. 17/497,941 (pp. 1-9).
Office Action (Notice of Allowance and Fees Due (PTOL-85)) dated Feb. 13, 2023 for U.S. Appl. No. 17/497,955 (pp. 1-8).
Office Action (Notice of Allowance and Fees Due (PTOL-85)) dated Mar. 1, 2023 for U.S. Appl. No. 17/497,943 (pp. 1-7).
Office Action (Notice of Allowance and Fees Due (PTOL-85)) dated Mar. 13, 2023 for U.S. Appl. No. 17/497,942 (pp. 1-8).
Office Action (Notice of Allowance and Fees Due (PTOL-85)) dated Mar. 25, 2022 for U.S. Appl. No. 16/805,811 (10 Pages).
Office Action (Notice of Allowance and Fees Due (PTOL-85)) dated Mar. 27, 2023 for U.S. Appl. No. 17/497,945 (pp. 1-8).
Office Action (Notice of Allowance and Fees Due (PTOL-85)) dated Mar. 30, 2023 for U.S. Appl. No. 17/497,952 (pp. 1-8).
Office Action (Notice of Allowance and Fees Due (PTOL-85)) dated Apr. 26, 2023 for U.S. Appl. No. 17/497,946 (pp. 1-8).
Office Action (Notice of Allowance and Fees Due (PTOL-85)) dated Apr. 27, 2023 for U.S. Appl. No. 17/497,949 (pp. 1-8).
Office Action (Notice of Allowance and Fees Due (PTOL-85)) dated May 10, 2023 for U.S. Appl. No. 17/497,953 (pp. 1-8).
Office Action (Notice of Allowance and Fees Due (PTOL-85)) dated May 17, 2023 for U.S. Appl. No. 17/497,962 (pp. 1-9).
Office Action (Notice of Allowance and Fees Due (PTOL-85)) dated Jun. 5, 2023 for U.S. Appl. No. 17/497,948 (pp. 1-8).
Office Action (Notice of Allowance and Fees Due (PTOL-85)) dated Jul. 14, 2023 for U.S. Appl. No. 17/869,777 (pp. 1-9).
Office Action (Notice of Allowance and Fees Due (PTOL-85)) dated Jul. 19, 2023 for U.S. Appl. No. 17/167,084 (pp. 1-7).
Office Action (Notice of Allowance and Fees Due (PTOL-85)) dated Sep. 3, 2024 for U.S. Appl. No. 18/496,866 (pp. 1-7).
Office Action (Notice of Allowance and Fees Due (PTOL-85)) dated Sep. 12, 2023 for U.S. Appl. No. 17/233,461 (pp. 1-7).
Office Action (Notice of Allowance and Fees Due (PTOL-85)) dated Sep. 20, 2023 for U.S. Appl. No. 16/029,861 (pp. 1-9).
Office Action (Notice of Allowance and Fees Due (PTOL-85)) dated Oct. 6, 2023 for U.S. Appl. No. 17/591,592 (pp. 1-10).
Office Action (Notice of Allowance and Fees Due (PTOL-85)) dated Oct. 11, 2022 for U.S. Appl. No. 17/497,941 (10 Pages ).
Office Action (Notice of Allowance and Fees Due (PTOL-85)) dated Oct. 12, 2022 for U.S. Appl. No. 17/497,955 (pp. 1-9).
Office Action (Notice of Allowance and Fees Due (PTOL-85)) dated Oct. 20, 2023 for U.S. Appl. No. 17/591,592 (pp. 1-8).

(56) References Cited

OTHER PUBLICATIONS

Office Action (Notice of Allowance and Fees Due (PTOL-85)) dated Nov. 1, 2023 for U.S. Appl. No. 17/167,084 (pp. 1-7).
Office Action (Notice of Allowance and Fees Due (PTOL-85)) dated Nov. 13, 2023 for U.S. Appl. No. 17/233,461 (pp. 1-7).
Office Action (Notice of Allowance and Fees Due (PTOL-85)) dated Nov. 27, 2023 for U.S. Appl. No. 17/591,592 (pp. 1-10).
Office Action dated Mar. 2, 2023 for U.S. Appl. No. 16/029,861 (pp. 1-8).
Office Action dated Apr. 17, 2024 for U.S. Appl. No. 18/482,901 (pp. 1-6).
Office Action dated May 9, 2024 for U.S. Appl. No. 18/487,044 (pp. 1-7).
Office Action dated Dec. 22, 2022 for U.S. Appl. No. 17/869,777 (pp. 1-10).
Office Action (Non-Final Rejection) dated May 6, 2025 for U.S. Appl. No. 18/423,279 (pp. 1-6).
Office Action (Non-Final Rejection) dated Dec. 10, 2024 for U.S. Appl. No. 18/482,901 (pp. 1-6).
Office Action (Non-Final Rejection) dated Dec. 11, 2024 for U.S. Appl. No. 18/492,649 (pp. 1-9).
Office Action (Non-Final Rejection) dated Dec. 12, 2024 for U.S. Appl. No. 18/492,642 (pp. 1-6).
Office Action (Notice of Allowance and Fees Due (PTOL-85)) dated Mar. 12, 2025 for U.S. Appl. No. 18/496,866 (pp. 1-7).
Office Action (Notice of Allowance and Fees Due (PTOL-85)) dated Jun. 9, 2025 for U.S. Appl. No. 18/482,901 (pp. 1-7).
Office Action (Notice of Allowance and Fees Due (PTOL-85)) dated Jun. 10, 2025 for U.S. Appl. No. 18/492,649 (pp. 1-9).
Office Action (Notice of Allowance and Fees Due (PTOL-85)) dated Aug. 12, 2025 for U.S. Appl. No. 18/492,642 (pp. 1-7).
Office Action (Notice of Allowance and Fees Due (PTOL-85)) dated Oct. 24, 2024 for U.S. Appl. No. 18/432,018 (pp. 1-10).
Office Action (Notice of Allowance and Fees Due (PTOL-85)) dated Oct. 30, 2024 for U.S. Appl. No. 18/432,014 (pp. 1-9).
Office Action (Notice of Allowance and Fees Due (PTOL-85)) dated Oct. 30, 2024 for U.S. Appl. No. 18/432,020 (pp. 1-10).
Office Action (Notice of Allowance and Fees Due (PTOL-85)) dated Nov. 14, 2024 for U.S. Appl. No. 18/432,020 (pp. 1-10).
Office Action (Notice of Allowance and Fees Due (PTOL-85)) dated Nov. 14, 2024 for U.S. Appl. No. 18/487,044 (pp. 1-7).
Office Action (Notice of Allowance and Fees Due (PTOL-85)) dated Nov. 22, 2024 for U.S. Appl. No. 18/496,866 (pp. 1-7).
Office Action (Notice of Allowance and Fees Due (PTOL-85)) dated Nov. 26, 2024 for U.S. Appl. No. 18/432,014 (pp. 1-9).
Office Action (Notice of Allowance and Fees Due (PTOL-85)) dated Nov. 29, 2024 for U.S. Appl. No. 18/432,017 (pp. 1-9).
Office Action No. 5212 dated Apr. 11, 2025 and issued in Columbian National Stage Patent Application Based on International Application No. PCT/US2022/015004, Portugese (13 Pages).
Olena Myronycheva, Maro Sehlstedt-Persson, Olov Karlsson and Dick Sandberg, "Growth of Mold and Rot Fungi on Copper-Impregnated Scots Pine Sapwood: Influence of Planing Depth and Incolulation Pattern", Bioresources.com, vol. 13, No. 4, 2018, pp. 8787-8801 (pp. 15).
Pankaj Kumar, Krister Holmberg, Isha Soni, Nasarul Islam, Manish Kumar, Pooja Shandilya, Mika Sillanpa, and Vinay Chauhan, "Advancements in ionic liquid-based corrosion inhibitors for sustainable protection strategies: from experimental to computational insights", published in Advances in Colloid and Interface Science, vol. 333 (2024), by Elsevier B. V., Sep. 17, 2024 (36 Pages).
Product Brochure for Smartply® Max FR/FR Build Flame Retardant Panel, by Medite Smartply Innovative Timber Products, Ireland UK, Nov. 20, (4 Pages).
Product Data Sheet for I-Bond® OSB FC 4312 MDI-Based Polymeric Resin, manufactured by Huntsman Polyurethanes, Jan. 26, 2015 (2 Pages).
Response to Office Action No. 5212 filed on Apr. 28, 2025 in Columbian National Stage Patent Application Based on International Application No. PCT/US2022/015004, Portugese (206 Pages).
Response to Second Office Action No. 16697 filed on Dec. 12, 2025 in Columbian National Stage Patent Application Based on International Application No. PCT/US2022/015004 , Portuguse (196 Pages).
Richa Bansal, Harish C. Barshilia, and Krishna K. Pandey, "Nanotechnology in wood science: Innovations and applications", published in International Journal of Biological Macromolecules vol. No. 262 (2024), Feb. 2024 (25 Pages).
Rynehvee Tan, "The Use of P-MDI Resin in MDF Manufacture—A Report Submitted in Partial Fulfillment of the Requirements for the Degree of Bachelor of Science in Wood Products Processing", The Faculty of Forestry, University of British Columbia, Wood 493, Vancouver, CA, Apr. 12, 2012 (18 Pages).
Safety Data Sheet (SDS) for D-Blaze™ Fire Retardant Pressure Treated Wood using Phospho-Ammonium Boron Complex, produced by Viance LLC, Charlotte, North Carolina generated Feb. 2, 2015 (9 Pages).
Safety Data Sheet (SDS) for Wood Dust, by West Fraser, Quesnel, BC Canada, generated Apr. 20, 2016 (5 Pages).
Safety Data Sheet (SDS) Version 1.2 for Ranger MDF, by West Fraser, Blue Ridge, Alberta Canada, generated May 22, 2022 (14 Pages).
Safety Data Sheet (SDS) Version 1.2 for Westpine MDF, by West Fraser, Quesnel, British Columbia Canada, generated Jun. 1, 2022 (12 Pages).
Safety Data Sheet (SDS) Version 1.7 for Norbord OSB (including OSB Branded West Fraser), by West Fraser, Toronto, Ontario Canada, generated Apr. 11, 2021 (11 Pages).
Safety Data Sheet (SDS) Version 2.0 for Plywood, by West Fraser, Quesnel, BC Canada, generated May 22, 2022 (11 Pages).
Safety Data Sheet for Greenfire™ Pro Defense, by Fire Suppression Innovations, Placentia, California, Feb. 2024, (5 Pages).
Safety Data Sheet No. 003 Version 2 for Plywood by West Fraser, Edmonton BC, dated May 22, 2015 (11 Pages).
Sahriyanti Saad, Yusram Massijaya, and Yusuf Sudo Hadi, "Physical and Mechanical Properties of OSB Made from Bamboo", University of Hasanuddin, published by Indonesian Wood Research Society (IWORS), Bali, Indoensia 2010 (5 Pages).
Second Office Action No. 16697 filed on Apr. 28, 2025 in Columbian National Stage Patent Application Based on International Application No. PCT/US2022/015004 , Portuguse (17 Pages).
Seng Hua Lee, Paridah Md Tahir, Wei Chen Lum, Li Peng Tan, Paiman Bawon, Byung-Dae Park, Syeed Saiful Azry Osman Al Edrus, and Ummi Hani Abdullah, "A Review on Citric Acid as Green Modifying Agent and Binder for Wood", Polymers 2020, vol. 12(8), 1692 (21 Pages).
Supplementary European Search Report issued in EPO Patent Application No. EP22750358.8 dated Nov. 30, 2024 (2 Pages).
T D Cahyono and Syahidah "Citric acid, an environmentally friendly adhesive and wood impregnation material-review of research", IOP Conference Series, Materials Science and Engineering, Aug. 19, 2019 (7 Pages).
T. S. McCracken, "PMDI Prepolymers For Enhanced Curing For Production Of Wood Composite Panels", Covestro, Pittsburgh, PA, https://www.coatingsworld.com, Coatings World, Jan. 7, 2019 (6 Pages).
Technical Data Sheet for Hexion Formaldehyde 35% with 7% Methanol, by Hexion Inc., Nov. 1, 2023 (1 Page).
The Specifiers Guide—OSB Edition—for Oriented Strand Board (OSB) by Hanson Playwood Limited, West Yorkshire, UK, 2020 (8 Pages).
USDA Forest Service Specification Titled "Long-Term Retardant, Wildland Firefighting Specification 5100-304d dated Jan. 7, 2020", US Department of Agriculture Forest Service, Jan. 7, 2020 (32 Pages).
Valentina D. Ciobanu, Octavia Zeleniuc, Adela-Eliza Dumitrascu, Badea Lepadatescu and Bogdan Iancu, "The Influence of Speed and Press Factor on Oriented Strand Board Performance in Continuous Press", Bioresources.com, vol. 9, No. 4, 2014, pp. 6805-6816 (pp. 12).
Webpage Overview on "A Chipboard Production—Forming Line", manufactured/configured by HOCHSMANN using Dieffenbacher wood technology equipment, published at https://wtp.hoechsmann.

(56) References Cited

OTHER PUBLICATIONS com/en/lexikon/41143/chipboard_production_f Captured on Mar. 8, 2025, Hochsmann GmbH, Klipphausen, Germany (5 Pages).
Webpages by Hexion Inc. describing Binding Resins for Oriented Strand Board (OSB), Hexion Inc, captured at www. hexion.com on Nov. 10, 2024 (9 Pages).
Webpages Describing "Binding Resins for Oriented Strand Board (OSB)—Fine-Tuned Resin Formulations for OSB Mills" published by Hexion, Inc. at https://www.hexion.com/our-products/products-by-application/adhesives/wood-adhesives/oriented-strand-board captured on Dec. 13, 2024, Columbus, Ohio, USA (7 Pages).
Website Pages Describing Production of "3-Ply Vertically Pressed Bamboo Panels", published at https://www.mesunbamboo.com/about-us/production/ by Mesun Bamboo, Zhejiang, China, Captured on Dec. 13, 2025 (10 Pages).
West Fraser Bulletin titled "OSB Information Sheet for Residential Floor, Wall & Roof Applications", West Fraser, Toronto, Ontario, Canada , Aug. 4, 2023 (3 Pages).
White Paper # 115/Bulletin titled "Engineered Wood:Stay Ahead of the Curve in Production Efficiency, Compliance and Profit" by Spraying Systems Co., Wheaton, Illinois, www.spray.com/panelspraybulletin, 2015 (6 Pages).
Wikipedia Article on Phenol, captured at https://en.wikipedia.org/wiki/Phenol, on Nov. 10, 2024, (6 Pages).
Wikipedia Article on Phenolic Acid, captured at https://en.wikipedia.org/wiki/Phenolic_acid, on Nov. 10, 2024, (2 Pages).
Wikipedia Article on Polyvinyl Acetate, captured at https://en.wikipedia.org/wiki/Polyvinyl_acetate, on Nov. 10, 2024, (5 Pages).
Yasuharu Nakayama, "Polymer blend systems for water-borne paints", Kansai Paint Company Ltd., 4-17-1 Higashi-yawata, Hiratsuka, Kanagawa, Japan, Progress in Organic Coatings vol. 33 (1998) pp. 108-116, Elsevier Publishers (9 Pages).
Zhu, X.; Ali, R.N.; Song, M.; Tang, Y.; Fan, Z. Recent Advances in Polymers for Potassium Ion Batteries. Polymers 2022, 14, 5538 (26 Pages).
"Acid vs. Base—What's the Difference?", published in This vs. That , at https://thisvsthat.io/acid-vs-base , Dec. 14, 2025, Bit Flip LLC, (6 Pages).
"Divalent vs. Monovalent—What's the Difference?", published in This vs. That , at https://thisvsthat.io/divalent-vs-monovalent Mar. 16, 2025, Bit Flip LLC, (4 Pages).
"Flame-retardant coatings for wood surfaces" by European Coatings on Jan. 2, 2024 at https://www.european-coatings.com/news/application-areas/flame-retardant-coatings-for-wood-surfaces/ , published by Vincentz Network GmbH & Co., Hannover Germany (4 Pages).
"Flame-retardant coatings for wood surfaces", published on Jul. 5, 2024 at https://www.european-coatings.com/news/application-areas/flame-retardancy-of-acrylic-emulsion-resin-intumescent-coatings-added-with-alkaline-lignin-on-plywood/ by European Coatings, captured on Nov. 23, 2024, published by Vincentz Network GmbH & Co., Hannover Germany, previously published in Journal of Coatings Technology and Research, vol. 21, 2024 (5 Pages.
"Toxicological Profile for Formaldehyde" (Jul. 1999), U.S. Department of Health and Human Services, Public Health Service Agency for Toxic Substances and Disease Registry, Division o Toxicology/Toxicology Information Branch, Atlanta, Georgia USA (pp. 468).
A Specification Guide To Flame Retardant Wood Panels (Part 5: The Features abnd Benefits of Smartply Max FR B OSB and Premier FR MDF), by Medite Smartply Innovative Wood Products, 2021 (16 Pages).
Anupama Sapkota, "Ester vs. Ether—Definition, 12 Major Differences, Examples", published in Science Info at https://scienceinfo.com/ester-vs-ether/ , captured on Jan. 19, 2025 (12 Pages).
Asha at Wood Based Panels International (WBPI), "MDI—a simple equation for OSB production?", published at https://www.wbpionline.com/analysis/mdi-a-simple-equation-for-osb-production/ by WBPI, on May 16, 2012 (8 Pages).
BASF MDI Handbook North America (For MDI-Based Polyurethane Chemicals) published in 2019 by BASF Corporation, Wyandotte, Michigan USA, (35 Pages).
Brochure on Huntsman® I-BOND® MDI-Based Polyurethane Wood Resins for Use in the Man ufacture of Composite Wood Products ( V1), published by Huntsman Corporation, The Woodlands, Texas USA, 2022 (5 Pages).
Canadian Code Compliance Evaluation (CCMC) No. 12009-R, issued Aug. 31, 1989 and Modified Nov. 8, 2023 for Rubinate® 1840 MDI-Based Resin Binder by Huntsman International LLC, Woodlands, Texas, for OSB and Waferboard, in Compliance with NBC 2015 (10 Pages).
Carmen-Alice Teaca and Fuiga Tanasa. "Wood Surface Modification—Classic and Modern Approaches in Wood Chemical Treatment by Esterification Reactions", Coatings, MDPI, Coatings 2020, vol. 10, p. 629, (31 Pages).
Chandrabhan Verma, Eno E. Ebenso, M.A. Quraishi, "Corrosion inhibitors for ferrous and non-ferrous metals and alloys in ionic sodium chloride solutions: A review", Journal of Molecular Liquids, vol. 248, Dec. 2017, pp. 927-942 (9 Pages).
Che Zhang, A thesis titled "Evaluation of Bio/pMDI Wood Adhesives" presented to the University of Waterloo in fulfillment of the thesis requirement for the degree of Master of Applied Science in Chemical Engineering, University of Waterloo Waterloo, Ontario, Canada, 2018 (68 Pages).
Che Zheng, 2018 Master's Thesis of at the University of Waterloo titled "Evaluation of Bio/pMDI Wood Adhesives", Chemical Engineering Department, University of Waterloo, Waterloo, Ontario, Canada, 2018 (68 Pages).
Design for Code Acceptance—Flame Spread Performance of Wood Products Used For Interior Finish, American Wood Council, Leesburg, VA, 2019 (7 Pages).
Dieffenbacher "Let's Build Your Plant—Products and Solutions for the Wood-Based Panel Industry" (2020), a Product and Solutions Catalog and Planning and Design Guidebook, by Dieffenbacher GmbH, Eppingen, Germany, May 2020 (73 Pages).
Dr Chris Phanopoulos, "Polyurethanes and Isocyanates used as adhesives in Composite Wood Products", I-BOND® Products, Huntsman Corporation, The Woodlands, Texas (52 Pages).
Dr. Alexey Peshkovsky, "Making Stable Emulsions—A Guide to Formulation and Processing Conditions Optimization" (2015), Industrial Sonomechanics, LLC, Miami, Florida USA 2015 (22 Pages).
DRJ® Listing and Technical Evaluation Report No. Jan. 2010 for No-Burn® Plus and No-Burn® Plus Seal Spray Fire Protected Lumber and SCL Used as an Air Barrier Material and Water Resistance, Issued Oct. 23, 2020 and Revised Mar. 13, 2025, DRJ Engineering, LLC (24 Pages).
English Translation of Office Action No. 5212 dated Apr. 11, 2025 and issued in Columbian National Stage Patent Application Based on International Application No. PCT/US2022/015004 (17 Pages).
English Translation of Response to Second Office Action No. 16697 filed on Dec. 12, 2025 in Columbian National Stage Patent Application Based on International Application No. PCT/US2022/015004 (13 Pages).
English Translation of Second Office Action No. 16697 filed on Apr. 28, 2025 in Columbian National Stage Patent Application Based on International Application No. PCT/US2022/015004 (17 Pages).
Environmental Product Declaration (EPD) dated Jul. 7, 2023 covering Burnblock® Fire Retardants (i.e. Burnblock JG30, Burnblock MM50 and Burnblock DM3 Powders) containing Ammonium phosphates 5-95%, Citrate 5-95%, and Sodium Benzoate 2-10%., manufactured by Burnblock ApS, Copenhagen, Denmark, (14 Pages).
Environmental Product Declaration per ISO 14025 (Declaration No. EPDIE-19-17) by Medite Smartply on Nov. 11, 2019, for Smartply Oriented Stand Boards (OSB), EPD Ireland (43 Pages).
Euroepan-Search Report Including European Supplemental Search Report and European Opinion issued in European Patent Application No. 22750358.8 on Dec. 10, 2024 (Dec. 10, 2024), which is a National Stage Entry of International Patent Application No. PCT/US2022/015004 ( 8 Pages).
European Search Opinion (EPO Form 1703) (Form dated Apr. 15, 2024 issued in EPO Patent Application No. EP22750358.8 (5 Pages).

(56) References Cited

OTHER PUBLICATIONS

Huntsman Product Brochure titled "A Commitment to the Future—Composite Wood Products" describing I-BOND® MDI-Based Polymeric Resin Products for Various Composite Wood Products, manufactured by Huntsman Polyurethanes, Huntsman Corporation, Woodlands, Texas USA 2019 (7 Pages).
Information Disclosure Statement filed in Columbian National Stage Application based on International Application No. PCT/US2022/015004 (463 Pages).
International Search Report (ISR) and Written Opinion (WO) issued in International Patent Application No. PCT/US2025/012489, dated Jul. 9, 2025 (49 Pages).
International Search Report (ISR) and Written Opinion (WO) issued in International Patent Application No. PCT/US2025/030054, dated Sep. 15, 2025 (98 Pages).
International Search Report (ISR) and Written Opinion (WO) issued in International Patent Application No. PCT/US2025/030057, dated Sep. 24, 2025 (157 Pages).
International Search Report (ISR) and Written Opinion (WO) issued in International Patent Application No. PCT/US2025/030268, dated Sep. 17, 2025 (42 Pages).
Ivan Sumerskii, Pia Solt, Hendrikus W. G. van Herwijnen, Irina Sulaeval, Ters Thomas, Thomas Rosenau, and Antje Potthast, "Lignin-Containing PMDI-Binder for Wood Particle Board Production", Lenzinger Berichte 97m 2022, pp. 109-122 (14 Pages).
JBL Brochure #078 titled "Facts—Citrofol® As a carrier fluid for microbials", by Jungbunzlauer Suisse AG, CH-4002 Basel, Switzerland, 2024 (10 Pages).
JBL Brochure #088 titled "Into the future with biopolymers—Shaping polymer properties with bio-based additives", by Jungbunzlauer Suisse AG, CH-4002 Basel, Switzerland, 2023 (2 Pages).
JBL Brochure #142 titled "Facts—Citrofol® As Coalescent agent", by Jungbunzlauer Suisse AG, CH-4002 Basel, Switzerland, 2019 (12 Pages).
Kelvin M. Chapman, A Doctoral Thesis titled "A Study of Two Aspects of Medium Density Fiberboard Manufacture" submitted in fulfilment of the requirements for the degree of Doctor of Philosophy in Chemical and Process Engineering to the University of Canterbury, Canterbury, England, Mar. 2004 (189 Pages).
Letter (dated Aug. 15, 2025) Accompanying Subsequently Filed Items filed in European Patent Application No. EP22750359.6 which is an Regional Phase Entry Application from International Application No. PCT/US2022/015005 (15 Pages).
Letter (dated Jul. 4, 2025) Accompanying Subsequently Filed Items filed in European Patent Application No. EP22750358.8 which is an Regional Phase Entry Application from International Application No. PCT/US2022/015004 (21 Pages).
M.B. Oliveira, J.A.P. Coutinho, and A.J. Queimada, "Surface tensions of esters from a combination of the gradient theory with the CPA EoS", published by Elsevier B.V. in Fluid Phase Equilibria, vol. 303, 2011, pp. 56-61 (6 Pages).
Material Safety Data Sheet for Fire Terminator FT JN669 Fire Extinguishing Agent for Forest/Peat Fires, by Fire Terminator International PTE Ltd., Singapore, Dec. 21, 2020 (4 Pages).
Mats Sundin, Master's Thesis titled "Design of Blow Line Resin Injector for MDF Production", Master of Science Programme, Mechanical Engineering, Lulea University of Technology, Sundsvall, Sweden 2007 (67 Pages).
Mitsura Abe, Yukiko Enomoto, Matsako Seki and Tsunehisa Miki, "Esterification of Solid Wood for Plastic Forming", Bioresources.com, vol. 15, No. 3, 2020, pp. 6282-6298 (pp. 17).
Mohamed, A.; Visco, D.P., Jr.; Bastidas, D.M. , "Sodium Succinate as a Corrosion Inhibitor for Carbon Steel Rebars in Simulated Concrete Pore Solution", Molecules, Dec. 10, 2022, vol. 27, p. 8776 (23 Pages).
Mulik Abaker Ibrahim and Fauzi Febrianto, "Properties of Oriented Strand Board (OSB) Made from Mixing Bamboo", published in ARPN Journal of Science and Technology, vol. 3, No. 9, Sep. 2013, pp. 937-962 (27 Pages).
Office Action (Non-Final Rejection) dated Apr. 22, 2025 for U.S. Appl. No. 18/496,862 (pp. 1-7).
Office Action (Non-Final Rejection) dated Apr. 22, 2025 for U.S. Appl. No. 18/496,864 (pp. 1-8).
Office Action (Non-Final Rejection) dated Apr. 22, 2025 for U.S. Appl. No. 18/496,896 (pp. 1-7).
Office Action (Non-Final Rejection) dated May 2, 2025 for U.S. Appl. No. 18/496,865 (pp. 1-6).

* cited by examiner

OIL DISPERSENT APPLIED BY AIRPLANE

SWEEP SKIMMING

BOOMS

POLYMERS USED FOR ABSORBING HYDROCARBON LIQUIDS

Polymer Materials for Absorbing/Adsorbing
Hydrogen Liquid In Boom Structures and the Like
Used To Absorb Hydrocarbons Spilled in Water
Offshore and Onshore During Recovery:

Polyethylene

Polypropylene

Polyurethane - open-cell oleophillic polyurethane foam

Silicone Polymer Rubber

Co-Polymer Blend (PRIOR ART)

FIG. 9

Aqueous Film Forming Foam (AFFF)
For Fire Fighting Flammable Fuels
Class B Fire Fighting Foams Aqueous Film Forming Foam (AFFF) Concentrate for forming a film between the fuel and the air, sealing the surace of the fuel and preventing the escape and ignition of flammable fuel vapors. AFFF can be created by combining foaming agents with flourinate surfactants. Perfluorinated alkylated substance and polyfluoroalkyl substances (PFAS) are the active ingredient in thes fluorinated surfactants. They are that have multiple fluorine atoms attached to an alkyl chain. As such, they contain at least one perfluoroalkly moiety, $C_nF_{2n}$

+

$H_2O$ (PRIOR ART)

FIG. 17

BURNING AUTOMOBILE

BURNING FUEL OIL STORAGE TANK

USING FOAM TO SUPPRESS SPILLS AND FIRES

AIRCRAFT FUEL FIRE

MOBILE COMPUTING DEVICES DEPLOYED ON THE SYSTEM NETWORK OF THE PRESENT INVENTION

DRY CHEMICAL POWDER COMPOSITIONS OF THE FIRST GENERIC EMBODIMENT OF THE PRESENT INVENTION ADAPTED FOR EXTINGUISHING FIRES INVOLVING FLAMMABLE HYDROCARBONS LIQUIDS SUCH AS, OILS, FUELS (E.G. GASOLINE AND DIESEL) AND NON-POLAR SOLVENTS (E.G. KETONES AND ALCOHOLS)

Dry Chemical Fire Extinguishing Agent in Powder Form

Potassium citrate

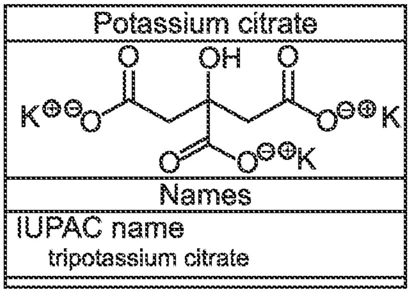

Names

IUPAC name
tripotassium citrate

Formula: $C_6H_7K_3O_8$

Melting Point: 275 C (527 F)

Solubility in water: 226 g/L (20°C)

+

Powder Fluidizing Agent (e.g. Natural Cellulose, or Silica Powder)

+

Surfactant (e.g. Sodium Lauryl Ether Sulfate, or CITREM, Powder)

Preferred Powder Particle Size Range: 10 - 500 [microns]

FIG. 25

DRY CHEMICAL POWDER COMPOSITIONS OF THE SECOND GENERIC EMBODIMENT OF THE PRESENT INVENTION ADAPTED FOR EXTINGUISHING FIRES INVOLVING FLAMMABLE HYDROCARBONS LIQUIDS SUCH AS, OILS, FUELS (E.G. GASOLINE AND DIESEL) AND NON-POLAR SOLVENTS (E.G. KETONES AND ALCOHOLS), AND ABSORBING THE FLAMMABLE HYDROCARBON LIQUIDS USING THE SAME

Dry Chemical Fire Extinguishing Agent in Powder Form

Potassium citrate

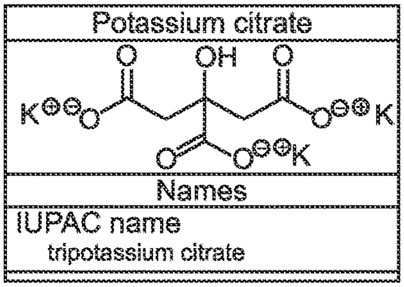

Names

IUPAC name
tripotassium citrate

Formula: $C_6H_7K_3O_8$

Melting Point: 275 C (527 F)

Solubility in water: 226 g/L (20°C)

+

Polymer(s) Powder For Absorbing Flammable Liquid Hydrocarbons

+

Powder Fluidizing Agent (e.g. Cellulose Powder, Silica Powder)

+

Surfactant (e.g. Sodium Lauryl Ether Sulfate, or CITREM, Powder)

Preferred Powder Particle Size Range: 10 - 500 [microns]

FIG. 26

THERMOPLASTIC POLYMER POWDERS FOR ABSORBING HYDROCARBON LIQUIDS

| Thermoplastic Polymer Materials * | Hydrophoic / Oleophilic |
|---|---|
| POLYOLEFINS: | |
| Polyethylene | Yes / yes |
| Polypropylene | Yes / yes |
| Polyvinyl chloride (PVC) | Yes / yes |
| Polystyrene (PS) | Yes / yes |
| Polycarbonate | Yes / yes |
| Polyurethane | yes / yes |
| POLYSILOXANE or SILICONE POLYMER | Yes / yes |
| (with silicon-oxygen backbone with organic groups) | Yes / yes |
| POLYMER BLENDS: | Yes / yes |
| EPOXY RESIN POLYMER: | Yes / yes |
| PHENOLIC RESINS | Yes / yes |
| POLYESTER RESINS | Yes / yes |
| POLYAMIDES (Nylon) | Yes / yes |
| * High Molecular Weight | |

FIG. 27

DRY CHEMICAL POWDER COMPOSITIONS OF THE ILLUSTRATIVE EMBODIMENT OF THE PRESENT INVENTION ADAPTED FOR EXTINGUISHING FIRES INVOLVING FLAMMABLE HYDROCARBONS LIQUIDS SUCH AS, OILS, FUELS AND NON-POLAR SOLVENTS, WHILE ABSORBING THE FLAMMABLE HYDROCARBON LIQUIDS

Dry Chemical Fire Extinguishing Agent

Potassium citrate

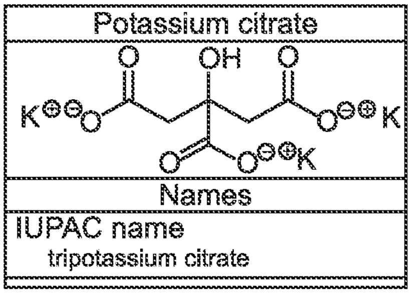

Names

IUPAC name
tripotassium citrate

Formula: $C_6H_7K_3O_8$

Melting Point: 275 C (527 F)

Solubility in water: 226 g/L (20°C)

+

Cross-linked Polyethylene (PE) Polymer Powder
For Absorbing Flammable Liquid Hydrocarbon)

+

Powder Fluidizing Agent (e.g. Cellulose Powder, Silica Powder)

+

Surfactant (e.g. Sodium Lauryl Ether Sulfate, or CITREM, Powder)

Preferred Powder Particle Size Range: 10 - 500 [microns]

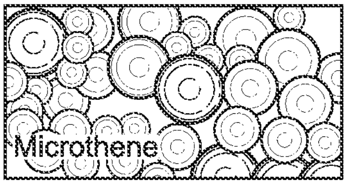

FIG. 28

DRY CHEMICAL POWDER COMPOSITIONS OF THE SECOND ILLUSTRATIVE EMBODIMENT OF THE PRESENT INVENTION ADAPTED FOR EXTINGUISHING FIRES INVOLVING FLAMMABLE HYDROCARBONS LIQUIDS SUCH AS, OILS, FUELS AND NON-POLAR SOLVENTS, WHILE ABSORBING THE FLAMMABLE HYDROCARBON LIQUIDS

Dry Chemical Fire Extinguishing Agent

Potassium citrate

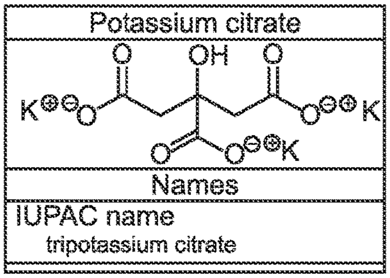

Names

IUPAC name
tripotassium citrate

Formula: $C_6H_7K_3O_8$

Melting Point: 275 C (527 F)

Solubility in water: 226 g/L (20°C)

+

Cross-linked Ethylene / Propylene / Diene Elastomer (EPDM) Polymer Powder For Absorbing Flammable Liquid Hydrocarbon)

+

Powder Fluidizing Agent (e.g. Cellulose Powder, Silica Powder)

+

Surfactant (e.g. Sodium Lauryl Ether Sulfate, or CITREM, Powder)

Preferred Powder Particle Size Range: 10 - 500 [microns]

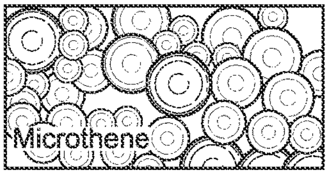

FIG. 29

DRY CHEMICAL POWDER COMPOSITIONS OF THE THIRD ILLUSTRATIVE EMBODIMENT OF THE PRESENT INVENTION FOR EXTINGUISHING FIRE INVOLVING FLAMMABLE HYDROCARBONS LIQUIDS SUCH AS, OILS, FUELS AND NON-POLAR SOLVANTS, WHILE ABSORBING THE FLAMMABLE HYDROCARBON LIQUIDS

Dry Chemical Fire Extinguishing Agent in Powder Form

Potassium citrate

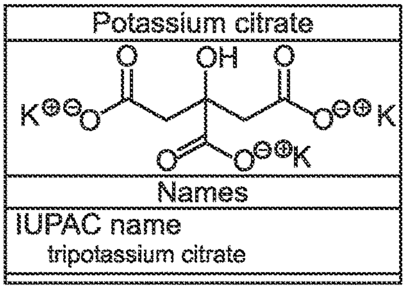

Names

IUPAC name
tripotassium citrate

Formula: $C_6H_7K_3O_8$

Melting Point: 275 C (527 F)

Solubility in water: 226 g/L (20°C)

+

Cross-linked Polypropylene Polymer Powder
For Absorbing Flammable Liquid Hydrocarbon

+

Powder Fluidizing Agent (e.g. Cellulose Powder, Silica Powder)

+

Surfactant (e.g. Sodium Lauryl Ether Sulfate, or CITREM, Powder)

Preferred Powder Particle Size Range: 10 - 500 [microns]

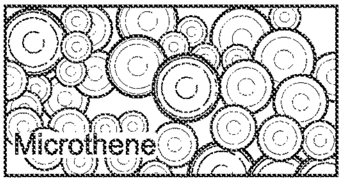

FIG. 30

DRY CHEMICAL POWDER COMPOSITIONS OF THE FOURTH ILLUSTRATIVE EMBODIMENT OF THE PRESENT INVENTION FOR EXTINGUISHING FIRE INVOLVING FLAMMABLE HYDROCARBONS LIQUIDS SUCH AS, OILS, FUELS AND NON-POLAR SOLVANTS, WHILE ABSORBING THE FLAMMABLE HYDROCARBON LIQUIDS

Dry Chemical Fire Extinguishing Agent in Powder Form

Potassium citrate

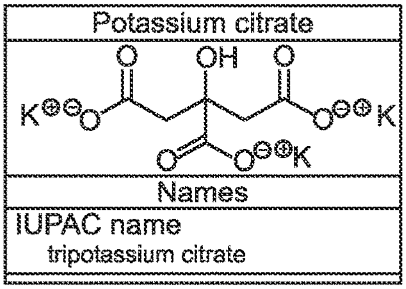

Names

IUPAC name
tripotassium citrate

Formula: $C_6H_7K_3O_8$

Melting Point: 275 C (527 F)

Solubility in water: 226 g/L (20°C)

+

Cross-linked Polypropylene Polymer Powder
For Absorbing Flammable Liquid Hydrocarbon

+

Powder Fluidizing Agent (e.g. Cellulose Powder, Silica Powder)

+

Surfactant (e.g. Sodium Lauryl Ether Sulfate, or CITREM, Powder)

Preferred Powder Particle Size Range: 10 - 500 [microns]

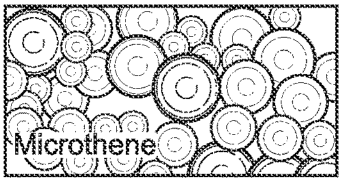

FIG. 31

DRY CHEMICAL POWDER COMPOSITIONS OF THE FIFTH ILLUSTRATIVE EMBODIMENT OF THE PRESENT INVENTION FOR EXTINGUISHING FIRE INVOLVING FLAMMABLE HYDROCARBONS LIQUIDS SUCH AS, OILS, FUELS AND NON-POLAR SOLVANTS, WHILE ABSORBING THE FLAMMABLE HYDROCARBON LIQUIDS

Dry Chemical Fire Extinguishing Agent in Powder Form

Potassium citrate

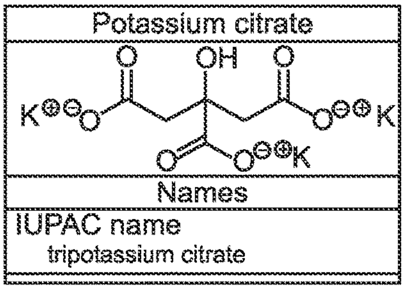

Names

IUPAC name
tripotassium citrate

Formula: $C_6H_7K_3O_8$

Melting Point: 275 C (527 F)

Solubility in water: 226 g/L (20°C)

+

Cross-linked Polysiloxane (Silicone) Polymer Powder For Absorbing Flammable Liquid Hydrocarbon

+

Powder Fluidizing Agent (e.g. Cellulose Powder, Silica Powder)

+

Surfactant (e.g. Sodium Lauryl Ether Sulfate, or CITREM, Powder)

Preferred Powder Particle Size Range: 10 - 500 [microns]

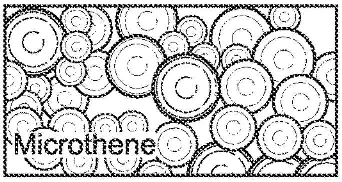

FIG. 32

DRY CHEMICAL POWDER COMPOSITIONS OF THE SIXTH ILLUSTRATIVE EMBODIMENT OF THE PRESENT INVENTION FOR EXTINGUISHING FIRE INVOLVING FLAMMABLE HYDROCARBONS LIQUIDS SUCH AS, OILS, FUELS AND NON-POLAR SOLVANTS, WHILE ABSORBING THE FLAMMABLE HYDROCARBON LIQUIDS

Dry Chemical Fire Extinguishing Agent in Powder Form

Potassium citrate

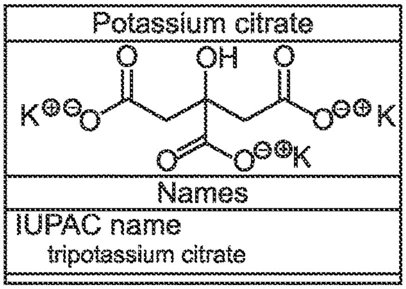

Names

IUPAC name tripotassium citrate

Formula: $C_6H_7K_3O_8$

Melting Point: 275 C (527 F)

Solubility in water: 226 g/L (20°C)

+

Cured Epoxy Resin Polymer Powder For Absorbing Flammable Liquid Hydrocarbon

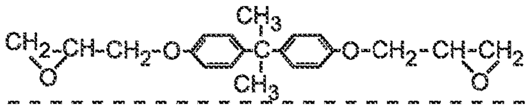

+

Powder Fluidizing Agent (e.g. Cellulose Powder, Silica Powder)

+

Surfactant (e.g. Sodium Lauryl Ether Sulfate, or CITREM, Powder)

Preferred Powder Particle Size Range: 10 - 500 [microns]

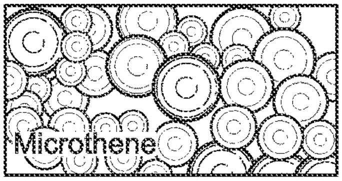

FIG. 33

DRY CHEMICAL POWDER COMPOSITIONS OF THE SEVENTH ILLUSTRATIVE EMBODIMENT OF THE PRESENT INVENTION FOR EXTINGUISHING FIRE INVOLVING FLAMMABLE HYDROCARBONS LIQUIDS SUCH AS, OILS, FUELS AND NON-POLAR SOLVANTS, WHILE ABSORBING THE FLAMMABLE HYDROCARBON LIQUIDS

Dry Chemical Fire Extinguishing Agent in Powder Form

Potassium citrate

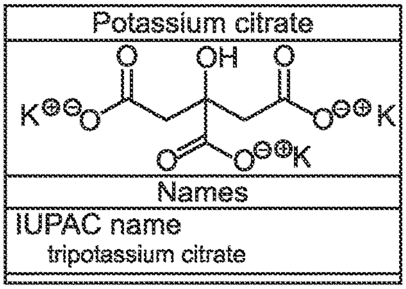

Names

IUPAC name
tripotassium citrate

Formula: $C_6H_7K_3O_8$

Melting Point: 275 C (527 F)

Solubility in water: 226 g/L (20°C)

+

Polymer Blend For Absorbing Flammable Liquid Hydrocarbon (WO Patent Application Publication No. WO 03/042296 A2)

+

Powder Fluidizing Agent (e.g. Cellulose Powder, Silica Powder)

+

Surfactant (e.g. Sodium Lauryl Ether Sulfate, or CITREM, Powder)

Preferred Powder Particle Size Range: 10 - 500 [microns]

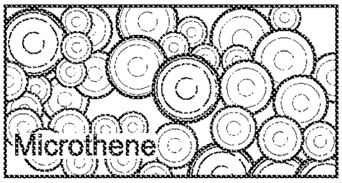

FIG. 34

DRY CHEMICAL POWDER COMPOSITIONS OF THE EIGHTH ILLUSTRATIVE EMBODIMENT OF THE PRESENT INVENTION FOR EXTINGUISHING FIRE INVOLVING FLAMMABLE HYDROCARBONS LIQUIDS SUCH AS, OILS, FUELS AND NON-POLAR SOLVANTS, WHILE ABSORBING THE FLAMMABLE HYDROCARBON LIQUIDS

Dry Chemical Fire Extinguishing Agent in Powder Form

Potassium citrate

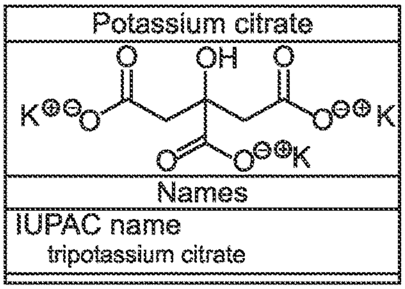

Names

IUPAC name
tripotassium citrate

Formula: $C_6H_7K_3O_8$

Melting Point: 275 C (527 F)

Solubility in water: 226 g/L (20°C)

+

Polyvinyl Chloride (PVC) Polymer For Absorbing Flammable Liquid Hydrocarbon (e.g. EP Patent Application Pub. 0129700A2)

+

Powder Fluidizing Agent (e.g. Cellulose Powder, Silica Powder)

+

Surfactant (e.g. Sodium Lauryl Ether Sulfate, or CITREM, Powder)

Preferred Powder Particle Size Range: 10 - 500 [microns]

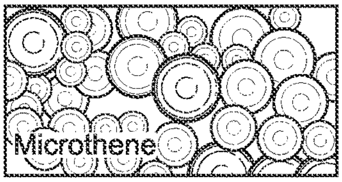

FIG. 35

GPS-TRACKING BACK-PACK SYSTEM FOR DISCHARGING AND PROJECTING DRY CHEMICAL POWDER FIRE EXTINGUISHING COMPOSITIONS ONTO FIRE OUTBREAKS ON LAND AND WATER

GPS-TRACKING BACK-PACK SYSTEM FOR DISCHARGING AND PROJECTING DRY CHEMICAL POWDER FIRE EXTINGUISHING COMPOSITIONS ONTO FIRE OUTBREAKS ON LAND AND WATER

GPS-TRACKED SYSTEM FOR PROJECTING DRY POWDER COMPOSITION FOR EXTINGUISHING FIRE AND ABSORBING HYDROCARBON LIQUIDS

AUTONOMOUS (DRONE) AIRCRAFT SYSTEM FOR DISCHARGING AND SPRAYING DRY CHEMICAL FIRE EXTINGUISHING POWDER ONTO LIVE FIRE OUTBREAKS FROM THE AIRSPACE

AUTONOMOUS (DRONE) AIRCRAFT SYSTEM FOR SPRAYING DRY CHEMICAL FIRE EXTINGUISHING POWDER ONTO LIVE ACTIVE OUTBREAKS

GPS-TRACKED (HELICOPTER) AIRCRAFT SYSTEM FOR DISCHARGING AND SPRAYING DRY CHEMICAL POWDER FIRE EXTINGUISHING AGENT ONTO LIVE ACTIVE FIRES

GPS-TRACKED BACK-PACK SYSTEM FOR DISCHARGING AND SPRAYING DRY CHEMICAL POWDER FIRE EXTINGUISHING POWDER ONTO LIVE FIRE OUTBREAKS

GPS-TRACKED BACK-PACK SYSTEM FOR DISCHARGING AND SPRAYING DRY CHEMICAL POWDER FIRE EXTINGUISHING POWDER ONTO LIVE FIRE OUTBREAKS

HAND-HELD VR-ENABLED NAVIGATION AND CONTROL DEVICE
FOR USE WITH VR-GUIDED SYSTEM OF THE PRESENT INVENTION

GPS-TRACKING WHEELED SYSTEM FOR PROJECTING DRY CHEMICAL FIRE EXTINGUISHING POWDER ONTO ACTIVE FIRES INVOLVING FLAMMABLE HYDROCARBON LIQUIDS

GPS-TRACKING SYSTEM FOR DISCHARGING AND PROJECTING DRY CHEMICAL FIRE EXTINGUISHING POWDER ON ACTIVE FIRES INVOLVING FLAMMABLE HYDROCARBON LIQUIDS, AND THEN DISCHARGING AND PROJECTING ABSORBING POLYMER POWDER TO ABSORB THE FLAMMABLE HYDROCARBON LIQUID

110

GPS-TRACKED MANNED VEHICLE FOR REMOTELY / VR-CONTROLLED SPRAYING OF DRY CHEMICAL FIRE EXTINGUISHING POWDER ONTO A LIVE FIRE OUTBREAK

The asymmetric unit of the title compound, showing the atom numbering. Atoms are represented by 50% probability spheroids.

The crystal structure of $K_3C_6H_5O_7$, view down the c axis, with coordination spheres of the potassium cations in polyhedral representation.

The Fire Extinguishing Process Of The Present Invention Involving
Fire Extinguishing And Film Forming Chemical Powders Of The Present Invention
As Specified In FIG. 25

The Flammable Hydrocarbon Liquid Absorption Process Of The Present Invention Using Polymer Powders As Specified In FIG. 27, Applied After Extinguishing Fire On Flammable Liquid Using Dry Chemical Powder As Specified In FIG. 25

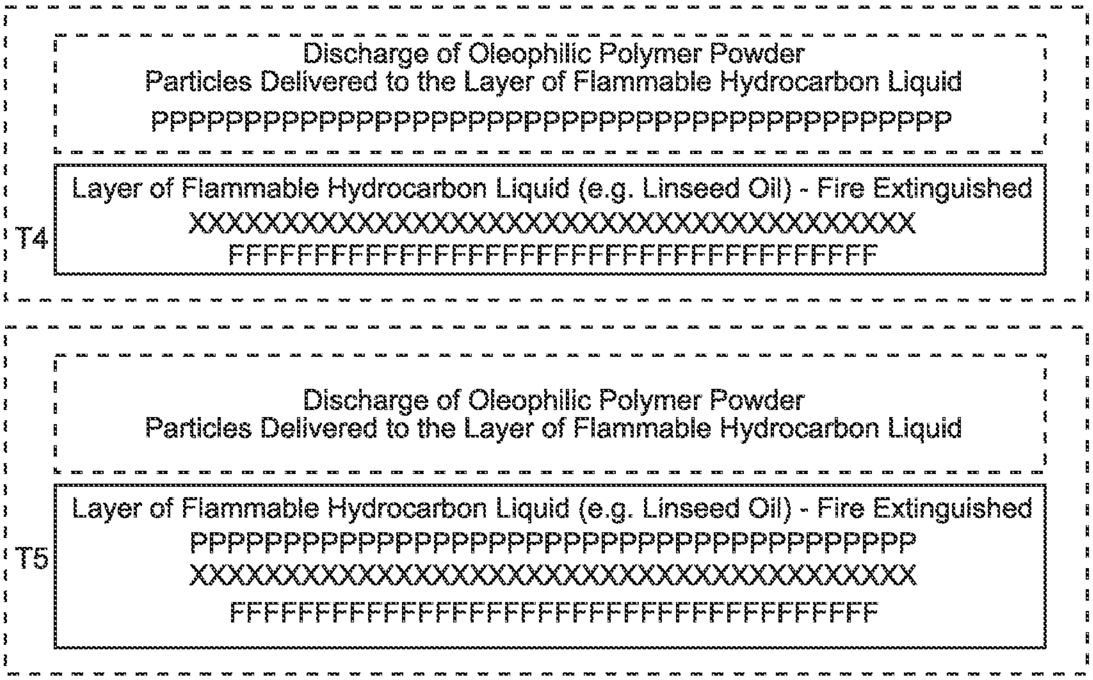

X: Dry chemical Powder Particles of the Present Invention
O: Free-Radical Gas Components Produced from Combustion Phase of Fire Outbreak
F: Layer of Flammable Hydrocarbon Liquid
P: Oleophilic Polymer Powder Particles

FIG. 46B

LIQUID HYDROCARBON SORBING ARTICLES OF MANUFACTURE COMPOSED FROM HYDROPHOBIC/OLEOPHILIC FIBEROUS COMPOSITIONS CHEMICALLY TREATED FOR INHIBITING FIRE IGNITION INVOLVING FLAMMABLE LIQUID HYDROCARBONS, WHILE ABSORBING THE FLAMMABLE LIQUID HYDROCARBONS WHEN SPILLED ON A BODY OF WATER AND/OR LAND

* Fire Inhibiting Dry Powder Chemical

Potassium citrate

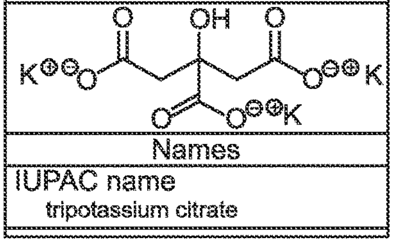

Names

IUPAC name
tripotassium citrate

Formula: $C_6H_7K_3O_8$

Melting Point: 275 C (527 F)

Solubility in water: 226 g/L (20°C)

\+

Powder Fluidizing Agent

\+

A Coalescing Agent and/or Dispersant and/ Surfactant

\+

Short-Strand Sorbent Fiber Material For Absorbing Flammable Liquid Hydrocarbons

*Preferred Powder Particle Size Range: 10 - 500 [microns]

FIG. 48

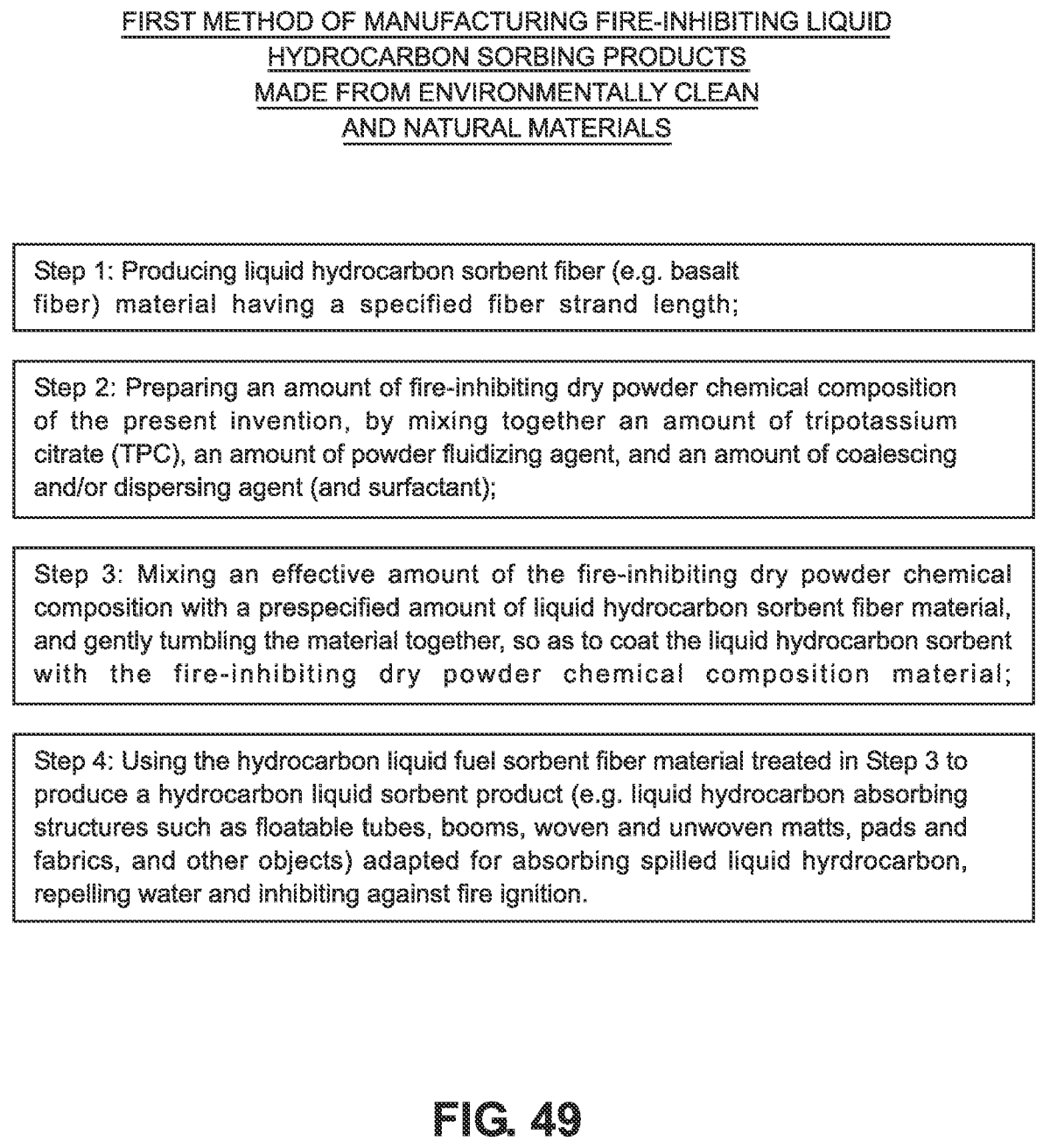

FIRST METHOD OF MANUFACTURING FIRE-INHIBITING LIQUID HYDROCARBON SORBING PRODUCTS MADE FROM ENVIRONMENTALLY CLEAN AND NATURAL MATERIALS

Step 1: Producing liquid hydrocarbon sorbent fiber (e.g. basalt fiber) material having a specified fiber strand length;

Step 2: Preparing an amount of fire-inhibiting dry powder chemical composition of the present invention, by mixing together an amount of tripotassium citrate (TPC), an amount of powder fluidizing agent, and an amount of coalescing and/or dispersing agent (and surfactant);

Step 3: Mixing an effective amount of the fire-inhibiting dry powder chemical composition with a prespecified amount of liquid hydrocarbon sorbent fiber material, and gently tumbling the material together, so as to coat the liquid hydrocarbon sorbent with the fire-inhibiting dry powder chemical composition material;

Step 4: Using the hydrocarbon liquid fuel sorbent fiber material treated in Step 3 to produce a hydrocarbon liquid sorbent product (e.g. liquid hydrocarbon absorbing structures such as floatable tubes, booms, woven and unwoven matts, pads and fabrics, and other objects) adapted for absorbing spilled liquid hyrdrocarbon, repelling water and inhibiting against fire ignition.

FIG. 49

LIQUID HYDROCARBON SORBING ARTICLES OF MANUFACTURE COMPOSED FROM HYDROPHOBIC/OLEOPHILIC FIBEROUS COMPOSITIONS CHEMICALLY TREATED FOR INHIBITING FIRE IGNITION INVOLVING FLAMMABLE LIQUID HYDROCARBONS, WHILE ABSORBING THE FLAMMABLE LIQUID HYDROCARBONS WHEN SPILLED ON A BODY OF WATER AND/OR LAND

*

Fire Inhibiting Dry Powder Chemical

Potassium citrate

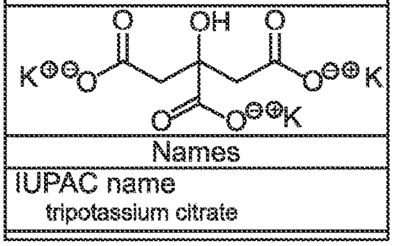

Names

IUPAC name
tripotassium citrate

Formula: $C_6H_7K_3O_8$

Melting Point: 275 C (527 F)

Solubility in water: 226 g/L (20°C)

+

A Quantity of Water Serving as a Solvent and Dispersant

+

A Coalescing Agent and/or Dispersant and/ Surfactant

+

Short-Strand Sorbent Fiber Material For Absorbing Flammable Liquid Hydrocarbons

FIG. 50

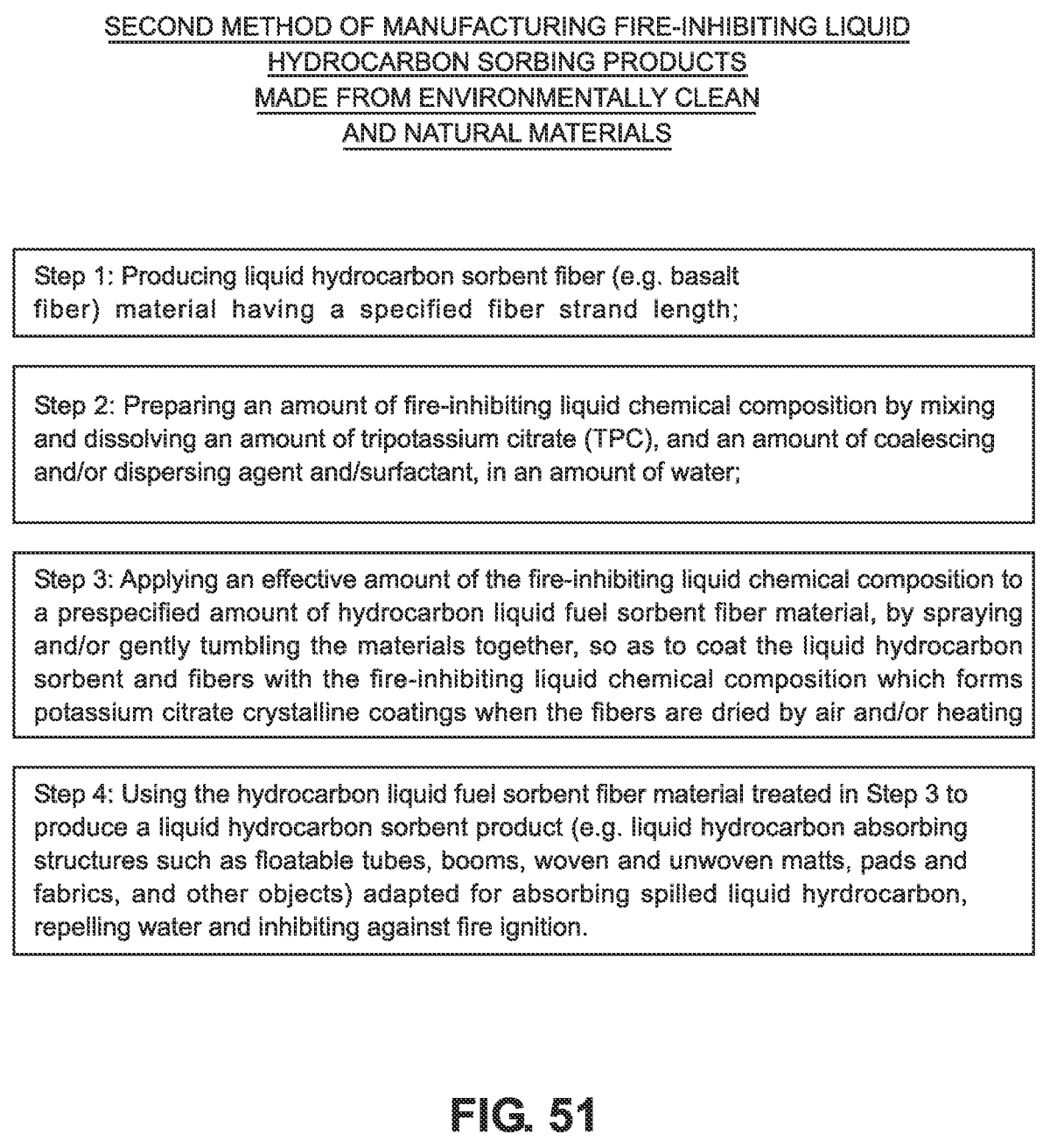

SECOND METHOD OF MANUFACTURING FIRE-INHIBITING LIQUID HYDROCARBON SORBING PRODUCTS MADE FROM ENVIRONMENTALLY CLEAN AND NATURAL MATERIALS

Step 1: Producing liquid hydrocarbon sorbent fiber (e.g. basalt fiber) material having a specified fiber strand length;

Step 2: Preparing an amount of fire-inhibiting liquid chemical composition by mixing and dissolving an amount of tripotassium citrate (TPC), and an amount of coalescing and/or dispersing agent and/surfactant, in an amount of water;

Step 3: Applying an effective amount of the fire-inhibiting liquid chemical composition to a prespecified amount of hydrocarbon liquid fuel sorbent fiber material, by spraying and/or gently tumbling the materials together, so as to coat the liquid hydrocarbon sorbent and fibers with the fire-inhibiting liquid chemical composition which forms potassium citrate crystalline coatings when the fibers are dried by air and/or heating Step 4: Using the hydrocarbon liquid fuel sorbent fiber material treated in Step 3 to produce a liquid hydrocarbon sorbent product (e.g. liquid hydrocarbon absorbing structures such as floatable tubes, booms, woven and unwoven matts, pads and fabrics, and other objects) adapted for absorbing spilled liquid hyrdrocarbon, repelling water and inhibiting against fire ignition.

FIG. 51

Fire-Inhibiting Liquid Hydrocarbon Sorbent Socks,Tubes Etc.
Made From Basalt Fiber Material Treated With
Dry Powder Fire Inhibiting Chemical Compositions
of The Present Invention Fire-Inhibiting Liquid Hydrocarbon Sorbent Booms
Made From Basalt Fiber Material Treated With
Dry Powder Fire Inhibiting Chemical Compositions
of The Present Invention

ENVIRONMENTALLY-CLEAN FIRE INHIBITING AND EXTINGUISHING COMPOSITIONS AND PRODUCTS FOR SORBING FLAMMABLE LIQUIDS WHILE INHIBITING IGNITION AND EXTINGUISHING FIRE

RELATED CASES

The present Patent Application is a Continuation of co-pending U.S. patent application Ser. No. 17/591,592 filed Feb. 2, 2022, which is a Continuation-in-Part of: U.S. patent application Ser. No. 17/233,461 filed Apr. 17, 2021; U.S. patent application Ser. No. 17/167,084 filed Feb. 4, 2021; U.S. patent application Ser. No. 17/176,670 filed Feb. 16, 2021; U.S. patent application Ser. No. 16/805,811 filed Mar. 1, 2020; U.S. patent application Ser. No. 16/914,067 filed Jun. 26, 2020; wherein each said co-pending US Patent Application is commonly owned by Mighty Fire Breaker LLC and incorporated herein by reference as if fully set forth herein.

BACKGROUND OF INVENTION

Field of Invention

The present invention is directed towards improvements in the art of extinguishing fires through the use of novel chemical extinguishing compositions of matter, including methods of and apparatus for effectively applying the same.

Brief Description of the State of the Art

Unfortunately, flammable liquid spills, including oil spills and discharges, are common in harbors, waterways, navigation channels as well as the open sea. Typically, such spills form a surface layer which may extend over a wide area. In the past, catastrophic effects have been seen from the accidental discharge of oil from tankers, pipes, storage tanks as well as during exploration, drilling and production of oil. Oil spills oftentimes evolve into massive fuel fires causing great environmental damage.

Regrettably, oil and flammable fuel spills are a common occurrence as well on land surfaces such as, for example, cement, concrete and asphalt as well as platforms used during production of oil, gas and other flammable fluids. With a simple spark, these flammable liquid spills transform into serious fuel fires causing great destruction to life, property and the natural environment.

What onshore and offshore flammable fuel spills have in common is that these events both require (i) quick extinguishment of flammable fuel fires when fires break out, and (ii) then quick removal of the spilled flammable liquids from the environment, to remediate the situation, and ensure the protection of life, property and the natural environment.

Many different methods and technologies have been developed to respond to such problems. Exemplary methods are discussed below to help reconstruct the state of knowledge in the art and provide perspective on the history of the present invention disclosed and claimed herein.

Responding to Oils Spills at Sea

FIG. 1 illustrates conventional prior art methods for responding to oil spills at sea, including: (i) the use of chemical dispersion by applying chemicals designed to remove oil from the water surface by breaking the oil into small droplets; (ii) using in situ burning with booms to contain or prevent the spread of oil, and then setting the freshly spilled oil on fire, usually while still floating on the water surface; and (iii) skimming using boats equipped with a floating skimmers and booms designed to remove thin layers of oil from the surface.

FIG. 2 shows a plane dispersing chemicals to break up of oil when applied to water.

FIG. 3 shows the controlled in situ burning of oil spilled on an ocean surface and contained by booms to prevent spreading.

FIG. 4A shows (i) the application of oil absorbing polymer (i-Petrogel polymer) onto the surface of crude oil spilled on an ocean, (ii) the swelling of the oil absorbing polymer, and (iii) recovery of the absorbed oil in the swelled oil using a skimmer, in accordance with U.S. Pat. No. 9,861,954.

FIG. 4B schematically represents the i-Petrogel® cross-linked polyolefin polymer material (e.g. Polyethylene (PE) and ethylene/propylene/diene elastomer (EPDM) polymers) being absorbed by the crude oil (i.e. hydrocarbon liquid), as specified in U.S. Pat. No. 9,861,954.

FIG. 5 shows a prior art sweep skimmer using in the collection of spilled oil on an ocean surface.

Responding to Oils Spills at on Shore

FIG. 6. showing conventional prior art methods for responding to oil spills on shore, including: (i) using shoreline flushing/washing equipment with water hoses that rise oil from the shoreline into the water there it can be more easily collected; (ii) using long floating interconnected barriers or booms to minimize the spread of spilled oil, (iii) using industrialized sized vacuum trucks to suction oil from the shoreline or on the water surface; (iv) using specialized absorbent materials or sorbents that act like a sponge to pick up oil but not water; (v) using shoreline cleaners and biodegradation agents (i.e. chemical cleaners) that act like soaps that remove oil, and nutrients may be added to help microbes break down oil; (vi) burning spilled oil in situ, with fire, while it is still floating on the water surface and/or marsh surface; (vii) manual removal using clean-up crews with shovels and other hand tools to pick up oil from the shoreline; and (viii) mechanical removal using heavy machinery such as backhoes and front-end loaders, to remove spilled oil and sludge on shorelines.

FIG. 7 shows the use of floatable booms to collect and remove spilled oil.

FIG. 8 shows the use of floatable neoprene booms to absorb spilled oil.

FIG. 9 lists conventional polymer materials that have been used for the purpose of absorbing/adsorbing hydrogen liquid in boom structures and the like, in response to hydrocarbons spilled in water offshore and onshore during recovery. Such polymer materials include polyethylene, polypropylene, polyurethane—open-cell oleophilic polyurethane foam, silicone polymer rubber, and co-polymer blend.

Dispersing Hydrocarbon-Absorbing Powders to Recover And Absorb Oil And Fuel Spilled on Hard Surfaces FIG. 10 shows a prior art dry powder composition consisting of cross-linked polymers adapted for absorbing hydrocarbon liquid (e.g. fuel, oil and other hydrocarbon) spills on hard surfaces.

FIG. 11 shows a prior art dry powder composition consisting of amorphous alumina silicate perlite for absorbing oils, fuels, paints and other fluids, and then sweeping up the absorbed product.

FIG. 12 shows a prior art dry powder composition for extinguishing fires involving flammable hydrocarbon liquids, including an absorbent solid in powder form, a dry chemical extinguishing agent, a first polymer soluble in liquid hydrocarbons, and a second polymer soluble in water, as described in U.S. Pat. No. 5,062,996 to Joseph B. Kaylor.

FIG. 13 shows a prior art dry powder compositions for use in extinguishing fires involving flammable liquids, comprising a chemical extinguishing agent, mixed together with powder particles of a thermoplastic polymer (e.g. rubber), as described in U.S. Pat. No. 5,053,147 to Joseph B. Kaylor.

Liquid Compositions for Extinguishing Hydrocarbon Fuel and Oil Fires on Land

FIG. 14 shows the primary components of a prior art (PhosChek®) liquid fire extinguishing chemical, including primary components, including monoammonium phosphate (MAP), diammonium hydrogen phosphate (DAP) disclosed in water.

FIG. 15 shows the primary active components of a prior art liquid fire extinguishing/inhibiting chemical disclosed and claimed in BASF's U.S. Pat. No. 8,273,813 to Beck et al., namely tripotassium citrate (TPC), and a water-absorbing polymer dissolved water.

FIG. 16 shows the primary active components in the prior art Hartidino dry-31 fire inhibiting chemical, namely, potassium citrate and a natural gum dissolved water, as described in the Material Safety Data Sheet for Hartindo AF31 (Eco Fire Break) dated Feb. 4, 2013 (File No. DWMS2013).

Film Forming Foams for Extinguishing Hydrocarbon Fuel and Oil Fires

FIG. 17 shows the prior active components in the prior art PHOS-CHEK® 3% MS aqueous film forming foam (AFFF MIL-SPEC) for firefighting flammable fuels Class B firefighting foams, wherein when mixed with water, the aqueous film forming foam (AFFF) concentrate forms a film between the liquid fuel and the air, sealing the surface of the fuel and preventing the escape and ignition of flammable fuel vapors, and wherein per-fluorinated alkylated substances and polyfluoroalkyl substances (PFAS) are the active ingredients in these fluorinated surfactants, and these surfactants have multiple fluorine atoms attached to an alkyl chain, and contain at least one perfluoroalkyl moiety, $C_nF_{2n}$.

FIG. 18 shows a firefighter producing and applying prior art aqueous film forming foam (AFFF) on a live fire outbreak involving a flammable hydrocarbon liquid such as gasoline from an automobile burning.

FIG. 19 shows firefighters producing and applying prior art aqueous film forming foam (AFFF) on a live fire outbreak involving a flammable hydrocarbon liquid such as fuel oil stored in a storage tank engulfed in fire.

FIG. 20 shows firefighters producing and applying prior art aqueous film forming foam (AFFF) on a live fire outbreak involving a flammable hydrocarbon liquid such as fuel oil spilled from a fuel truck on fire.

FIG. 21 shows firefighters producing and applying prior art aqueous film forming foam (AFFF) on a live fire outbreak involving a flammable hydrocarbon liquid spilled from an aircraft on fire.

FIG. 22 shows the prior active components in the prior art PHOS-CHEK® 1×3% alcohol resistant—aqueous film forming foam (AR-AFFF ULTRA) for firefighting flammable fuels Class B firefighting foams, wherein when mixed with water, the alcohol resistant—aqueous film forming foam (AR-AFFF) concentrate forms an alcohol resistant protective gel film on the surface of flammable liquids (i.e. polar solvents) between the non-polar flammable liquids miscible in water, and the air, sealing the interface surface and preventing the escape and ignition of flammable vapors.

In view of the above, it is clear that industry needs better, safer and more effective fire extinguishing chemical compositions, and methods of and equipment for applying the same without creating risks of smoke and injury to firefighters and damage to the environment at large, while overcoming the shortcomings and drawbacks of prior art compositions, apparatus and methodologies.

SUMMARY AND OBJECTS OF THE PRESENT INVENTION

A primary object of the present is to provide new and improved environmentally-clean dry powder compositions for fire extinguishment and flammable liquid absorption, and new and improved methods of and systems for applying the same to active fire outbreaks, to provide safer and more effective fire suppression response in diverse environments where flammable liquids are involved, while overcoming the shortcomings and drawbacks of prior art compositions, apparatus and methodologies.

Another object of the present invention is to provide new and improved environmentally-clean dry powder fire extinguishing chemical compositions that can be sprayed as a fine powder particles over active fires to rapidly extinguish the same by interrupting the free radical chemical reactions supported in the combustion phase of a fire outbreak involving a flammable liquid.

Another object of the present invention is to provide new and improved dry powder fire extinguishing chemical compositions that allows its active fire extinguishing chemistry (e.g. potassium mineral salts) to efficiently penetrate and chemically interrupt the combustible phases of fire outbreaks.

Another object of the present invention is to provide a new and improved environmentally-clean dry powder fire extinguishing chemical composition formulated by (i) mixing a major quantity of tripotassium citrate (TPC) functioning as a fire inhibitor, with a minor quantity of powder fluidizing agent, to form a new and improved dry powder fire extinguishing composition of matter.

Another object of the present invention is to provide apparatus for spraying the new and improved dry powder fire extinguishing chemical composition that promotes the formation of anhydrous semi-crystalline potassium mineral salt films onto the surface of flammable hydrocarbon liquids, that are involved in fire outbreaks, and that these anhydrous semi-crystalline potassium mineral salt films provide barriers to hydrocarbon vapors from migrating to the combustible phase of the fire during the fire extinguishment process.

Another object of the present invention is to provide a dry powder fire extinguishing chemical composition on of matter, made by mixing: (a) a fire extinguishing agent in the form of at least one alkali metal salt of a nonpolymeric saturated carboxylic acid; and (b) a powder fluidizing agent to help provide the dry powder composition with excellent fluid flow characteristics; and (c) a surfactant that promotes the promotes the formation of anhydrous semi-crystalline potassium mineral salt films onto the surface of flammable hydrocarbon liquids, that are involved in fire outbreaks.

Another object of the present invention is to provide such dry powder fire extinguishing chemical compositions, wherein the alkali metal salt is a sodium or potassium salt, and wherein the alkali metal salt is tripotassium citrate.

Another object of the present invention is to provide a new and improved method of proactively fighting a fire comprising the steps of applying improved dry powder fire extinguishing chemical composition to the fire outbreak, employing tripotassium citrate powder having a powder particle size in the range of about 500 to about 10 microns.

Another object of the present invention is to provide a new and improved method of actively fighting a fire fueled by flammable hydrocarbon liquid, using a dry power composition containing fine tripotassium citrate powder mixed and blended with a fluidizing agent and a surfactant that promotes the formation of anhydrous semi-crystalline potassium mineral salt films onto the surface of flammable hydrocarbon liquids, that are involved in fire outbreaks.

Another object of the present invention is to provide a new and improved environmentally-clean dry powder fire extinguishing chemical composition comprising: a major amount of tripotassium citrate (TPC) powder, and a minor amount of powder fluidizing agent added to and mixed with a major amount of tripotassium citrate powder, to form a dry chemical powder having a powder particle size in the range of about 500 to about 10 microns.

Another object of the present invention is to provide a new and improved dry powder fire extinguishing composition comprising: a major amount of dry tripotassium citrate monohydrate (TPC) powder, and a minor amount of powder fluidizing agent (e.g. guar gum powder) or silica powder as components, to make up a predetermined quantity of environmentally-clean dry powder for fire extinguishing applications.

Another object of the present invention is to provide a new and improved method of extinguishing flammable liquid fires, and also absorbing any excess flammable liquid that remains after fire extinguishment.

Another object of the present invention is to provide a new and improved one-step method of extinguishing flammable liquid fires, and absorbing any excess flammable liquid that remains after fire extinguishment, using a dry composite chemical powder composition including fire extinguishing chemical powder, as well as fluid absorbing polymer power mixed together and milled to powder dimensions ideal for the purposes at hand.

Another object of the present invention is to provide a new and improved two-step method of extinguishing flammable liquid fires and absorbing any excess flammable liquid remaining after fire extinguishment, by first applying a first dry chemical powder composition including fire extinguishing chemical powder, and thereafter, applying a second fluid absorbing polymer power applied after the fire extinguishing powder has been applied and the fire extinguished.

Another object of the present invention is to provide automated fire-suppression system for automatically discharging dry chemical powder onto a detected fire outbreak involving flammable hydrocarbon liquid (e.g. fuel).

Another object of the present invention is to provide a new and improved method of extinguishing fire on flammable liquid spilled on water offshore.

Another object of the present invention is to provide a new and improved dry powder compositions for use in responding to oil and flammable liquid spills on water offshore.

Another object of the present invention is to provide a new and improved method of extinguishing fire on flammable liquid spilled onshore.

Another object of the present invention is to provide a new and improved dry powder compositions can be used to respond to oil spills onshore.

Another object of the present invention is to provide a new and improved method of extinguishing fire on flammable liquid spilled on highways.

Another object of the present invention is to provide a new and improved dry powder compositions for use in responding to flammable liquid spills on highway road surfaces.

Another object of the present invention is to provide a new and improved method of extinguishing fire on flammable liquid spilled on airport runways.

Another object of the present invention is to provide a new and improved dry powder compositions for use in responding to flammable liquid spills on airport runways.

Another object of the present invention is to provide a new and improved method of extinguishing fire on flammable liquid spilled at gas stations.

Another object of the present invention is to provide a new and improved dry powder compositions for use in responding to flammable liquid spills at gasoline and diesel filling stations with fuel pumps.

Another object of the present invention is to provide a new and improved method of extinguishing fire on flammable liquid on surfaces in commercial and industrial facilities.

Another object of the present invention is to provide a new and improved dry powder compositions for use in responding to flammable liquid spills on surfaces at commercial and industrial facilities.

Another object of the present invention is to provide a new and improved liquid hydrocarbon sorbing articles of manufacture (e.g. tubes, socks, mats, fabric, canvas, etc.) composed from hydrophobic/oleophilic fibrous compositions chemically treated for inhibiting fire ignition involving flammable liquid hydrocarbons, while absorbing the flammable liquid hydrocarbons when spilled on a body of water and/or land, wherein the liquid hydrocarbon sorbing articles are manufactured using an environmentally-clean fire inhibiting liquid chemical comprising a fire inhibiting liquid chemical formulated using tripotassium citrate (TPC), powder fluidizing agent, and a coalescing agent and/or dispersant (and surfactant) mixed together and applied to coat the surfaces of short-strand sorbent fiber material for absorbing flammable liquid hydrocarbons.

Another object of the present invention is to provide a new and improved a first method of manufacturing fire-inhibiting liquid hydrocarbon sorbing products made from environmentally clean and natural materials, comprising (i) producing liquid hydrocarbon sorbent fiber (e.g. basalt fiber) material having a specified fiber strand length, (ii) preparing an amount of fire-inhibiting dry powder chemical composition of the present invention, by mixing together an amount of tripotassium citrate (TPC), an amount of powder fluidizing agent, and an amount of coalescing and/or dispersing agent (and surfactant), (iii) mixing an effective amount of the fire-inhibiting dry powder chemical composition with a prespecified amount of liquid hydrocarbon sorbent fiber material, and gently tumbling the material together, so as to coat the liquid hydrocarbon sorbent with the fire-inhibiting dry powder chemical composition material, and (iv) using the hydrocarbon liquid fuel sorbent fiber material treated to produce a hydrocarbon liquid sorbent product adapted for adsorbing spilled liquid hydrocarbon, repelling water and inhibiting against fire ignition.

Another object of the present invention is to provide a new and improved liquid hydrocarbon sorbing articles of manufacture composed from hydrophobic/oleophilic fibrous compositions chemically treated for inhibiting fire ignition involving flammable liquid hydrocarbons, while absorbing the flammable liquid hydrocarbons when spilled on a body of water and/or land, wherein an environmentally-clean fire inhibiting liquid chemical composition is formulated using a major amount of tripotassium citrate (TPC), and a minor amount of coalescing and dispersing agent and surfactant dissolved in a quantity of water and mixed to produce a liquid solution that is used for coating short-strand sorbent fiber material adapted for sorbing flammable liquid hydrocarbons.

Another object of the present invention is to provide a new and improved method of manufacturing fire-inhibiting liquid hydrocarbon sorbing products made from environmentally clean and natural materials, comprising (i) producing liquid hydrocarbon sorbent fiber (e.g. basalt fiber) material having a specified fiber strand length, (ii) preparing an amount of fire-inhibiting liquid chemical composition by mixing and dissolving an amount of tripotassium citrate (TPC) and an amount of coalescing and/or dispersing agent and/surfactant, in an amount of water as a solvent and dispersant, (iii) applying an effective amount of the fire-inhibiting liquid chemical composition to a prespecified amount of hydrocarbon liquid fuel sorbent fiber material, by spraying and/or gently tumbling the materials together, so as to coat the liquid hydrocarbon sorbent and its fibers with the fire-inhibiting liquid chemical composition which forms a potassium citrate crystals when dried by air or forced air and/or heating, and (iv) using the treated hydrocarbon liquid fuel sorbent fiber material to produce a liquid hydrocarbon sorbent product (e.g. liquid hydrocarbon absorbing structures such as floatable tubes, booms, socks, woven and unwoven matts, pads and fabrics, and other objects) adapted for adsorbing spilled liquid hydrocarbon, repelling water and inhibiting against fire ignition.

Another object of the present invention is to provide a new and improved fire-inhibiting liquid hydrocarbon sorbent boom (e.g. socks, tubes, etc.) made from basalt fiber material treated with dry powder fire inhibiting chemical compositions of the present invention.

Another object of the present invention is to provide a new and improved fire-inhibiting liquid hydrocarbon sorbent boom made from basalt fiber material treated with dry powder fire inhibiting chemical compositions of the present invention.

Another object of the present invention is to provide new and improved fire-inhibiting liquid hydrocarbon sorbent mats and pads made from non-woven and non-woven basalt fiber material treated with dry powder fire inhibiting chemical compositions of the present invention.

More particularly, an object of the prevent invention is to provide an environmentally-clean dry powder chemical composition for inhibiting fire ignition and/or extinguishing an active fire involving a flammable hydrocarbon liquid, wherein the environmentally-clean dry chemical powder composition comprises:

- a major amount of powder realized in the form of an alkali metal salt of a nonpolymeric saturated carboxylic acid;
- a minor amount of powder fluidizing agent; and
- wherein each component is mixed, blended and milled into a dry powder composition, and packaged within a container.

Preferably, the alkali metal salt is a sodium or potassium salt, and particularly where the alkali metal salt is tripotassium citrate (TPC). The dry powder composition has a powder particle size in the range of about 3000 microns to about 10 microns. The environmentally-clean dry chemical powder composition can further include a minor amount of surfactant powder for promoting the formation of a thin anhydrous semi-crystalline metal citrate film on the surface of a flammable hydrocarbon liquid.

Another object of the present invention is to provide an article of manufacture comprising the environmentally-clean fire inhibiting/extinguishing dry chemical composition as described above. Also container can be a device selected from the group consisting of a fire extinguisher, a fire extinguishing system, a fire inhibitor dispenser, and a fire inhibitor dispensing system.

Another object of the prevent invention is to provide an environmentally-clean dry chemical powder composition for absorbing flammable hydrocarbon liquid and inhibiting fire ignition and/or extinguishing an active fire involving the absorbed flammable hydrocarbon liquid, wherein the environmentally-clean dry chemical powder composition comprises:

- a major amount of tripotassium citrate (TPC) powder;
- a minor amount of powder fluidizing agent;
- wherein each component is mixed, blended and milled into a dry powder composition having a powder particle size in the range of about 3000 microns to about 10 microns, and packaged within a container.

In a preferred embodiment, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. The surfactant can be selected from the group consisting of triethyl citrate (TEC), sodium lauryl ester sulfate (SLES), and CITREM hydrophilic emulsifier.

In another embodiment of the present invention, an environmentally-clean dry chemical powder composition is produced by mixing and blending in amounts proportional to the weights specified as follows, comprising:

- about 8.0 pounds by weight of tripotassium citrate (TPC);
- about 2.5 pounds by weight of natural gum as a powder fluidizing agent; and
- about 0.5 pounds by weight of surfactant, to produce a resultant dry powder composition of total weight of about 11.0 pounds;
- wherein each component is mixed, blended and milled into a dry powder composition, and packaged into a container.

Preferably, the dry powder composition has a powder particle size in the range of about 3000 microns to about 10 microns. The surfactant promotes the formation of a thin anhydrous semi-crystalline tripotassium citrate film on the surface of a flammable hydrocarbon liquid. The surfactant can be selected from the group consisting of triethyl citrate (TEC), sodium lauryl ester sulfate (SLES), and CITREM hydrophilic emulsifier.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, wherein the environmentally-clean dry chemical powder composition comprises:

- a major amount of tripotassium citrate (TPC) powder;
- a minor amount of polymer powder for absorbing flammable hydrocarbon liquids;
- a minor amount of powder fluidizing agent powder; and
- wherein each component is mixed, blended and milled into a dry powder composition and packaged into and sealed within a container for storage and ultimate shipment to an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition was produced by mixing, blending and milling the components to powder particle dimensions and in amounts proportional to the weights specified as follows, comprising:

about 8.0 pounds by weight of tripotassium citrate;

about 2.5 pounds by weight of polymer powder as a hydrocarbon liquid absorbing polymer powder;

about 0.4 pounds by weight of natural gum as a powder fluidizing agent; and about 0.1 pounds by weight of surfactant to produce a resultant dry powder composition of total weight of about 11.0 pounds;

wherein each component is mixed, blended and milled into a dry powder composition packaged into and sealed within a container.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, wherein the environmentally-clean dry chemical powder composition comprises:

a major amount of tripotassium citrate (TPC) powder;

a minor amount of Cross-linked Polyethylene (PE) polymer powder for absorbing flammable hydrocarbon liquids;

a minor amount of powder fluidizing agent; and wherein each component is mixed, blended and milled into a dry powder composition and packaged into a container for dispensing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition is produced by mixing, blending and milling the components in amounts proportional to the weights specified as follows, comprising:

about 8.0 pounds by weight of tripotassium citrate;

about 2.5 pounds by weight of Cross-linked Polyethylene (PE) powder as hydrocarbon liquid absorbing polymer powder;

about 0.4 pounds by weight of natural gum as a powder fluidizing agent; and about 0.1 pounds by weight of surfactant to produce a resultant dry powder composition of total weight of about 11.0 pounds;

wherein each component is mixed, blended and milled into a dry powder composition and packaged into a container for storage dispensing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, said environmentally-clean dry chemical powder composition comprising:

a major amount of tripotassium citrate (TPC) powder;

a minor amount of Cross-linked Ethylene/Propylene/Diene Elastomer (EPDM) polymer powder for absorbing flammable hydrocarbon liquids;

a minor amount of powder fluidizing agent; and wherein each component is mixed, blended and milled into a dry powder composition, and packaged into a container for dispensing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, said environmentally-clean dry chemical powder composition comprising:

a major amount of tripotassium citrate (TPC) powder;

a minor amount of Cross-linked Polypropylene polymer powder for absorbing flammable hydrocarbon liquids;

a minor amount of powder fluidizing agent; and wherein each component is mixed, blended and milled into a dry powder composition, and packaged within a container for dispersing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition was produced by mixing, blending and milling the components to powder particle dimensions and in amounts proportional to the weights specified as follows, comprising:

about 8.0 pounds by weight of tripotassium citrate;

about 2.5 pounds by weight of Cross-linked Polypropylene powder as hydrocarbon liquid absorbing polymer powder;

about 0.4 pounds by weight of natural gum as a powder fluidizing agent; and about 0.1 pounds by weight of surfactant to produce a resultant dry powder composition of total weight of about 11.0 pounds;

wherein each component is mixed, blended and milled into a dry powder composition, and packaged into and sealed within a container for dispersing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, said environmentally-clean dry chemical powder composition comprising:

a major amount of tripotassium citrate (TPC) powder;

a minor amount of Cross-linked Polyurethane Polymer for absorbing flammable hydrocarbon liquids;

a minor amount of powder fluidizing agent; and wherein each component is mixed, blended and milled into a dry powder composition, and packaged within a container for dispersing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition is produced by mixing, blending and milling the components to powder particle dimensions and in amounts proportional to the weights specified as follows, comprising:

about 8.0 pounds by weight of tripotassium citrate;

about 2.5 pounds by weight of Cross-linked Polyurethane Polymer as hydrocarbon liquid absorbing polymer powder;

about 0.4 pounds by weight of natural gum as a powder fluidizing agent; and 0.1 pounds by weight of surfactant to produce a resultant dry powder composition of total weight of about 11.0 pounds;

wherein each component is mixed, blended and milled into a dry powder composition, and packaged within a container for dispersing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, wherein the environmentally-clean dry chemical powder composition comprises:

a major amount of tripotassium citrate (TPC) powder;

a minor amount of Cross-linked Polysiloxane (Silicone) polymer powder for absorbing flammable hydrocarbon liquids;

a minor amount of powder fluidizing agent; and a minor amount of surfactant powder;

wherein each component is mixed, blended and milled into a dry powder composition and packaged within a container for dispersing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition is produced by mixing, blending and milling the components to powder particle dimensions and in amounts proportional to the weights specified as follows, comprising:

- about 8.0 pounds by weight of tripotassium citrate;
- about 2.5 pounds by weight of Cross-linked Polysiloxane (Silicone) Polymer powder for absorbing hydrocarbon liquid;
- about 0.4 pounds by weight of natural gum as a powder fluidizing agent; and
- about 0.1 pounds by weight of surfactant to produce a resultant dry powder composition of total weight of about 11.0 pounds;
- wherein each component is mixed, blended and milled into a dry powder composition, and packaged within a container.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, said environmentally-clean dry chemical powder composition comprising:

- a major amount of tripotassium citrate (TPC) powder; and
- a minor amount of Cured Epoxy Resin Polymer Powder for absorbing flammable hydrocarbon liquids; a minor amount of powder fluidizing agent; and
- wherein each component is mixed, blended and milled into a dry powder composition, and packaged within a container for dispersing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition is produced by mixing, blending and milling the components to powder particle dimensions in amounts proportional to the weights specified as follows, comprising:

- about 8.0 pounds by weight of tripotassium citrate;
- about 2.5 pounds by weight of Cured Epoxy Resin Polymer powder for absorbing hydrocarbon liquid;
- about 0.4 pounds by weight of natural gum as a powder fluidizing agent; and
- about 0.1 pounds by weight of surfactant to produce a resultant dry powder composition of total weight of about 11.0 pounds;
- wherein each component is mixed, blended and milled into a dry powder composition, and packaged within a container.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, wherein the environmentally-clean dry chemical powder composition comprises:

- a major amount of tripotassium citrate (TPC) powder;
- a minor amount of polymer blend powder for absorbing flammable hydrocarbon liquids;
- a minor amount of powder fluidizing agent; and
- wherein each component is mixed, blended and milled into a dry powder composition, and packaged within a container for dispersing at an end-user location.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition is produced by mixing, blending and milling the components to powder particle dimensions and in amounts proportional to the weights specified as follows, comprising:

- about 8.0 pounds by weight of tripotassium citrate;
- about 2.5 pounds by weight of polymer blend powder for absorbing hydrocarbon liquid;
- about 0.4 pounds by weight of natural gum as a powder fluidizing agent; and
- about 0.1 pounds by weight of surfactant to produce a resultant dry powder composition of total weight of about 11.0 pounds;

wherein each component is mixed, blended and milled into a dry powder composition, and packaged within a container.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, said environmentally-clean dry chemical powder composition comprising:

(a) a major amount from 1% to 95% by weight, preferably from 40% to 60% by weight and more preferably from 50% to 85% by weight, of at least one alkali metal salt of a nonpolymeric saturated c (e.g. tripotassium citrate monohydrate or TPC);
(b) a minor amount from 1% to 30% by weight, preferably from 5% to 25% by weight and more preferably from 10% to 25% by weight, of hydrocarbon liquid absorbing polymer;
(c) a minor amount from 0.1% to 3% by weight, preferably from 0.5% to 2% by weight and more preferably from 0.3% to 2.0% by weight, of fluidizing agent (e.g. natural cellulose powder or natural gum powder, or silica powder); and
(d) a minor amount from 0.1% to 2% by weight, preferably from 0.5% to 1% by weight and more preferably from 0.3% to 0.8% by weight, of dispersing agent, wherein the sum by % weight of the components (a), (b), (c) and (d) should not exceed 100% by weight.

Another embodiment of the present invention is to provide an environmentally-clean dry chemical powder composition for absorbing flammable hydrocarbon liquid and inhibiting fire ignition and/or extinguishing an active fire involving the absorbed flammable hydrocarbon liquid, wherein the environmentally-clean dry chemical powder composition comprises:

a major amount of tripotassium citrate (TPC) powder,
a major amount of liquid hydrocarbon sorbent material having oleophilic/hydrophobic absorption properties,
a minor amount of powder fluidizing agent mixed, blended together with other components and milled to form the environmentally-clean dry chemical powder composition.

In a preferred embodiment, the environmentally-clean dry powder chemical composition has a powder particle size in the range of about 3000 microns to about 10 microns, and is packaged within a container. Preferably, the powder fluidizing agent comprises natural gum powder, and the liquid hydrocarbon sorbent material comprises basalt fiber. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

Another embodiment of the present invention is to provide apparatus for dispensing environmentally-clean dry powder chemical material on flammable hydrocarbon liquid for absorbing the flammable hydrocarbon liquid, inhibiting fire ignition of the absorbed flammable hydrocarbon liquid and/or extinguishing an active fire involving the absorbed flammable hydrocarbon liquid, wherein the apparatus comprises:

a container for storing a quantity of environmentally-clean dry powder chemical material, wherein said environmentally-clean dry powder chemical material comprises
a major amount of tripotassium citrate (TPC) powder,
a major amount of liquid hydrocarbon sorbent powder material having oleophilic/hydrophobic absorption properties, and
a minor amount of powder fluidizing agent for promoting said tripotassium citrate powder and liquid hydrocarbon sorbent powder material to flow like a fluid during application,
wherein each component is mixed, blended and milled into said dry powder chemical material; and
an applicator in fluid communication with said container, for applying said environmentally-clean dry powder chemical material over flammable hydrocarbon liquid for absorbing the flammable hydrocarbon liquid, and inhibiting fire ignition of the flammable hydrocarbon liquid, and/or extinguishing an active fire involving the absorbed flammable.

In preferred embodiments, said applicator comprises: a VR-controlled robot system; powered equipment for dispensing said environmentally-clean dry powder chemical material over flammable hydrocarbon liquid spilled into a body of water, or a ground surface; or powered equipment for blowing said environmentally-clean dry powder chemical material over a distance and onto flammable hydrocarbon liquid that has been spilled (i) on the surface of a body of water, (ii) on a ground surface, or (iii) from a burning object such an automobile.

Another embodiment of the present invention is to provide apparatus for dispensing environmentally-clean fire inhibiting/exhibiting dry powder chemical material over Class A and/or Class B fuels, for inhibiting fire ignition of said Class A and/or Class B fuels, and extinguishing an active fire involving said Class A and/or Class B fuels, wherein the apparatus comprises:

a container for storing a quantity of environmentally-clean dry powder fire-extinguishing chemical material, wherein said environmentally-clean fire-extinguishing dry powder chemical material comprises
a major amount of tripotassium citrate (TPC) powder, and
a minor amount of powder fluidizing agent for promoting said tripotassium citrate powder to flow like a fluid during application,
wherein each component is mixed, blended and milled into said environmentally-clean fire-extinguishing dry powder chemical material; and
an applicator in fluid communication with said container, for applying said environmentally-clean fire-extinguishing dry powder chemical material over Class A and/or Class B fuels, for inhibiting fire ignition of said Class A and/or Class B fuels, and extinguishing an active fire involving said Class A and/or Class B fuels.

In a preferred embodiment, the applicator comprises a VR-controlled robot system; powered equipment for dispensing said environmentally-clean dry powder chemical material over flammable hydrocarbon liquid spilled into a body of water, or a ground surface; or powered equipment for blowing said environmentally-clean dry powder chemical material over a distance and onto flammable hydrocarbon liquid that has been spilled (i) on the surface of a body of water, (ii) on a ground surface, or (iii) from a burning object such an automobile.

Another embodiment of the present invention is to provide a liquid hydrocarbon absorbing article of manufacture comprising:

a hydrophobic/oleophilic fibrous material contained within a carrier, and chemically treated for inhibiting fire ignition involving flammable liquid hydrocarbons, while absorbing the flammable liquid hydrocarbons when spilled on a body of water and/or land, wherein the treatment is carried out by a process comprising the step of:

(i) formulating an environmentally-clean fire inhibiting liquid chemical using tripotassium citrate (TPC), and a coalescing and/or dispersant agent mixed together; and (ii) applying said environmentally-clean fire inhibiting liquid chemical so as to coat the surfaces of hydrophobic/oleophilic fibrous material for absorbing flammable liquid hydrocarbons.

In a preferred embodiment of invention, the article of manufacture is selected from the group consisting of tubes, socks, mats, fabric, and canvas. Also, the hydrophobic/oleophilic fibrous material comprises basalt fibers having a short strand length (e.g. 1 inch)

Another embodiment of the present invention is to provide a method of manufacturing a liquid hydrocarbon absorbing product made from environmentally clean and natural materials, comprising the steps of:

(i) producing liquid hydrocarbon sorbent fiber material having a specified fiber strand length and having oleophilic/hydrophobic properties;

(ii) preparing an amount of fire-inhibiting dry powder chemical composition, by mixing together an amount of tripotassium citrate (TPC), an amount of powder fluidizing agent, and an amount of coalescing and/or dispersing agent;

(iii) mixing an effective amount of the fire-inhibiting dry powder chemical composition with a prespecified amount of liquid hydrocarbon sorbent fiber material, and gently tumbling the material together, so as to coat the liquid hydrocarbon sorbent with the fire-inhibiting dry powder chemical composition material; and (iv) using the hydrocarbon liquid fuel sorbent fiber material treated to produce a hydrocarbon liquid sorbent product adapted for adsorbing spilled liquid hydrocarbon, repelling water and inhibiting against fire ignition.

In a preferred embodiment of the present invention, the liquid hydrocarbon sorbent fiber material comprises basalt fibers. Also the article of manufacture is selected from the group consisting of tubes, socks, mats, fabric, and canvas.

Another embodiment of the present invention is to provide a liquid hydrocarbon absorbing article of manufacture comprising:

hydrophobic/oleophilic fibrous material chemically treated for inhibiting fire ignition involving flammable liquid hydrocarbons, while absorbing the flammable liquid hydrocarbons when spilled on a body of water and/or land;

wherein said hydrophobic/oleophilic fibrous material is treated by providing an environmentally-clean fire inhibiting liquid chemical composition formulated using a major amount of tripotassium citrate (TPC), and a minor amount of coalescing and dispersing agent dissolved in a quantity of water and mixed to produce a liquid solution that is used for coating said hydrophobic/oleophilic fibrous material adapted for absorbing flammable liquid hydrocarbons.

Another embodiment of the present invention is to provide a method of manufacturing a liquid hydrocarbon absorbing product made from environmentally clean fire-inhibiting materials, wherein the method comprises the steps of:

(i) producing liquid hydrocarbon sorbent fiber material having a specified fiber strand length and hydrophobic/oleophilic properties, (ii) preparing an amount of fire-inhibiting liquid chemical composition by mixing and dissolving a major amount of tripotassium citrate (TPC) and a minor amount of coalescing and/or dispersing agent, in an amount of water as a solvent and dispersant, (iii) applying an effective amount of the fire-inhibiting liquid chemical composition to a prespecified amount of said hydrocarbon liquid fuel sorbent fiber material, by spraying and/or gently tumbling the materials together, so as to coat the liquid hydrocarbon sorbent and its fibers with the fire-inhibiting liquid chemical composition which forms a potassium citrate crystals on the fibers when dried by air or forced air and/or heating, and (iv) using the hydrocarbon liquid fuel sorbent fiber material treated in Step (iii) to produce a fire-inhibiting liquid hydrocarbon sorbent product adapted for adsorbing spilled liquid hydrocarbon, repelling water and inhibiting against fire ignition.

In a preferred embodiment of the present invention, the liquid hydrocarbon sorbent fiber material comprises basalt fibers. Also the liquid hydrocarbon sorbent product is a liquid hydrocarbon absorbing article selected from the group consisting of floatable tubes, booms, socks, woven and unwoven matts, pads and fabrics, and other objects.

Another embodiment of the present invention is to provide fire inhibiting liquid hydrocarbon sorbent boom comprising:

a tubular carrier made from a fabric that permits the passage of hydrocarbon liquids and sewn into a 3D geometrical shape of a tubular structure; and an oleophilic/hydrophobic fiber material contained in said tubular carrier and treated with a dry powder fire inhibiting chemical composition containing tripotassium citrate (TPC), to produce a fire inhibiting liquid hydrocarbon sorbent boom for absorbing liquid hydrocarbon spilled on water or ground surface.

In a preferred embodiment of the present invention, the oleophilic/hydrophobic fiber material is basalt fiber.

Another embodiment of the present invention is to provide fire inhibiting liquid hydrocarbon sorbent sock comprising:

a tubular carrier made from a fabric that permits the passage of hydrocarbon liquids; and an oleophilic/hydrophobic fiber material contained in said tubular carrier and treated with a fire inhibiting dry powder chemical composition containing tripotassium citrate (TPC), to produce a fire inhibiting liquid hydrocarbon sorbent boom for absorbing liquid hydrocarbon spilled on the surface of a body of water, or on a ground surface.

A preferred embodiment of the oleophilic/hydrophobic fiber material is basalt fiber.

Another embodiment of the present invention is to provide a fire inhibiting liquid hydrocarbon sorbent fabric comprising:

a fabric that permits the passage of hydrocarbon liquids and sewn into a 3D geometrical shape of a sheet of fabric; and oleophilic/hydrophobic fiber contained in said fabric and treated with a dry powder fire inhibiting chemical composition containing tripotassium citrate (TPC), to produce a fire inhibiting liquid hydrocarbon sorbent fabric for sorbing (i.e. adsorbing) liquid hydrocarbon spilled on water or ground surface.

A preferred embodiment of the oleophilic/hydrophobic fiber is basalt fiber.

Another embodiment of the present invention is to provide an environmentally-clean fire inhibiting and extinguishing composition for absorbing flammable liquids while inhibiting ignition and extinguishing fire involving flammable hydrocarbon liquids such as, oils, fuels and non-polar solvents such as ketones and alcohols; wherein the dry powder chemical composition is made by a process comprising the steps of:

mixing, blending and milling to suitable powder particle sizes, the following components:

a fire extinguishing agent in the form of at least one alkali metal salt of a nonpolymeric saturated carboxylic acid;

a powder fluidizing agent to help provide the dry powder composition with excellent fluid flow characteristics; and a surfactant promoting the formation of anhydrous semi-crystalline metal mineral salt film on the surface of flammable hydrocarbon liquids involved in fire outbreaks to be extinguished and absorbed by the environmentally-clean dry powder chemical composition.

These and other benefits and advantages to be gained by using the features of the present invention will become more apparent hereinafter and in the appended Claims to Invention.

BRIEF DESCRIPTION OF DRAWINGS

The following Objects of the Present Invention will become more fully understood when read in conjunction of the Detailed Description of the Illustrative Embodiments, and the appended Drawings, wherein:

FIG. 9 is a list of conventional polymer materials for absorbing/adsorbing hydrogen liquid in boom structures and the like used to absorb hydrocarbons spilled in water offshore and onshore during recovery, including polyethylene, polypropylene, polyurethane—open-cell oleophilic polyurethane foam, silicone polymer rubber, and co-polymer blend;

FIG. 17 is a schematic representation illustrating the prior active components in the prior art PHOS-CHEK® 3% MS aqueous film forming foam (AFFF MIL-SPEC) for firefighting flammable fuels Class B firefighting foams, wherein when mixed with water, the aqueous film forming foam (AFFF) concentrate forms a film between the liquid fuel and the air, sealing the surface of the fuel and preventing the escape and ignition of flammable fuel vapors, and wherein per-fluorinated alkylated substances and polyfluoroalkyl substances (PFAS) are the active ingredients in these fluorinated surfactants, and these surfactants have multiple fluorine atoms attached to an alkyl chain, and contain at least one perfluoroalkyl moiety, $C_nF_{2n}$;

FIG. 25 is a schematic representation illustrating the primary components of a first illustrative embodiment of the environmentally-clean dry powder chemical fire extinguishing composition of the present invention consisting of major amounts of tripotassium citrate (TPC) and minor amounts of free-flow fluidizing agent (e.g. cellulose or gum powder) mixed and blended together with a minor amount of surfactant powder to form the fire extinguishing dry chemical powder composition of the present invention having powder particle size preferably within the range of about 500 microns to about 10 microns;

FIG. 26 is a schematic representation illustrating the primary components of a second environmentally-clean dry powder chemical fire extinguishing composition of the present invention consisting of major amounts of tripotassium citrate (TPC), minor amounts of polymers for absorbing flammable hydrocarbons, and minor amounts of powder fluidizing agent (e.g. natural cellulose or silica powder), blended and mixed together with a minor amount of surfactant powder to form the fire extinguishing dry chemical powder composition of the present invention having powder particle size preferably within the range of about 500 microns to about 10 microns;

FIG. 27 is a list of known thermoplastic polymer materials that may be used to practice the dry chemical fire extinguishing agent of the dry power chemical compositions of the present invention specified in FIG. 26;

FIG. 28 is a schematic representation illustrating the primary components of a first embodiment of environmentally-clean dry powder chemical fire extinguishing composition of the present invention consisting of a major amount of tripotassium citrate monohydrate (TPC) powder, a minor amount of cross-linked polyethylene (PE) polymer powder for absorbing flammable liquid hydrocarbon, a minor amount of powder fluidizing agent (e.g. natural cellulose or silica powder), and a minor amount of surfactant powder, blended together and milled to form the dry powder chemical fire extinguishing composition of the present invention having powder particle size preferably within the range of about 500 microns to about 10 microns;

FIG. 29 is a schematic representation illustrating the primary components of a second embodiment of environmentally-clean dry powder chemical fire extinguishing composition of the present invention consisting of a major amount of tripotassium citrate monohydrate (TPC) powder, a minor amount of cross-linked ethylene/propylene/diene elastomer (EPDM) polymer powder for absorbing flammable liquid hydrocarbon, a minor amount of powder fluidizing agent (e.g. natural cellulose or silica powder), and a minor amount of surfactant powder, blended together and milled to form the dry powder chemical fire extinguishing composition of the present invention having powder particle size preferably within the range of about 500 microns to about 10 microns;

FIG. 30 is a schematic representation illustrating the primary components of a third embodiment of environmentally-clean dry powder chemical fire extinguishing composition of the present invention consisting of a major amount of tripotassium citrate monohydrate (TPC) powder, a minor amount of cross-linked polypropylene polymer powder for absorbing flammable liquid hydrocarbon, a minor amount of powder fluidizing agent (e.g. natural cellulose or silica powder), and a minor amount of surfactant powder, blended together and milled to form the dry powder chemical fire extinguishing composition of the present invention having powder particle size preferably within the range of about 500 microns to about 10 microns;

FIG. 31 is a schematic representation illustrating the primary components of a fourth embodiment of environmentally-clean dry powder chemical fire extinguishing composition of the present invention consisting of a major amount of tripotassium citrate monohydrate (TPC) powder, a minor amount of cross-linked polyurethane polymer powder for absorbing flammable liquid hydrocarbon, a minor amount of powder fluidizing agent (e.g. natural cellulose or silica powder), and a minor amount of surfactant powder, blended together and milled to form the dry powder chemical fire extinguishing composition of the present invention having powder particle size preferably within the range of about 500 microns to about 10 microns;

FIG. 32 is a schematic representation illustrating the primary components of a fifth embodiment of environmentally-clean dry powder chemical fire extinguishing composition of the present invention consisting of a major amount of tripotassium citrate monohydrate (TPC) powder, a minor amount of cross-linked polysiloxane (silicone) polymer powder for absorbing flammable liquid hydrocarbon, a minor amount of powder fluidizing agent (e.g. natural cellulose or silica powder), and a minor amount of surfactant powder, blended together and milled to form the dry powder chemical fire extinguishing composition of the present invention having powder particle size preferably within the range of about 500 microns to about 10 microns;

FIG. 33 is a schematic representation illustrating the primary components of a sixth embodiment of environmentally-clean dry powder chemical fire extinguishing composition of the present invention consisting of a major amount of tripotassium citrate monohydrate (TPC) powder, a minor amount of cured epoxy resin polymer powder for absorbing flammable liquid hydrocarbon, a minor amount of powder fluidizing agent (e.g. natural cellulose or silica powder), and a minor amount of surfactant powder, blended together and milled to form the dry powder chemical fire extinguishing composition of the present invention having powder particle size preferably within the range of about 500 microns to about 10 microns;

FIG. 34 is a schematic representation illustrating the primary components of a seventh embodiment of environmentally-clean dry powder chemical fire extinguishing composition of the present invention consisting of a major amount of tripotassium citrate monohydrate (TPC) powder, a minor amount of polymer blend powder for absorbing flammable liquid hydrocarbon, a minor amount of powder fluidizing agent (e.g. natural cellulose or silica powder), and a minor amount of surfactant powder, blended together and milled to form the dry powder chemical fire extinguishing composition of the present invention having powder particle size preferably within the range of about 500 microns to about 10 microns;

FIG. 35 is a schematic representation illustrating the primary components of an eighth embodiment of environmentally-clean dry powder chemical fire extinguishing composition of the present invention consisting of a major amount of tripotassium citrate monohydrate (TPC) powder, a minor amount of polyvinyl chloride (PVC) Polymer powder for absorbing flammable liquid hydrocarbon, a minor amount of powder fluidizing agent (e.g. natural cellulose or silica powder), and a minor amount of surfactant powder, blended together and milled to form the dry powder chemical fire extinguishing composition of the present invention having powder particle size preferably within the range of about 500 microns to about 10 microns;

FIG. 46B is a flow chart describing the primary steps involved in the flammable hydrocarbon liquid absorption process of the present invention using liquid absorbing polymer powders as specified in FIG. 27 applied immediately after extinguishing fire on the flammable liquid using dry chemical fire-extinguishing powder of the present invention as specified in FIGS. 25 through 35, directly applied over the flammable fuel using apparatus such as illustrated in FIGS. 42A and 42B;

FIG. 48 is a schematic representation of liquid hydrocarbon sorbing articles of manufacture (e.g. tubes, socks, mats, fabric, canvas, etc.) composed from hydrophobic/oleophilic fibrous compositions chemically treated for inhibiting fire ignition involving flammable liquid hydrocarbons, while absorbing the flammable liquid hydrocarbons when spilled on a body of water and/or land, using an environmentally-clean fire inhibiting liquid chemical comprising a fire inhibiting liquid chemical formulated using a major amount of tripotassium citrate (TPC), a minor amount of powder fluidizing agent, and a minor amount of coalescing agent and/or dispersant (and surfactant) mixed together and applied to coat the surfaces of short-strand sorbent fiber material having hydrophobic/oleophilic properties for absorbing flammable liquid hydrocarbons;

FIG. 49 is a flow chart describing the primary steps carried out in a first method of manufacturing fire-inhibiting liquid hydrocarbon sorbing products made from environmentally clean and natural materials, wherein the method comprises (i) producing liquid hydrocarbon sorbent fiber (e.g. basalt fiber) material having a specified fiber strand length, (ii) preparing an amount of fire-inhibiting dry powder chemical composition of the present invention, by mixing together a major amount of tripotassium citrate (TPC), a minor amount of powder fluidizing agent, and an minor amount of coalescing and/or dispersing (and surfactant) agent, (iii) mixing an effective amount of the fire-inhibiting dry powder chemical composition with a prespecified amount of liquid hydrocarbon sorbent fiber material, and gently tumbling the material together, so as to coat the liquid hydrocarbon sorbent with the fire-inhibiting dry powder chemical composition material, and (iv) using the treated hydrocarbon liquid fuel sorbent fiber material to produce a hydrocarbon liquid sorbent product adapted for adsorbing spilled liquid hydrocarbon, repelling water, and inhibiting against fire ignition;

FIG. 50 is a schematic representation of liquid hydrocarbon sorbing articles of manufacture composed from hydrophobic/oleophilic fibrous compositions chemically treated for inhibiting fire ignition involving flammable liquid hydrocarbons, while absorbing the flammable liquid hydrocarbons when spilled on a body of water and/or land, using an environmentally-clean fire inhibiting liquid chemical composition formulated using a major amount of tripotassium citrate (TPC), and a minor amount of coalescing and dispersing and surfactant agent dissolved in a major amount of water and mixed to produce a liquid solution that is used for coating short-strand sorbent fiber material having hydrophobic/oleophilic properties and adapted for sorbing flammable liquid hydrocarbons;

FIG. 51 is a flow chart describing the primary steps carried out in a second method of manufacturing fire-inhibiting liquid hydrocarbon sorbing products made from environmentally clean and natural materials, wherein the method comprises (i) producing liquid hydrocarbon sorbent fiber (e.g. basalt fiber) material having a specified fiber strand length and hydrophobic/oleophilic properties, (ii) preparing an amount of fire-inhibiting liquid chemical composition by mixing and dissolving a major amount of tripotassium citrate (TPC) and a minor amount of coalescing and/or dispersing and surfactant agent, in an amount of water as a solvent and dispersant, (iii) applying an effective amount of the fire-inhibiting liquid chemical composition to a prespecified amount of hydrocarbon liquid fuel sorbent fiber material, by spraying and/or gently tumbling the materials together, so as to coat the liquid hydrocarbon sorbent and its fibers with the fire-inhibiting liquid chemical composition which forms a potassium citrate crystals when dried by air or forced air and/or heating, and (iv) using the treated hydrocarbon liquid fuel sorbent fiber material to produce a liquid hydrocarbon sorbent product (e.g. liquid hydrocarbon absorbing structures such as floatable tubes, booms, socks, woven and unwoven matts, pads and fabrics, and other objects) adapted for adsorbing spilled liquid hydrocarbon, repelling water and inhibiting against fire ignition;

DESCRIPTION OF THE EMBODIMENTS

Figure 1:
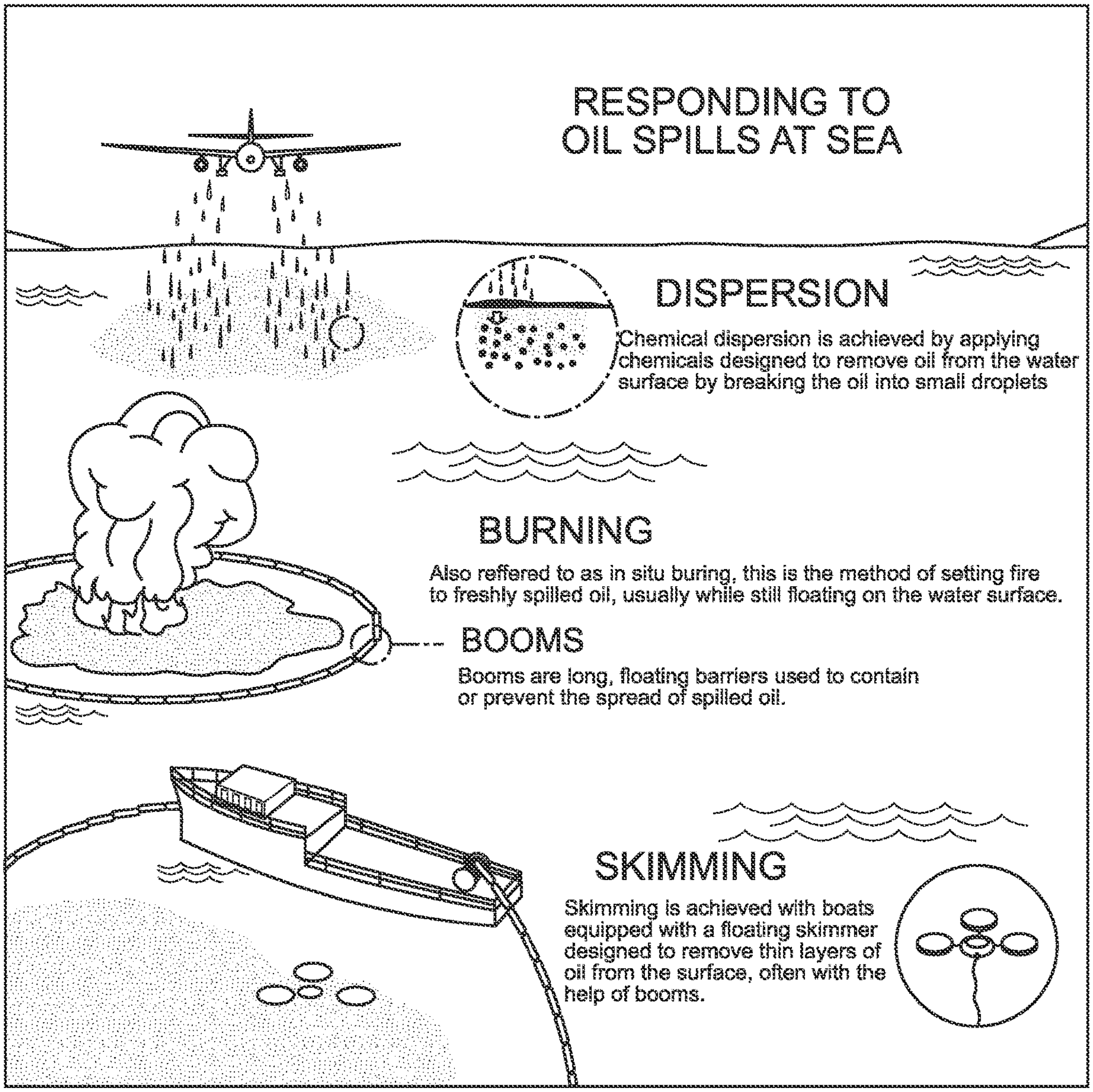
(PRIOR ART) FIG. 1
FIG. 1 is a prior art schematic illustration showing conventional prior art methods for responding to oil spills at sea, including (i) the use of chemical dispersion by applying chemicals designed to remove oil from the water surface by breaking the oil into small droplets, (ii) using in situ burning with booms to contain or prevent the spread of oil, and then setting the freshly spilled oil on fire, usually while still floating on the water surface, (iv) skimming using boats equipped with a floating skimmers and booms designed to remove thin layers of oil from the surface.
Figure 2:
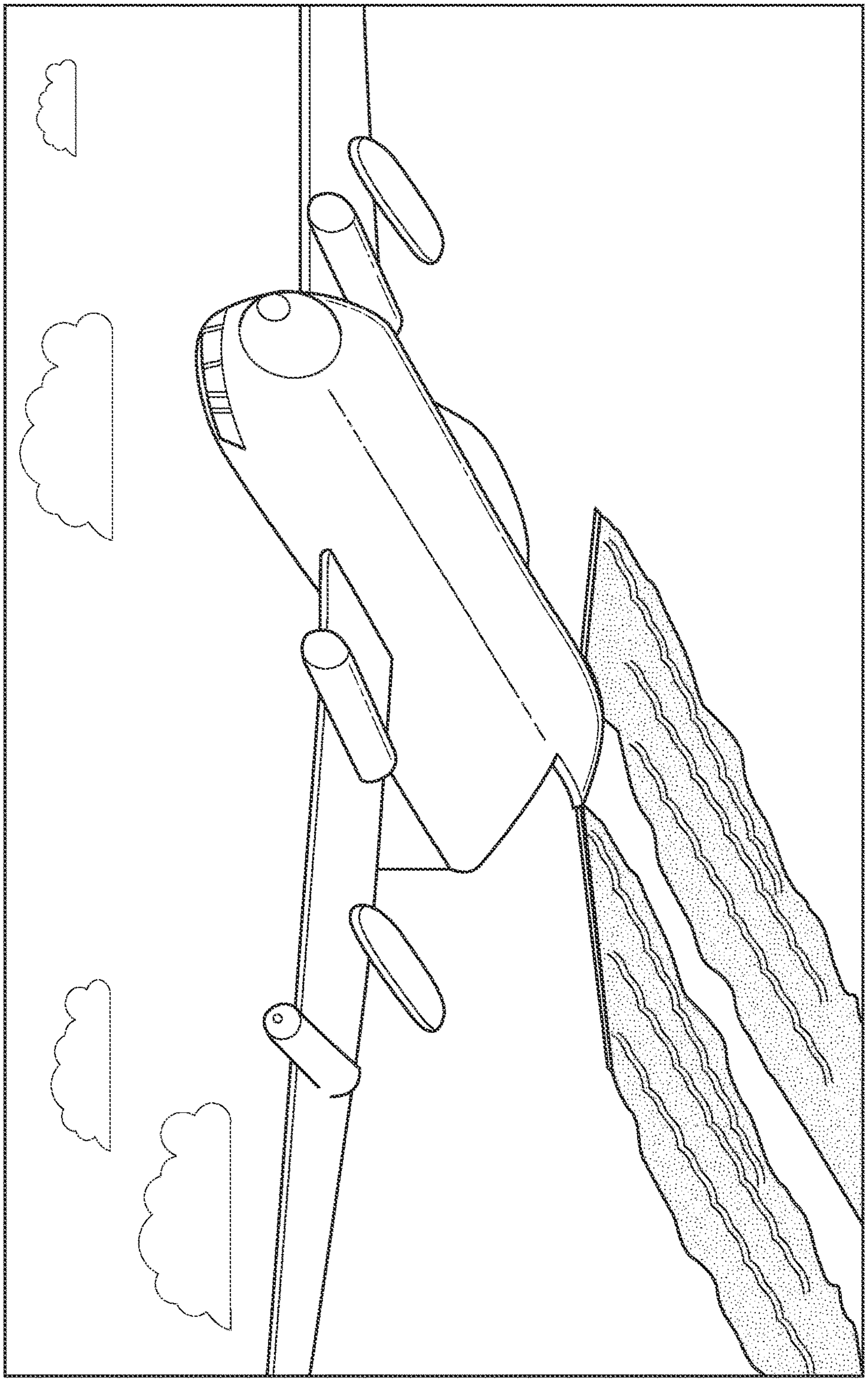
(PRIOR ART) FIG. 2
FIG. 2 is a prior art schematic illustration showing a of a plane dispersing chemicals to break up of oil when applied to water.
Figure 3:
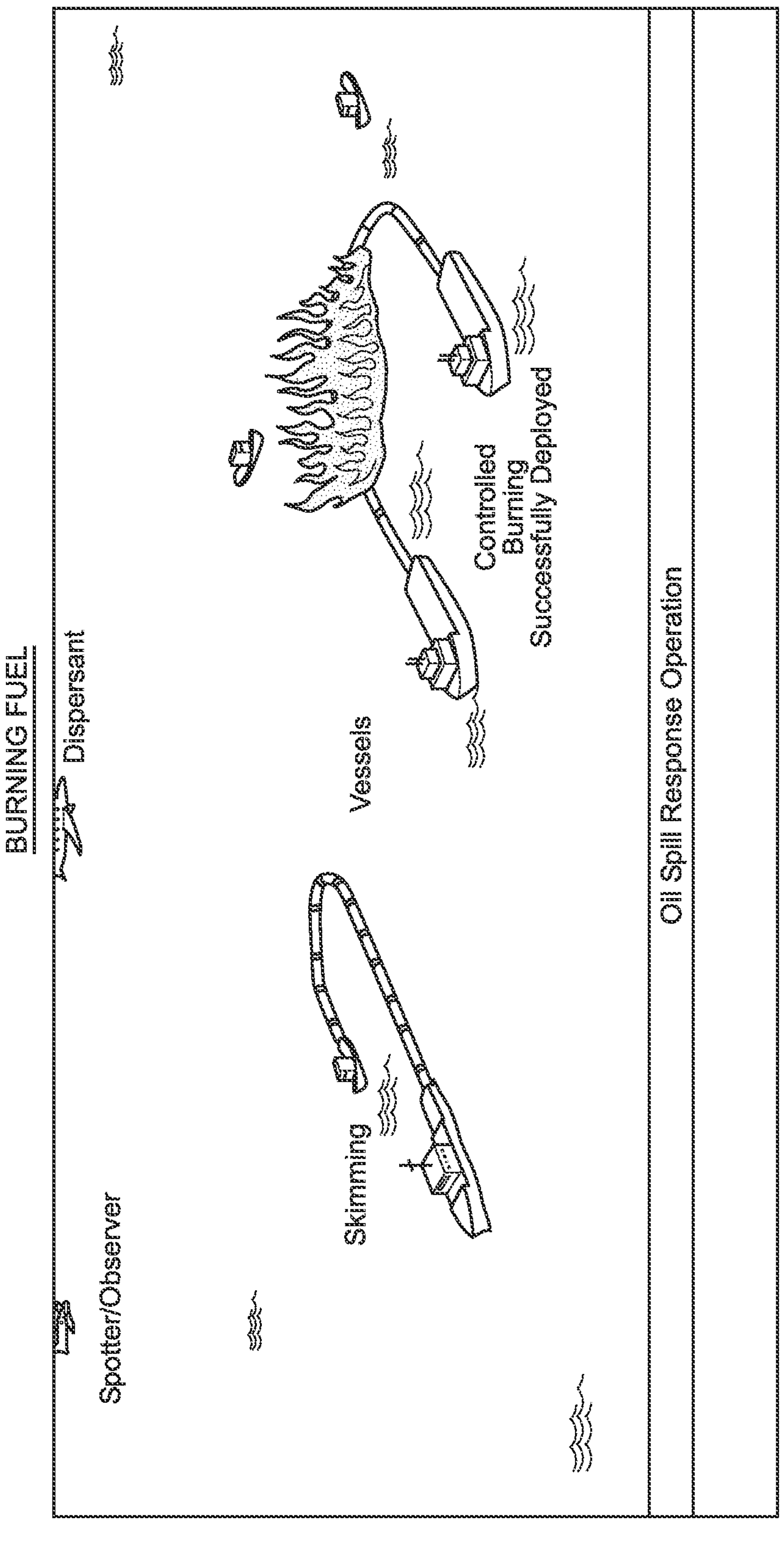
(PRIOR ART) FIG. 3
FIG. 3 is a prior art schematic illustration showing the controlled in situ burning of oil spilled on an ocean surface and contained by booms to prevent spreading.
Figure 4A:
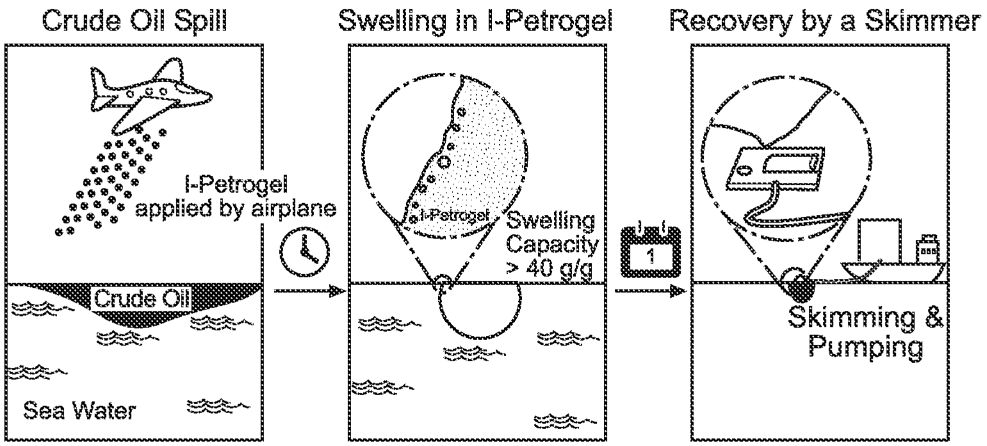
(PRIOR ART) FIG. 4A
FIG. 4A is a prior art schematic illustration showing (i) the application of oil absorbing polymer (i-Petrogel polymer) onto the surface of crude oil spilled on an ocean, (ii) the swelling of the oil absorbing polymer, and (iii) recovery of the absorbed oil in the swelled oil using a skimmer, in accordance with U.S. Pat. No. 9,861,954.
Figure 4B:
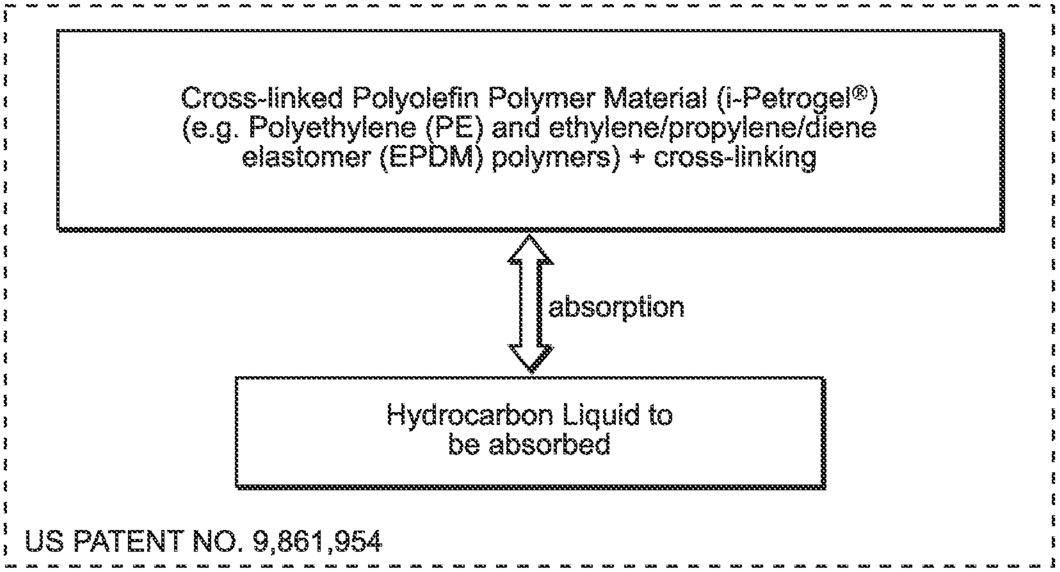
(PRIOR ART) FIG. 4B
FIG. 4B showing a prior art schematic model of i-Petrogel® cross-linked polyolefin polymer material (e.g. Polyethylene (PE) and ethylene/propylene/diene elastomer (EPDM) polymers) absorbed by the crude oil (i.e. hydrocarbon liquid), as specified in U.S. Pat. No. 9,861,954.
Figure 5:
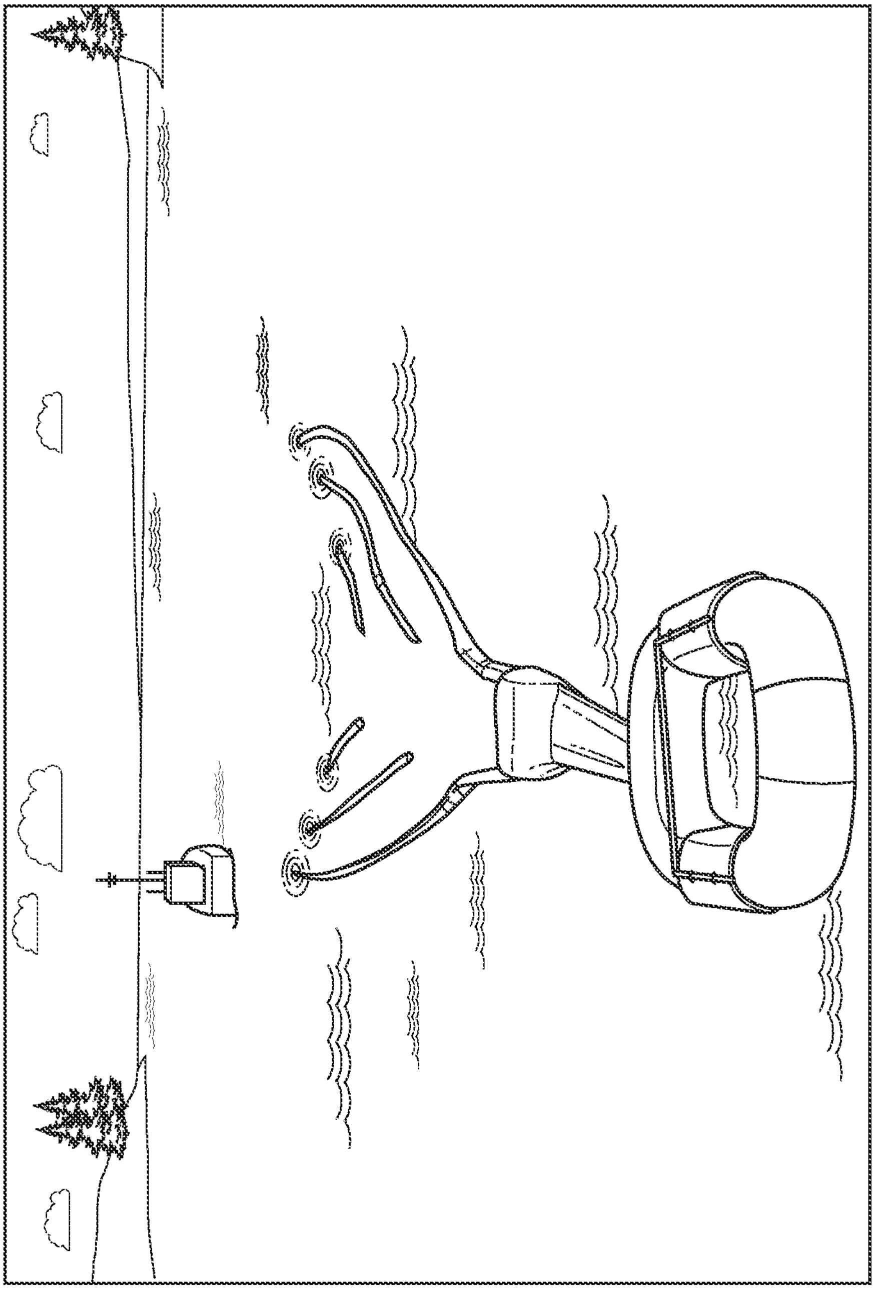
(PRIOR ART) FIG. 5
FIG. 5 is an illustration showing a prior art sweep skimmer using in the collection of spilled oil on an ocean surface.
Figure 6:
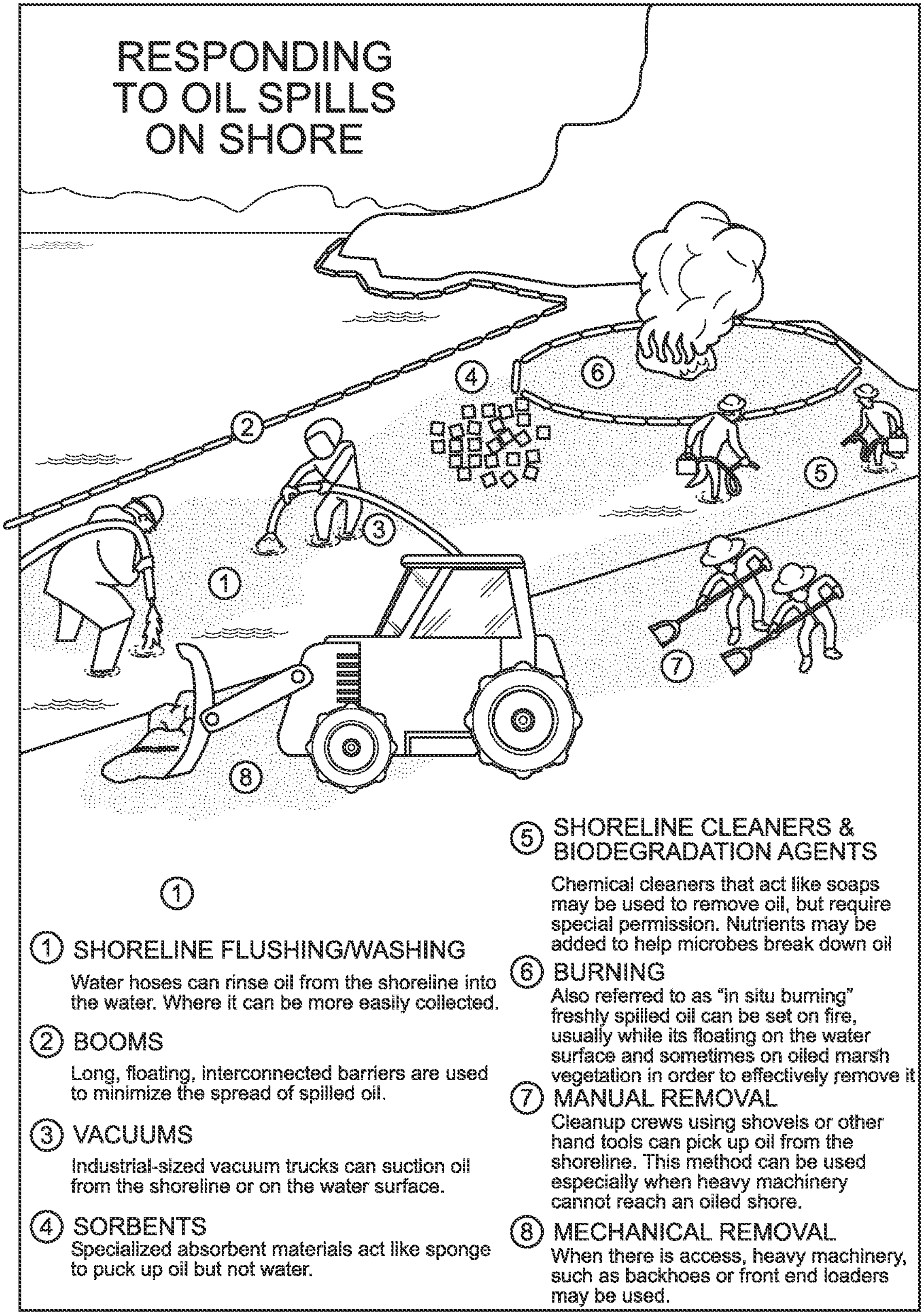
(PRIOR ART) FIG. 6
FIG. 6. is a prior art schematic illustration showing conventional prior art methods for responding to oil spills on shore, including (i) using shoreline flushing/washing equipment with water hoses that rise oil from the shoreline into the water there it can be more easily collected, (ii) using long floating interconnected barriers or booms to minimize the spread of spilled oil, (iii) using industrialized sized vacuum trucks to suction oil from the shoreline or on the water surface, (iv) using specialized absorbent materials or sorbents that act like a sponge to pick up oil but not water, (v) using shoreline cleaners and biodegradation agents (i.e. chemical cleaners) that act like soaps that remove oil, and nutrients may be added to help microbes break down oil, (vi) burning spilled oil in situ, with fire, while it is still floating on the water surface and/or marsh surface, (vii) manual removal using clean-up crews with shovels and other hand tools to pick up oil from the shoreline, and (viii) mechanical removal using heavy machinery such as backhoes and front-end loaders, to remove spilled oil and sludge on shorelines.
Figure 7:
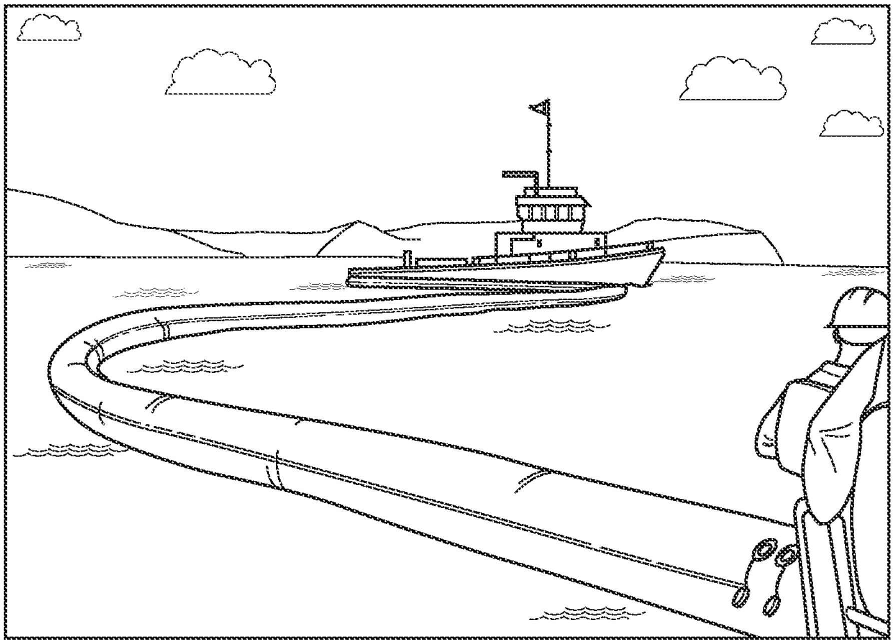
(PRIOR ART) FIG. 7
FIG. 7 is a prior art illustration showing the use of floatable booms to collect and remove spilled oil.

Referring to the accompanying Drawings, like structures and elements shown throughout the figures thereof shall be indicated with like reference numerals.

Figure 23:
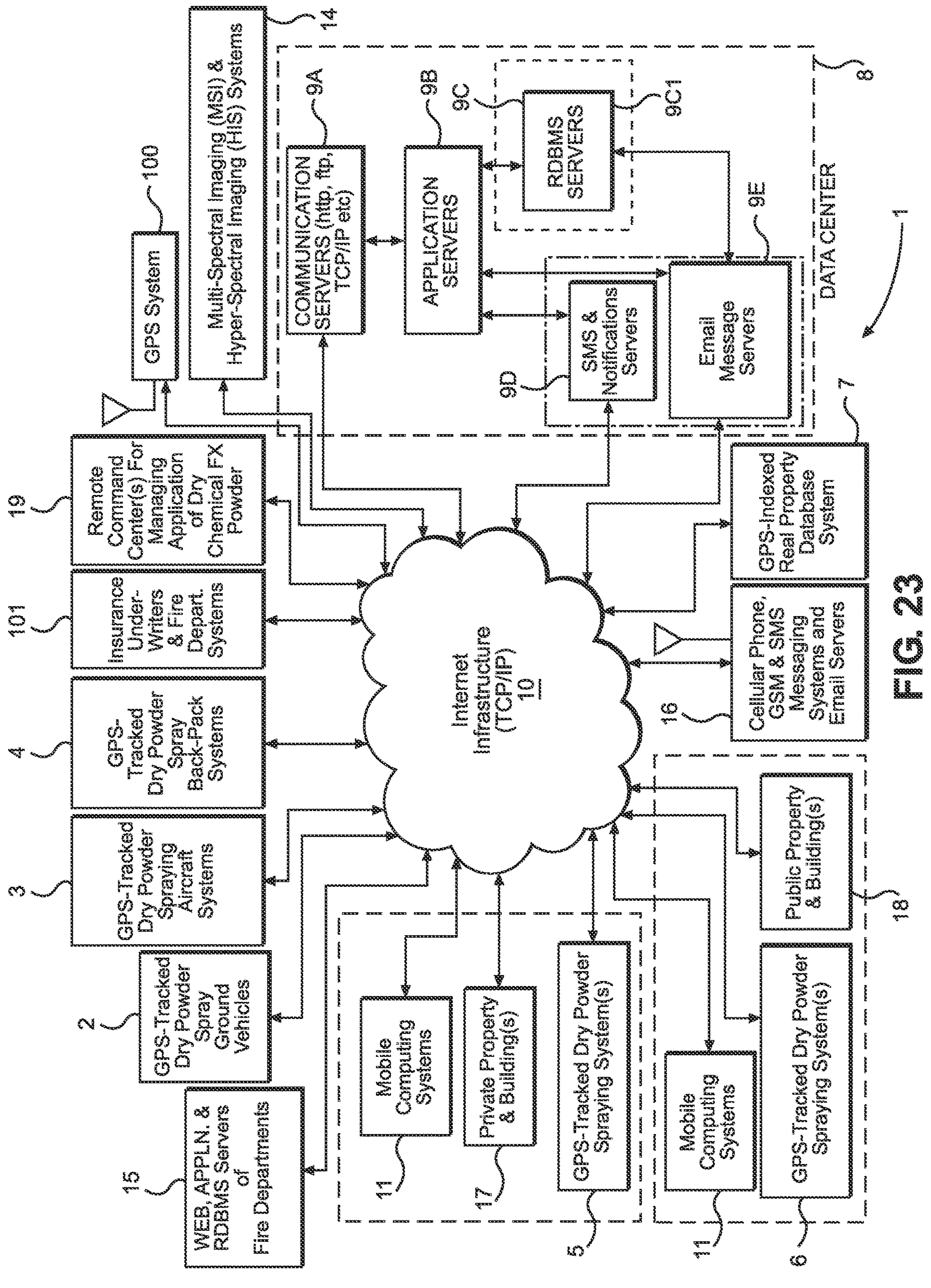
FIG. 23 is schematic representation of the wireless system network of the present invention designed for managing the supply, delivery and spray-application of the environmentally-clean dry powder fire extinguishing composition of the present invention, to extinguish Class A, B, C, D and E fires, and shown comprising GPS-tracked dry chemical powder spray ground vehicles, GPS-tracked dry chemical powder spray air vehicles, GPS-tracked dry chemical powder spray backpack systems, mobile computing systems running the mobile applications used by property owners, residents, fire departments, insurance underwriters, government officials, medical personal and others, remote data sensing and capturing systems for remotely monitoring land and fires wherever they may break out, a GPS system for providing GPS-location services to each and every system components in the system network, and one or more data center containing clusters of web, application and database servers for supporting wire wild alert and notification systems, and microservices configured for monitoring and managing the system and network of GPS-tracking dry chemical powder spraying systems and mobile computing and communication devices configured in accordance with the principles of the present invention.

Wireless System Network for Managing the Supply, Delivery and Spray-Application of Environmentally-Clean Fire Extinguishing Dry Chemical Powder on Property to Reduce the Risks of Damage and/or Destruction Caused by Fire FIG. 23 shows the wireless system network of the present invention 1 designed for managing the supply, delivery and spray-application of environmentally-clean fire extinguishing dry chemical powder compositions of the present invention, onto active fire outbreaks wherever they may occur onshore, offshore, and even in outer space.

As shown, the wireless system network 1 comprises a distribution of system components, namely: GPS-tracked dry chemical powder spray ground vehicles 2 (e.g. all-terrain vehicle, mobile vehicles), as shown in FIGS. 40A, 40B, 40C, 43A and 43B for applying dry chemical powder spray to fire outbreaks anywhere; GPS-tracked dry chemical powder spray air-based vehicles 3, as shown in FIGS. 37A, 37B, 38A, 38B, for applying dry chemical powder spray of the present invention from the air to fire outbreaks anywhere; GPS-tracked mobile dry chemical powder back-pack spraying systems 4 (e.g. including wheel supported, and backpack-carried systems), as shown in FIGS. 36A, 36B, 36C, 36D, 39A, 39B, 42A and 42B, for applying dry chemical powder spray to live fire outbreaks; a GPS-indexed database system 7 for storing the GPS coordinates of the vertices and maps of all land parcels, including private property and building and public property and building, situated in every town, county and state in the region over which the system network 1 is used to manage wild fires as they may occur; a cellular phone, GSM, and SMS messaging systems and email servers, collectively 16; and one or more data centers 8 for monitoring and managing GPS-tracking/GSM-linked dry chemical powder supply and spray systems, including web servers 9A, application servers 9B and database servers 9C (e.g. RDBMS) operably connected to the TCP/IP infrastructure of the Internet 10, and including a network database 9C1, for monitoring and managing the system and network of GPS-tracking dry chemical powder spraying systems and various functions supported by the command center 19, including the management of fire suppression and the GPS-guided application of dry chemical powder over property, as will be described in greater technical detail hereinafter. As shown, each data center 8 also includes an SMS server 9D and an email message server 9E for communicating with registered users on the system network 1 who use a mobile computing device (e.g. an Apple® iPhone or iPad tablet) 11 with the mobile application 12 installed thereon and configured for the purposes described herein. Such communication services will include SMS/text, email and push-notification services known in the mobile communications arts.

As shown in FIG. 23, the GPS-indexed real-property (land) database system 7 will store the GPS coordinates of the vertices and maps of all land parcels contained in every town, county and state of the region over which the system network is deployed and used to manage wild fires as they may occur. Typically, databases and data processing methods, equipment and services known in the GPS mapping art, will be used to construct and maintain such GPS-indexed databases 7 for use by the system network of the present invention, when managing GPS-controlled application of clean dry chemical powder spray and mist over GPS-specified parcels of land, at any given time and date, under the management of the system network of the present invention. Examples of such GPS-indexed maps of land parcels are reflected by the task report shown in FIG. 23, and examples of GPS-indexed maps are shown in the schematic illustrations depicted in FIGS. 18, 20, 22 and 24.

As shown in FIG. 23, the system network 1 also includes a GPS system 100 for transmitting GPS reference signals transmitted from a constellation of GPS satellites deployed in orbit around the Earth, to GPS transceivers installed aboard each GPS-tracking ground-based or air-based dry chemical powder spraying system of the present invention, shown herein, as part of the illustrative embodiments. From the GPS signals it receives, each GPS transceiver aboard such dry chemical powder spraying systems is capable of computing in real-time the GPS location of its host system, in terms of longitude and latitude. In the case of the Empire State Building in NYC, NY, its GPS location is specified as: N40° 44.9064', W073°59.0735'; and in number only format, as: 40.748440, −73.984559, with the first number indicating latitude, and the second number representing longitude (the minus sign indicates "west").

As shown in FIG. 23, the system network 1 further includes multi-spectral imaging (MSI) systems and/or hyper-spectral-imaging (HSI) systems 14 for remotely data sensing and gathering data about wild fires and their progress. Such MSI and HSI systems may be space/satellite-based and/or drone-based (supported on an unmanned airborne vehicle or UAV). Drone-based systems can be remotely-controlled by a human operator, or guided under an artificial intelligence (AI) navigation system. Such AI-based navigation systems may be deployed anywhere, provided access is given to such remote navigation system the system network and its various systems. Typically, the flight time will be limited to under 1 hour using currently available battery technology, so there will be a need to provide provisions for recharging the batteries of such drones/UASs in the field, necessitating the presence of human field personnel to support the flight and remote data sensing and mapping missions of each such deployed drone, flying about raging wild fires, in connection with the system network of the present invention.

Specification of the Network Architecture of the System Network of the Present Invention FIG. 23 illustrates system network 1 implemented as a stand-alone platform deployed on the Internet. As shown, the Internet-based system network comprises: cellular phone and SMS messaging systems and email servers 16 operably connected to the TCP/IP infrastructure of the Internet 10; a network of mobile computing systems 11 running enterprise-level mobile application software 12, operably connected to the TCP/IP infrastructure of the Internet 10; an array of GPS-tracked dry chemical powder spraying systems (30, 40, 50, 60, 70, 80, 90, 110, 120 and 130), each provided with GPS-tracking and having wireless internet connectivity with the TCP/IP infrastructure of the Internet 10, using various communication technologies (e.g. GSM, Bluetooth, WIFI, and other wireless networking protocols well known in the wireless communications arts); and one or more industrial-strength data center(s) 8, preferably mirrored with each other and running Border Gateway Protocol (BGP) between its router gateways, and operably connected to the TCP/IP infrastructure of the Internet 10.

As shown in FIG. 23, each data center 8 comprises: the cluster of communication servers 9A for supporting http and other TCP/IP based communication protocols on the Internet (and hosting Web sites); a cluster of application servers 9B; the cluster of RDBMS servers 9C configured within a distributed file storage and retrieval ecosystem/system, and interfaced around the TCP/IP infrastructure of the Internet well known in the art; the SMS gateway server 9D supporting integrated email and SMS messaging, handling and processing services that enable flexible messaging across the system network, supporting push notifications; and the cluster of email processing servers 9E.

Referring to FIG. 23, the cluster of communication servers 9A is accessed by web-enabled mobile computing clients 11 (e.g. smart phones, wireless tablet computers, desktop computers, computer workstations, etc.) used by many stakeholders accessing services supported by the system network 1. The cluster of application servers 9A implement many core and compositional object-oriented software modules supporting the system network 1. Typically, the cluster of RDBMS servers 9C use SQL to query and manage datasets residing in its distributed data storage environment, although non-relational data storage methods and technologies such as Apache's Hadoop non-relational distributed data storage system may be used as well.

Figure 19:
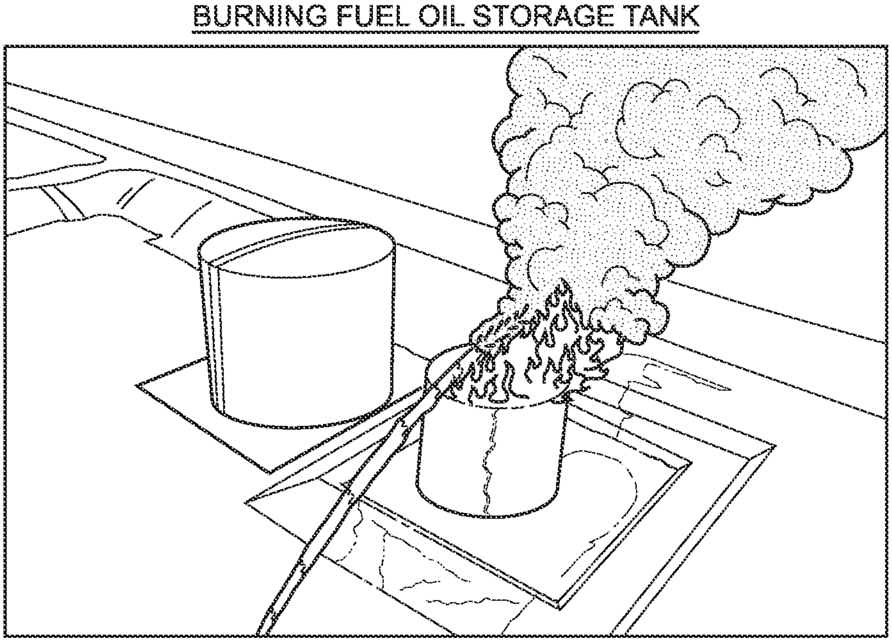
(PRIOR ART) FIG. 19
FIG. 19 is a perspective view of firefighters producing and applying prior art aqueous film forming foam (AFFF) on a live fire outbreak involving a flammable hydrocarbon liquid such as fuel oil stored in a storage tank engulfed in fire.

As shown in FIG. 23, the system network architecture shows many different kinds of users supported by mobile computing devices 11 running the mobile application 12 of the present invention, namely: the plurality of mobile computing devices 11 running the mobile application 12, used by fire departments and firemen to access services supported by the system network 1; the plurality of mobile computing systems 11 running mobile application 12, used by insurance underwriters and agents to access services on the system network 1; the plurality of mobile computing systems 11 running mobile application 12, used by building architects and their firms to access the services supported by the system network 1; the plurality of mobile client systems 11 (e.g. mobile computers such as iPad, and other Internetenabled computing devices with graphics display capabilities, etc.) used by spray-project technicians and administrators, and running a native mobile application 12 supported by server-side modules, and the various illustrative GUIs shown in FIGS. 19 through 19D, supporting client-side and server-side processes on the system network of the present invention; and a GPS-tracked dry chemical powder spraying systems 20, 30, 40 and 50 for spraying buildings and ground cover to provide protection and defense against wild-fires.

In general, the system network 1 will be realized as an industrial-strength, carrier-class Internet-based network of object-oriented system design, deployed over a global data packet-switched communication network comprising numerous computing systems and networking components, as shown. As such, the information network of the present invention is often referred to herein as the "system" or "system network". The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, although not necessary, the entire system of the present invention would be designed according to object-oriented systems engineering (OOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application 12 of the present invention, described above.

Figure 24A:
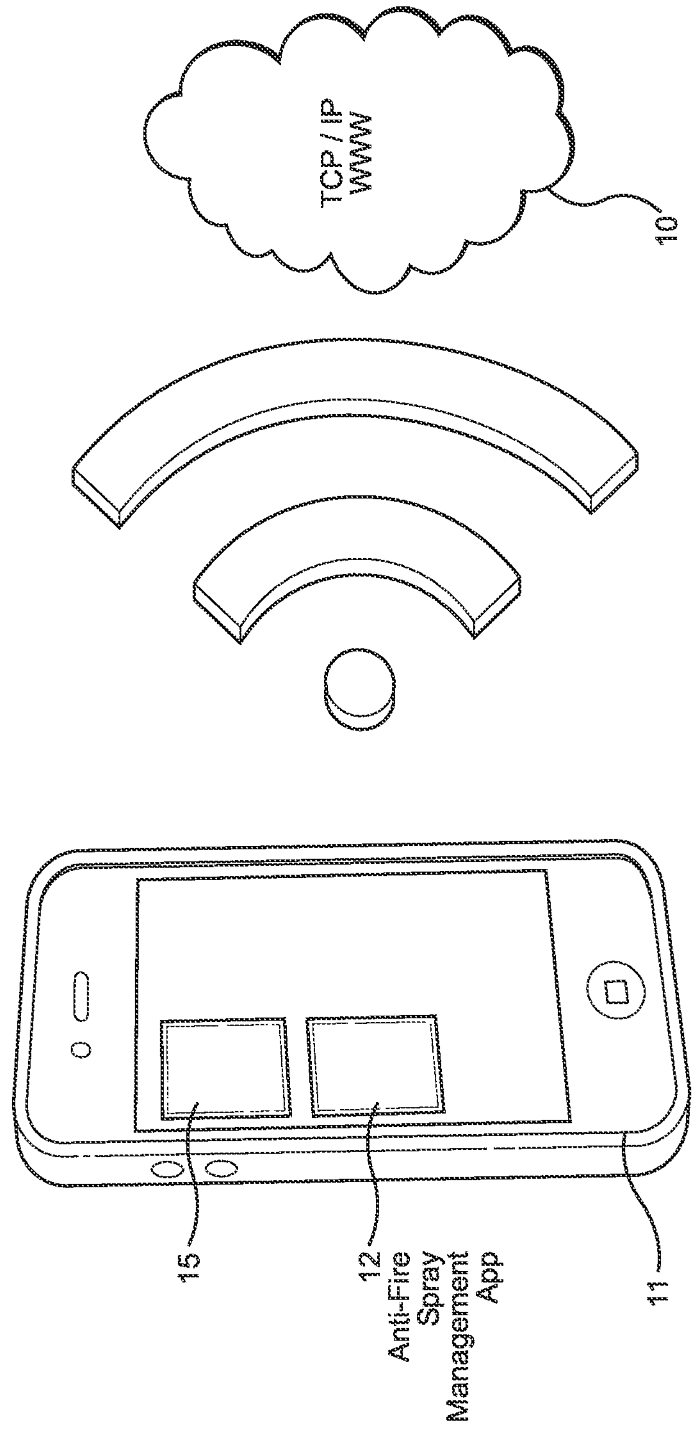
FIG. 24A is a perspective view of an exemplary mobile computing device deployed on the system network of the present invention, supporting the mobile anti-fire spray management application of the present invention deployed as a component of the system network of the present invention as shown in FIG. 23, as well as (ii) conventional fire alert and notification systems.

Specification of System Architecture of an Exemplary Mobile Smartphone System Deployed on the System Network of the Present Invention FIG. 24A shows an exemplary mobile computing device 11 deployed on the system network of the present invention, supporting conventional fire alert and notification systems as well as the mobile dry powder spray management application 12 of the present invention, that is deployed as a component of the system network 1.

Figure 24B:
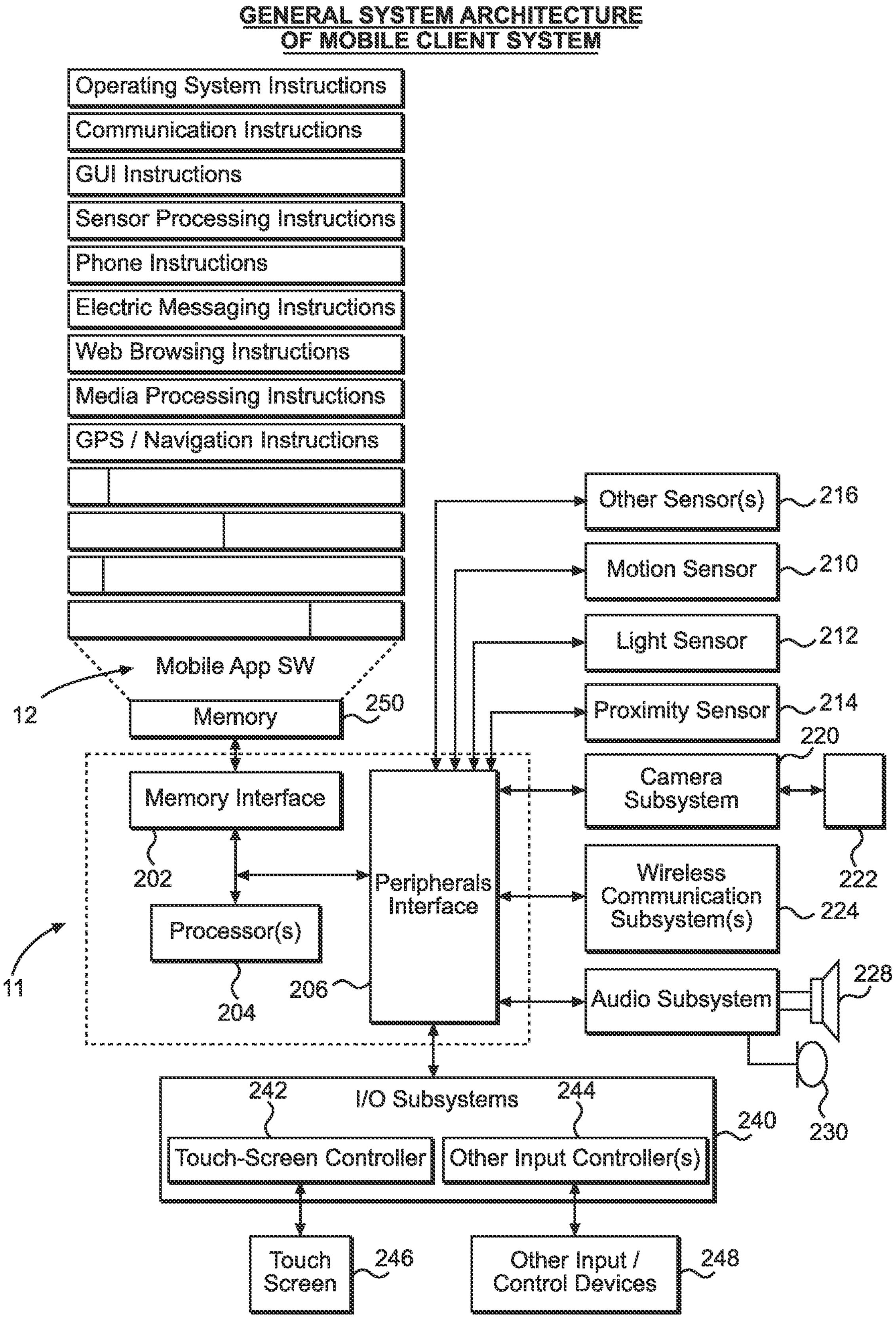
FIG. 24B shows a system diagram for an exemplary mobile client computer system deployed on the system network of the present invention.

FIG. 24B shows the system architecture of an exemplary mobile client computing system 11 that is deployed on the system network 1 and supporting the many services offered by system network servers 9A, 9B, 9C, 9D, 9E. As shown, the mobile smartphone device 11 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 11 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 11 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 11 can be found in U.S. Pat. No. 8,631,358 incorporated herein by reference in its entirety.

Different Ways of Implementing the Mobile Client Machines and Devices on the System Network of the Present Invention In one illustrative embodiment, the enterprise-level system network is realized as a robust suite of hosted services delivered to Web-based client subsystems 1 using an application service provider (ASP) model. In this embodiment, the Web-enabled mobile application 12 can be realized using a web-browser application running on the operating system (OS) (e.g. Linux, Application IOS, etc.) of a mobile computing device 11 to support online modes of system operation, only. However, it is understood that some or all of the services provided by the system network 1 can be accessed using Java clients, or a native client application, running on the operating system of a client computing device, to support both online and limited off-line modes of system operation. In such embodiments, the native mobile application 12 would have access to local memory (e.g. a local RDBMS) on the client device 11, accessible during off-line modes of operation to enable consumers to use certain or many of the system functions supported by the system network during off-line/off-network modes of operation. It is also possible to store in the local RDBMS of the mobile computing device 11 most if not all relevant data collected by the mobile application for any particular fire-protection spray project, and to automatically synchronize the dataset for user's projects against the master datasets maintained in the system network database 9C1, within the data center 8 shown in FIG. 23. This way, when using a native application, during off-line modes of operation, the user will be able to access and review relevant information regarding any building spray project, and make necessary decisions, even while off-line (i.e. not having access to the system network).

As shown and described herein, the system network 1 has been designed for several different kinds of user roles including, for example, but not limited to: (i) property owners, residents, fire departments, local, county, state and federal officials; and (ii) wild fire suppression administrators, contractors, technicians et al registered on the system network. Depending on which role, for which the user requests registration, the system network will request different sets of registration information, including name of user, address, contact information, etc. In the case of a web-based responsive application on the mobile computing device 11, once a user has successfully registered with the system network, the system network will automatically serve a native client GUI, or an HTML5 GUI, adapted for the registered user. Thereafter, when the user logs into the system network, using his/her account name and password, the system network will automatically generate and serve GUI screens described below for the role that the user has been registered with the system network.

In the illustrative embodiment, the client-side of the system network 1 can be realized as mobile web-browser application, or as a native application, each having a "responsive-design" and adapted to run on any client computing device (e.g. iPhone, iPad, Android or other Web-enabled computing device) 11 and designed for use by anyone interested in managing, monitoring and working to defend against the threat of fires.

Specification of Environmentally-Clean Aqueous-Based Liquid Fire Extinguishing Chemical Compositions and Formulations, and Methods of Making the Same in Accordance with the Principles of the Present Invention Another object of the present invention is to provide new and improved environmentally-clean powder-based fire extinguishing chemical solutions (i.e. dry powder compositions) for producing chemical products that demonstrate excellent immediate extinguishing effects when applied to extinguish a burning or smoldering fire.

In general, the novel fire extinguishing dry powder chemical compositions of the present invention comprise: (a) a fire extinguishing agent in the form of at least one alkali metal salt of a nonpolymeric saturated carboxylic acid; (b) free-flow fluidizing agent (e.g. cellulose or gum powder); and (c) surfactant powder; mixed and blended to form the fire extinguishing dry chemical powder composition of the present invention having powder particle size preferably within the range of about 10 microns to about 500 microns, although the size of the powder particles in the dry powder compositions may be within the particular size range from about 5 microns to about 3000 microns, while supporting high fire extinguishing performance of flammable liquid, in accordance with the principles of the present invention. However, it is understood that smaller powder particle sizes outside this range will work well, due to increase surface area of powder to operate on the free radical combustion reaction gases and components of an active fuel fire. However using smaller powder particle sizes, toward nano-powder particle dimensions, may require additional considerations to maintain fluidity and comply to health and safety requirements required by local jurisdictions and particular application environments. Also, while it possible to use powder particle sizes that are larger than the size specified in the range above, it may be necessary to mix and blend additional components to the composition to maintain powder particle fluidity, without degrading its fire extinguishing properties.

Useful alkali metal salts of nonpolymeric saturated carboxylic acids for inclusion in the compositions of the present invention preferably comprise: alkali metal salts of oxalic acid; alkali metal salts of gluconic acid; alkali metal salts of citric acid; and also alkali metal salts of tartaric acid. Alkali metal salts of citric acid are particularly preferred, as will be further explained hereinafter.

Notably, while the efficacy of the alkali metal salts increases in the order of lithium, sodium, potassium, cesium and rubidium, the salts of sodium and salts of potassium are preferred for cost of manufacturing reasons. Potassium carboxylates are very particularly preferred, but tripotassium citrate monohydrate (TPC) is the preferred alkali metal salt for use in formulating the environmentally-clean fire extinguishing chemical compositions of the present invention.

While it is understood that other alkali metal salts are available to practice the chemical compositions of the present invention, it should be noted that the selection of tripotassium citrate as the preferred alkali metal salt, includes the follow considerations: (i) the atomic ratio of carbon to potassium (the metal) in the utilized alkali metal salt (i.e. tripotassium citrate); and (ii) that tripotassium citrate is relatively stable at transport and operating temperatures.

Tripotassium citrate is an alkali metal salt of citric acid (a weak organic acid) that has the molecular formula $C_6H_8O_7$. While citric acid occurs naturally in citrus fruit, in the world of biochemistry, citric acid is an intermediate in the celebrated "Citric Acid cycle, also known as the Krebs Cycle (and the Tricarboxylic Acid Cycle), which occurs in the metabolism of all aerobic organisms. The role that citric acid plays in the practice of the chemical compositions of the present invention will be described in greater detail hereinafter.

The concentration of the fire extinguishing agent in the dry powder composition is preferably in the range from 1% to 95% by weight, preferably from 40% to 60% by weight and more preferably from 50% to 85% by weight, of at least one alkali metal salt of a nonpolymeric saturated carboxylic acid (e.g. tripotassium citrate monohydrate or TPC).

Preferably, the powder fluidizing agent should render the particles in the powder composition to flow easily and not cake up. Powder based surfactants such as natural cellulose (e.g. guar gum) powder and silica powder are preferred powder fluidizing (free-flow) agents when used in combination with tripotassium citrate (TPC) powder.

The concentration of the power fluidizing agent in the dry powder composition is preferably in the range from 0.1% to 3% by weight, preferably from 0.5% to 2% by weight and more preferably from 0.3% to 2.0% by weight, of powder fluidizing agent (e.g. natural cellulose powder or natural gum powder, or silica powder).

Preferably, the surfactant powder (e.g. sodium lauryl ester sulfate powder, or CITREM powder) should reduce the powder composition to flow easily and not cake up. Powder based surfactants such as Sodium Lauryl Ether Sulfate, Powder or CITREM Powder, are preferred powder surfactants when used in combination with tripotassium citrate (TPC) powder.

The concentration of the surfactant agent in the dry powder composition is preferably in the range from 0.1% to 2% by weight, preferably from 0.5% to 1% by weight and more preferably from 0.3% to 0.8% by weight, of fluidizing agent (e.g. sodium lauryl ester sulfate SLES powder, or CITREM powder).

The concentration of the hydrocarbon liquid absorbing polymer employed in the powder compositions specified in FIGS. 26 through 35, is preferably in the range from 1% to 30% by weight, preferably from 5% to 25% by weight and more preferably from 10% to 25% by weight of the hydrocarbon absorbing polymer.

The fire extinguishing dry powder chemical compositions of the present invention are producible and prepared by mixing specified amounts, blending and milling the components to produce the dry powder fire extinguishing compositions with the powder particle sizes taught herein.

The compositions of the present invention are also useful as a fire extinguishing agent for fighting fires of Class A, B, C, D and E. For example, a dry chemical powder of the present invention may be prepared and deployed for firefighting uses in diverse applications.

Specification of Preferred Embodiments of Dry Powder Fire Extinguishing Chemical Compositions of Matter In the first preferred embodiment of the fire extinguishing dry powder chemical composition of the present invention, the components are realized as follows: (a) dry chemical fire extinguishing agent as a powder is realized in the form of an alkali metal salt of a nonpolymeric saturated carboxylic acid, specifically, tripotassium citrate monohydrate powder; (b) a powder fluidizing (i.e. free-flowing) agent is realized in the form of a natural cellulose (e.g. guar or Xanthan gum) powder, or silica powder) to maintain the free-flowing fluid properties of the resulting dry powder composition, and (c) if and as necessary, a surfactant agent in the form of a powder (e.g. sodium lauryl ester sulfate SLES, or citric acid with mono- and diglycerides of fatty acids (CITREM) powder produced from glycerol and fully hydrogenated palm oil) for promoting the formation of an anhydrous semi-crystalline tripotassium citrate film on the surface of flammable hydrocarbon liquids involved in fires being extinguished by the dry powder chemical compositions of the present invention.

Once prepared using any of formulations specified above, the dry powder chemical composition is then stored in a container, bottle or tote (i.e. its package) suitable for the end user application in mind. Then, the filled package should be sealed with appropriate sealing technology and immediately labeled with a specification of (i) its chemical components, with weight percent measures where appropriate, and the date and time of manufacture, printed and recorded in accordance with good quality control (QC) practices well known in the art. Where necessary or desired, barcode symbols and/or barcode/RFID identification tags and labels can be produced and applied to the sealed package to efficiently track each barcoded package containing a specified quantity of clean fire extinguishing chemical composition. All product and QC information should be recorded in globally accessible network database, for use in tracking the movement of the package as it moves along the supply chain from its source of manufacture, toward it end use at a GPS specified location.

Selecting Tripotassium Citrate (TCP) as a Preferred Fire Extinguishing Agent for Use in the Fire Extinguishing Biochemical Compositions of the Present Invention In the preferred embodiments of the present invention, tripotassium citrate (TPC) is selected as active fire extinguishing chemical component in dry powder fire extinguishing chemical composition. In dry form, TPC is known as tripotassium citrate monohydrate ($C_6H_5K_3O_7 \cdot H_2O$) which is the common tribasic potassium salt of citric acid, also known as potassium citrate. It is produced by complete neutralization of citric acid with a high purity potassium source, and subsequent crystallization. Tripotassium citrate occurs as transparent crystals or a white, granular powder. It is an odorless substance with a cooling, salty taste. It is slightly deliquescent when exposed to moist air, freely soluble in water and almost insoluble in ethanol (96%).

Tripotassium citrate is a non-toxic, slightly alkaline salt with low reactivity. It is chemically stable if stored at ambient temperatures. In its monohydrate form, TPC is very hygroscopic and must be protected from exposure to humidity. Care should be taken not to expose tripotassium citrate monohydrate to high pressure during transport and storage as this may result in caking. Tripotassium citrate monohydrate is considered “GRAS” (Generally Recognized As Safe) by the United States Food and Drug Administration without restriction as to the quantity of use within good manufacturing practice. CAS Registry Number:[6100-05-6]. E-Number: E332.

Tripotassium citrate monohydrate (TPC) is a non-toxic, slightly alkaline salt with low reactivity. It is a hygroscopic and deliquescent material. It is chemically stable if stored at ambient temperatures. In its monohydrate form, it is very hygroscopic and must be protected from exposure to humidity. It properties are:

- Monohydrate
- White granular powder
- Cooling, salty taste profile, less bitter compared to other potassium salts
- Odorless
- Very soluble in water
- Potassium content of 36%
- Slightly alkaline salt with low reactivity
- Hygroscopic
- Chemically and microbiologically stable
- Fully biodegradable
- Allergen and GMO free Jungbunzlauer (JBL), a leading Swiss manufacturer of chemicals, manufactures and distributes TPC for food-grade, healthcare, pharmaceutical and over the counter (OTC) applications around the world. As disclosed in JBL’s product documents, TPC is an organic mineral salt which is so safe to use around children and adults alike. Food scientists worldwide have added TPC to (i) baby/infant formula powder to improve the taste profile, (ii) pharmaceuticals/OTC products as a potassium source, and (iii) soft drinks as a soluble buffering salt for sodium-free pH control in beverages, improving stability of beverages during processing, heat treatment and storage.

Alternatively, the dry chemical compositions of the present invention can be practiced using other alkali metal salts of a nonpolymeric saturated carboxylic acid, other than tripotassium citrate. In particular, trisodium citrate Na3C6H5O7 can be used to replace tripotassium citrate in dry chemical compositions, used in quantities similar to tripotassium citrate, and mixed, blended and milled together with other specified components of dry chemical compositions. Also, the dry compositions of the present invention can be practiced by using both tripotassium citrate and trisodium citrate as the fire extinguishing component(s) of the dry chemical compositions of the present invention, in quantities and amounts specified herein, with excellent results. Trisodium citrate is also available from Jungbunzlauer (JBL).

Selecting Sodium Lauryl Ester Sulfate and/or CITREM as a Preferred Surfactant with Surface Tension Reducing Properties for Use in the Fire Extinguishing Powder Compositions of the Present Invention In the preferred illustrative embodiments of the present invention, the surfactant used in the dry powder chemical compositions of the present invention is realized as a food-grade additive component, namely, (e.g. sodium lauryl ester sulfate, or CITREM, Powder) which functions as a surfactant with surface tension reducing properties and surfactant properties as well.

In the dry powder fire extinguishing liquid composition, the powder fluidizing agent functions as free-flowing agent so that dry powder particles, when having particle powder particle size in the range of from about 500 microns to about 10 microns, these powder particles will flow freely and behave much like a fluid, without the addition of water or other fluid solvents.

Figure 45A:
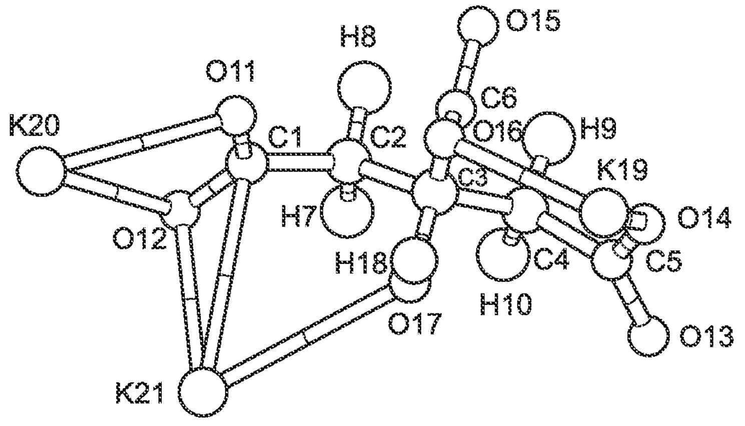
FIG. 45A is a schematic representation illustrating the atoms and atom numbering in the crystal structure of the compound, tripotassium citrate (K3C6H5O7) formed on treated surfaces in accordance with the principles of the present invention.
Figure 45B:
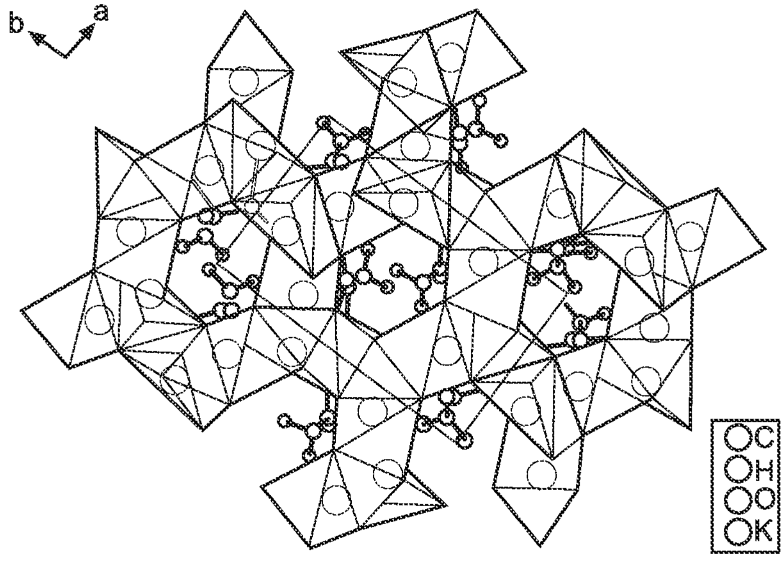
FIG. 45B is a schematic representation of the atomic crystal structure of a small piece of the crystalline structure of tripotassium citrate (K3C6H5O7) salt structure formed on the surface of a flammable liquid involved in a fire extinguished by the dry chemical powder of the present invention.

A relatively minor quantity of dry surfactant powder (e.g. sodium lauryl ester sulfate powder, or CITREM powder) is blended with a major quantity of TCP powder in specific quantities by weight to produce a free-flowing dry powder chemical composition, preferably consisting of food-grade chemicals, having (i) highly effective fire extinguishing properties, as proven by testing, and (ii) being capable of forming a thin essentially dry (anhydrous) film of semi-crystalline tripotassium citrate crystals as illustrated in FIGS. 45A and 45B, when ultimately contacting the surface of the flammable liquid (e.g. a flammable hydrocarbon such as fuel oil, or non-polar solvent such as ketones or alcohol, or a mixture of water containing non-polar solvents). During operation, this dry (anhydrous) film of semi-crystalline tripotassium citrate crystals formed on the flammable liquid surface establishes a film barrier thereon, to the transport of hydrocarbon vapors from the flammable liquid to the ambient environment or combustion phase of an ongoing fire, thereby preventing reignition of the fire by such film-trapped vapors. As such, this surfactant with emulsification properties functions to support the development of an essentially anhydrous film consisting of semi-crystalline tripotassium citrate crystals, by action of the dry film formation powder (or DFFP) composition of the present invention, to be contrasted with the use of conventional aqueous film formation foams or AFFF in conventional firefighting operations.

The resulting dry powder chemical composition of the present invention should remain essentially stable without clumping at expected operating temperatures (e.g. 34 F to 120 F). Also, the powders should freely flow much like a fluid when discharged and sprayed under pressure towards any active fire outbreak, from a portable or fixed fire extinguishing device, so that the discharged dry powder stream is not obstructed away from its fire target by either ambient air currents, produced by wind, turbulence or other sources.

Broadly described, the dry powder fire extinguishing agents of the present invention consist of dry metal salt crystals, combined with powder fluidizing agents and surfactants, that can be discharged and sprayed onto an active fire outbreak involving a flammable liquid or other combustible material. Preferably, the dry powder forms a thin anhydrous film of semi-crystalline tripotassium citrate crystals on the surface thereof, to establish a barrier or film preventing hydrocarbon vapors from flowing towards the combustion phase of the fire, and promote reignition of the fire once it is extinguished by millions of dry powder particles interfering with the free radical chemical reactions in the combustion phase of the fire. This process is illustrated in FIG. 46 for the class of dry power chemical compositions specified in FIG. 25, and in FIGS. 47A and 47B for the class of dry power chemical compositions specified in FIGS. 26 through 35.

When the metal salt crystal powder particles come into contact with the combustion phase of the fire outbreak involving a source of flammable liquid (e.g. hydrocarbon fuel or non-polar solvents), this powder-vapor interaction instantly interferes withs the free-radical chain reactions of the combustion phase of the fire, to stabilize these volatile gases, and suppress and extinguish the fire outbreak, while a residual amount of the dry powder collects on and coats the surface of the flammable fluid, and forms a thin substantially anhydrous film of semi-crystalline tripotassium citrate crystals on the surface thereof, to thereby create a vapor-blocking film barrier preventing hydrocarbon vapors from freely passing through the film barrier to a source of reignition, this preventing or minimizing the reignition of the flammable fuel, while then affording the opportunity to safely and quickly absorb the spilled flammable liquid, in remediation measures that can be immediately taken in two different ways, using the present invention.

Figure 42A:
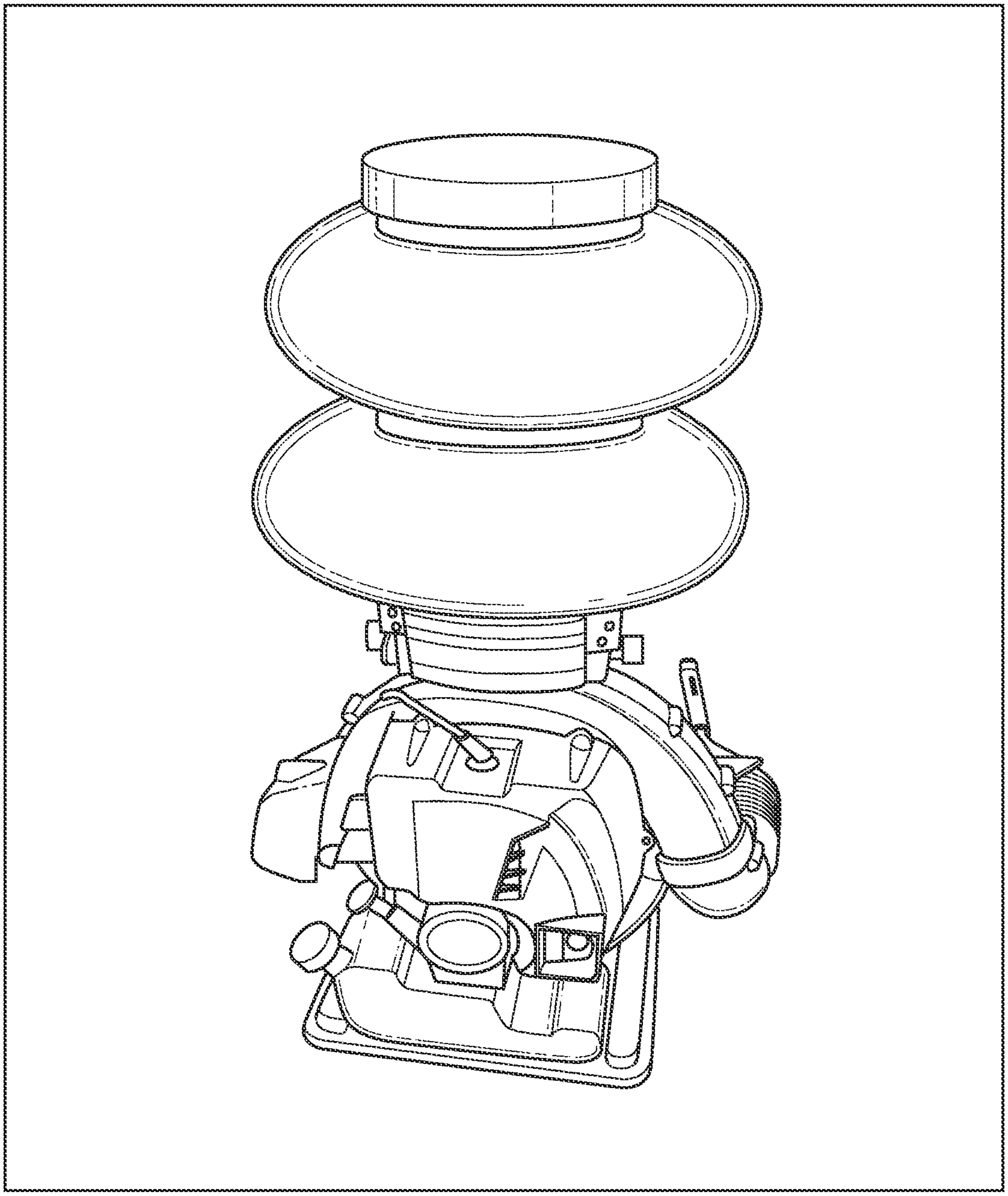
FIG. 42A is a GPS-tracked portable backpack-mounted dry chemical powder spraying system adapted for spraying ground surfaces with environmentally-clean anti-fire dry chemical powder in accordance with the principles of the present invention.
Figure 42B:
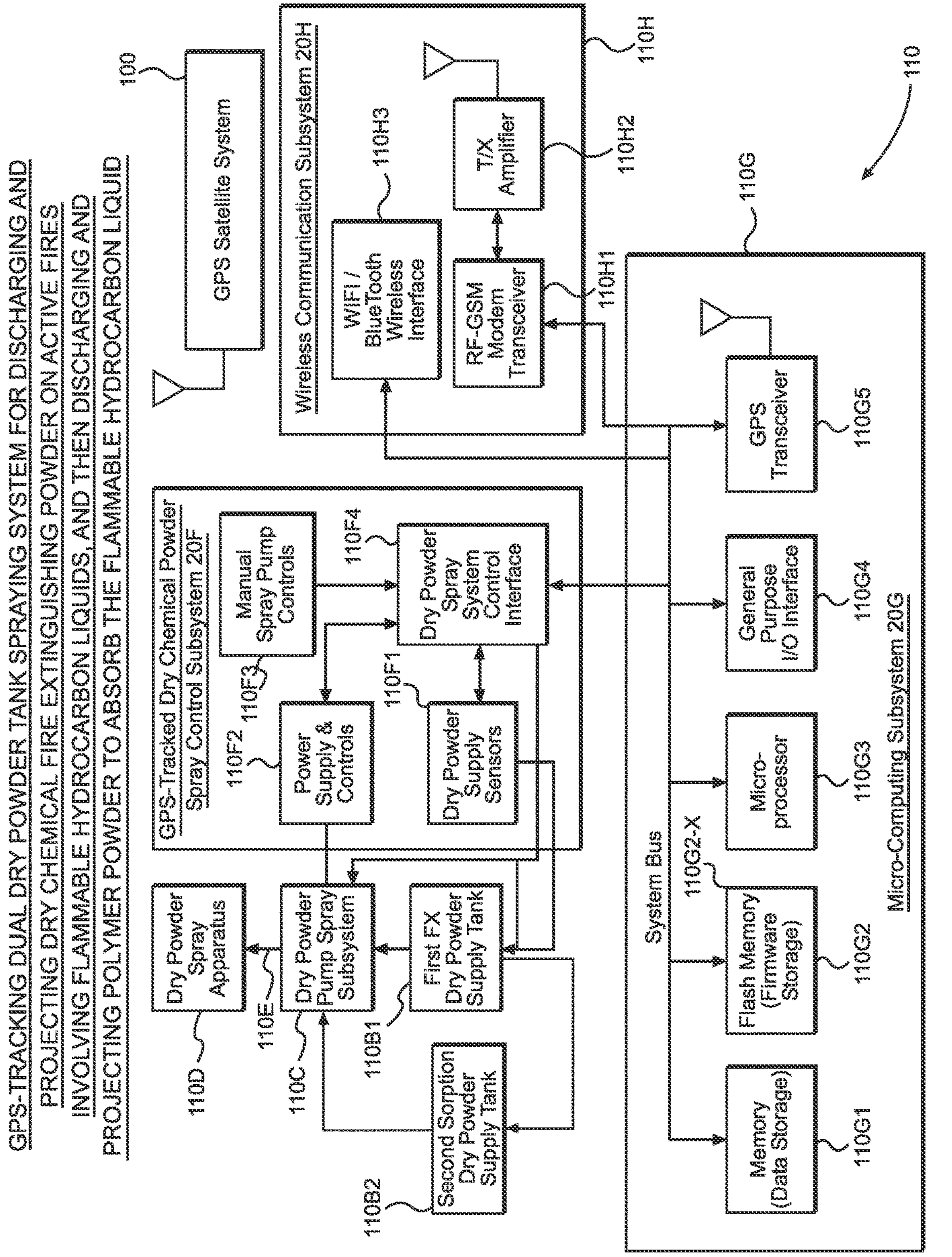
FIG. 42B is the GPS-tracked backpack-mounted dry chemical powder system shown in FIG. 42A, comprising a GPS-tracked and remotely-monitored dry chemical powder spray control subsystem interfaced with a micro-computing platform for monitoring the spraying of environmentally-clean dry chemical powder from the system when located at specific GPS-indexed location coordinates, and automatically logging and recording such dry spray application operations within the network database system.
Figure 46A:
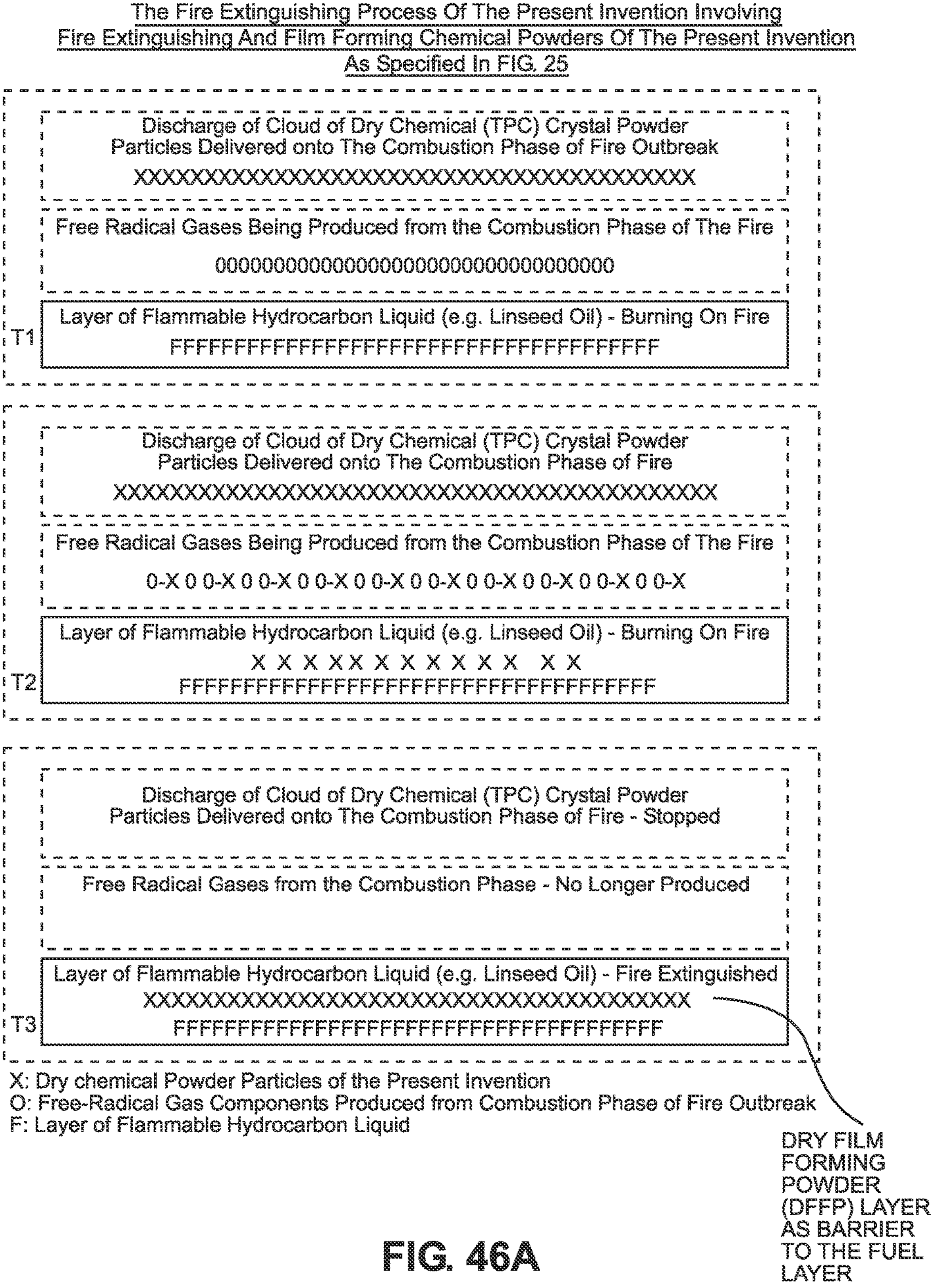
FIG. 46A is a flow chart providing a description the two-step fire extinguishing and liquid absorption process of the present invention involving flammable hydrocarbon liquids, wherein over time intervals T1, T2 and T3, the dry chemical powder composition of the present invention is discharged over an active fire outbreak involving a flammable liquid (e.g. linseed oil), and quickly over time, the power particles quickly extinguish the free radical chemical reactions in the combustion phase of the fire, and ultimately form a thin film of the semi-crystalline material of tripotassium citrate molecules, that provides a barrier to fire ignition of the underlying flammable liquid to prevent reignition of the fire.

The first general method of the firefighting according to the present invention involves discharging a fire extinguishing and film forming dry chemical powder of the present invention as specified in FIG. 25, to quickly extinguish a fire involving a flammable fluid (i.e. Class B Fire) as illustrated in FIG. 46A, and immediately thereafter, discharging dry polymer powders to absorb the flammable fluid after the fire is extinguished by the dry fire extinguishing chemical powder, as illustrated in FIG. 46B. The dual-tank back-pack dry powder spraying equipment shown in FIGS. 42A and 42B is ideal for practicing this method of fire extinguishment and post-fire environmental remediation.

Figure 47:
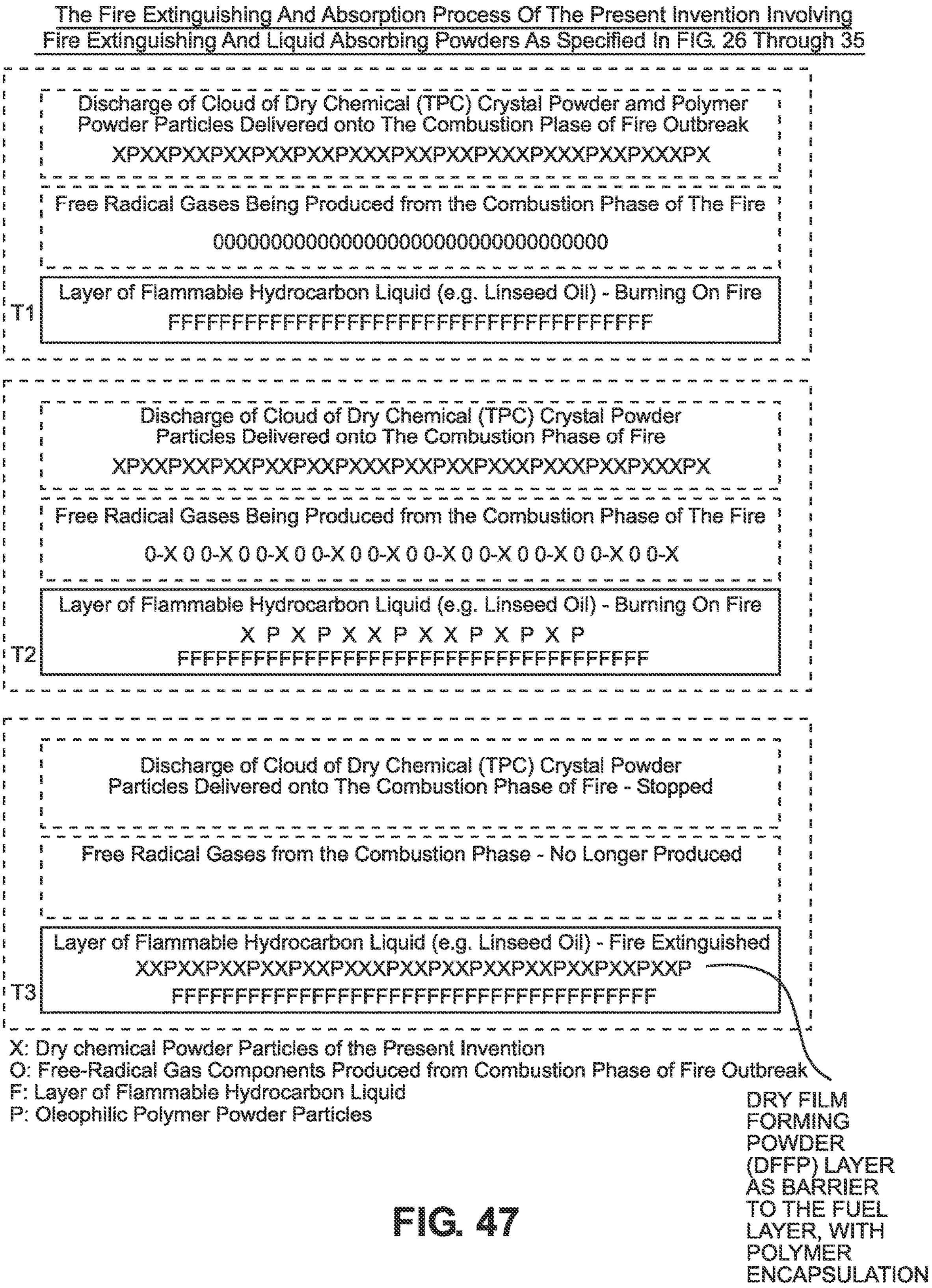
FIG. 47 provides a flow chart describing the one-step fire extinguishing process of the present invention involving flammable hydrocarbon liquids, wherein over time intervals T1, T2 and T3, using the apparatus illustrated in FIGS. 36A, 36B, 36C and 36D, the dry chemical powder composition of the present invention is discharged over an active fire outbreak involving a flammable liquid (e.g. linseed oil), and rapidly, the dry fire-extinguishing chemical power particles quickly extinguish the free radical chemical reactions in the combustion phase of the fire and ultimately form a thin film of the semi-crystalline material of tripotassium citrate molecules on the flammable liquid surface, providing a barrier to fire re-ignition of the underlying flammable liquid, while polymer powder particles of the discharged composition absorb the flammable hydrocarbon liquid, in an safe manner, for environmental cleanup and remediation.

The second general method of the firefighting according to the present invention involves discharging a fire extinguishing and fluid absorbing dry chemical powder of the present invention as specified in FIGS. 26 through 35, into an active fire involving a flammable fluid (i.e. Class B Fire), and to quickly extinguish the fire as illustrated in FIG. 47, while absorbing the flammable fluid as and during the chemical extinguishment of the fire outbreak by the dry fire extinguishing chemical powder. Any of the dry powder spraying equipment shown in FIGS. 36A-41B and 43A are ideal for practicing this method of fire extinguishment and real-time environmental remediation (e.g. fuel absorption).

Specification of Preferred Formulations for the Dry Powder Fire Extinguishing Chemical Compositions of Matter According to the Present Invention Example #1: Dry Powder Fire Extinguishing Chemical Composition FIG. 25 illustrates the primary components of a first environmentally-clean dry chemical fire extinguishing powder composition of the present invention for extinguishing an active fire involving a flammable hydrocarbon liquid, and consisting of: a major amount of tripotassium citrate (TPC) powder; a minor amount of powder fluidizing agent; and a minor amount of surfactant powder for promoting the formation of a thin anhydrous semi-crystalline tripotassium citrate film on the surface of the flammable hydrocarbon liquid; each being mixed, blended and milled into a dry powder composition having a powder particle size in the range of about 500 microns to about 10 microns, and packaged into and sealed within a storage container for storage and ultimate shipment to an end-user location. Example 1: Schematically illustrated in FIG. 25: An environmentally-clean fire-extinguishing dry chemical powder composition is produced by mixing, blending and milling the components to powder particle dimensions for packaging as specified as follows. The composition comprises: 8.0 pounds by weight of tripotassium citrate (64 fluid ounces by volume); 2.5 pounds by weight of natural gum as a powder fluidizing agent; and 0.5 pounds by weight of surfactant (i.e. sodium lauryl ester sulfate SLES powder) to produce a resultant dry powder composition of total weight of 11.0 pounds; wherein each component is mixed, blended and milled into a dry powder composition having a powder particle size of about 50 microns, and packaged into and sealed within a storage container.

Example #2: Dry Powder Fire Extinguishing Chemical Composition

FIG. 26 illustrates the primary components of a second environmentally-clean dry chemical fire extinguishing powder composition of the present invention for extinguishing an active fire involving a flammable hydrocarbon liquid, and consisting of: a major amount of tripotassium citrate (TPC) powder; a minor amount of polymer powder for absorbing flammable hydrocarbon liquids; a minor amount of powder fluidizing agent; and a minor amount of surfactant powder; each being mixed, blended and milled into a dry powder composition having a powder particle size in the range of about 500 microns to about 10 microns, and packaged into and sealed within a storage container for storage and ultimate shipment to an end-user location.

Example 2: Schematically Illustrated in FIG. 26: An Environmentally-Clean Fire-extinguishing dry chemical powder composition is produced by mixing, blending and milling the components to powder particle dimensions for packaging as specified as follows. The composition comprises: 8.0 pounds by weight of tripotassium citrate; 2.5 pounds by weight of polymer powder (i.e. hydrocarbon liquid absorbing polymer powder); 0.4 pounds by weight of natural gum as a powder fluidizing agent; and 0.1 pounds by weight of surfactant (i.e. sodium lauryl ester sulfate SLES powder, or CITREM powder) to produce a resultant dry powder composition of total weight of 11.0 pounds; wherein each component is mixed, blended and milled into a dry powder composition having a powder particle size of about 50 microns, and packaged into and sealed within a storage container.

Example #3: Dry Powder Fire Extinguishing Chemical Composition

FIG. 28 illustrates the primary components of a third environmentally-clean dry chemical fire extinguishing powder composition of the present invention for extinguishing an active fire involving a flammable hydrocarbon liquid, and consisting of: a major amount of tripotassium citrate (TPC) powder; a minor amount of Cross-linked Polyethylene (PE) polymer powder for absorbing flammable hydrocarbon liquids; a minor amount of powder fluidizing agent; and a minor amount of surfactant powder; each being mixed, blended and milled into a dry powder composition having a powder particle size in the range of about 500 microns to about 10 microns, and packaged into and sealed within a storage container for storage and ultimate shipment to an end-user location.

Example 3: Schematically illustrated in FIG. 28: An environmentally-clean fire-extinguishing dry chemical powder composition is produced by mixing, blending and milling the components to powder particle dimensions for packaging as specified as follows. The composition comprises: 8/0 pounds by weight of tripotassium citrate; 2.5 pounds by weight of Cross-linked Polyethylene (PE) powder (i.e. hydrocarbon liquid absorbing polymer powder); 0.4 pounds by weight of natural gum as a powder fluidizing agent; and 0.1 pounds by weight of surfactant (i.e. sodium lauryl ester sulfate SLES powder, or CITREM powder) to produce a resultant dry powder composition of total weight of 11.0 pounds; wherein each component is mixed, blended and milled into a dry powder composition having a powder particle size of about 50 microns, and packaged into and sealed within a storage container.

Example #4: Dry Powder Fire Extinguishing Chemical Composition

FIG. 29 illustrates the primary components of a fourth environmentally-clean dry chemical fire extinguishing powder composition of the present invention for extinguishing an active fire involving a flammable hydrocarbon liquid, and consisting of: a major amount of tripotassium citrate (TPC) powder; a minor amount of Cross-linked Ethylene/Propylene/Diene Elastomer (EPDM) polymer powder for absorbing flammable hydrocarbon liquids; a minor amount of powder fluidizing agent; and a minor amount of surfactant powder; each being mixed, blended and milled into a dry powder composition having a powder particle size in the range of about 500 microns to about 10 microns, and packaged into and sealed within a storage container for storage and ultimate shipment to an end-user location.

Example 4: Schematically illustrated in FIG. 29: An environmentally-clean fire-extinguishing dry chemical powder composition is produced by mixing, blending and milling the components to powder particle dimensions for packaging as specified as follows. The composition comprises: 8.0 pounds by weight of tripotassium citrate; 2.5 pounds by weight of Cross-linked Ethylene/Propylene/Diene Elastomer (EPDM) powder (i.e. hydrocarbon liquid absorbing polymer powder); 0.4 pounds by weight of natural gum as a powder fluidizing agent; and 0.1 pounds by weight of surfactant (i.e. sodium lauryl ester sulfate SLES powder, or CITREM powder) to produce a resultant dry powder composition of total weight of 11.0 pounds; wherein each component is mixed, blended and milled into a dry powder composition having a powder particle size of about 50 microns, and packaged into and sealed within a storage container.

Example #5: Dry Powder Fire Extinguishing Chemical Composition

FIG. 30 illustrates the primary components of a fifth environmentally-clean dry chemical fire extinguishing powder composition of the present invention for extinguishing an active fire involving a flammable hydrocarbon liquid, and consisting of: a major amount of tripotassium citrate (TPC) powder; a minor amount of Cross-linked Polypropylene polymer powder for absorbing flammable hydrocarbon liquids; a minor amount of powder fluidizing agent; and a minor amount of surfactant powder; each being mixed, blended and milled into a dry powder composition having a powder particle size in the range of about 500 microns to about 10 microns, and packaged into and sealed within a storage container for storage and ultimate shipment to an end-user location.

Example 5: Schematically illustrated in FIG. 30: An environmentally-clean fire-extinguishing dry chemical powder composition is produced by mixing, blending and milling the components to powder particle dimensions for packaging as specified as follows. The composition comprises: 8.0 pounds by weight of tripotassium citrate; 2.5 pounds by weight of Cross-linked Polypropylene powder (i.e. hydrocarbon liquid absorbing polymer powder); 0.4 pounds by weight of natural gum as a powder fluidizing agent; and 0.1 pounds by weight of surfactant (i.e. sodium lauryl ester sulfate SLES powder, or CITREM powder) to produce a resultant dry powder composition of total weight of 11.0 pounds; wherein each component is mixed, blended and milled into a dry powder composition having a powder particle size of about 50 microns, and packaged into and sealed within a storage container.

Example #6: Dry Powder Fire Extinguishing Chemical Composition

FIG. 31 illustrates the primary components of a sixth environmentally-clean dry chemical fire extinguishing powder composition of the present invention for extinguishing an active fire involving a flammable hydrocarbon liquid, and consisting of: a major amount of tripotassium citrate (TPC) powder; a minor amount of Cross-linked Polyurethane Polymer for absorbing flammable hydrocarbon liquids; a minor amount of powder fluidizing agent; and a minor amount of surfactant powder; each being mixed, blended and milled into a dry powder composition having a powder particle size in the range of about 500 microns to about 10 microns, and packaged into and sealed within a storage container for storage and ultimate shipment to an end-user location.

Example 6: Schematically illustrated in FIG. 31: An environmentally-clean fire-extinguishing dry chemical powder composition is produced by mixing, blending and milling the components to powder particle dimensions for packaging as specified as follows. The composition comprises: 8.0 pounds by weight of tripotassium citrate; 2.5 pounds by weight of Cross-linked Polyurethane Polymer (i.e. hydrocarbon liquid absorbing polymer powder); 0.4 pounds by weight of natural gum as a powder fluidizing agent; and 0.1 pounds by weight of surfactant (i.e. sodium lauryl ester sulfate SLES powder, or CITREM powder) to produce a resultant dry powder composition of total weight of 11.0 pounds; wherein each component is mixed, blended and milled into a dry powder composition having a powder particle size of about 50 microns, and packaged into and sealed within a storage container.

Example #7: Dry Powder Fire Extinguishing Chemical Composition

FIG. 31 illustrates the primary components of a seventh environmentally-clean dry chemical fire extinguishing powder composition of the present invention for extinguishing an active fire involving a flammable hydrocarbon liquid, and consisting of: a major amount of tripotassium citrate (TPC) powder; a minor amount of Cross-linked Polysiloxane (Silicone) polymer powder for absorbing flammable hydrocarbon liquids; a minor amount of powder fluidizing agent; and a minor amount of surfactant powder; each being mixed, blended and milled into a dry powder composition having a powder particle size in the range of about 500 microns to about 10 microns, and packaged into and sealed within a storage container for storage and ultimate shipment to an end-user location.

Example 7: Schematically illustrated in FIG. 31: An environmentally-clean fire-extinguishing dry chemical powder composition is produced by mixing, blending and milling the components to powder particle dimensions for packaging as specified as follows. The composition comprises: 8.0 pounds by weight of tripotassium citrate; 2.5 pounds by weight of Cured Epoxy Resin Polymer powder (i.e. hydrocarbon liquid absorbing polymer powder); 0.4 pounds by weight of natural gum as a powder fluidizing agent; and 0.1 pounds by weight of surfactant (i.e. sodium lauryl ester sulfate SLES powder, or CITREM powder) to produce a resultant dry powder composition of total weight of 11.0 pounds; wherein each component is mixed, blended and milled into a dry powder composition having a powder particle size of about 50 microns, and packaged into and sealed within a storage container.

Example #8: Dry Powder Fire Extinguishing Chemical Composition

FIG. 32 illustrates the primary components of a eighth environmentally-clean dry chemical fire extinguishing powder composition of the present invention for extinguishing an active fire involving a flammable hydrocarbon liquid, and consisting of: a major amount of tripotassium citrate (TPC) powder; a minor amount of Cross-linked Polysiloxane (Silicone) Polymer powder for absorbing flammable hydrocarbon liquids; a minor amount of powder fluidizing agent; and a minor amount of surfactant powder; each being mixed, blended and milled into a dry powder composition having a powder particle size in the range of about 500 microns to about 10 microns, and packaged into and sealed within a storage container for storage and ultimate shipment to an end-user location.

Example 8: Schematically illustrated in FIG. 32: An environmentally-clean fire-extinguishing dry chemical powder composition is produced by mixing, blending and milling the components to powder particle dimensions for packaging as specified as follows. The composition comprises: 8.0 pounds by weight of tripotassium citrate; 2.5 pounds by weight of Cross-linked Polysiloxane (Silicone) Polymer powder (i.e. hydrocarbon liquid absorbing polymer powder); 0.4 pounds by weight of natural gum as a powder fluidizing agent; and 0.1 pounds by weight of surfactant (i.e. sodium lauryl ester sulfate SLES powder, or CITREM powder) to produce a resultant dry powder composition of total weight of 11.0 pounds; wherein each component is mixed, blended and milled into a dry powder composition having a powder particle size of about 50 microns, and packaged into and sealed within a storage container.

Example #9: Dry Powder Fire Extinguishing Chemical Composition

FIG. 33 illustrates the primary components of a ninth environmentally-clean dry chemical fire extinguishing powder composition of the present invention for extinguishing an active fire involving a flammable hydrocarbon liquid, and consisting of: a major amount of tripotassium citrate (TPC) powder; a minor amount of Cured Epoxy Resin Polymer Powder for absorbing flammable hydrocarbon liquids; a minor amount of powder fluidizing agent; and a minor amount of surfactant powder; each being mixed, blended and milled into a dry powder composition having a powder particle size in the range of about 500 microns to about 10 microns, and packaged into and sealed within a storage container for storage and ultimate shipment to an end-user location.

Example 9: Schematically illustrated in FIG. 33. An environmentally-clean fire-extinguishing dry chemical powder composition is produced by mixing, blending and milling the components to powder particle dimensions for packaging as specified as follows. The composition comprises: 8.0 pounds by weight of tripotassium citrate; 2.5 pounds by weight of Cured Epoxy Resin Polymer Powder (i.e. hydrocarbon liquid absorbing polymer powder); 0.4 pounds by weight of natural gum as a powder fluidizing agent; and 0.1 pounds by weight of surfactant (i.e. sodium lauryl ester sulfate SLES powder, or CITREM powder) to produce a resultant dry powder composition of total weight of 11.0 pounds; wherein each component is mixed, blended and milled into a dry powder composition having a powder particle size of about 50 microns, and packaged into and sealed within a storage container.

Example #10: Dry Powder Fire Extinguishing Chemical Composition

FIG. 34 illustrates the primary components of a tenth environmentally-clean dry chemical fire extinguishing powder composition of the present invention for extinguishing an active fire involving a flammable hydrocarbon liquid, and consisting of: a major amount of tripotassium citrate (TPC) powder; a minor amount of polymer blend powder for absorbing flammable hydrocarbon liquids; a minor amount of powder fluidizing agent; and a minor amount of surfactant powder; each being mixed, blended and milled into a dry powder composition having a powder particle size in the range of about 500 microns to about 10 microns, and packaged into and sealed within a storage container for storage and ultimate shipment to an end-user location.

Example 10: Schematically illustrated in FIG. 34. An environmentally-clean fire-extinguishing dry chemical powder composition is produced by mixing, blending and milling the components to powder particle dimensions for packaging as specified as follows. The composition comprises: 8.0 pounds by weight of tripotassium citrate; 2.5 pounds by weight of polymer blend powder (i.e. hydrocarbon liquid absorbing polymer powder); 0.4 pounds by weight of natural gum as a powder fluidizing agent; and 0.1 pounds by weight of surfactant (i.e. sodium lauryl ester sulfate SLES powder, or CITREM powder) to produce a resultant dry powder composition of total weight of 11.0 pounds; wherein each component is mixed, blended and milled into a dry powder composition having a powder particle size of about 50 microns, and packaged into and sealed within a storage container.

Example #11: Basalt Fiber Based Dry Powder Chemical Composition for Absorbing Flammable Hydrocarbon Liquid and Inhibiting Fire Ignition FIG. 48 illustrates the primary components of an eleventh environmentally-clean dry chemical powder composition of the present invention adapted for absorbing flammable hydrocarbon liquid and inhibiting fire ignition thereof, when spilled on water as well as on land. Specifically, the environmentally-clean dry chemical powder composition is adapted for absorbing flammable hydrocarbon liquid and inhibiting fire ignition and/or extinguishing an active fire involving the absorbed flammable hydrocarbon liquid. In the illustrative embodiment, the environmentally-clean dry chemical powder composition comprises: a major amount of tripotassium citrate (TPC) powder; a major amount of liquid hydrocarbon sorbent powder material having oleophilic/hydrophobic absorption properties, and a minor amount of free-flow fluidizing agent mixed, blended together and milled to form the environmentally-clean dry chemical powder composition.

Preferably, the liquid hydrocarbon sorbent powder material comprises oleophilic/hydrophobic fiber material, and the preferred oleophilic/hydrophobic fiber material comprises basalt fiber, or any other natural or synthetic fiber having oleophilic/hydrophobic properties for the purpose at hand.

In a preferred embodiment, the environmentally-clean dry powder chemical composition has a powder particle size in the range of about 3000 microns to about 10 microns, and is packaged within a container. Preferably, the powder fluidizing agent comprises natural gum powder. In another embodiment, the environmentally-clean dry chemical powder composition further comprises: a minor amount of surfactant powder for promoting the formation of a thin anhydrous semi-crystalline tripotassium citrate film on the surface of a flammable hydrocarbon liquid. Preferably, the surfactant is selected from the group consisting of triethyl citrate (TEC), sodium lauryl ester sulfate (SLES), and CITREM hydrophilic emulsifier.

In the preferred embodiment, the environmentally-clean dry chemical powder composition is produced by mixing, blending and milling the components to powder particle dimensions and in amounts proportional to the weights specified as follows, comprising:

- about 8.0 pounds by weight of tripotassium citrate;
- about 2.5 pounds by weight of basalt fiber strands for absorbing (flammable) hydrocarbon liquid;
- about 0.4 pounds by weight of natural gum as a powder fluidizing agent; and
- about 0.1 pounds by weight of surfactant to produce a resultant dry powder composition of total weight of about 11.0 pounds;
- wherein each component is mixed, blended and milled into a dry powder composition, and packaged within a container.

Preferred Weights Percentages of the Components of the Fire Extinguishing Dry Chemical Compositions of the Present Invention In the dry chemical powder compositions of the present invention, the ratio of the alkali metal salt of a nonpolymeric carboxylic acid (e.g. tripotassium citrate) to the hydrocarbon liquid absorbing polymer may be a major amount between 1:100: to 1:1000 and is typically in the range from 1:1 to 1:100, preferably in the range from 1:2 to 1:50, more preferably in the range from 1:4 to 1:25 and most preferably in the range from 1:8 to 1:15.

A preferred dry powder chemical composition according to the present invention comprises: (a) a major amount from 1% to 95% by weight, preferably from 40% to 60% by weight and more preferably from 50% to 85% by weight, of at least one alkali metal salt of a nonpolymeric saturated carboxylic acid (e.g. tripotassium citrate monohydrate or TPC); (b) a minor amount from 1% to 30% by weight, preferably from 5% to 25% by weight and more preferably from 10% to 25% by weight, of hydrocarbon liquid absorbing polymer; (c) a minor amount from 0.1% to 3% by weight, preferably from 0.5% to 2% by weight and more preferably from 0.3% to 2.0% by weight, of fluidizing agent (e.g. natural cellulose powder or natural gum powder, or silica powder); and (d) a minor amount from 0.1% to 2% by weight, preferably from 0.5% to 1% by weight and more preferably from 0.3% to 0.8% by weight, of fluidizing agent (e.g. sodium lauryl ester sulfate SLES powder, or CITREM powder); wherein the sum by % weight of the components (a), (b), (c) and (d) should not exceed 100% by weight.

The rheology of the dry powder compositions is preferably about 5 [mPas] (millipascal-seconds, in SI units, defined as the internal friction of a liquid to the application of pressure or shearing stress determined using a rotary viscometer), and preferably not more than 50 [mPas], or 50 centipois) [cps], for most dry powder fire extinguishing applications.

Specification of the Methods of Producing the Dry Powder Fire Extinguishing Chemical Compositions of the Present Invention Once the fire extinguishing chemical compositions are prepared in accordance with the formations described above, the mixture is milled to the desired power particle dimensions using milling equipment and particle size instrumentation, well known in the art. Thereafter, the final dry powder compositions are packaged, barcoded with chain of custody information and then either stored, or shipped to its intended destination for use and application in accordance with present invention. As described herein, preferred method of surface coating application is using, for example, a dry powder sprayer adapted for spraying the fire extinguishing powder compositions onto an active fire, to extinguish the same, and also absorb the liquid hydrocarbons that may remain after extinguishment. Any of the other methods of and apparatus for spraying and GPS-tracking fire extinguishing powers of the present invention taught herein, as shown in FIGS. 23 through 44A, can be used with excellent results.

Useful Applications for the Fire Extinguishing Dry Powder Compositions of the Present Invention As disclosed, the fire extinguishing powder compositions of the present invention are very useful in: extinguishing active fires by application of the fire extinguishing powders onto the fire to suppress and extinguish the fire, as illustrated herein.

The compositions of the present invention can be also used for example for firefighting in forests, tire warehouses, landfill sites, coal stocks, oil fields, timberyards and mines, for fighting active fires from the air, using airplanes, helicopters and drones, as illustrated herein in FIGS. 37A, 37B, 38A and 38B.

Figure 44A:
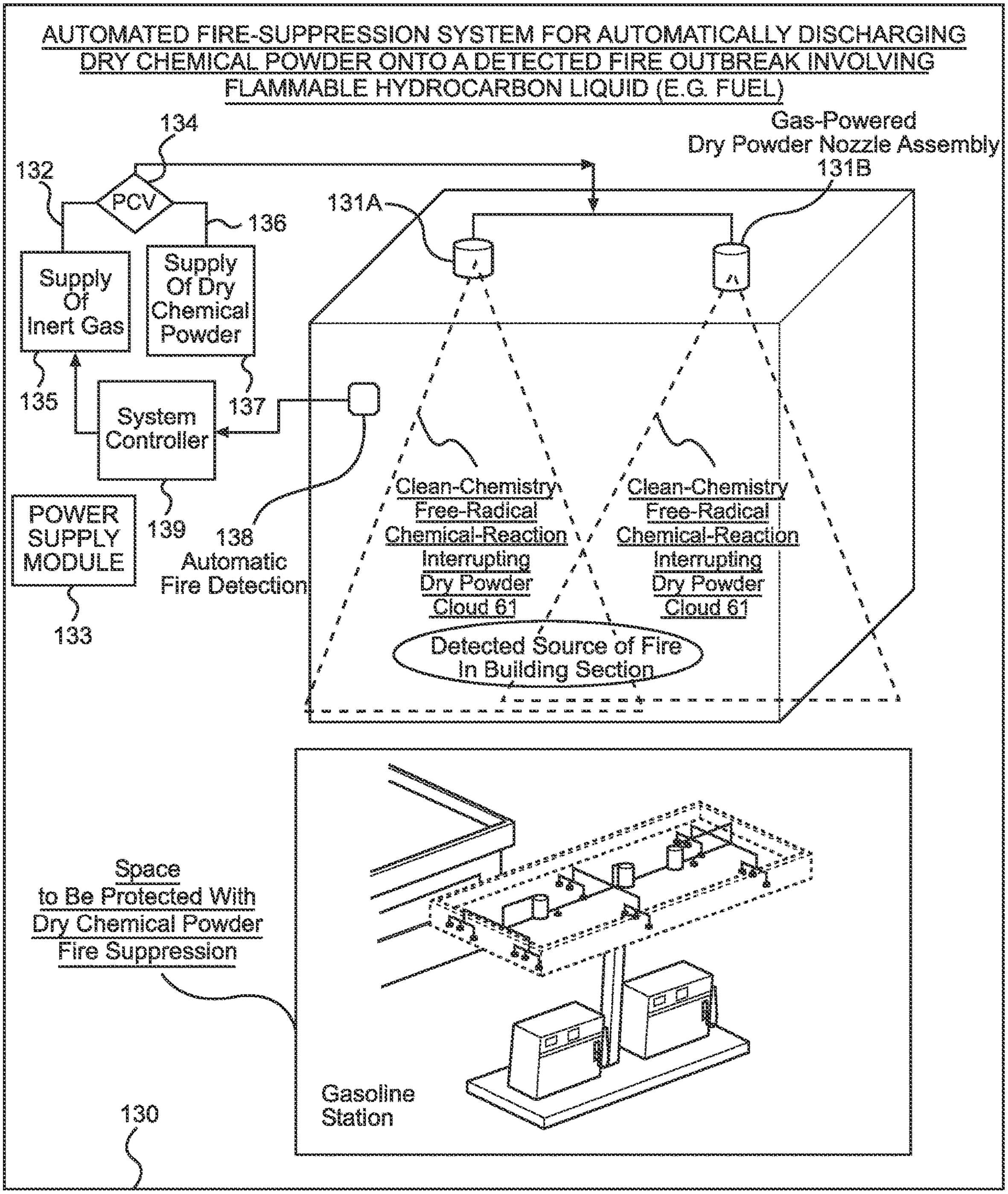
FIG. 44A is a GPS-tracked automatically discharging dry chemical powder fire extinguishing system adapted for extinguishing active fires outbreaks involving flammable liquids and gases, using environmentally-clean dry chemical powder fire extinguishing compositions, formulated in accordance with the principles of the present invention.
Figure 44B:
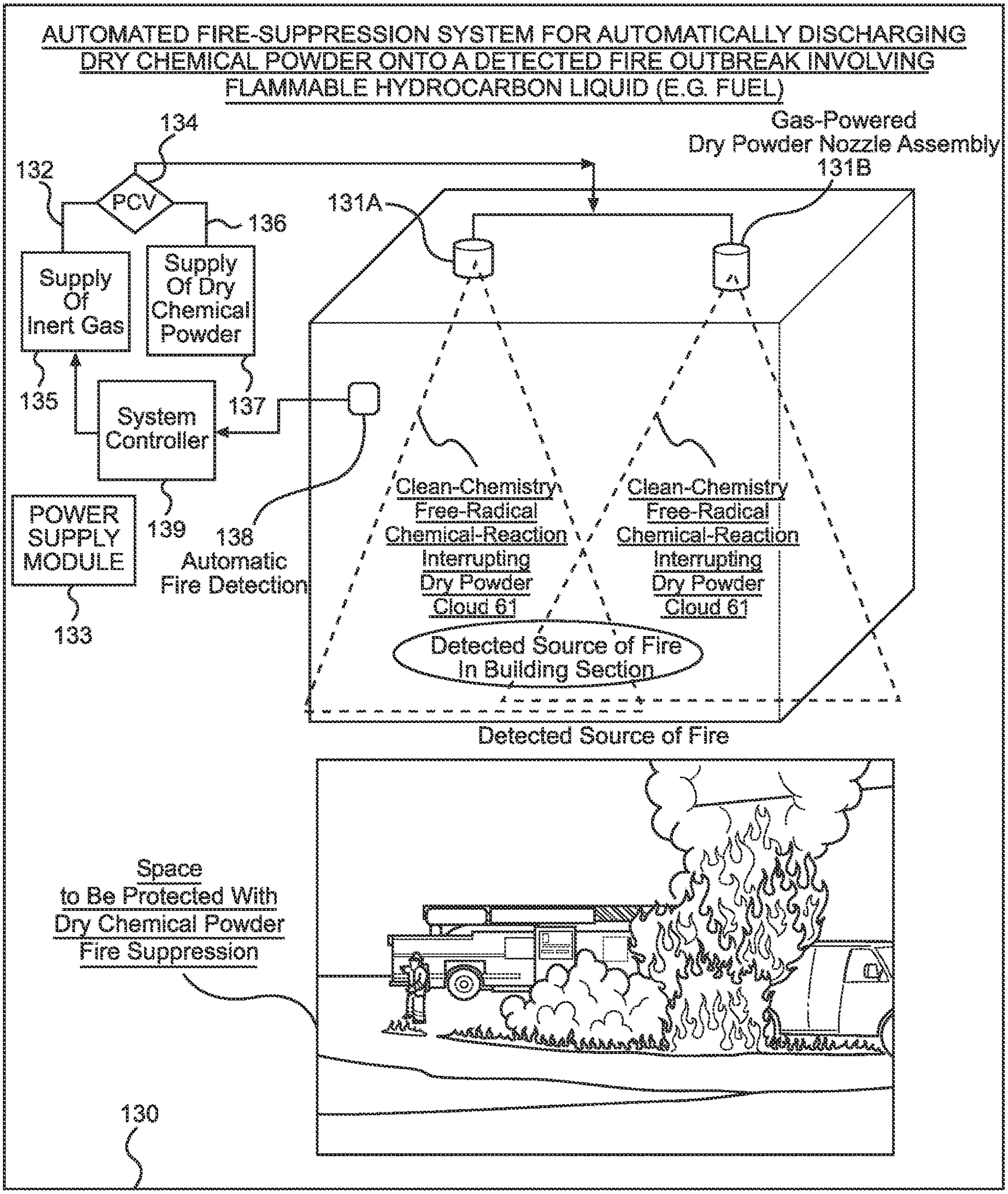
FIG. 44B is the system diagram of the dry powder fire extinguishing system depicted in FIG. 44A and configured at a gasoline station with fuel pumps, comprising a supply of dry chemical powder as fire extinguishing agent, pressurized by a supply of inert gas such as N2 or CO2, supplied to a system of dry powder spray nozzles mounted in the gasoline station above the pumps to automatically discharge the supply of dry chemical powder under pressure of the insert gas supply, over the automatically detected fire outbreak involving a flammable liquid such as gasoline or diesel fuel, as the case may be, and quickly extinguish the fire outbreak.

The dry powder compositions of the present invention can be used as a fire extinguishing agent dispensed from a hand-held device as show in FIGS. 39A, 39B, 41A and 41B, or automated dry powder dispensing systems under real-time sensor control as shown in FIGS. 44A and 44B. The fire extinguishing chemical compositions of the present invention are useful in extinguishing Class A, B, C, D and E fires.

The dry powder fire extinguishing chemical compositions of the present invention are further useful as fire extinguishing agents in fire extinguishers and/or fire extinguishing systems, and also via existing fire extinguishing pumps and fittings. Such fire extinguishers include, for example, portable and/or mobile fire extinguishers shown in FIG. 39A, 39B, 41A, 41B, as well as fixed installations as shown in FIGS. 44A and 44B, such as dry powder discharge systems disclosed in Applicant's US Patent Application Publication No. US2019/168047, incorporated herein by reference.

In the preferred embodiments of the compositions of the present invention, potassium citrate salts are utilized in the chemical formulations and are very readily biodegradable without harm or impact to the natural environment. This is highly advantageous especially in relation to the defense of towns, communities, home owner associations (HOAs), homes, business buildings and other forms of property, from the destructive impact of fires, using the fire extinguishing compositions of the present invention.

Figure 36A:
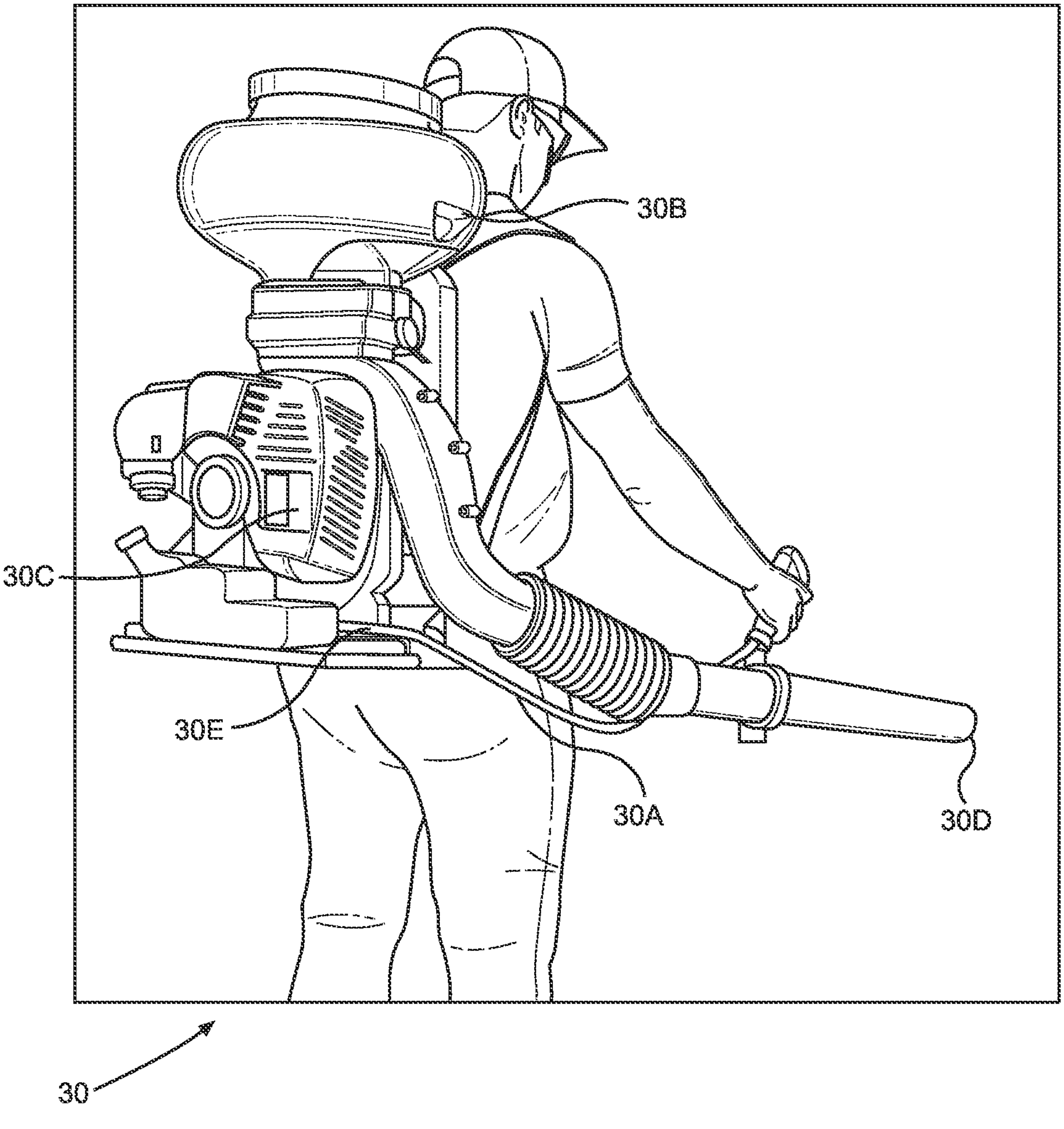
FIG. 36A is a GPS-tracked portable backpack-mounted dry chemical powder spraying system adapted for spraying dry chemical powder of the present invention onto fire outbreaks in accordance with the principles of the present invention.

Specification of the Mobile GPS-Tracked Dry Chemical Powder Spraying System of the Present Invention FIG. 36A shows a mobile GPS-tracked dry chemical powder spraying system 20 supported on a set of wheels 20A, having an integrated supply tank 20B and rechargeable-battery operated electric spray pump 20C with portable battery module (20C), for deployment at properties having building structures, for spraying the same with environmentally-clean dry chemical powder using a spray nozzle assembly 20D connected to the spray pump 20C by way of a flexible hose 20E.

Figure 36B:
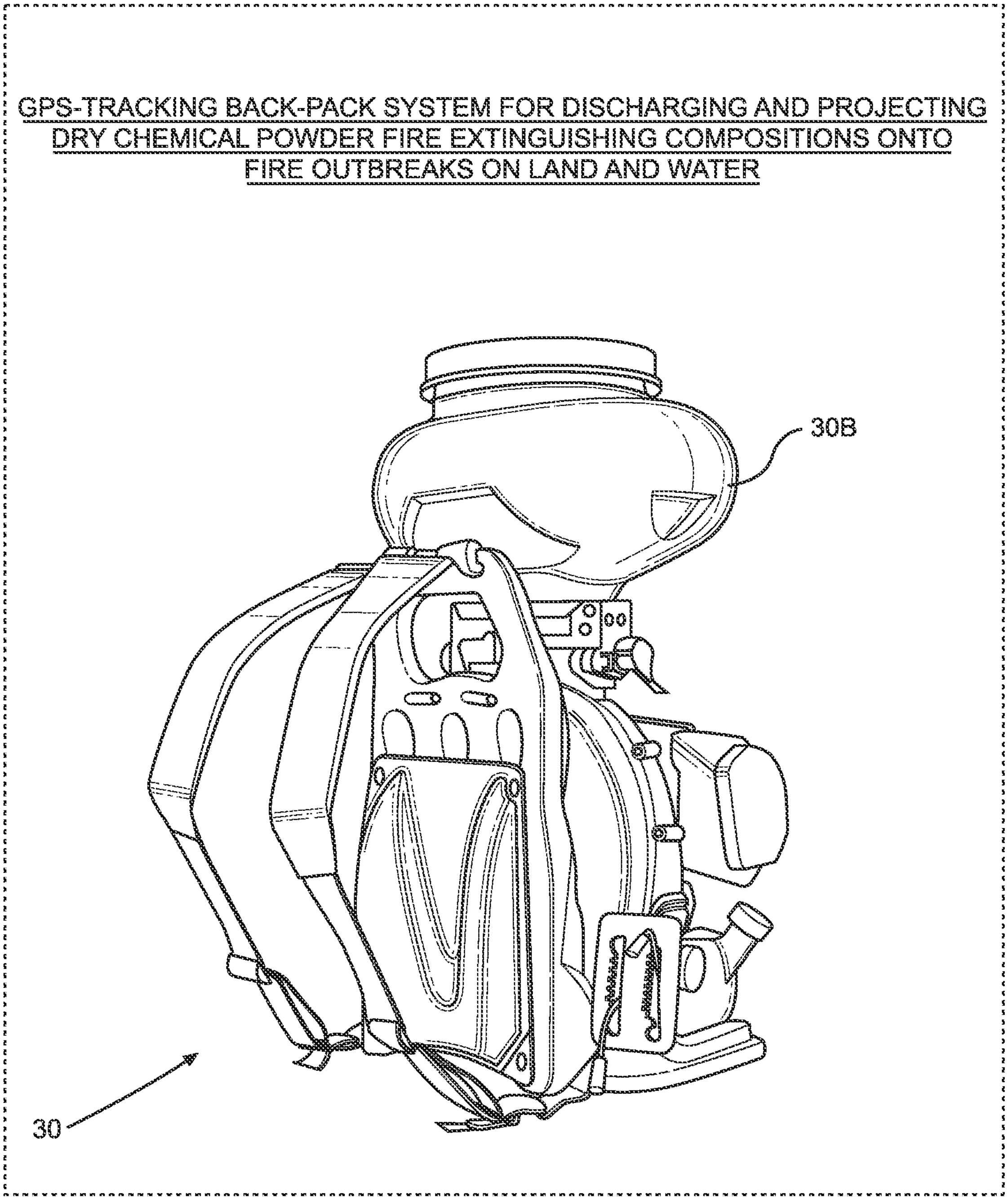
FIG. 36B is a rear perspective view of the GPS-tracked portable backpack-mounted dry chemical powder spraying system shown in FIG. 36A.
Figure 36C:
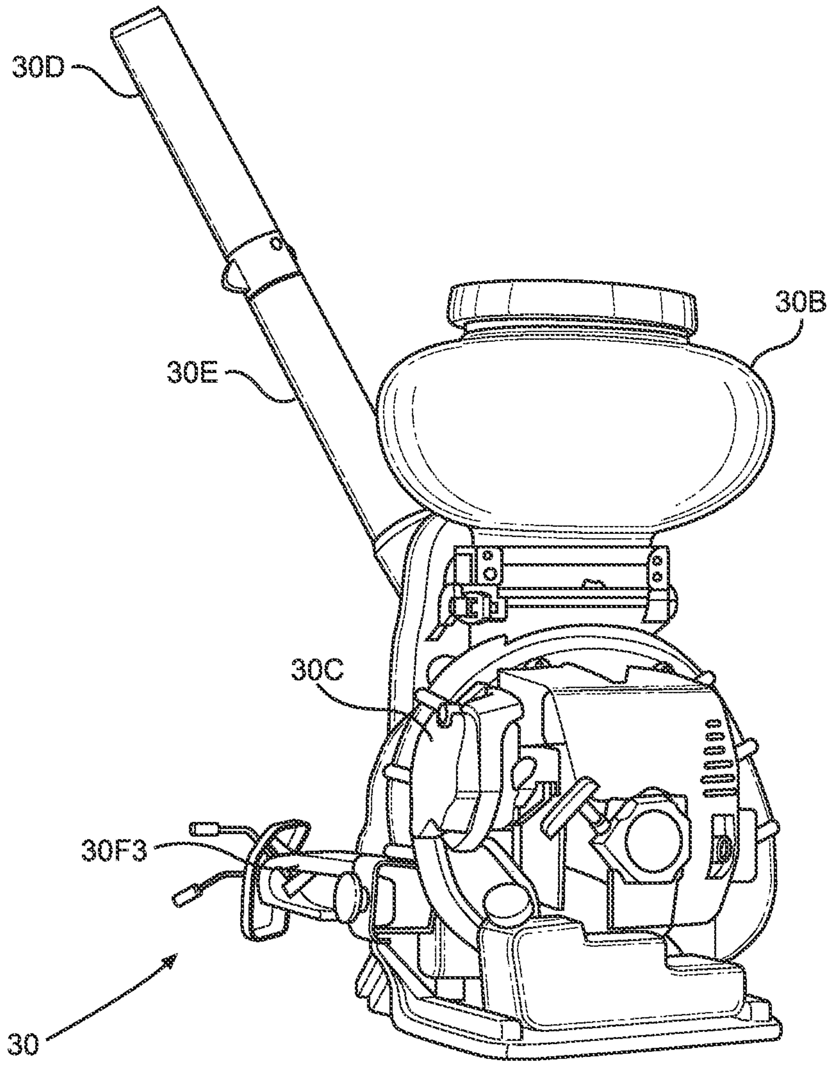
FIG. 36C is a front perspective view of the GPS-tracked portable backpack-mounted dry chemical powder spraying system shown in FIGS. 36A and 36B.
Figure 36D:
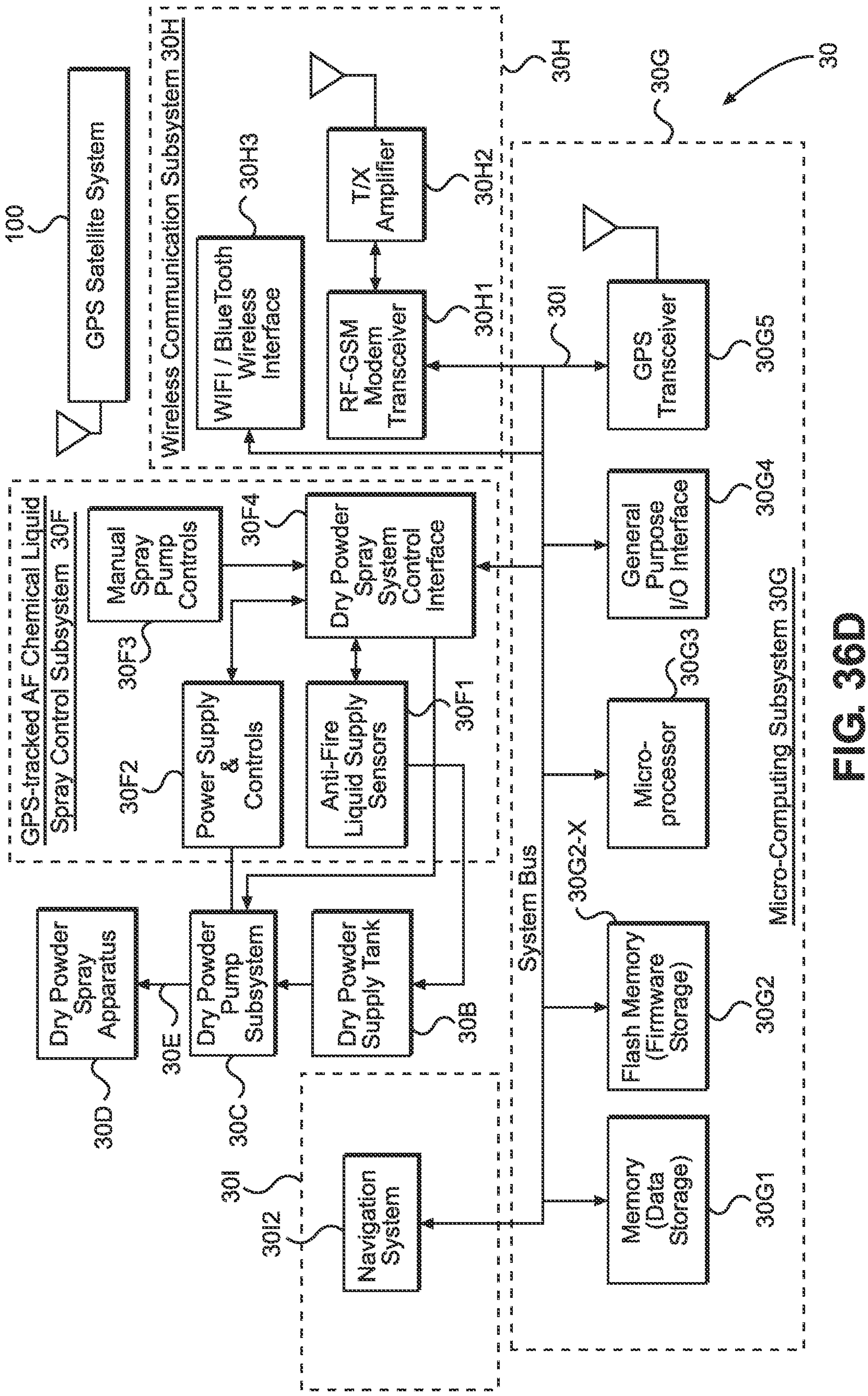
FIG. 36D is the GPS-tracked backpack-mounted atomizing spraying system shown in FIGS. 36A, 36B and 36C comprising a GPS-tracked and remotely-monitored dry powder spray control subsystem interfaced with a micro-computing platform for monitoring the spraying of environmentally-clean dry chemical powder from the system when located at specific GPS-indexed location coordinates, and automatically logging and recording such powder spray application operations within the network database system.

FIG. 36B shows the GPS-tracked mobile dry chemical powder spraying system 30 of FIG. 36A as comprising a number of subcomponents, namely: a GPS-tracked and remotely-monitored dry chemical powder spray control subsystem 30F; a micro-computing platform or subsystem 30G interfaced with the GPS-tracked and remotely-monitored dry chemical powder spray control subsystem 30F by way of a system bus 30I; and a wireless communication subsystem 30H interfaced to the micro-computing platform 30G via the system bus 30I. As configured, the GPS-tracked mobile dry chemical powder spraying system 20 enables and supports (i) the remote monitoring of the spraying of dry chemical powder from the system 30 when located at specific GPS-indexed location coordinates, and (ii) the logging of all such GPS-indexed spray application operations, and recording the data transactions thereof within a local database maintained within the micro-computing platform 30G, as well as in the remote network database 9C1 maintained at the data center 8 of the system network 1.

As shown in FIG. 36B, the micro-computing platform 30G comprises: data storage memory 30G1; flash memory (firmware storage) 30G2; a programmable microprocessor 30G3; a general purpose I/O (GPIO) interface 30G4; a GPS transceiver circuit/chip with matched antenna structure 30G5; and the system bus 30I which interfaces these components together and provides the necessary addressing, data and control signal pathways supported within the system 30.

As shown in FIG. 36B, the wireless communication subsystem 30H comprises: an RF-GSM modem transceiver 20H1; a T/X amplifier 30H2 interfaced with the RF-GSM modem transceiver 30H1; and a WIFI and Bluetooth wireless interfaces 30H3.

As shown in FIG. 36B, the GPS-tracked and remotely-controllable dry chemical powder spray control subsystem 30F comprises: dry chemical powder supply sensor(s) 30F1 installed in or on the dry chemical powder supply tank 30B to produce an electrical signal indicative of the volume or percentage of the dry chemical powder supply tank containing dry chemical powder at any instant in time, and providing such signals to the Dry chemical powder spraying system control interface 30F4; a power supply and controls 30F2 interfaced with the dry powder pump spray subsystem 30C, and also the dry chemical powder spraying system control interface 30F4; manually-operated spray pump controls interface 30F3, interfaced with the Dry chemical powder spraying system control interface 30F4; and the dry chemical powder spraying system control interface 30F4 interfaced with the micro-computing subsystem 30G, via the system bus 30I. The flash memory storage 30G2 contains microcode that represents a control program that runs on the microprocessor 30G3 and realizes the various GPS-specified dry chemical powder spray control, monitoring, data logging and management functions supported by the system 30.

Figure 37A:
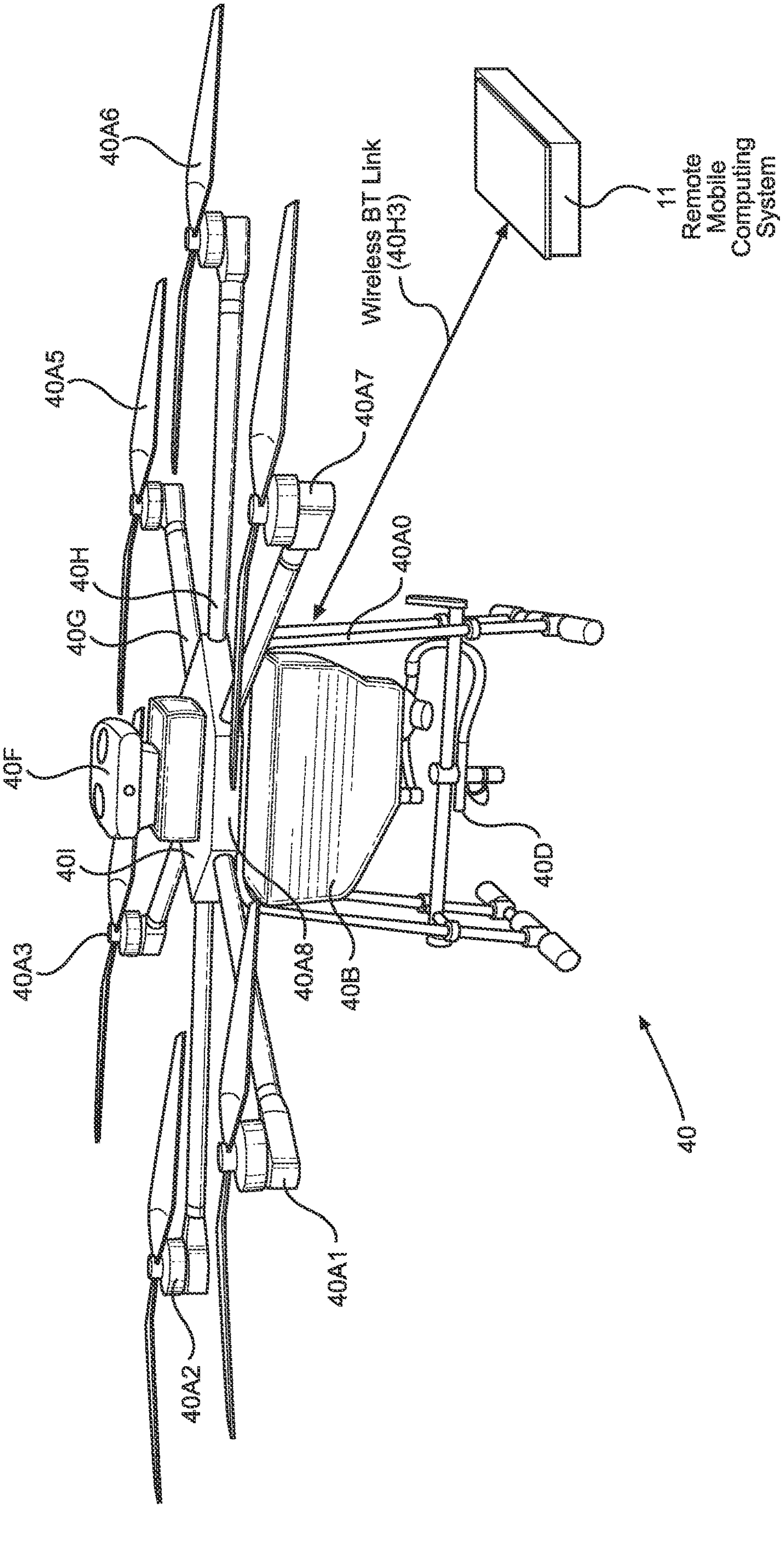
FIG. 37A is a GPS-tracked autonomous-aircraft drone-based dry chemical powder spray system adapted for spraying fire outbreaks with an environmentally-clean dry chemical powder formulated in accordance with the principles of the present invention.
Figure 37B:
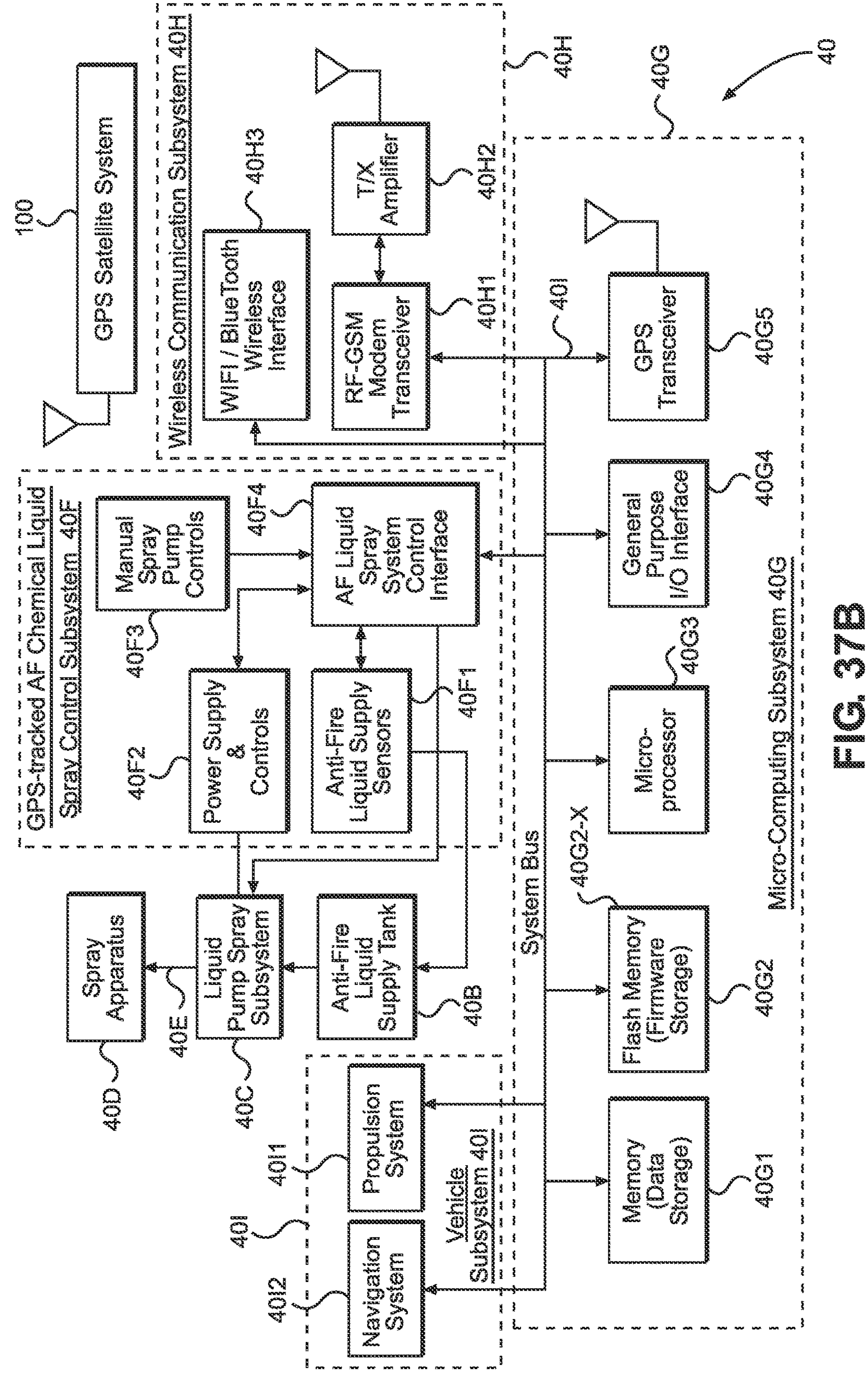
FIG. 37B shows the GPS-tracked drone-based dry chemical powder spray system of FIG. 37A being worn by a person who is using it with the system network, to GPS-track and record the spraying of GPS-specified fire outbreaks with the environmentally-clean dry chemical powder chemical composition, formulated in accordance with the principles of the present invention.

Specification of GPS-Tracked Autonomously-Driven Drone System Adapted for Spraying Dry Chemical Powder on Buildings and Ground Surfaces FIG. 37BA shows a mobile GPS-tracked unmanned airborne system (UAS) or drone 40 adapted for misting and spraying environmentally-clean dry chemical powder of the present invention on exterior building surfaces and ground surfaces in accordance with the principles of the present invention.

As shown, the drone vehicle system 40 comprises: a lightweight airframe 40A0 supporting a propulsion subsystem 40I provided with a set of eight (8) electric-motor driven propellers 40A1-40A8, driven by electrical power supplied by a rechargeable battery module 409, and controlled and navigated by a GPS-guided navigation subsystem 4012; an integrated supply tank 40B supported on the airframe 40A0, and connected to either rechargeable-battery-operated electric-motor driven spray pump, or gasoline/diesel or propane operated motor-driven spray pump, 40C; a spray nozzle assembly 40D connected to the spray pump 40C by way of a flexible hose 40E, for misting and spraying the same with environmentally-clean dry chemical powder under the control of GPS-specified coordinates defining its programmed flight path when operating to suppress or otherwise fight wild fires.

Figure 8:
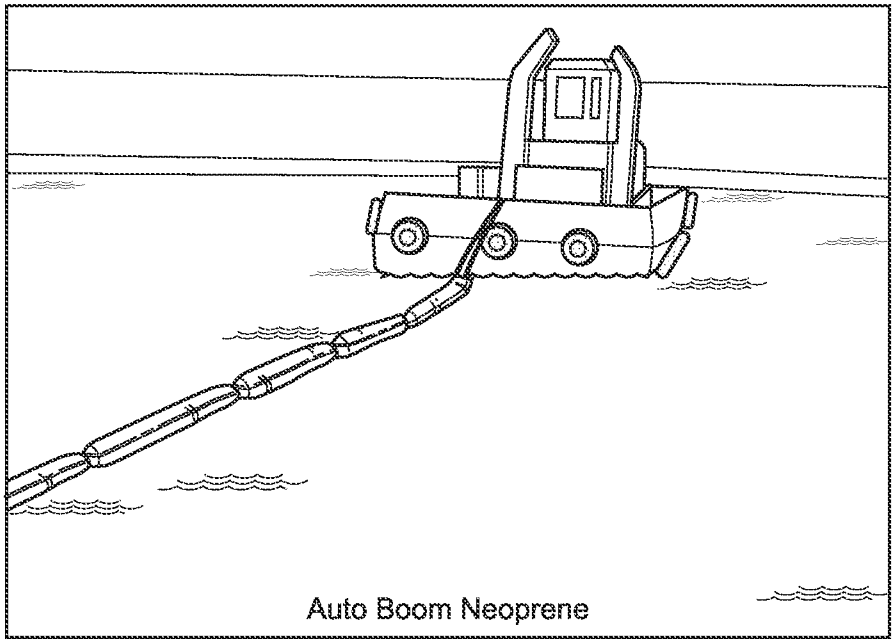
(PRIOR ART) FIG. 8
FIG. 8 is a prior art illustration showing the use of floatable neoprene booms to absorb spilled oil.
Figure 10:
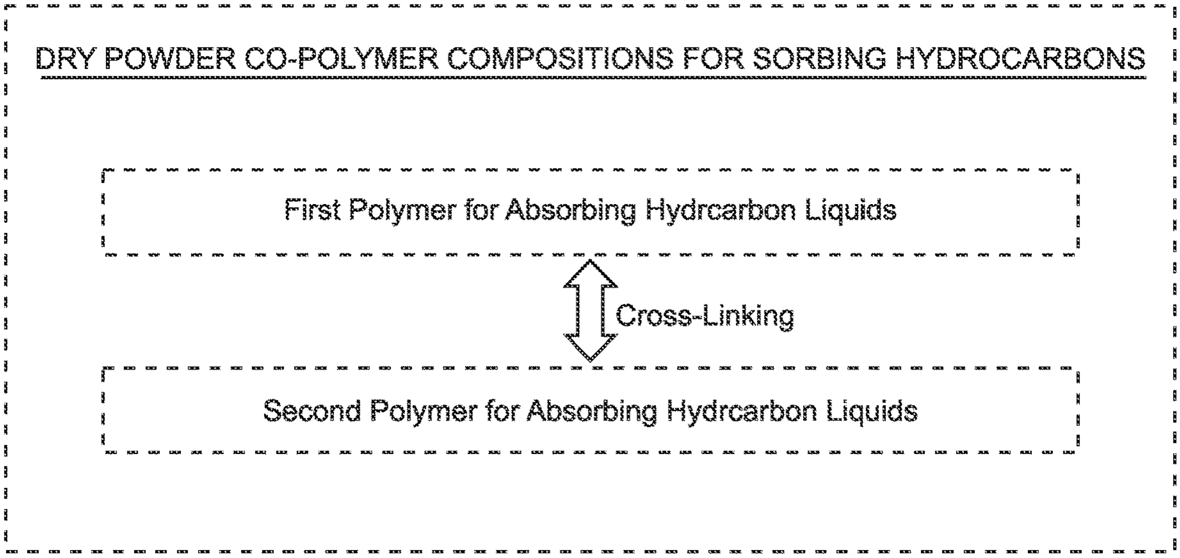
(PRIOR ART) FIG. 10
FIG. 10 is a schematic representation of a prior art dry powder composition consisting of cross-linked polymers adapted for absorbing hydrocarbon liquid (e.g. fuel, oil and other hydrocarbon) spills on hard surfaces.
Figure 11:
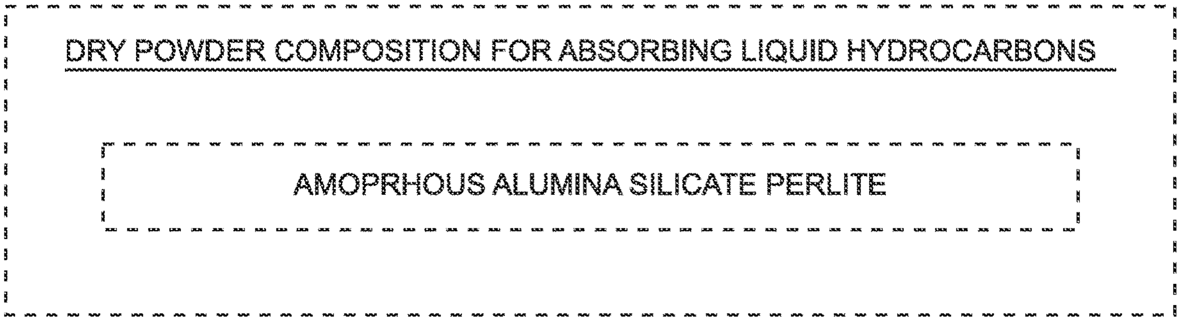
(PRIOR ART) FIG. 11
FIG. 11 is a schematic representation of a prior art dry powder composition consisting of amorphous alumina silicate perlite for absorbing oils, fuels, paints and other fluids, and then sweeping up the absorbed product.
Figure 12:
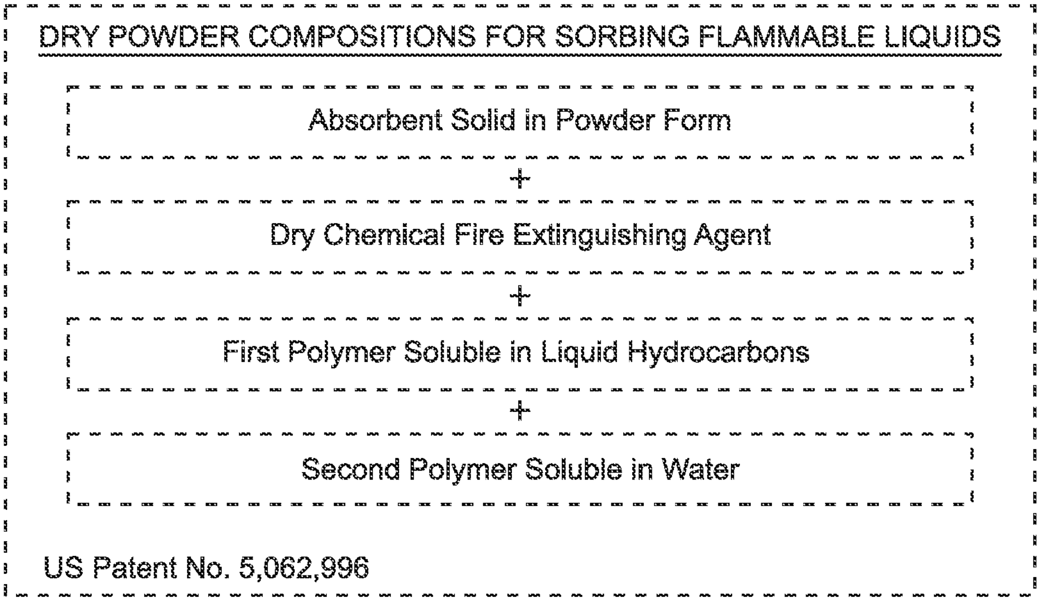
(PRIOR ART) FIG. 12
FIG. 12 is a schematic representation of a prior art dry powder composition for extinguishing fires involving flammable hydrocarbon liquids, including an absorbent solid in powder form, a dry chemical extinguishing agent, a first polymer soluble in liquid hydrocarbons, and a second polymer soluble in water, as described in U.S. Pat. No. 5,062,996 to Joseph B. Kaylor.
Figure 13:
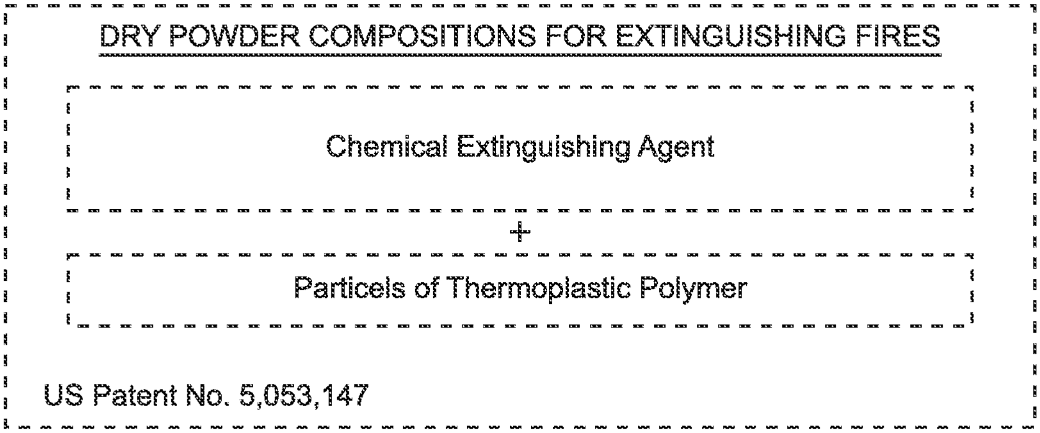
(PRIOR ART) FIG. 13
FIG. 13 is a schematic representation of a prior art dry powder compositions for use in extinguishing fires involving flammable liquids, comprising a chemical extinguishing agent, mixed together with powder particles of a thermoplastic polymer (e.g. rubber), as described in U.S. Pat. No. 5,053,147 to Joseph B. Kaylor.
Figure 14:
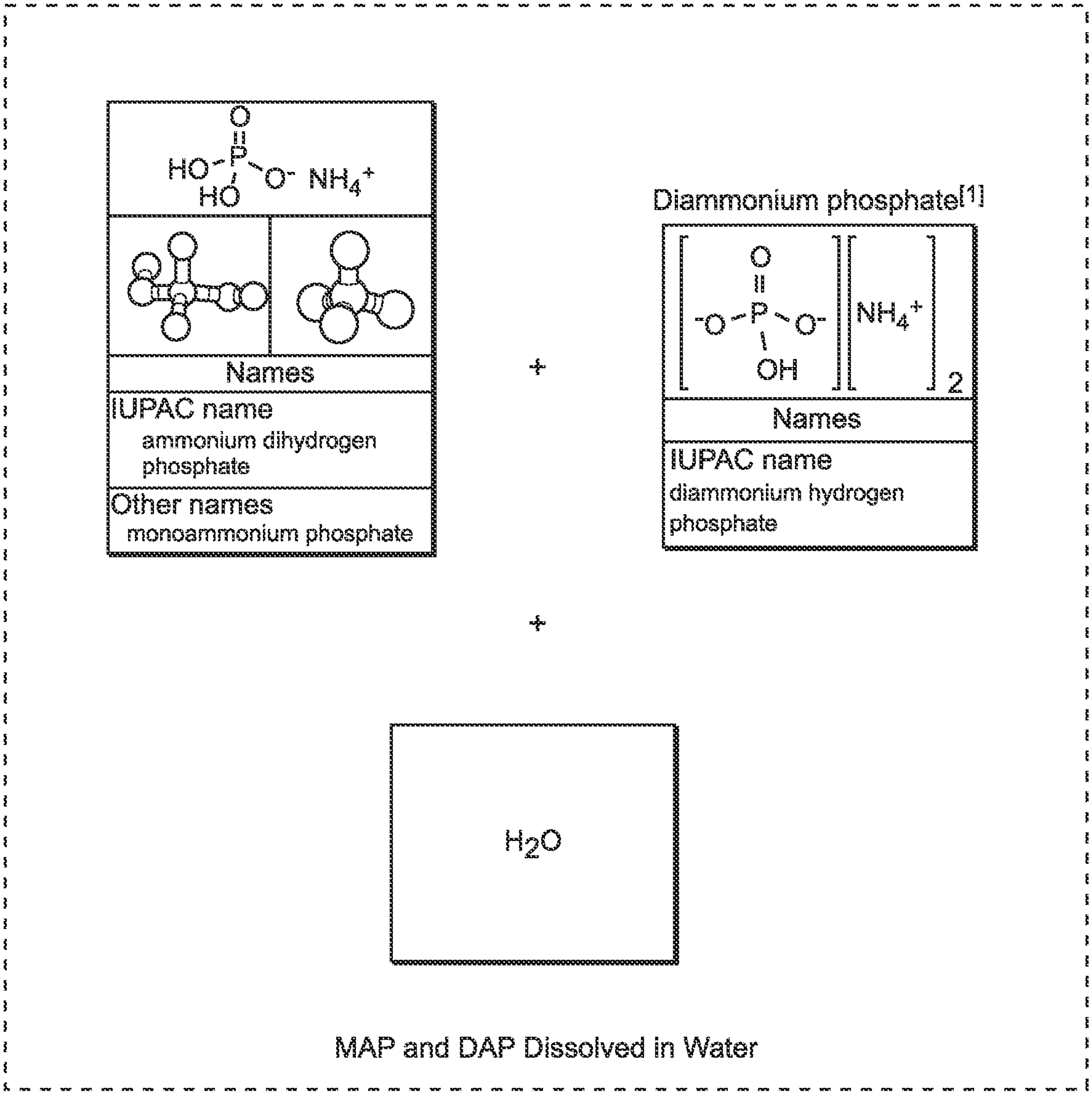
(PRIOR ART) FIG. 14
FIG. 14 is a schematic representation illustrating the primary components of a prior art (PhosChek®) liquid fire extinguishing chemical, including primary components, including monoammonium phosphate (MAP), diammonium hydrogen phosphate (DAP) disclosed in water.
Figure 15:
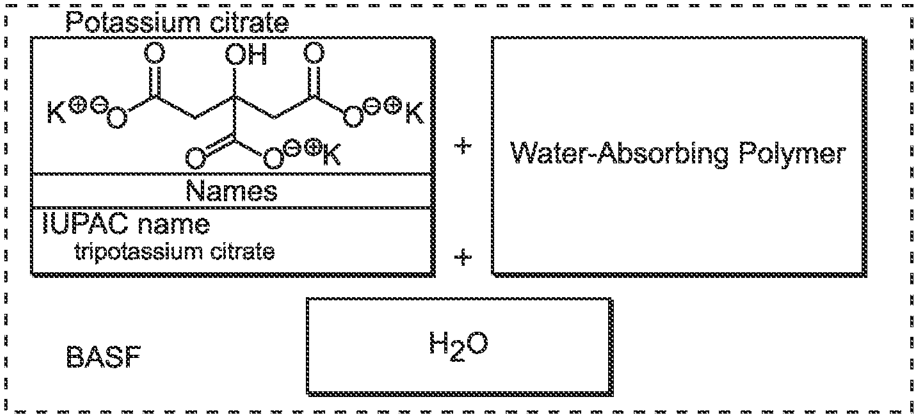
(PRIOR ART) FIG. 15
FIG. 15 is a schematic representation illustrating the primary active components of a prior art liquid fire extinguishing/inhibiting chemical disclosed and claimed in BASF's U.S. Pat. No. 8,273,813 to Beck et al., namely tripotassium citrate (TPC), and a water-absorbing polymer dissolved water.
Figure 16:
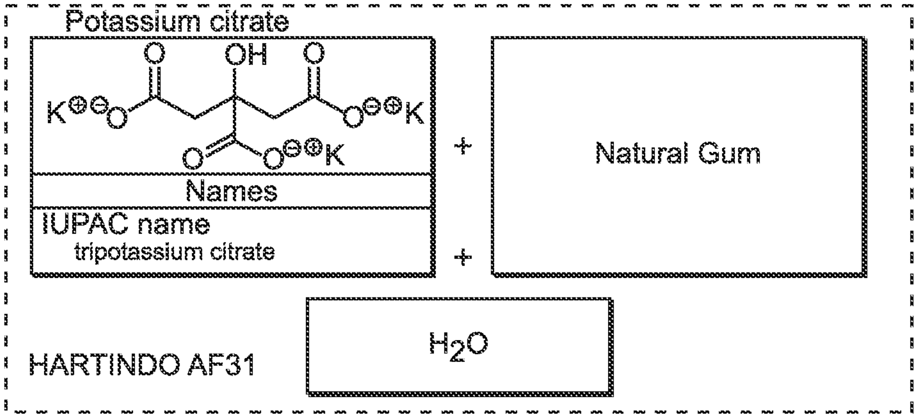
(PRIOR ART) FIG. 16
FIG. 16 is a schematic representation illustrating the primary active components in the prior art Hartidino dry-31 fire inhibiting chemical, namely, potassium citrate and a natural gum dissolved water, as described in the Material Safety Data Sheet for Hartindo AF31 (Eco Fire Break) dated Feb. 4, 2013 (File No. DWMS2013)

FIG. 37B shows the GPS-tracked dry chemical powder spraying system 40 of FIG. 8A as comprising a number of subcomponents, namely: a GPS-tracked and remotely-monitored dry chemical powder spray control subsystem 40F; a micro-computing platform or subsystem 40G interfaced with the GPS-tracked and remotely-monitored dry chemical powder spray control subsystem 40F by way of a system bus 40I; a wireless communication subsystem 40H interfaced to the micro-computing platform 40G via the system bus 40I; and a vehicular propulsion and navigation subsystem 40I employing propulsion subsystem 40I1, and AI-driven or manually-driven navigation subsystem 40I2.

As configured in the illustrative embodiment, the GPS-tracked dry chemical powder spraying system 40 enables and supports (i) the remote monitoring of the spraying of dry chemical powder from the system 40 when located at specific GPS-indexed location coordinates, and (ii) the logging of all such GPS-indexed spray application operations, and recording the data transactions thereof within a local database maintained within the micro-computing platform 40G, as well as in the remote network database 9C1 maintained at the data center 8 of the system network 1.

As shown in FIG. 37B, the micro-computing platform 40G comprises: data storage memory 40G1; flash memory (firmware storage) 40G2; a programmable microprocessor 40G3; a general purpose I/O (GPIO) interface 40G4; a GPS transceiver circuit/chip with matched antenna structure 40G5; and the system bus 40I which interfaces these components together and provides the necessary addressing, data and control signal pathways supported within the system 40. As such, the micro-computing platform 40G is suitably configured to support and run a local control program 40G2-X on microprocessor 40G3 and memory architecture 40G1, 40G2 which is required and supported by the enterprise-level mobile application 12 and the suite of services supported by the system network 1 of the present invention.

As shown in FIG. 37B, the wireless communication subsystem 30H comprises: an RF-GSM modem transceiver 40H1; a T/X amplifier 40H2 interfaced with the RF-GSM modem transceiver 40H1; and a WIFI interface and a Bluetooth wireless interface 40H3 for interfacing with WIFI and Bluetooth data communication networks, respectively, in a manner known in the communication and computer networking art.

As shown in FIG. 37B, the GPS-tracked and remotely-controllable dry chemical powder spray control subsystem 40F comprises: anti-fire chemical liquid supply sensor(s) 40F1 installed in or on the anti-fire chemical liquid supply tank 30B to produce an electrical signal indicative of the volume or percentage of the Dry chemical powder supply tank containing dry chemical liquid at any instant in time, and providing such signals to the Dry chemical powder spraying system control interface 40F4; a power supply and controls 40F2 interfaced with the liquid pump spray subsystem 40C, and also the Dry chemical powder spraying system control interface 40F4; manually-operated spray pump controls interface 40F3, interfaced with the Dry chemical powder spraying system control interface 30F4; and the Dry chemical powder spraying system control interface 40F4 interfaced with the micro-computing subsystem 40G, via the system bus 40I. The flash memory storage 40G2 contains microcode for a control program that runs on the microprocessor 40G3 and realizes the various GPS-specified dry chemical powder spray control, monitoring, data logging and management functions supported by the system 40.

Figure 38A:
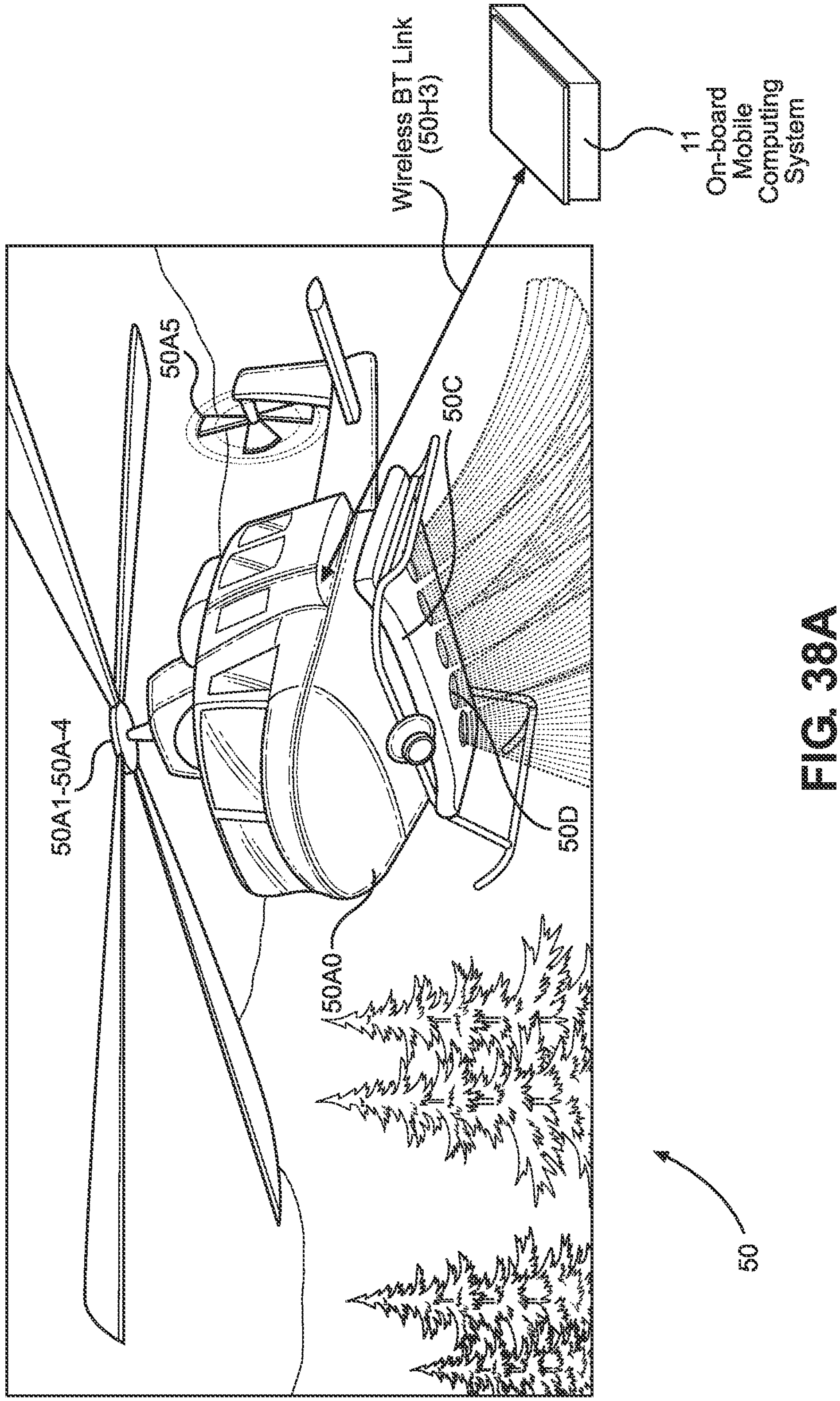
FIG. 38A is a perspective view of a GPS-tracked aircraft system (i.e. helicopter) adapted for spraying an environmentally-clean dry chemical fire extinguishing powder of the present invention, from the air space onto ground and/or property surfaces ablaze in fire in accordance with the principles of the present invention.

Specification of GPS-Tracked Aircraft (i.e. Helicopter) for Spraying Dry Chemical Powder on Ground Surfaces FIG. 38A shows a mobile GPS-tracked manned aircraft (i.e. helicopter) system 50 adapted for misting and spraying environmentally-clean dry chemical powder of the present invention on ground surfaces and over buildings in accordance with the principles of the present invention.

As shown, the aircraft system 50 comprises: a lightweight airframe 50A0 supporting a propulsion subsystem 50I provided with a set of axially-mounted helicopter blades 50A1-50A2 and 50A5, driven by combustion-engine and controlled and navigated by a GPS-guided navigation subsystem 50I2; an integrated supply tank 50B supported on the airframe 50A0, and connected to a gasoline/diesel operated motor-driven spray pump, 50C; a spray nozzle assembly 50D connected to the spray pump 50C by way of a hose 50E, for misting and/or spraying the same with environmentally-clean dry chemical powder under the control of GPS-specified coordinates defining its programmed flight path when operating to suppress or otherwise fight wild fires.

Figure 38B:
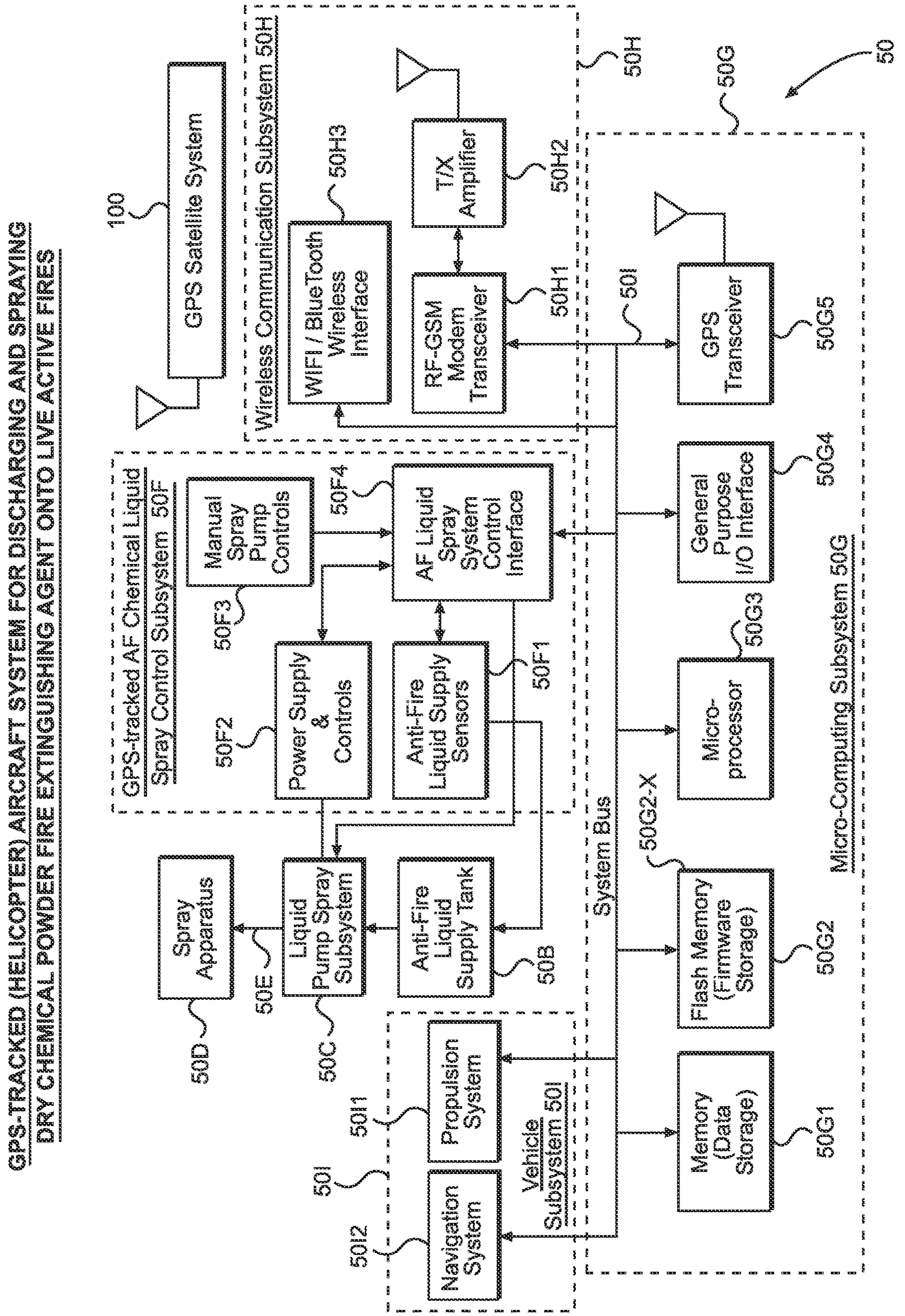
FIG. 38B is a schematic representation of the GPS-tracked aircraft (i.e. helicopter) system shown in FIG. 38A, comprising a GPS-tracked and remotely monitored dry powder chemical powder spray control subsystem interfaced with a micro-computing platform for monitoring the spraying of dry powder chemical liquid from the aircraft when located at specific GPS-indexed location coordinates, and automatically logging and recording such dry powder spray application operations within the network database system.

FIG. 38B shows the GPS-tracked dry chemical powder spraying system 50 of FIG. 9A as comprising a number of subcomponents, namely: a GPS-tracked and remotely-monitored dry chemical powder spray control subsystem 50F; a micro-computing platform or subsystem 50G interfaced with the GPS-tracked and remotely-monitored dry chemical powder spray control subsystem 50F by way of a system bus 50I; a wireless communication subsystem 50H interfaced to the micro-computing platform 50G via the system bus 50I; and a vehicular propulsion and navigation subsystem 50I employing propulsion subsystem 5011, and AI-driven or manually-driven navigation subsystem 50I2.

As configured in the illustrative embodiment, the GPS-tracked dry chemical powder spraying system 50 enables and supports (i) the remote monitoring of the spraying of dry chemical powder from the system 50 when located at specific GPS-indexed location coordinates, and (ii) the logging of all such GPS-indexed spray application operations, and recording the data transactions thereof within a local database maintained within the micro-computing platform 50G, as well as in the remote network database 9C1 maintained at the data center 8 of the system network 1.

As shown in FIG. 38B, the micro-computing platform 50G comprises: data storage memory 50G1; flash memory (firmware storage) 50G2; a programmable microprocessor 50G3; a general purpose I/O (GPIO) interface 50G4; a GPS transceiver circuit/chip with matched antenna structure 50G5; and the system bus 40I which interfaces these components together and provides the necessary addressing, data and control signal pathways supported within the system 50. As such, the micro-computing platform 50G is suitably configured to support and run a local control program 50G2-X on microprocessor 50G3 and memory architecture 50G1, 40G2 which is required and supported by the enterprise-level mobile application 12 and the suite of services supported by the system network 1 of the present invention.

As shown in FIG. 38B, the wireless communication subsystem 50H comprises: an RF-GSM modem transceiver 50H1; a T/X amplifier 50H2 interfaced with the RF-GSM modem transceiver 50H1; and a WIFI interface and a Bluetooth wireless interface 50H3 for interfacing with WIFI and Bluetooth data communication networks, respectively, in a manner known in the communication and computer networking art.

As shown in FIG. 38B, the GPS-tracked and remotely-controllable dry chemical powder spray control subsystem 50F comprises: anti-fire chemical liquid supply sensor(s) 50F1 installed in or on the anti-fire chemical liquid supply tank 50B to produce an electrical signal indicative of the volume or percentage of the Dry chemical powder supply tank containing dry chemical liquid at any instant in time, and providing such signals to the Dry chemical powder spraying system control interface 50F4; a power supply and controls 50F2 interfaced with the liquid pump spray subsystem 50C, and also the Dry chemical powder spraying system control interface 50F4; manually-operated spray pump controls interface 50F3, interfaced with the Dry chemical powder spraying system control interface 50F4; and the Dry chemical powder spraying system control interface 50F4 interfaced with the micro-computing subsystem 50G, via the system bus 50I. The flash memory storage 50G2 contains microcode for a control program that runs on the microprocessor 50G3 and realizes the various GPS-specified dry chemical powder spray control, monitoring, data logging and management functions supported by the system 50.

Figure 39A:
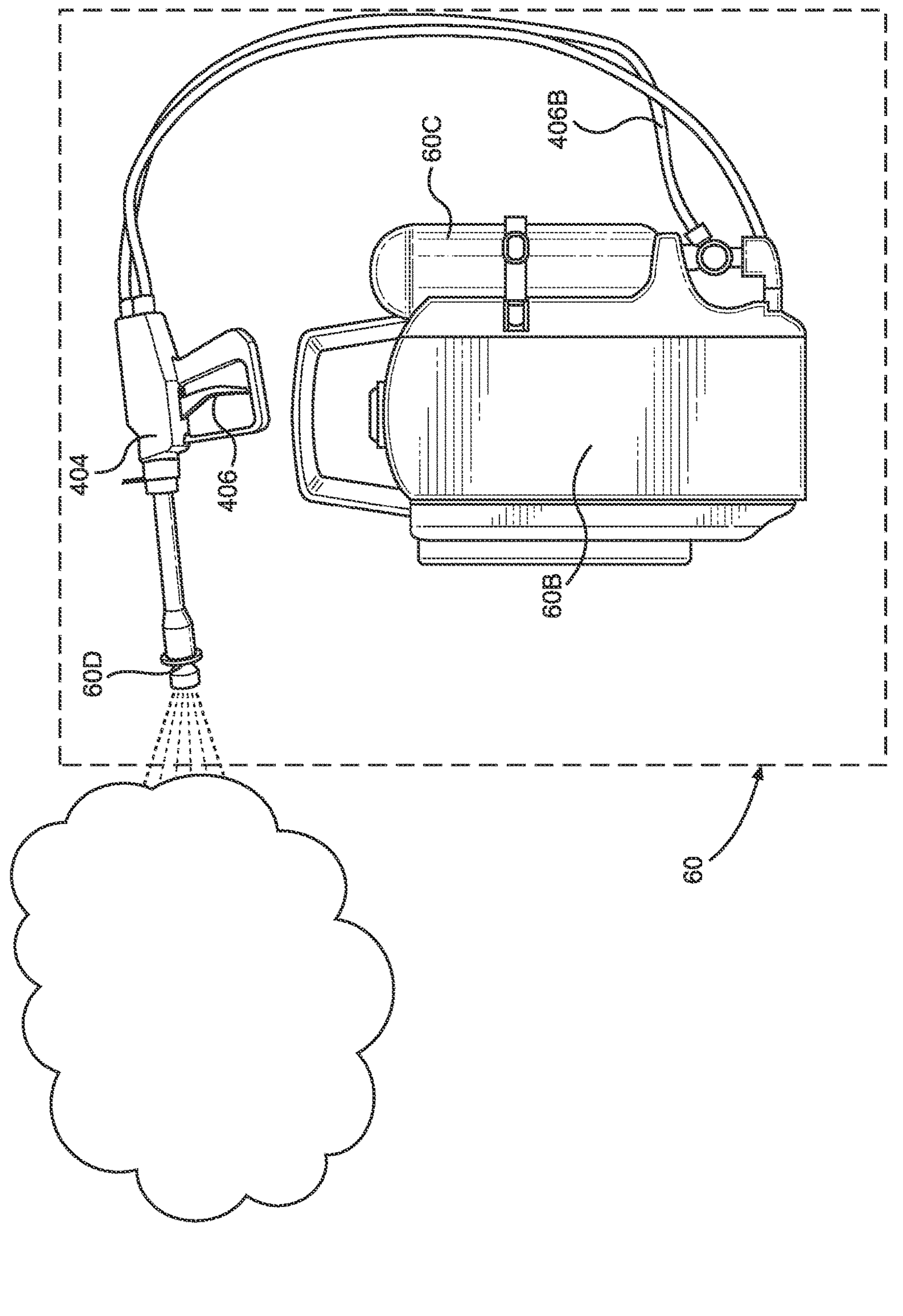
FIG. 39A is a GPS-tracked back-packed mounted dry chemical powder fire extinguishing system, for extinguishing fire outbreaks with an environmentally-clean dry chemical powder compositions formulated in accordance with the principles of the present invention.

Specification of GPS-Tracked Autonomously-Driven Aircraft for Spraying Dry Chemical Powder on Building and Ground Surfaces FIG. 39A shows a mobile GPS-tracked back-pack fire extinguishing system 60 adapted for spraying environmentally-clean dry chemical powder of the present invention on active fires whenever they may breakout, in accordance with the principles of the present invention.

As shown, the system 60 comprises: a lightweight frame/chassis 60A0 supporting a supply of inert gas (e.g. N2 or CO2) for propelling a supply of dry chemical powder 60B formulated according to the present invention (FIGS. 25-35); a GPS-guided navigation subsystem 6012; a spray nozzle assembly 60D connected to the spray pump 60C by way of a hose 60E, for spraying the dry chemical powder under pressurized gas pressure, onto an active fire.

Figure 39B:
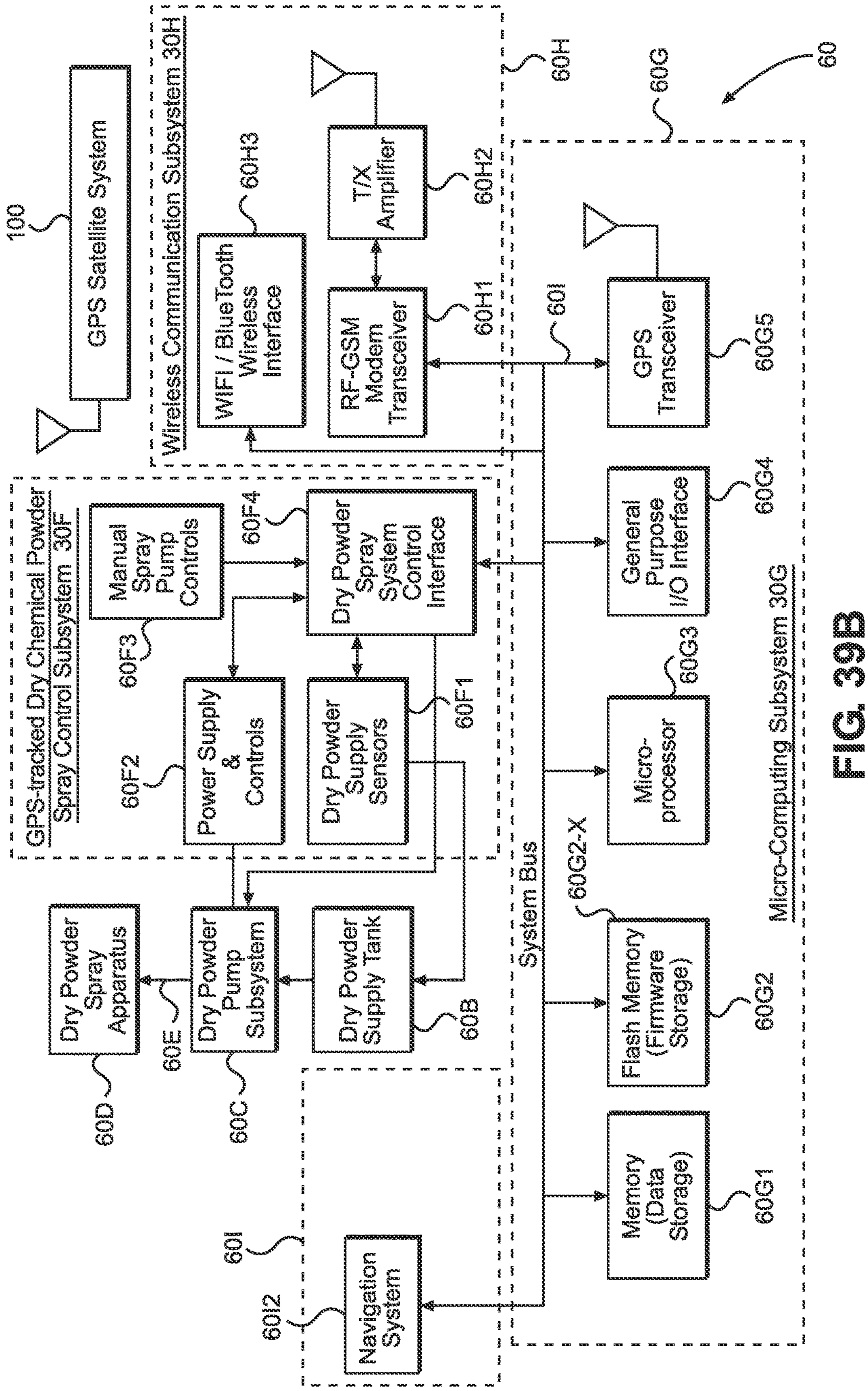
FIG. 39B is schematic block diagram showing the GPS-tracked back-packed mounted dry chemical powder fire extinguishing system depicted in FIG. 39A, comprising a GPS-tracked and remotely-monitored dry chemical powder spray control subsystem interfaced with a micro-computing platform for monitoring the spraying of dry chemical powder from the system when located at specific GPS-indexed location coordinates, and automatically logging and recording such dry powder spray operations within the network database system.

FIG. 39B shows the GPS-tracked dry chemical powder spraying system 60 of FIG. 39A as comprising a number of subcomponents, namely: a GPS-tracked and remotely-monitored dry chemical powder spray control subsystem 60F; a micro-computing platform or subsystem 60G interfaced with the GPS-tracked and remotely-monitored dry chemical powder spray control subsystem 60F by way of a system bus 60I; a wireless communication subsystem 60H interfaced to the micro-computing platform 60G via the system bus 50I; and a navigation subsystem 60I for providing directions to the operation as required by the situation and application at hand.

As configured in the illustrative embodiment, the GPS-tracked dry chemical powder spraying system 60 enables and supports (i) spraying of dry chemical powder from the system 60 while at any GPS-indexed location, and (ii) the logging of all such GPS-indexed spray application operations, and recording the data transactions thereof within a local database maintained within the micro-computing platform 60G, as well as in the remote network database 9C1 maintained at the data center 8 of the system network 1.

As shown in FIG. 39B, the micro-computing platform 60G comprises: data storage memory 60G1; flash memory (firmware storage) 60G2; a programmable microprocessor 60G3; a general purpose I/O (GPIO) interface 60G4; a GPS transceiver circuit/chip with matched antenna structure 60G5; and the system bus 60I which interfaces these components together and provides the necessary addressing, data and control signal pathways supported within the system 60. As such, the micro-computing platform 60G is suitably configured to support and run a local control program 60G2-X on microprocessor 60G3 and memory architecture 60G1, 60G2 which is required and supported by the enterprise-level mobile application 12 and the suite of services supported by the system network 1 of the present invention.

As shown in FIG. 39B, the wireless communication subsystem 50H comprises: an RF-GSM modem transceiver 60H1; a T/X amplifier 60H2 interfaced with the RF-GSM modem transceiver 60H1; and a WIFI interface and a Bluetooth wireless interface 60H3 for interfacing with WIFI and Bluetooth data communication networks, respectively, in a manner known in the communication and computer networking art.

As shown in FIG. 39B, the GPS-tracked and remotely-controllable dry chemical powder spray control subsystem 60F comprises: dry chemical powder supply sensor(s) 60F1 installed in or on the dry chemical powder supply tank 60B to produce an electrical signal indicative of the volume or percentage of the dry chemical powder supply tank containing dry chemical powder at any instant in time, and providing such signals to the dry chemical powder spraying system control interface 60F4; a power supply and controls 60F2 interfaced with the dry pump spray subsystem 60C, and also the dry chemical powder spraying system control interface 60F4; manually-operated spray pump controls interface 60F3, interfaced with the dry chemical powder spraying system control interface 60F4; and the dry chemical powder spraying system control interface 60F4 interfaced with the micro-computing subsystem 60G, via the system bus 60I. The flash memory storage 60G2 contains microcode for a control program that runs on the microprocessor 60G3 and realizes the various GPS-specified dry chemical powder spray control, monitoring, data logging and management functions supported by the system 60.

Figure 40A:
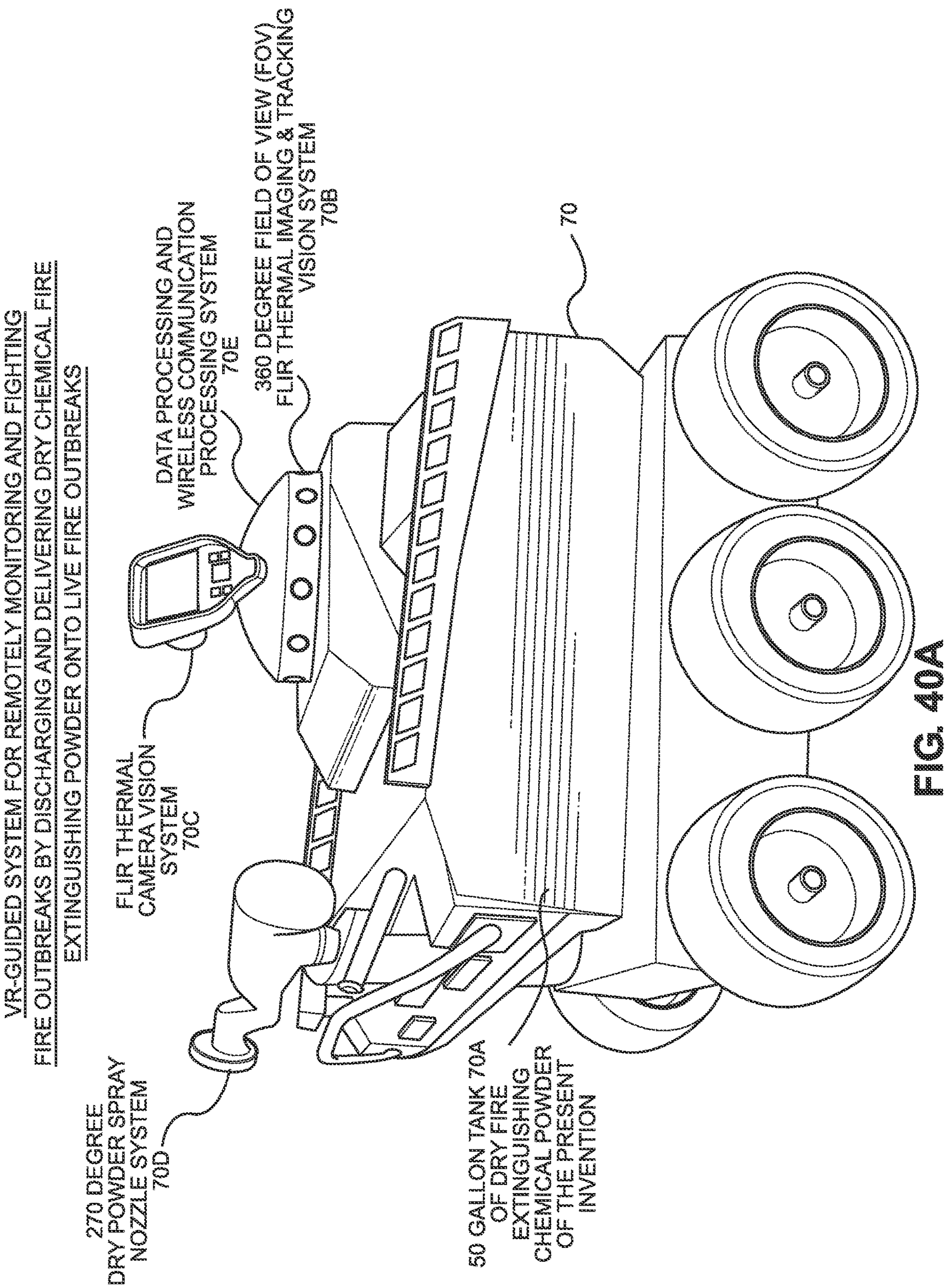
FIG. 40A is a GPS-tracked VR-remotely-controlled robot-based dry chemical powder spraying system adapted for spraying active fires involving flammable liquids, using clean dry chemical powders formulated and applied in accordance with the principles of the present invention.
Figure 40B:
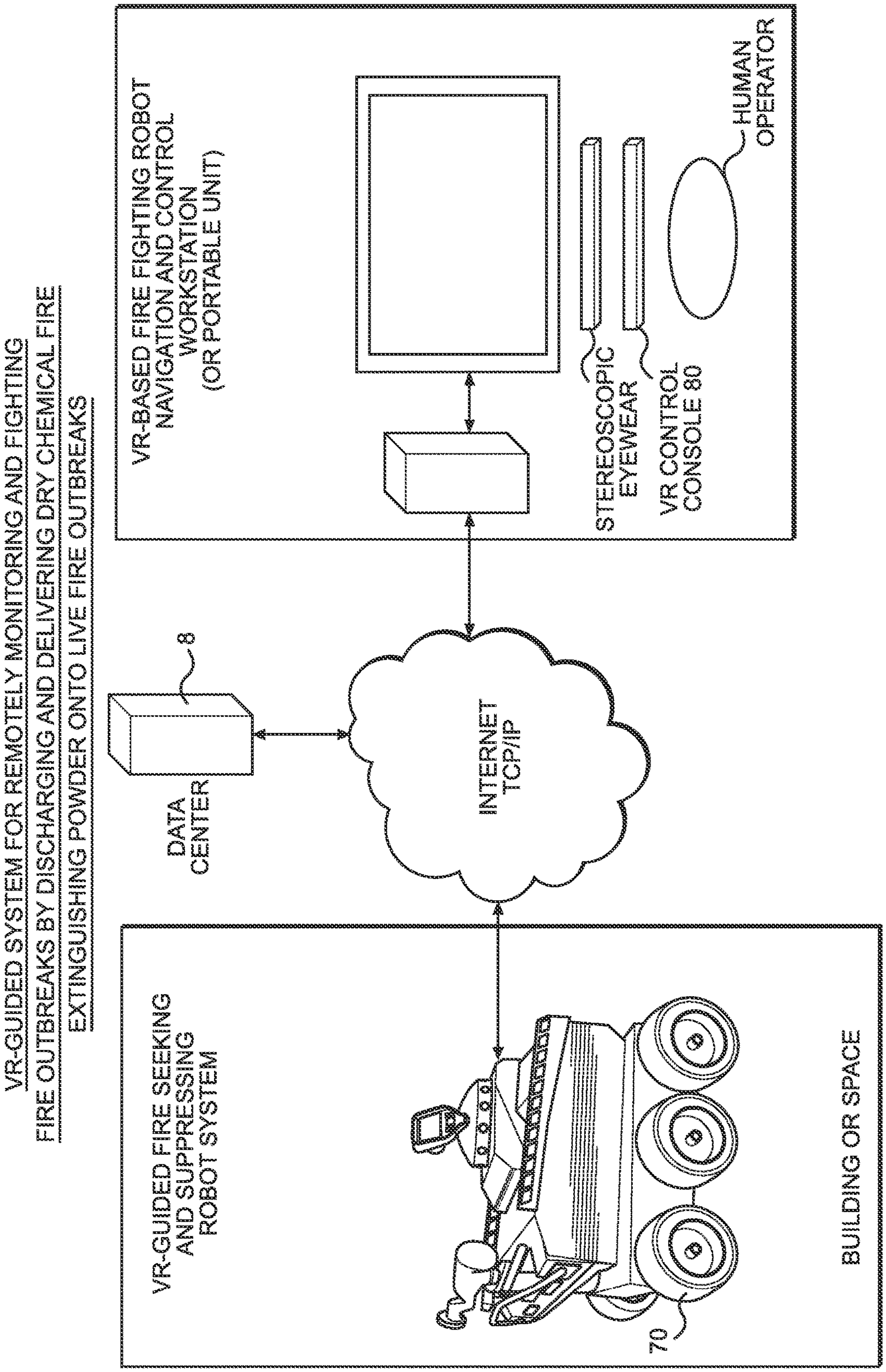
FIG. 40B is schematic diagram illustrating the GPS-tracked VR-remotely-controlled robot-based dry chemical powder spraying system depicted in FIG. 40A, being remotely controlled and operated at a distance from an active fire, using the hand-held VR-based remote control console deployed with the VR-guided system, shown in FIG. 40C.
Figure 40C:
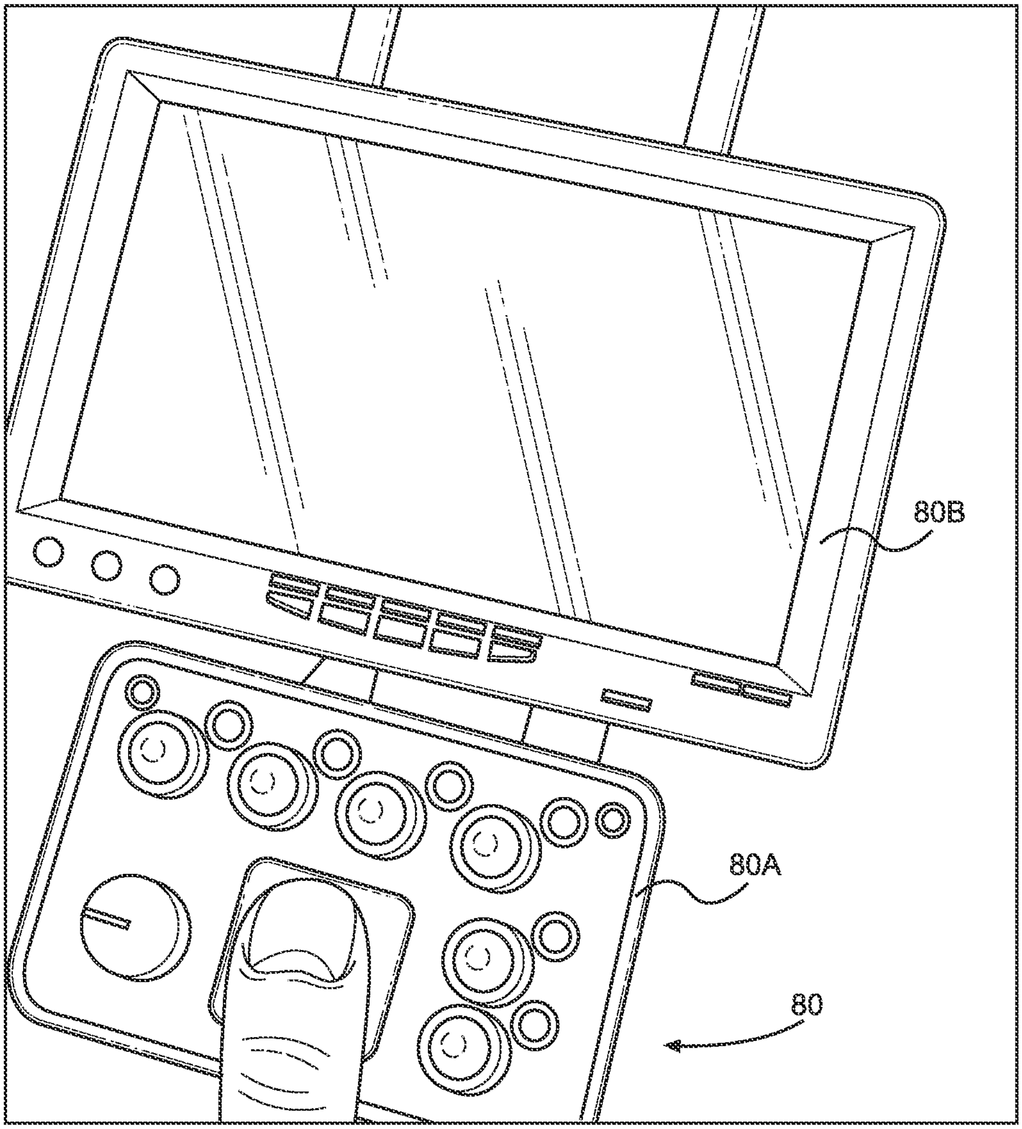
FIG. 40C is perspective view of the VR-based remote control console of the system depicted in FIG. 40B.

Specification of VR-Guided Dry Powder Spraying Robot System for Spraying Environmentally-Clean Dry Powder Chemical Compositions on Active Fires Under VR-Remote Control FIG. 140A shows a VR-guided dry powder spraying robot system 70 adapted for spraying environmentally-clean dry chemical powder on active fire outbreaks, under VR-remote control using the console of FIG. 40C, in accordance with the principles of the present invention.

As shown, the VR-guided robot system 70 comprises a lightweight frame/chassis with a VR-guided navigation subsystem, adapted for guiding and operating the robot system 70 using the VR-guided control console 80 with control panel 80A and LCD display panel 80B. Using the VR console, the operator can remotely navigate the powder spray robot to an active fire and then discharge the dry chemical powder over the fire to immediately extinguish the fire involving a flammable liquid.

Figure 41A:
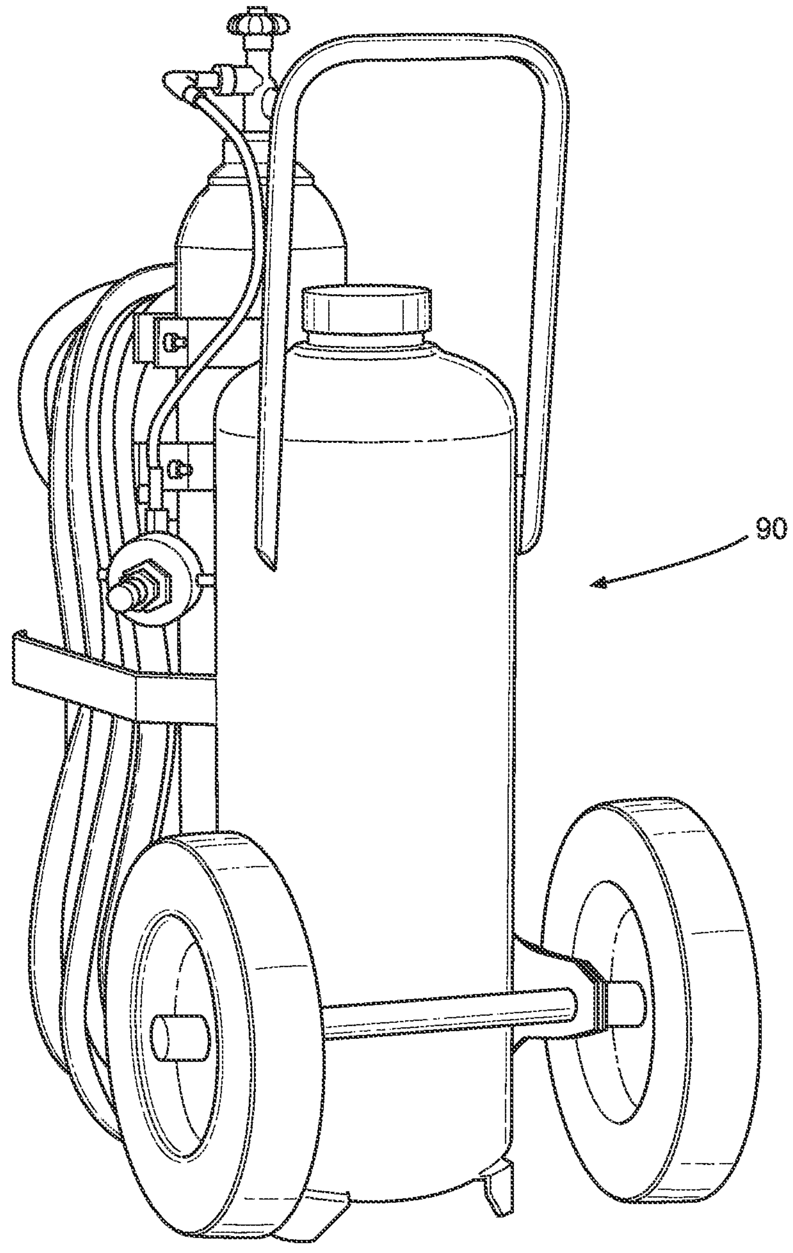
FIG. 41A is a GPS-tracked wheeled dry chemical powder spraying system adapted for spraying active fires with environmentally-clean dry chemical powder in accordance with the principles of the present invention.

Specification of GPS-Tracked Wheeled Dry Chemical Powder Spray System for Spraying Environmentally-Clean Dry Fire Extinguishing Chemical Powder on Active Fire Outbreaks FIG. 41A shows a mobile GPS-tracked backpack-mounted atomizing spray cannon (ASC) system 90 adapted for misting and spraying environmentally-clean inhibiting dry chemical powder on ground surfaces in accordance with the principles of the present invention.

As shown, the wheeled power spray system 90 comprises: a lightweight frame/chassis 90A provided with a set of wheels that is pulled by hand of the operator, while optionally being navigated by a GPS-guided navigation subsystem 9012; an integrated supply tank 90B supported on the frame 90A3, and connected to an inert pressurized gas supply tank 90C that pressurizes and drives the powder during discharge; an powder spray nozzle assembly 90D connected to the pressurized gas supply tank 90C by way of a hose 90E, for producing a forceful stream of dry chemical powder from a supply of dry chemical powder of the present invention 90B, under the gas pressure of pressurized subsystem 90.

Figure 41B:
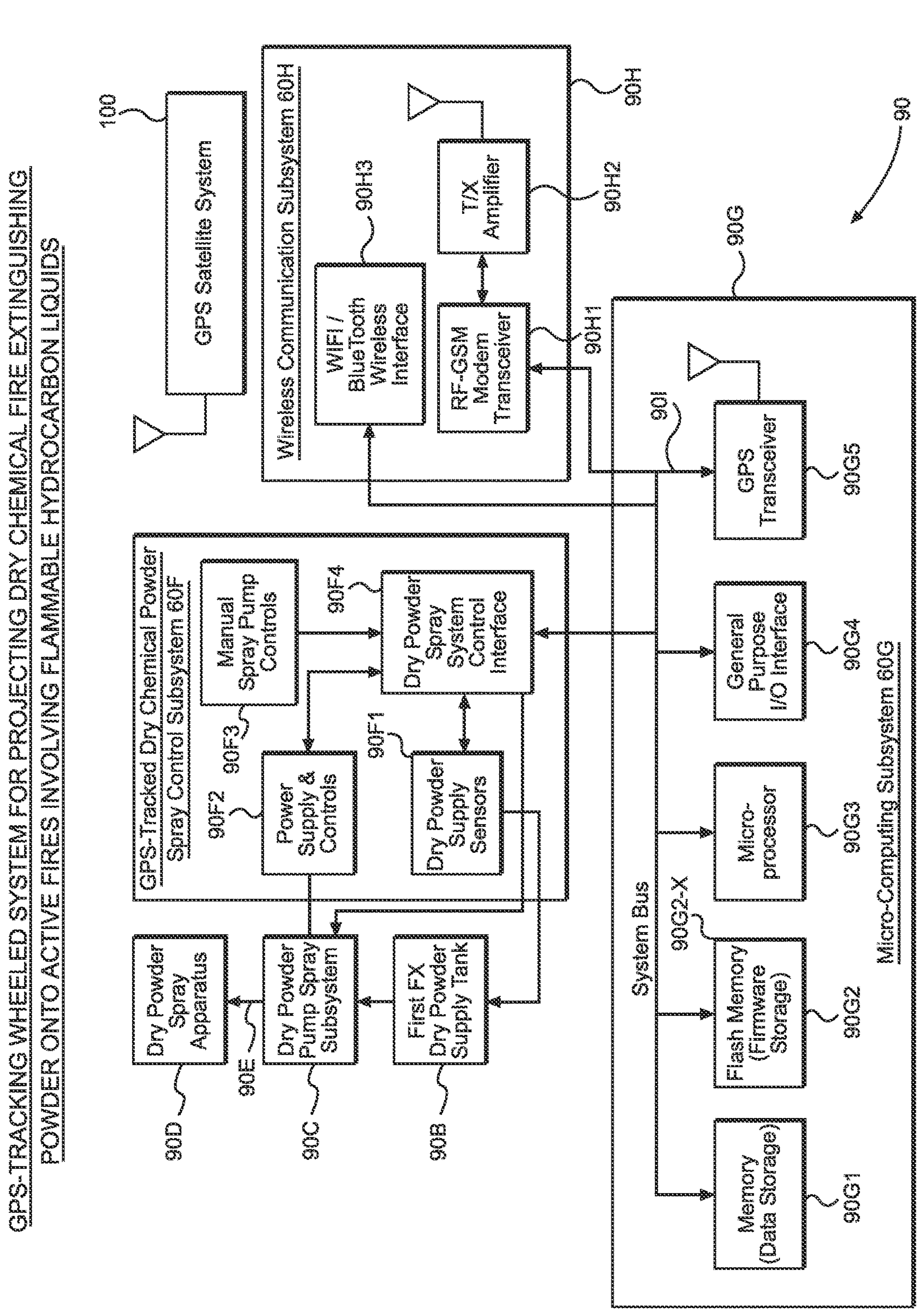
FIG. 41B is the GPS-tracked dry chemical powder spraying system shown in FIG. 41A, comprising a GPS-tracked and remotely-monitored dry powder chemical spray control subsystem interfaced with a micro-computing platform for monitoring the spraying of environmentally-clean dry chemical powder from the system when located at specific GPS-indexed location coordinates, and automatically logging and recording such dry chemical spray application operations within the network database system.

FIG. 41B shows the GPS-tracked dry chemical powder spraying system cannon 90 of FIG. 41A as comprising a number of subcomponents, namely: a GPS-tracked and remotely-monitored dry chemical powder spray control subsystem 90F; a micro-computing platform or subsystem 90G interfaced with the GPS-tracked and remotely-monitored dry chemical powder spray control subsystem 90F by way of a system bus 90I; a wireless communication subsystem 90H interfaced to the micro-computing platform 90G via the system bus 50I; and navigation subsystem 90I.

As configured in the illustrative embodiment, the GPS-tracked dry chemical powder spraying system 80 enables and supports (i) the remote monitoring of the spraying of dry chemical powder from the system 80 when located at specific GPS-indexed location coordinates, and (ii) the logging of all such GPS-indexed spray application operations, and recording the data transactions thereof within a local database maintained within the micro-computing platform 60G, as well as in the remote network database 9C1 maintained at the data center 8 of the system network 1.

As shown in FIG. 41B, the micro-computing platform 90G comprises: data storage memory 90G1; flash memory (firmware storage) 90G2; a programmable microprocessor 90G3; a general purpose I/O (GPIO) interface 90G4; a GPS transceiver circuit/chip with matched antenna structure 90G5; and the system bus 90I which interfaces these components together and provides the necessary addressing, data and control signal pathways supported within the system 90. As such, the micro-computing platform 90G is suitably configured to support and run a local control program 90G2-X on microprocessor 90G3 and memory architecture 90G1, 90G2 which is required and supported by the enterprise-level mobile application 12 and the suite of services supported by the system network 1 of the present invention.

As shown in FIG. 41B, the wireless communication subsystem 90H comprises: an RF-GSM modem transceiver 90H1; a T/X amplifier 90H2 interfaced with the RF-GSM modem transceiver 90H1; and a WIFI interface and a Bluetooth wireless interface 90H3 for interfacing with WIFI and Bluetooth data communication networks, respectively, in a manner known in the communication and computer networking art.

As shown in FIG. 41B, the GPS-tracked and remotely-controllable dry chemical powder spray control subsystem 90F comprises: dry chemical powder supply sensor(s) 90F1 installed in or on the dry chemical powder supply tank 90B to produce an electrical signal indicative of the volume or percentage of the dry chemical powder supply tank containing dry chemical powder at any instant in time, and providing such signals to the Dry chemical powder spraying system control interface 90F4; a power supply and controls 60F2 interfaced with the liquid pump spray subsystem 60C, and also the dry chemical powder spraying system control interface 90F4; manually-operated spray pump controls interface 90F3, interfaced with the dry chemical powder spraying system control interface 90F4; and the Dry chemical powder spraying system control interface 90F4 interfaced with the micro-computing subsystem 90G, via the system bus 90I. The flash memory storage 90G2 contains microcode for a control program that runs on the microprocessor 90G3 and realizes the various GPS-specified dry chemical powder spray control, monitoring, data logging and management functions supported by the system network of the present invention.

Specification of GPS-Tracking Mobile Dual-Tank Back-Pack Dry Powder Spray System for Spraying Dry Chemical Powder on Active Fires Involving Flammable Liquids for Extinguishing the Fire and then Absorbing the Flammable Liquid FIG. 42A shows a mobile GPS-tracked mobile dual-tank dry chemical powder spraying system 110 capable spraying environmentally-clean fire extinguishing dry powder on an active fire involving a flammable liquid, and thereafter, spraying hydrocarbon absorbing polymer over the flammable liquid to absorb it during a standard environmental remediation operation.

As shown in FIG. 42A, the GPS-tracked spraying system 110 comprises: a lightweight frame/chassis 110A0 supporting a first powder supply tank 110B1 containing dry fire extinguishing powder of the present invention described herein as shown in FIG. 25, and a second powder supply tank 110B2 containing dry hydrocarbon liquid absorbing powder described herein as shown in FIG. 25; and an electric or gasoline engine powered turbine fan 6011 for producing forced air stream for propelling either the first or second dry powder to flow forcefully from the spray pump 110C through the hose 110E, and out the spray nozzle assembly 110D to an active fire which must be extinguished by the first dry powder, and then the flammable liquid remaining to be absorbed by the second dry powder discharged from the system under the manual control of the operator.

FIG. 42B shows the GPS-tracked dry chemical powder spraying system 110 of FIG. 42A as comprising a number of subcomponents, namely: a GPS-tracked and remotely-monitored dry chemical powder spray control subsystem 110F; a micro-computing platform or subsystem 60G interfaced with the GPS-tracked and remotely-monitored dry chemical powder spray control subsystem 110F by way of a system bus 110I; a wireless communication subsystem 110H interfaced to the micro-computing platform 110G via the system bus 110I.

As configured in the illustrative embodiment, the GPS-tracked dry chemical powder spraying system 110 enables and supports (i) the spraying of fire extinguishing and liquid absorbing dry powders from the system 110 during the first and second operations required by the method illustrated in FIGS. 46A and 46B, and (ii) the logging of all such GPS-indexed powder spray operations, and recording the data transactions thereof within a local database maintained within the micro-computing platform 110G, as well as in the remote network database 9C1 maintained at the data center 8 of the system network 1.

As shown in FIG. 42B, the micro-computing platform 110G comprises: data storage memory 110G1; flash memory (firmware storage) 110G2; a programmable microprocessor 110G3; a general purpose I/O (GPIO) interface 110G4; a GPS transceiver circuit/chip with matched antenna structure 60G5; and the system bus 110I which interfaces these components together and provides the necessary addressing, data and control signal pathways supported within the system 110. As such, the micro-computing platform 110G is suitably configured to support and run a local control program 110G2-X on microprocessor 110G3 and memory architecture 110G1, 110G2 which is required and supported by the enterprise-level mobile application 12 and the suite of services supported by the system network 1 of the present invention.

As shown in FIG. 42B, the wireless communication subsystem 110H comprises: an RF-GSM modem transceiver 110H1; a T/X amplifier 110H2 interfaced with the RF-GSM modem transceiver 110H1; and a WIFI interface and a Bluetooth wireless interface 110H3 for interfacing with WIFI and Bluetooth data communication networks, respectively, in a manner known in the communication and computer networking art.

As shown in FIG. 42B, the GPS-tracked and remotely-controllable dry chemical powder spray control subsystem 110F comprises: dry chemical powder supply sensor(s) 110F1 installed in or on the dry chemical powder supply tank 110B to produce an electrical signal indicative of the volume or percentage of the dry chemical powder supply tank containing dry chemical powder at any instant in time, and providing such signals to the dry chemical powder spraying system control interface 110F4; a power supply and controls 110F2 interfaced with the powder pump spray subsystem 110C, and also the dry chemical powder spraying system control interface 110F4; manually-operated spray pump controls interface 110F3, interfaced with the dry chemical powder spraying system control interface 110F4; and the dry chemical powder spraying system control interface 110F4 interfaced with the micro-computing subsystem 110G, via the system bus 110I. The flash memory storage 110G2 contains microcode for a control program that runs on the microprocessor 110G3 and realizes the various GPS-specified dry chemical powder spray control, monitoring, data logging and management functions supported by the system network of the present invention.

During operation, the hand-held gun-style misting head with misting nozzle shown in FIG. 42A is manually activated by the user depressing a finger-activated trigger to discharge dry chemical powder from the nozzle onto an active fire for quick suppression and extinguishment. The portable system can be either back-mounted, or carried in one hand, while the other hand is used to hold and operate the dry powder spray gun.

Figure 43A:
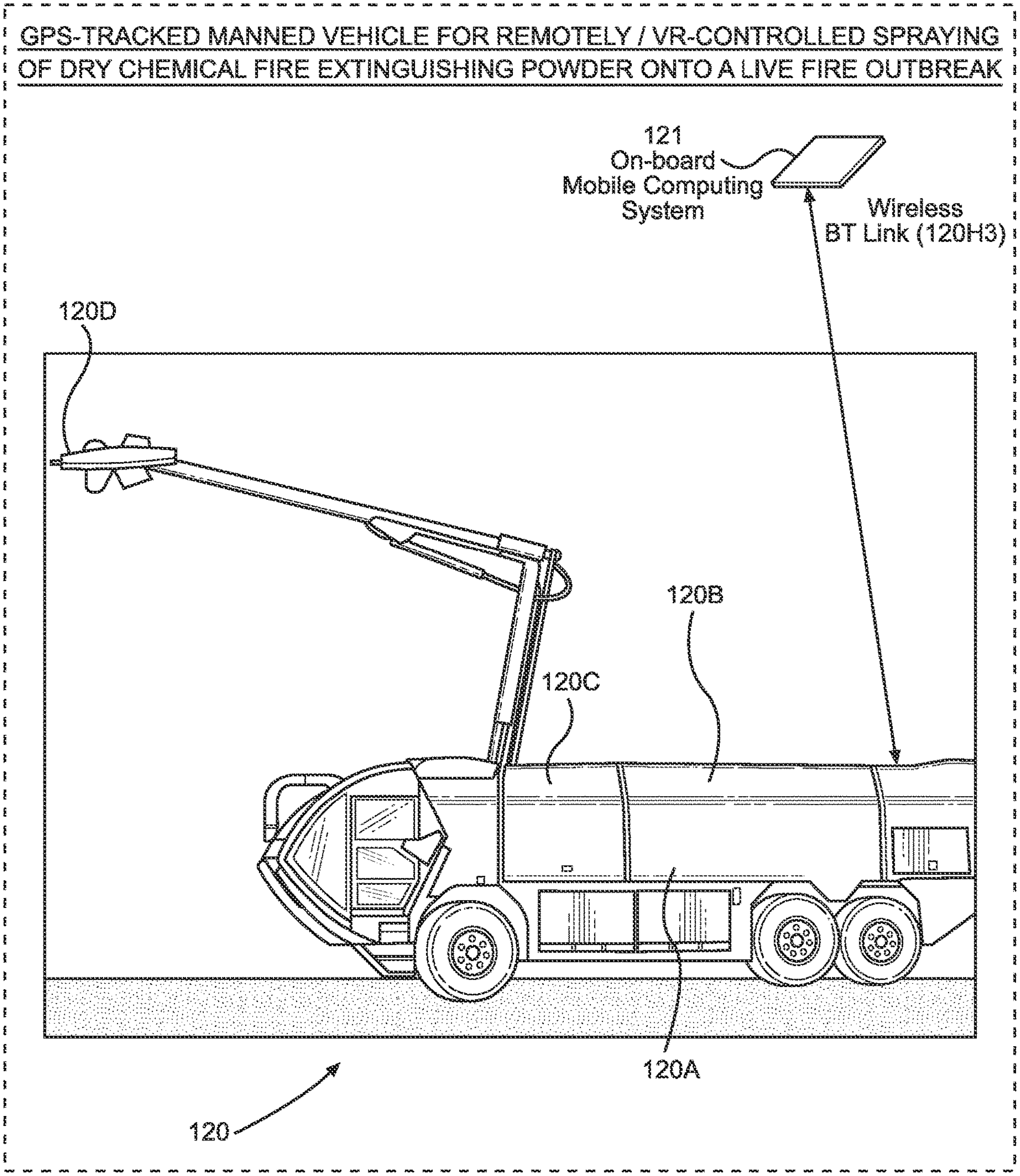
FIG. 43A is a GPS-tracked mobile remotely-controllable dry powder spraying system adapted for spraying active fires involving flammable liquids and gases with environmentally-clean dry chemical powder fire extinguishing compositions, formulated in accordance with the principles of the present invention.

Specification of GPS-Tracking Manned Vehicle for VR-Controlled Spraying of Dry Fire Extinguishing Chemical Powder Compositions of the Present Invention on Active Fire Outbreaks FIG. 43A shows a GPS-tracked manned vehicle system 120 adapted for VR-controlled spraying of environmentally-clean dry fire extinguishing powder onto active fire outbreaks (e.g. all Classes of fire A, B, C and D) wherever they may exit, to quickly extinguish the same in accordance with the principles of the present invention.

FIG. 143B shows the GPS-tracked system 120 of FIG. 43A as comprising a number of subcomponents, namely: a GPS-tracked and remotely-monitored dry chemical powder spray control subsystem 120F; a micro-computing platform or subsystem 60G interfaced with the GPS-tracked and remotely-monitored dry chemical powder spray control subsystem 60F by way of a system bus 120I; a wireless communication subsystem 60H interfaced to the micro-computing platform 120G via the system bus 120I.

As configured in the illustrative embodiment, the GPS-tracked system 120 enables and supports (i) the spraying of dry chemical powder from the system 120, and (ii) the logging of all such GPS-indexed spray application operations, and recording the data transactions thereof within a local database maintained within the micro-computing platform 120G, as well as in the remote network database 9C1 maintained at the data center 8 of the system network 1.

Figure 43B:
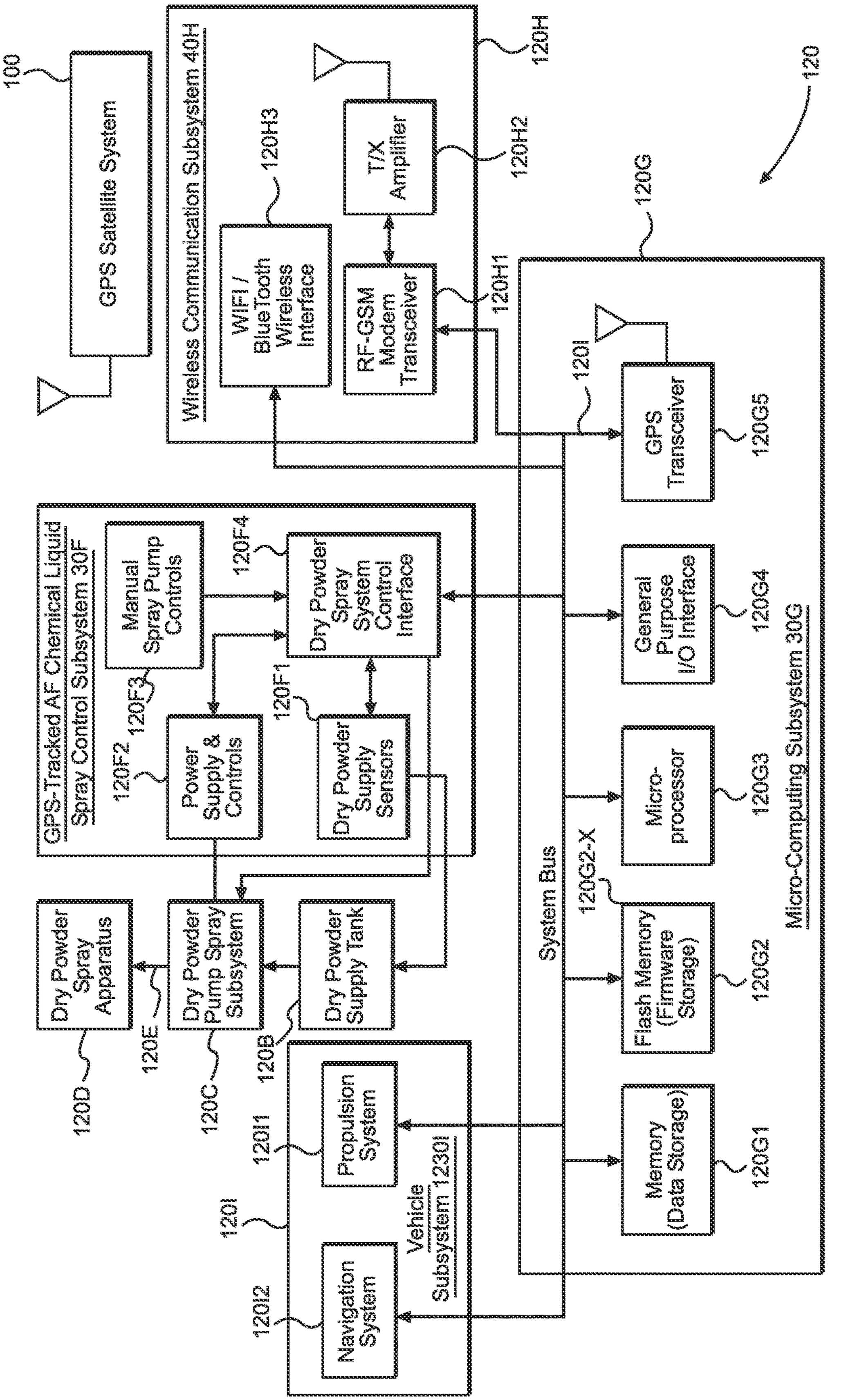
FIG. 43B is the GPS-tracked mobile remotely-controllable dry powder spraying system depicted in FIG. 43A, comprising a GPS-tracked and remotely-monitored dry chemical powder spray control subsystem interfaced with a micro-computing platform for monitoring the spraying of environmentally-clean dry chemical powder from the mobile system using a remotely extending spray nozzle, and automatically logging and recording such dry powder spray operations within the network database system.

As shown in FIG. 43B, the micro-computing platform 120G comprises: data storage memory 120G1; flash memory (firmware storage) 120G2; a programmable microprocessor 120G3; a general purpose I/O (GPIO) interface 120G4; a GPS transceiver circuit/chip with matched antenna structure 120G5; and the system bus 120I which interfaces these components together and provides the necessary addressing, data and control signal pathways supported within the system 120. As such, the micro-computing platform 120G is suitably configured to support and run a local control program 120G2-X on microprocessor 120G3 and memory architecture 120G1, 120G2 which is required and supported by the enterprise-level mobile application and the suite of services supported by the system network 1 of the present invention.

As shown in FIG. 43B, the wireless communication subsystem 120H comprises: an RF-GSM modem transceiver 120H1; a T/X amplifier 120H2 interfaced with the RF-GSM modem transceiver 120H1; and a WIFI interface and a Bluetooth wireless interface 120H3 for interfacing with WIFI and Bluetooth data communication networks, respectively, in a manner known in the communication and computer networking art.

As shown in FIG. 43B, the GPS-tracked and remotely-controllable dry chemical powder spray control subsystem 120F comprises: dry chemical powder supply sensor(s) 120F1 installed in or on the anti-fire chemical liquid supply tank 120B to produce an electrical signal indicative of the volume or percentage of the dry chemical powder supply tank containing dry chemical powder of the present invention at any instant in time, and providing such signals to the dry chemical powder spraying system control interface 120F4; a power supply and controls 120F2 interfaced with the powder pump spray subsystem 120C controlling the dry powder source, and also the control interface 120F4; and the system control interface 120F4 is interfaced with the micro-computing subsystem 120G, via the system bus 120I. The flash memory storage 120G2 contains microcode for a control program that runs on the microprocessor 120G3 and realizes the various GPS-specified dry chemical powder spray control, monitoring, data logging and management functions supported by the system network of the present invention.

Using mobile system 120, the operators can drive to any location where a fire outbreak has occurred involving a flammable liquid such as gasoline, diesel fuel, or other solvents, and use VR-guided controls to move its articulated arm supporting the powder spray nozzle 120D towards and close to the blazing fire to quickly extinguish it by spraying the dry chemical powder of the present invention all over the fire. Thereafter, liquid absorbing polymer powder stored aboard the vehicle 120 can be discharged over the flammable liquid to absorb the same using the two-step method described above and detailed in FIGS. 46A and 46B. Alternatively, a dry composite powder as specified in FIGS. 26 through 35 can be used aboard the vehicle 120 to extinguish an active fire while absorbing the flammable liquid originally fueling the same, as illustrated in the method of FIG. 47.

Specification of an Automatically Discharging Dry Chemical Powder Fire Extinguishing and Liquid Absorption System Installed at a Gasoline Service Station FIG. 44A shows an automatically discharging dry chemical powder fire extinguishing and liquid absorption system of the present invention 130 installed at a conventional gasoline service station with multiple fuel pumps where automobile park to refill their gasoline tanks, and configured for operation in accordance with the principles of the present invention.

As shown in FIG. 44A, the automatically discharging dry chemical powder fire extinguishing system 130 is adapted for extinguishing active fires outbreaks involving flammable liquids and gases, using environmentally-clean dry chemical powder fire extinguishing compositions, formulated in accordance with the principles of the present invention;

As shown in FIG. 44B, the dry powder fire extinguishing system 130, comprises: a supply of dry chemical powder 137 as fire extinguishing agent, pressurized by a supply of inert gas such as N2 or CO2 135, and supplied to a pressure control value (PCV) 134, and then supplied via piping to a network of dry powder spray nozzles 131A, 131B, mounted in the gasoline station above the pumps, all operated under a system controller 139, triggered by an automated fire detector 138 installed near the pumps at the station. Automatic fire detectors 138 can be realized using any technology available and supplies a detection signal to the system controller 139 which actuates the PCV 134 and discharges the dry chemical powder from supply tanks 137 to the nozzles 131A, 131B under gas pressure supplied by pressurized gas tanks 135, to quickly extinguish the fire outbreak. Depending on which method of fire extinguishment and liquid absorption is practiced, different dry chemical powders will be used. For example, dry chemical powder specified in FIG. 25 will be loaded in the supply tanks in the event the two-step method is practiced, as illustrated in FIGS. 46A and 46B, where separate dry powders are used for fire extinguishing and liquid absorption during two different phases of the process. Alternatively, the dry chemical powders specified in FIGS. 26-35 will be used in the one-step method illustrated in FIG. 47, where a dry composite powder is employed and loaded in the supply tank 137 containing components for both chemically extinguishing a fire outbreak, and chemically absorbing the spilled flammable liquid during the same phase or essentially same of operation.

Upon system operation, upon automatically detecting a fire outbreak, the supply of dry chemical powder 137 is discharged under pressure of the insert gas supply 135, to automatically discharge the dry powder over the detected fire, involving a flammable liquid such as gasoline or diesel fuel.

Applications of the Dry Powder Compositions of the Present Invention

Extinguishing Fire on Flammable Liquid Spilled on Water Offshore

The dry powder compositions of the present invention can be used to respond to oil and flammable liquid spills, as described in FIGS. 1 through 5. Upon the spilling of oil or flammable liquid offshore, the dry powder compositions specified in FIGS. 26 through 35 can be discharged over the expansive surface of spilled hydrocarbon liquid dispersed on a water surface, using the method specified in FIG. 47 and any of the apparatus specified in FIGS. 36-39B, for example. If the spilled flammable fuel is ablaze (i.e. burning), then the discharged dry powder composition will extinguish the active fire while polymer powder particles absorb hydrocarbon molecules of the spilled hydrocarbon floating on the water, as illustrated in FIG. 47, to clean-up the extinguished hydrocarbon absorbed by the applied powder composition of the present invention. If necessary or desired, the hydrocarbon-absorbed powder removed after fire extinguishment may be processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the water, as illustrated in FIG. 47, to clean-up the spilled hydrocarbon absorbed by the applied powder composition of the present invention.

Alternatively, the method of fire extinguishing and liquid absorption specified in FIGS. 46A and 46B may be practiced and applied to the hydrocarbon liquids spilled offshore, using the dry chemical powder compositions specified in FIG. 25 and hydrocarbon absorbing polymer powders specified in FIG. 27. If the spilled flammable fuel is ablaze (i.e. burning), then the discharged dry powder composition will extinguish the active fire, and then while polymer powder particles are discharged to absorb hydrocarbon molecules of the spilled hydrocarbon floating on the water, as illustrated in FIGS. 46A and 46B, to clean-up the extinguished hydrocarbon liquid absorbed by the applied powder composition of the present invention. If necessary or desired, the hydrocarbon-absorbed powder may be removed after fire extinguishment and then be processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the water, as illustrated in FIGS. 46A and 46B, to clean-up the spilled hydrocarbon absorbed by the applied powder composition of the present invention.

Extinguishing Fire on Flammable Liquid Spilled Onshore

The dry powder compositions of the present invention can be used to respond to oil spills onshore described in FIGS. 6 through 22. Upon the spilling of oil or flammable liquid offshore, the dry powder compositions specified in FIGS. 26 through 35 can be discharged over the expansive surface of spilled hydrocarbon liquid dispersed on a water surface, using the method specified in FIG. 47 and any of the apparatus specified in FIGS. 36-39B, for example. If the spilled flammable fuel is ablaze (i.e. burning), then the discharged dry powder composition will extinguish the active fire while polymer powder particles absorb hydrocarbon molecules of the spilled hydrocarbon floating on the hard surface, as illustrated in FIG. 47, to clean-up the extinguished hydrocarbon absorbed by the applied powder composition of the present invention. If necessary or desired, the hydrocarbon-absorbed powder may be removed after fire extinguishment and then processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the water, as illustrated in FIG. 47, to clean-up the spilled hydrocarbon absorbed by the applied powder composition of the present invention.

Alternatively, the method of fire extinguishing and liquid absorption specified in FIGS. 46A and 46B may be practiced and applied to the hydrocarbon liquids spilled offshore, using the dry chemical powder compositions specified in FIG. 25 and hydrocarbon absorbing polymer powders specified in FIG. 27. If the spilled flammable fuel is ablaze (i.e. burning), then the discharged dry powder composition will extinguish the active fire, and then polymer powder particles are discharged to absorb hydrocarbon molecules of the spilled hydrocarbon floating on the water, as illustrated in FIGS. 46A and 46B, to clean-up the extinguished hydrocarbon absorbed by the applied powder composition of the present invention. If necessary or desired, the hydrocarbon-absorbed powder may be removed after fire extinguishment and then be processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the water, as illustrated in FIGS. 46A and 46B, to clean-up the spilled hydrocarbon absorbed by the applied powder composition of the present invention.

Extinguishing Fire on Flammable Liquid Spilled on Highways

Figure 18:
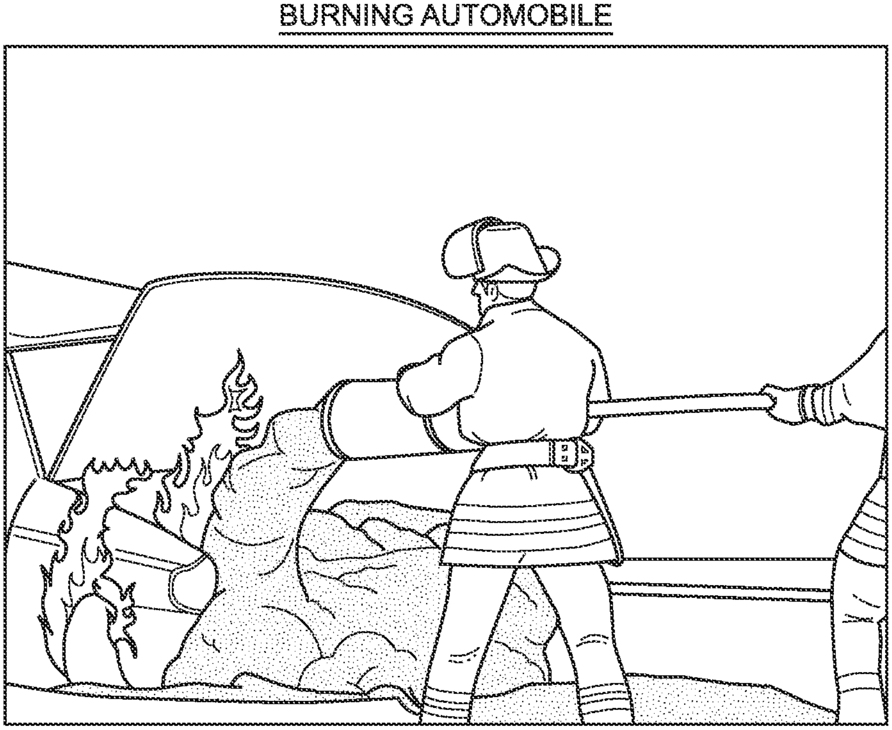
(PRIOR ART) FIG. 18
FIG. 18 is a perspective view of a firefighter producing and applying prior art aqueous film forming foam (AFFF) on a live fire outbreak involving a flammable hydrocarbon liquid such as gasoline from an automobile burning.
Figure 20:
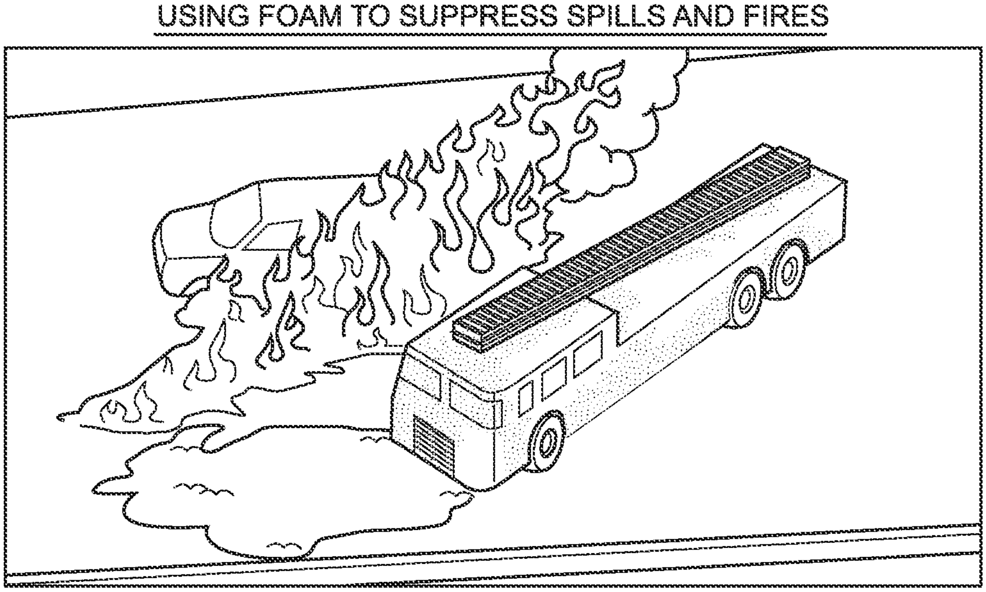
(PRIOR ART) FIG. 20
FIG. 20 is a perspective view of firefighters producing and applying prior art aqueous film forming foam (AFFF) on a live fire outbreak involving a flammable hydrocarbon liquid such as fuel oil spilled from a fuel truck on fire.

The dry powder compositions of the present invention can be used to respond to flammable liquid spills on highway road surfaces as described in FIGS. 18 and 20. Upon the spilling of oil or flammable liquid on the highway road surface, the dry powder compositions specified in FIGS. 26 through 35 can be discharged over the expansive surface of spilled hydrocarbon liquid (e.g. gasoline or diesel fuel) dispersed on a road or highway surface, using the method specified in FIG. 47 and any of the apparatus specified in FIGS. 36-43B, for example. If the spilled flammable fuel is ablaze (i.e. burning), then the discharged dry powder composition will extinguish the active fire while polymer powder particles absorb hydrocarbon molecules of the spilled hydrocarbon floating on the runway, as illustrated in FIG. 47, to clean-up the extinguished hydrocarbon absorbed by the applied powder composition of the present invention. If necessary or desired, the hydrocarbon-absorbed powder may be removed after fire extinguishment and then processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the road surface, as illustrated in FIG. 47, to clean-up the spilled hydrocarbon absorbed by the applied powder composition of the present invention.

Alternatively, the method of fire extinguishing and liquid absorption specified in FIGS. 46A and 46B may be practiced and applied to the hydrocarbon liquids spilled on highway road surfaces, using the dry chemical powder compositions specified in FIG. 25 and hydrocarbon absorbing polymer powders specified in FIG. 27. If the spilled flammable fuel is ablaze (i.e. burning), then the discharged dry powder composition will extinguish the active fire, and then polymer powder particles are discharged to absorb hydrocarbon molecules of the spilled hydrocarbon floating on the road surface, as illustrated in FIGS. 46A and 46B, to clean-up the extinguished hydrocarbon absorbed by the applied powder composition of the present invention. If necessary or desired, the hydrocarbon-absorbed powder may be removed after fire extinguishment and then be processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the road surface, as illustrated in FIGS. 46A and 46B, to clean-up the spilled hydrocarbon absorbed by the applied powder composition of the present invention.

Extinguishing Fire on Flammable Liquid Spilled on Airport Runways

Figure 21:
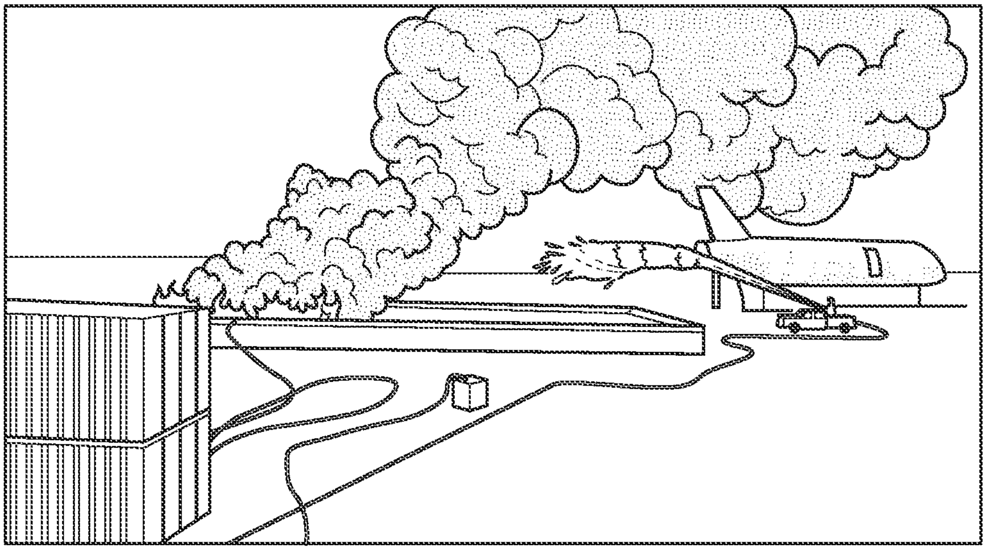
(PRIOR ART) FIG. 21
FIG. 21 is a perspective view of firefighters producing and applying prior art aqueous film forming foam (AFFF) on a live fire outbreak involving a flammable hydrocarbon liquid spilled from an aircraft on fire.
Figure 22:
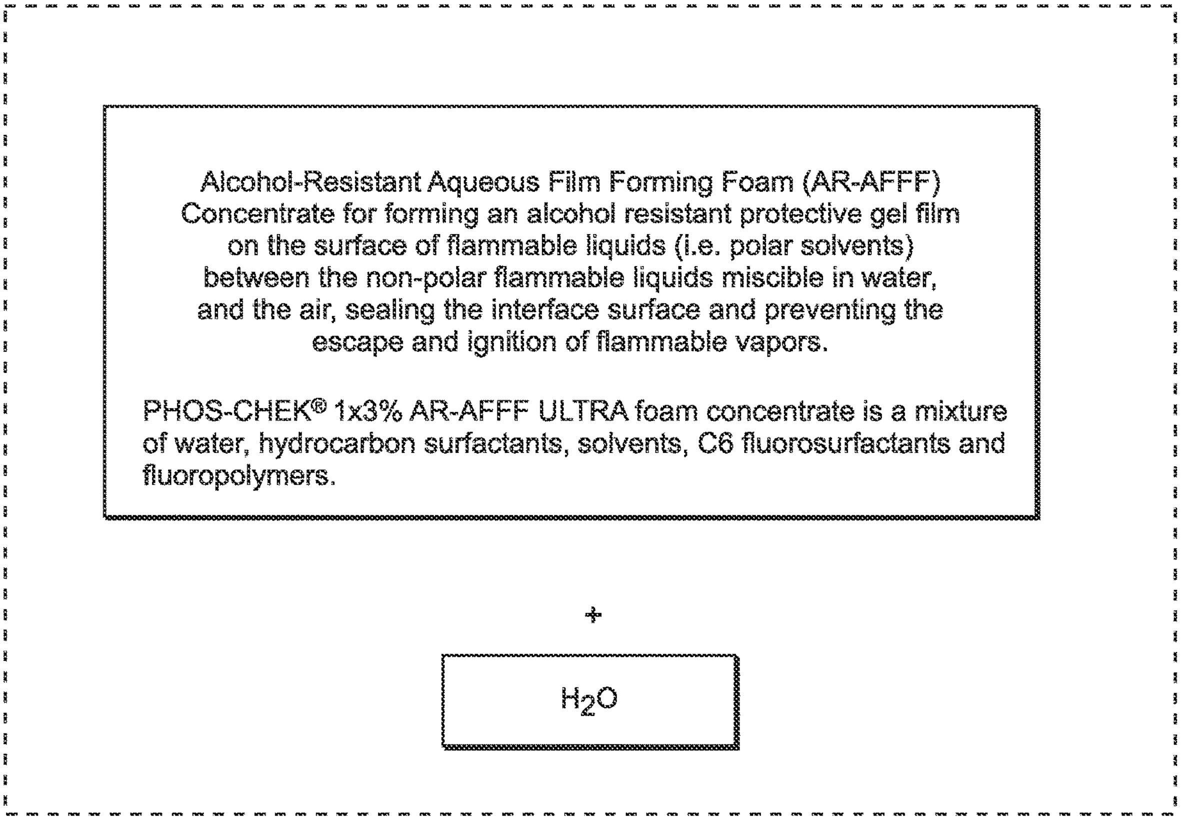
(PRIOR ART) FIG. 22
FIG. 22 is a schematic representation illustrating the prior art active components in the prior art PHOS-CHEK® 1×3% alcohol resistant—aqueous film forming foam (AR-AFFF ULTRA) for firefighting flammable fuels Class B firefighting foams, wherein when mixed with water, the alcohol resistant—aqueous film forming foam (AR-AFFF) concentrate forms an alcohol resistant protective gel film on the surface of flammable liquids (i.e. polar solvents) between the non-polar flammable liquids miscible in water, and the air, sealing the interface surface and preventing the escape and ignition of flammable vapors.

The dry powder compositions of the present invention can be used to respond to flammable liquid spills on airport runways, as described in FIG. 21. Upon the spilling of oil or flammable liquid on the highway, the dry powder compositions specified in FIGS. 26 through 35 can be discharged over the expansive surface of spilled hydrocarbon liquid (e.g. gasoline or diesel fuel) dispersed on an airport runway surface, using the method specified in FIG. 47 and any of the apparatus specified in FIGS. 36-43B, for example. If the spilled flammable fuel is ablaze (i.e. burning), then the discharged dry powder composition will extinguish the active fire while polymer powder particles absorb hydrocarbon molecules of the spilled hydrocarbon floating on the runway, as illustrated in FIG. 47, to clean-up the extinguished hydrocarbon absorbed by the applied powder composition of the present invention. If necessary or desired, the hydrocarbon-absorbed powder may be removed after fire extinguishment and then processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the runway surface, as illustrated in FIG. 47, to clean-up the spilled hydrocarbon absorbed by the applied powder composition of the present invention.

Alternatively, the method of fire extinguishing and liquid absorption specified in FIGS. 46A and 46B may be practiced and applied to the hydrocarbon liquids spilled on runway surfaces, using the dry chemical powder compositions specified in FIG. 25 and hydrocarbon absorbing polymer powders specified in FIG. 27. If the spilled flammable fuel is ablaze (i.e. burning), then the discharged dry powder composition will extinguish the active fire, and then polymer powder particles are discharged to absorb hydrocarbon molecules of the spilled hydrocarbon floating on the runway surface, as illustrated in FIGS. 46A and 46B, to clean-up the extinguished hydrocarbon absorbed by the applied powder composition of the present invention. If necessary or desired, the hydrocarbon-absorbed powder may be removed after fire extinguishment and then be processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the road surface, as illustrated in FIGS. 46A and 46B, to clean-up the spilled hydrocarbon absorbed by the applied powder composition of the present invention.

Extinguishing Fire on Flammable Liquid Spilled at Gas Stations

The dry powder compositions of the present invention can be used to respond to flammable liquid spills at gasoline and diesel filling stations with fuel pumps, as described in FIGS. 44A and 44B. Upon the spilling of oil or flammable liquid on the highway, the dry powder compositions specified in FIGS. 26 through 35 can be discharged over the expansive surface of spilled hydrocarbon liquid (e.g. gasoline or diesel fuel) dispersed on filling station and pump surface, using the method specified in FIG. 47 and any of the apparatus specified in FIGS. 36-44B, for example. If the spilled flammable fuel is ablaze (i.e. burning), then the discharged dry powder composition will extinguish the active fire while polymer powder particles absorb hydrocarbon molecules of the spilled hydrocarbon floating on the runway, as illustrated in FIG. 47, to clean-up the extinguished hydrocarbon absorbed by the applied powder composition of the present invention. If necessary or desired, the hydrocarbon-absorbed powder may be removed after fire extinguishment and then processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the filling station road surface, as illustrated in FIG. 47, to clean-up the spilled hydrocarbon absorbed by the applied powder composition of the present invention.

Alternatively, the method of fire extinguishing and liquid absorption specified in FIGS. 46A and 46B may be practiced and applied to the hydrocarbon liquids spilled on filling station surfaces, using the dry chemical powder compositions specified in FIG. 25 and hydrocarbon absorbing polymer powders specified in FIG. 27. If the spilled flammable fuel is ablaze (i.e. burning), then the discharged dry powder composition will extinguish the active fire, and then polymer powder particles are discharged to absorb hydrocarbon molecules of the spilled hydrocarbon floating on the runway surface, as illustrated in FIGS. 46A and 46B, to clean-up the extinguished hydrocarbon absorbed by the applied powder composition of the present invention. If necessary or desired, the hydrocarbon-absorbed powder may be removed after fire extinguishment and then be processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the filling station surface, as illustrated in FIGS. 46A and 46B, to clean-up the spilled hydrocarbon absorbed by the applied powder composition of the present invention.

Extinguishing Fire on Flammable Liquid on Surfaces In Commercial And Industrial Facilities The dry powder compositions of the present invention can be used to respond to flammable liquid spills on surfaces at commercial and industrial facilities. Upon the spilling of oil or flammable liquid at a commercial or industrial facility, the dry powder compositions specified in FIGS. 26 through 35 can be discharged over the expansive surface of spilled hydrocarbon liquid (e.g. gasoline or diesel fuel) dispersed over equipment or facilities surfaces, using the method specified in FIG. 47 and any of the apparatus specified in FIGS. 36-44B, for example. If the spilled flammable fuel is ablaze (i.e. burning), then the discharged dry powder composition will extinguish the active fire while polymer powder particles absorb hydrocarbon molecules of the spilled hydrocarbon liquid, as illustrated in FIG. 47, to clean-up the extinguished hydrocarbon absorbed by the applied powder composition of the present invention. If necessary or desired, the hydrocarbon-absorbed powder may be removed after fire extinguishment and then processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the surfaces at the commercial or industrial facility, as illustrated in FIG. 47, to clean-up the spilled hydrocarbon absorbed by the applied powder composition of the present invention.

Alternatively, the method of fire extinguishing and liquid absorption specified in FIGS. 46A and 46B may be practiced and applied to the hydrocarbon liquids spilled on surfaces of the facility, using the dry chemical powder compositions specified in FIG. 25 and hydrocarbon absorbing polymer powders specified in FIG. 27. If the spilled flammable fuel is ablaze (i.e. burning), then the discharged dry powder composition will extinguish the active fire, and then polymer powder particles are discharged to absorb hydrocarbon molecules of the spilled hydrocarbon floating on the surface of the facility, as illustrated in FIGS. 46A and 46B, to clean-up the extinguished hydrocarbon absorbed by the applied powder composition of the present invention. If necessary or desired, the hydrocarbon-absorbed powder may be removed after fire extinguishment and then be processed to extract the hydrocarbons for recycling and reuse. If the spilled flammable fuel is not ablaze (i.e. not burning), then the polymer powder particles in the discharged dry powder composition will absorb hydrocarbon molecules of the spilled hydrocarbon floating on the surfaces of the commercial or industrial facility, as illustrated in FIGS. 46A and 46B, to clean-up the spilled hydrocarbon absorbed by the applied powder composition of the present invention.

Specification of Liquid Hydrocarbon Sorbing Articles of Manufacture Composed from Hydrophobic/Oleophilic Fibrous Compositions Chemically Treated for Inhibiting Fire Ignition of Flammable Liquid Hydrocarbons, Using Fire Inhibiting Dry Chemical Powder FIG. 48 is a schematic representation of liquid hydrocarbon sorbing articles of manufacture (e.g. tubes, socks, mats, fabric, canvas, strands, etc.) composed from hydrophobic/oleophilic fibrous compositions chemically treated for inhibiting fire ignition involving flammable liquid hydrocarbons, while absorbing the flammable liquid hydrocarbons when spilled on a body of water and/or land. Such liquid hydrocarbon sorbing articles of manufacture are made using an environmentally-clean fire inhibiting liquid chemical comprising a fire inhibiting liquid chemical formulated using a major amount of tripotassium citrate (TPC), powder fluidizing agent, and a minor amount of coalescing agent and/or dispersant (e.g. CITROFOL® triethyl citrate) and a surfactant (e.g. Sodium Lauryl Ether Sulfate, or CITREM) mixed together and applied to coat the surfaces of short-strand sorbent fiber material having oleophilic/hydrophobic properties (e.g. such as Basalt Fiber Sorbent Material disclosed in EP Patent No. 3266518 B1 and US Patent Application Publication No. 2018/0133690) adapted for absorbing flammable liquid hydrocarbons spilled or dispersed on bodies of water, or hard ground surfaces, as the case may be and require safe and expeditious recovery and environmental cleanup.

In the preferred embodiment, the environmentally-clean fire-extinguishing dry chemical powder composition, used to treat the oleophilic/hydrophobic fibers material (e.g. basalt fiber strands), is produced by mixing, blending and milling the components to powder particle dimensions for packaging as specified as follows. The composition comprises: 8.0 pounds by weight of tripotassium citrate; 2.5 pounds by weight of natural gum as a powder fluidizing agent; and 0.5 pounds by weight of surfactant (i.e. sodium lauryl ester sulfate SLES powder) to produce a resultant dry powder composition of total weight of 11.0 pounds; wherein each component is mixed, blended and milled into a dry powder composition having a powder particle size of about 50 microns, and packaged into and sealed within a storage container.

FIG. 49 describes the primary steps carried out in a first method of manufacturing fire-inhibiting liquid hydrocarbon sorbing products made from environmentally clean and natural materials. As described in FIG. 49, the method comprises: (i) producing liquid hydrocarbon sorbent fiber (e.g. basalt fiber) material having a specified fiber strand length (e.g. 1 inch); (ii) preparing an amount of fire-inhibiting dry powder chemical composition of the present invention, by mixing together an amount of tripotassium citrate (TPC), an amount of powder fluidizing agent, and an amount of coalescing and/or dispersing agent (and surfactant), such a Citrofol® triethyl citrate, (iii) mixing an effective amount of the fire-inhibiting dry powder chemical composition with a prespecified amount of liquid hydrocarbon sorbent fiber material, and gently tumbling the material together, so as to coat the liquid hydrocarbon sorbent with the fire-inhibiting dry powder chemical composition material; and (iv) using the hydrocarbon liquid fuel sorbent fiber material treated to produce a hydrocarbon liquid sorbent product adapted for adsorbing spilled liquid hydrocarbon, repelling water and inhibiting against fire ignition.

In the preferred embodiment, the environmentally-clean fire-extinguishing dry chemical powder composition, used to treat the oleophilic/hydrophobic fibers material (e.g. basalt fiber strands), is produced by mixing, blending and milling the components to powder particle dimensions for packaging as specified as follows. The composition comprises: 8.0 pounds by weight of tripotassium citrate; 2.5 pounds by weight of natural gum as a powder fluidizing agent; and 0.5 pounds by weight of surfactant (i.e. sodium lauryl ester sulfate SLES powder) to produce a resultant dry powder composition of total weight of 11.0 pounds; wherein each component is mixed, blended and milled into a dry powder composition having a powder particle size of about 50 microns, and packaged into and sealed within a storage container.

Specification of Liquid Hydrocarbon Sorbing Articles of Manufacture Composed from Hydrophobic/Oleophilic Fibrous Compositions Chemically Treated for Inhibiting Fire Ignition of Flammable Liquid Hydrocarbons, Using Fire Inhibiting Chemical Liquid FIG. 50 represents the structure of liquid hydrocarbon sorbing articles of manufacture (e.g. tubes, socks, mats, fabric, canvas, strands, etc.) composed from hydrophobic/oleophilic fibrous compositions chemically treated for inhibiting fire ignition involving flammable liquid hydrocarbons, such as oils, fuels and non-polar solvents, while absorbing the flammable liquid hydrocarbons when spilled on a body of water and/or land. Such liquid hydrocarbon sorbing articles of manufacture are made using an environmentally-clean fire inhibiting liquid chemical composition formulated using a first amount of tripotassium citrate (TPC), and a second amount of coalescing and dispersing agent and surfactant dissolved in a quantity of water and mixed to produce a liquid solution that is used for coating short-strand sorbent fiber material (e.g. Basalt Fiber Sorbent Material EP Patent No. 3266518 B1, US Patent Application Publication No. 2018/0133690) adapted for sorbing flammable liquid hydrocarbons.

A fire-extinguishing biochemical composition, for use in treating the oleophilic/hydrophobic basalt fiber strands, is produced by stirring the components into water. The composition comprises: 0.05 pounds by weight of triethyl citrate as coalescing agent, (20.3 milliliters by volume); 5.2 pounds by weight of tripotassium citrate (64 fluid ounces by volume); and 4.4 pounds by weight of water (64 fluid ounces by volume), to produce a resultant solution of total weight of 9.61 pounds having 128 ounces or 1 gallon of volume.

FIG. 51 describes the primary steps carried out in a second method of manufacturing fire-inhibiting liquid hydrocarbon sorbing products made from environmentally clean and natural materials. As shown in FIG. 31, the method comprises: (i) producing liquid hydrocarbon sorbent fiber (e.g. basalt fiber) material having a specified fiber strand length; (ii) preparing an amount of fire-inhibiting liquid chemical composition of the present invention; (iii) applying an effective amount of the fire-inhibiting dry powder chemical composition to a prespecified amount of hydrocarbon liquid fuel sorbent fiber material, by spraying and/or gently tumbling the materials together, so as to coat the liquid hydrocarbon sorbent with the fire-inhibiting liquid chemical composition which is then air-dried or by forced air and/or heating; and (iv) using the hydrocarbon liquid fuel sorbent fiber material treated in Step 3 to produce a liquid hydrocarbon sorbent product (e.g. liquid hydrocarbon absorbing structures such as floatable tubes, booms, woven and unwoven matts, pads and fabrics, and other objects) adapted for adsorbing spilled liquid hydrocarbon, repelling water and inhibiting against fire ignition.

A fire-extinguishing biochemical composition, for use in treating the oleophilic/hydrophobic basalt fiber strands, is produced by stirring the components into water. The composition comprises: 0.05 pounds by weight of triethyl citrate as coalescing agent, (20.3 milliliters by volume); 5.2 pounds by weight of tripotassium citrate (64 fluid ounces by volume); and 4.4 pounds by weight of water (64 fluid ounces by volume), to produce a resultant solution of total weight of 9.61 pounds having 128 ounces or 1 gallon of volume.

Figure 52:
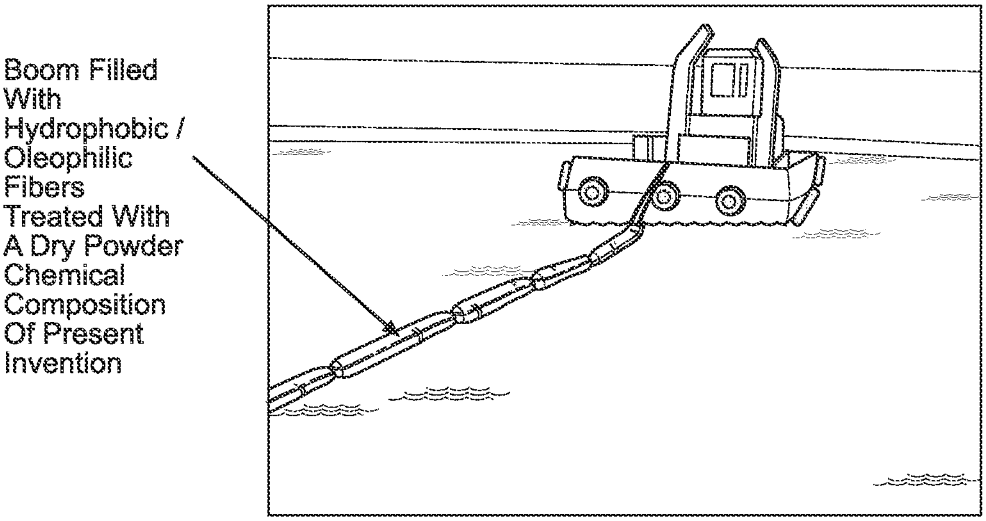
FIG. 52 is a perspective view of fire-inhibiting liquid hydrocarbon sorbent socks, tubes, etc. made from basalt fiber material having hydrophobic/oleophilic properties and treated with dry powder fire inhibiting chemical compositions of the present invention.

Specification of Liquid Hydrocarbon Sorbing Articles of Manufacture Composed from Hydrophobic/Oleophilic Fibrous Compositions Chemically Treated for Inhibiting Fire Ignition of Flammable Liquid Hydrocarbons FIG. 52 shows fire-inhibiting liquid hydrocarbon sorbent booms (e.g. socks, tubes, etc.) made from basalt fiber material treated with dry powder fire inhibiting chemical compositions of the present invention, and fabricated in accordance with the first method described in FIG. 51. As shown in FIG. 52, a fire inhibiting liquid hydrocarbon sorbent boom comprises: a tubular carrier made from any fabric that permits the passage of hydrocarbon liquid, and is sewn into a 3D geometrical shape of a tubular structure; and an oleophilic/hydrophobic fiber material contained in the tubular carrier and treated with a dry powder fire inhibiting chemical composition containing tripotassium citrate (TPC), to produce a fire inhibiting liquid hydrocarbon sorbent boom for sorbing liquid hydrocarbon spilled on water or ground surface. Preferably, the oleophilic/hydrophobic fiber material is basalt fiber.

Figure 53:
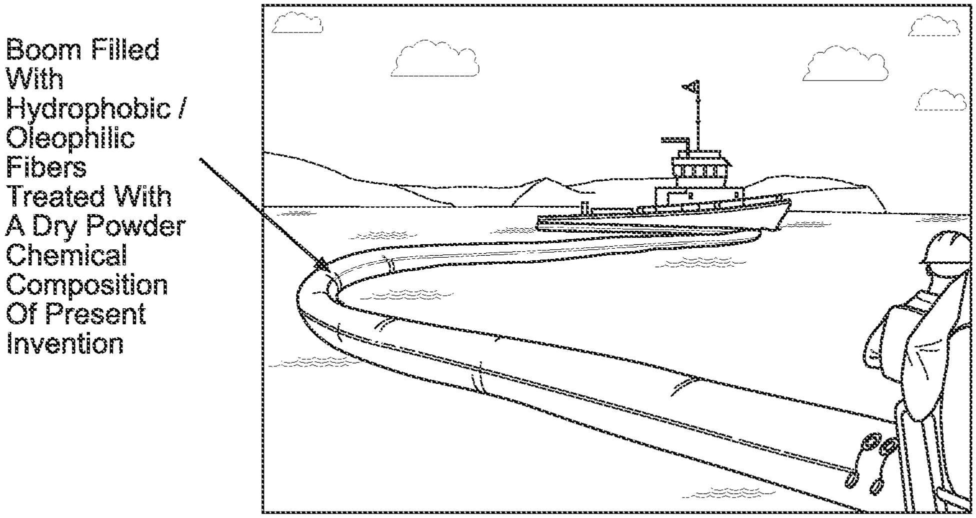
FIG. 53 is a perspective view fire-inhibiting liquid hydrocarbon sorbent booms made from basalt fiber material having hydrophobic/oleophilic properties and treated with dry powder fire inhibiting chemical compositions of the present invention.

FIG. 53 shows fire-inhibiting liquid hydrocarbon sorbent booms made from basalt fiber material treated with fire inhibiting liquid chemical compositions of the present invention, and fabricated in accordance with the first method described in FIG. 51. As shown in FIG. 53, a fire inhibiting liquid hydrocarbon sorbent boom comprises: a tubular carrier made from any fabric that permits the passage of hydrocarbon liquids, and sewn into a 3D geometrical shape of a tubular structure; and an oleophilic/hydrophobic fiber material contained in the tubular carrier and treated with a dry powder fire inhibiting chemical composition containing tripotassium citrate (TPC), to produce a fire inhibiting liquid hydrocarbon sorbent boom for sorbing liquid hydrocarbon spilled on water or ground surface. Preferably, the oleophilic/hydrophobic fiber material is basalt fiber.

Figure 54:
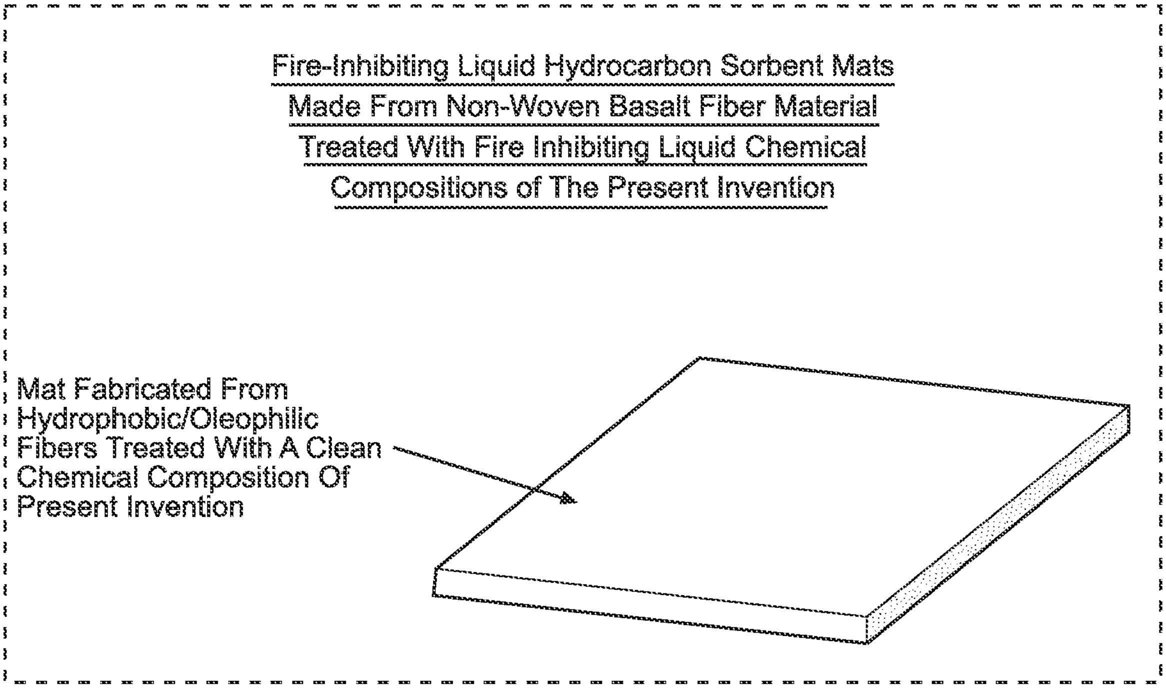
FIG. 54 is a perspective view of fire-inhibiting liquid hydrocarbon sorbent mats made from non-woven basalt fiber material having hydrophobic/oleophilic properties and treated with dry powder fire inhibiting chemical compositions of the present invention.

FIG. 54 shows fire-inhibiting liquid hydrocarbon sorbent mats made from non-woven basalt fiber material treated with fire inhibiting dry powder chemical compositions of the present invention, and packaged within a liquid impervious fabric, and fabricated in accordance with the first method described in FIG. 49. As shown in FIG. 54, the fire inhibiting liquid hydrocarbon sorbent fabric, shaped in the form of a mat or pad, comprises: any fabric that permits the passage of hydrocarbon liquids and sewn into a 3D geometrical shape of a mat or pad structure that can be applied over oil and liquid fuel spills; and oleophilic/hydrophobic fiber contained in the fabric and treated with a dry powder fire inhibiting chemical composition containing tripotassium citrate (TPC), to produce a fire inhibiting liquid hydrocarbon sorbent fabric for sorbing liquid hydrocarbon spilled on water or ground surface. Preferably, the oleophilic/hydrophobic fiber is basalt fiber.

Figure 55:
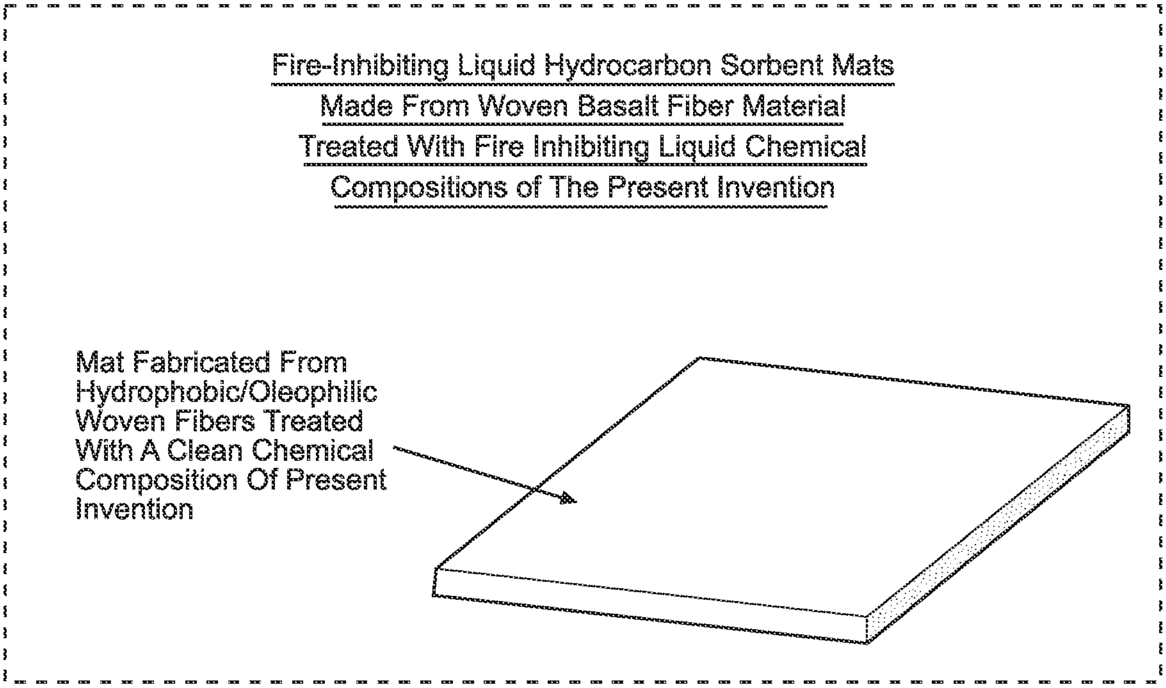
FIG. 55 is a perspective view of fire-inhibiting liquid hydrocarbon sorbent mats made from woven basalt fiber material having hydrophobic/oleophilic properties and treated with dry powder fire inhibiting chemical compositions of the present invention.

FIG. 55 shows fire-inhibiting liquid hydrocarbon sorbent mats made from woven basalt fiber material treated with fire inhibiting liquid chemical compositions of the present invention, and fabricated in accordance with the second method described in the first method described in FIG. 51. As shown in FIG. 55, the fire inhibiting liquid hydrocarbon sorbent fabric shaped in the form of a mat, comprises: any fabric that permits the passage of hydrocarbon liquids; and oleophilic/hydrophobic fiber contained in the fabric and treated with a dry powder fire inhibiting chemical composition containing tripotassium citrate (TPC), to produce a fire inhibiting liquid hydrocarbon sorbent fabric for sorbing liquid hydrocarbon spilled on water or ground surface. Preferably, the oleophilic/hydrophobic fiber is basalt fiber.

Modifications to The Present Invention Which Readily Come to Mind

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein. These and other variations and modifications will come to mind in view of the present invention disclosure.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. An environmentally-clean dry chemical powder composition for absorbing flammable hydrocarbon liquid and inhibiting fire ignition and/or extinguishing an active fire involving the absorbed flammable hydrocarbon liquid, said environmentally-clean dry chemical powder composition comprising:

- a major amount of tripotassium citrate (TPC) powder;
- a minor amount of polymer powder for absorbing flammable hydrocarbon liquids;
- a minor amount of powder fluidizing agent powder;
- wherein said tripotassium citrate (TPC) powder is present in a major amount in the range from 65% to 95% by weight;
- wherein said polymer powder is present in a minor amount in the range from 1% to 30% by weight; and
- wherein said powder fluidizing agent powder is present in a minor amount in the range from 0.1% to 3% by weight;
- wherein the sum of the % weight of said powder components should not exceed 100% by weight; and
- wherein each said powder component is mixed, blended and milled into a said environmentally-clean dry chemical powder composition and packaged into and sealed within a container for storage and shipment to an end-user location, for use in absorbing flammable hydrocarbon liquid and inhibiting fire ignition and/or extinguishing an active fire involving said absorbed flammable hydrocarbon liquid.

2. The environmentally-clean dry chemical powder composition according to claim 1, wherein the environmentally-clean dry chemical powder composition has a powder particle size in the range of about 3000 microns to about 10 microns.

3. The environmentally-clean dry chemical powder composition of claim 1, wherein said powder fluidizing agent comprises one or more powders selected from the group consisting of natural gum powder, natural cellulose powder and silica powder.

4. An environmentally-clean dry chemical powder composition for absorbing flammable hydrocarbon liquid and inhibiting fire ignition and/or extinguishing an active fire involving the absorbed flammable hydrocarbon liquid, said environmentally-clean dry chemical powder composition comprising:

- a major amount of potassium citrate powder;
- a minor amount of polymer powder for absorbing flammable hydrocarbons; and
- a minor amount of powder fluidizing agent, blended and mixed together to form the said environmentally-clean dry chemical powder composition, for use in absorbing flammable hydrocarbon liquid and inhibiting fire ignition and/or extinguishing an active fire involving said absorbed flammable hydrocarbon liquid;
- wherein said potassium citrate powder is present in a major amount in the range from 65% to 95% by weight;
- wherein said polymer powder is present in a minor amount in the range from 1% to 30% by weight; and
- wherein said powder fluidizing agent powder is present in a minor amount in the range from 0.1% to 3% by weight;
- wherein the sum of the % weight of said powder components should not exceed 100% by weight.

5. The environmentally-clean dry chemical powder composition according to claim 4, wherein the environmentally-clean dry chemical powder composition has a powder particle size in the range of about 3000 microns to about 10 microns.

6. The environmentally-clean dry chemical powder composition of claim 4, wherein said powder fluidizing agent comprises one or more powders selected from the group consisting of natural gum powder, natural cellulose powder and silica powder.

7. The environmentally-clean dry chemical powder composition of claim 1, wherein said polymer powder comprises one or more polymers selected from the group consisting of cross-linked polyethylene (PE) polymer powder, cross-linked ethylene/propylene/diene elastomer (EPDM) polymer powder, cross-linked polypropylene polymer powder, cross-linked polypropylene powder, cross-linked polyurethane polymer, cross-linked polysiloxane (silicone) polymer powder, cured epoxy resin polymer powder, and polymer blend powder.

8. The environmentally-clean dry chemical powder composition of claim 4, wherein said polymer powder comprises one or more polymers selected from the group consisting of cross-linked polyethylene (PE) polymer powder, cross-linked ethylene/propylene/diene elastomer (EPDM) polymer powder, cross-linked polypropylene polymer powder, cross-linked polypropylene powder, cross-linked polyurethane polymer, cross-linked polysiloxane (silicone) polymer powder, cured epoxy resin polymer powder, and polymer blend powder.

9. An environmentally-clean dry chemical powder composition for absorbing flammable hydrocarbon liquid and inhibiting fire ignition and/or extinguishing an active fire involving the absorbed flammable hydrocarbon liquid, said environmentally-clean dry chemical powder composition comprising:

a potassium citrate powder;

a polymer powder for absorbing flammable hydrocarbons; and a powder fluidizing agent, blended and mixed together to form said environmentally-clean dry chemical powder composition for absorbing flammable hydrocarbon liquid and inhibiting fire ignition and/or extinguishing an active fire involving the absorbed flammable hydrocarbon liquid, wherein said environmentally-clean dry chemical powder composition is stored in a container, and carried by and connected to a transportable dispensing apparatus configured for dispensing said environmentally-clean dry chemical powder composition over and/or onto a flammable hydrocarbon liquid so as to absorb the flammable hydrocarbon liquid and inhibit fire ignition and/or extinguishing an active fire involving said absorbed flammable hydrocarbon liquid.

10. The environmentally-clean dry chemical powder composition according to claim 9, wherein the environmentally-clean dry chemical powder composition has a powder particle size in the range of about 3000 microns to about 10 microns.

11. The environmentally-clean dry chemical powder composition of claim 9, wherein said powder fluidizing agent comprises one or more powders selected from the group consisting of natural gum powder, natural cellulose powder and silica powder.

12. The environmentally-clean dry chemical powder composition of claim 9, wherein said polymer powder comprises one or more polymers selected from the group consisting of cross-linked polyethylene (PE) polymer powder, cross-linked ethylene/propylene/diene elastomer (EPDM) polymer powder, cross-linked polypropylene polymer powder, cross-linked polypropylene powder, cross-linked polyurethane polymer, cross-linked polysiloxane (silicone) polymer powder, cured epoxy resin polymer powder, and polymer blend powder.

13. The environmentally-clean dry chemical powder composition of claim 9, wherein said potassium citrate powder comprises tripotassium citrate (TPC) powder.

14. The environmentally-clean dry chemical powder composition of claim 9, wherein said transportable dispensing apparatus comprises a transportable vehicle that can be rapidly transported to said flammable hydrocarbon liquid and dispense said environmentally-clean dry chemical powder composition and absorb the flammable hydrocarbon liquid and inhibit fire ignition and/or extinguishing an active fire involving said absorbed flammable hydrocarbon liquid.

* * * * *